US010705794B2

(12) United States Patent

Gruber et al.

(10) Patent No.: US 10,705,794 B2

(45) Date of Patent: Jul. 7, 2020

(54) AUTOMATICALLY ADAPTING USER INTERFACES FOR HANDS-FREE INTERACTION

(71) Applicant: Apple Inc., Cupertino, CA (US)

(72) Inventors: Thomas R. Gruber, Emerald Hills, CA (US); Harry J. Saddler, Berkeley, CA (US); Lia T. Napolitano, San Francisco, CA (US); Emily Clark Schubert, San Jose, CA (US); Brian Conrad Sumner, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/913,421

(22) Filed: Jun. 8, 2013

(65) Prior Publication Data

US 2013/0275875 A1 Oct. 17, 2013

Related U.S. Application Data

(63) Continuation-in-part of application No. 13/250,947, filed on Sep. 30, 2011, now Pat. No. 10,496,753, and (Continued)

(51) Int. Cl.

*G06F 3/16* (2006.01)
*G10L 15/22* (2006.01)
*G10L 15/08* (2006.01)

(52) U.S. Cl.

CPC .............. *G06F 3/167* (2013.01); *G10L 15/22* (2013.01); *G10L 2015/088* (2013.01); *G10L 2015/225* (2013.01)

(58) Field of Classification Search

CPC .......... G06F 3/16; G06F 3/011; G06F 3/0481; G06F 17/243; G10L 15/265; H04M 1/66; H04M 1/6075; H04M 1/6083

See application file for complete search history.

(56) References Cited

U.S. PATENT DOCUMENTS

| | | | |
|---|---|---|---|
| 1,559,320 | A | 10/1925 | Hirsh |
| 2,180,522 | A | 11/1939 | Henne |

(Continued)

FOREIGN PATENT DOCUMENTS

| | | | |
|---|---|---|---|
| CA | 2666438 | C | 6/2013 |
| CH | 681573 | A5 | 4/1993 |

(Continued)

OTHER PUBLICATIONS

"Top 10 Best Practices for Voice User Interface Design" available at <http://www.developer.com/voice/article.php/1567051/Top-10-Best-Practices-for-Voice-UserInterface-Design.htm>, Nov. 1, 2002, 4 pages.

(Continued)

*Primary Examiner* — Seth A Silverman

(74) *Attorney, Agent, or Firm* — Dentons US LLP

(57) ABSTRACT

The method includes automatically, without user input and without regard to whether a digital assistant application has been separately invoked by a user, determining that the electronic device is in a vehicle. In some implementations, determining that the electronic device is in a vehicle comprises detecting that the electronic device is in communication with the vehicle (e.g., via a wired or wireless communication techniques and/or protocols). The method also includes, responsive to the determining, invoking a listening mode of a virtual assistant implemented by the electronic device. In some implementations, the method also includes limiting the ability of a user to view visual output presented by the electronic device, provide typed input to the electronic device, and the like.

32 Claims, 31 Drawing Sheets

Related U.S. Application Data a continuation-in-part of application No. 12/987,982, filed on Jan. 10, 2011, now Pat. No. 9,318,108.

(60) Provisional application No. 61/657,744, filed on Jun. 9, 2012, provisional application No. 61/493,201, filed on Jun. 3, 2011, provisional application No. 61/295,774, filed on Jan. 18, 2010.

(56) References Cited

U.S. PATENT DOCUMENTS 3,704,345 A 11/1972 Coker et al.
3,710,321 A 1/1973 Rubenstein
3,828,132 A 8/1974 Flanagan et al.
3,979,557 A 9/1976 Schulman et al.
4,013,085 A 3/1977 Wright
4,081,631 A 3/1978 Feder
4,090,216 A 5/1978 Constable
4,107,784 A 8/1978 Van Bemmelen
4,108,211 A 8/1978 Tanaka
4,159,536 A 6/1979 Kehoe et al.
4,181,821 A 1/1980 Pirz et al.
4,204,089 A 5/1980 Key et al.
4,241,286 A 12/1980 Gordon
4,253,477 A 3/1981 Eichman
4,278,838 A 7/1981 Antonov
4,282,405 A 8/1981 Taguchi
4,310,721 A 1/1982 Manley et al.
4,332,464 A 6/1982 Bartulis et al.
4,348,553 A 9/1982 Baker et al.
4,384,169 A 5/1983 Mozer et al.
4,386,345 A 5/1983 Narveson et al.
4,433,377 A 2/1984 Eustis et al.
4,451,849 A 5/1984 Fuhrer
4,485,439 A 11/1984 Rothstein
4,495,644 A 1/1985 Parks et al.
4,513,379 A 4/1985 Wilson et al.
4,513,435 A 4/1985 Sakoe et al.
4,555,775 A 11/1985 Pike
4,577,343 A 3/1986 Oura
4,586,158 A 4/1986 Brandle
4,587,670 A 5/1986 Levinson et al.
4,589,022 A 5/1986 Prince et al.
4,611,346 A 9/1986 Bednar et al.
4,615,081 A 10/1986 Lindahl
4,618,984 A 10/1986 Das et al.
4,642,790 A 2/1987 Minshull et al.
4,653,021 A 3/1987 Takagi
4,654,875 A 3/1987 Srihari et al.
4,655,233 A 4/1987 Laughlin
4,658,425 A 4/1987 Julstrom
4,670,848 A 6/1987 Schramm
4,677,570 A 6/1987 Taki
4,680,429 A 7/1987 Murdock et al.
4,680,805 A 7/1987 Scott
4,686,522 A 8/1987 Hernandez et al.
4,688,195 A 8/1987 Thompson et al.
4,692,941 A 9/1987 Jacks et al.
4,698,625 A 10/1987 McCaskill et al.
4,709,390 A 11/1987 Atal et al.
4,713,775 A 12/1987 Scott et al.
4,718,094 A 1/1988 Bahl et al.
4,724,542 A 2/1988 Williford
4,726,065 A 2/1988 Froessl
4,727,354 A 2/1988 Lindsay
RE32,632 E 3/1988 Atkinson
4,736,296 A 4/1988 Katayama et al.
4,750,122 A 6/1988 Kaji et al.
4,754,489 A 6/1988 Bokser
4,755,811 A 7/1988 Slavin et al.
4,776,016 A 10/1988 Hansen
4,783,804 A 11/1988 Juang et al.
4,783,807 A 11/1988 Marley
4,785,413 A 11/1988 Atsumi
4,790,028 A 12/1988 Ramage
4,797,930 A 1/1989 Goudie
4,802,223 A 1/1989 Lin et al.
4,803,729 A 2/1989 Baker
4,807,752 A 2/1989 Chodorow
4,811,243 A 3/1989 Racine
4,813,074 A 3/1989 Marcus
4,819,271 A 4/1989 Bahl et al.
4,827,518 A 5/1989 Feustel et al.
4,827,520 A 5/1989 Zeinstra
4,829,576 A 5/1989 Porter
4,829,583 A 5/1989 Monroe et al.
4,831,551 A 5/1989 Schalk et al.
4,833,712 A 5/1989 Bahl et al.
4,833,718 A 5/1989 Sprague
4,837,798 A 6/1989 Cohen et al.
4,837,831 A 6/1989 Gillick et al.
4,839,853 A 6/1989 Deerwester et al.
4,852,168 A 7/1989 Sprague
4,862,504 A 8/1989 Nomura
4,875,187 A 10/1989 Smith
4,878,230 A 10/1989 Murakami et al.
4,887,212 A 12/1989 Zamora et al.
4,896,359 A 1/1990 Yamamoto et al.
4,903,305 A 2/1990 Gillick et al.
4,905,163 A 2/1990 Garber et al.
4,905,270 A 2/1990 Ono
4,908,867 A 3/1990 Silverman
4,914,586 A 4/1990 Swinehart et al.
4,914,590 A 4/1990 Loatman et al.
4,918,723 A 4/1990 Iggulden et al.
4,926,491 A 5/1990 Maeda et al.
4,928,307 A 5/1990 Lynn
4,931,783 A 6/1990 Atkinson
4,935,954 A 6/1990 Thompson et al.
4,939,639 A 7/1990 Lee et al.
4,941,488 A 7/1990 Marxer et al.
4,944,013 A 7/1990 Gouvianakis et al.
4,945,504 A 7/1990 Nakama et al.
4,953,106 A 8/1990 Gansner et al.
4,955,047 A 9/1990 Morganstein et al.
4,965,763 A 10/1990 Zamora
4,972,462 A 11/1990 Shibata
4,974,191 A 11/1990 Amirghodsi et al.
4,975,975 A 12/1990 Filipski
4,977,598 A 12/1990 Doddington et al.
4,980,916 A 12/1990 Zinser
4,985,924 A 1/1991 Matsuura
4,992,972 A 2/1991 Brooks et al.
4,994,966 A 2/1991 Hutchins
4,994,983 A 2/1991 Landell et al.
5,001,774 A 3/1991 Lee
5,003,577 A 3/1991 Ertz et al.
5,007,095 A 4/1991 Nara et al.
5,007,098 A 4/1991 Kumagai
5,010,574 A 4/1991 Wang
5,016,002 A 5/1991 Levanto
5,020,112 A 5/1991 Chou
5,021,971 A 6/1991 Lindsay
5,022,081 A 6/1991 Hirose et al.
5,027,110 A 6/1991 Chang et al.
5,027,406 A 6/1991 Roberts et al.
5,027,408 A 6/1991 Kroeker et al.
5,029,211 A 7/1991 Ozawa
5,031,217 A 7/1991 Nishimura
5,032,989 A 7/1991 Tornetta
5,033,087 A 7/1991 Bahl et al.
5,040,218 A 8/1991 Vitale et al.
5,046,099 A 9/1991 Nishimura
5,047,614 A 9/1991 Bianco
5,047,617 A 9/1991 Shepard et al.
5,050,215 A 9/1991 Nishimura
5,053,758 A 10/1991 Cornett et al.
5,054,084 A 10/1991 Tanaka et al.
5,057,915 A 10/1991 Kohorn et al.
5,067,158 A 11/1991 Arjmand
5,067,503 A 11/1991 Stile
5,072,452 A 12/1991 Brown et al.
5,075,896 A 12/1991 Wilcox et al.
5,079,723 A 1/1992 Herceg et al.

(56) References Cited

U.S. PATENT DOCUMENTS 5,083,119 A 1/1992 Trevett et al.
5,083,268 A 1/1992 Hemphill et al.
5,086,792 A 2/1992 Chodorow
5,090,012 A 2/1992 Kajiyama et al.
5,091,790 A 2/1992 Silverberg
5,091,945 A 2/1992 Kleijn
5,103,498 A 4/1992 Lanier et al.
5,109,509 A 4/1992 Katayama et al.
5,111,423 A 5/1992 Kopec, Jr. et al.
5,119,079 A 6/1992 Hube et al.
5,122,951 A 6/1992 Kamiya
5,123,103 A 6/1992 Ohtaki et al.
5,125,022 A 6/1992 Hunt et al.
5,125,030 A 6/1992 Nomura et al.
5,127,043 A 6/1992 Hunt et al.
5,127,053 A 6/1992 Koch
5,127,055 A 6/1992 Larkey
5,128,672 A 7/1992 Kaehler
5,133,011 A 7/1992 McKiel, Jr.
5,133,023 A 7/1992 Bokser
5,142,584 A 8/1992 Ozawa
5,144,875 A 9/1992 Nakada
5,148,541 A 9/1992 Lee et al.
5,153,913 A 10/1992 Kandefer et al.
5,157,610 A 10/1992 Asano et al.
5,157,779 A 10/1992 Washburn et al.
5,161,102 A 11/1992 Griffin et al.
5,164,900 A 11/1992 Bernath
5,164,982 A 11/1992 Davis
5,165,007 A 11/1992 Bahl et al.
5,167,004 A 11/1992 Netsch et al.
5,175,536 A 12/1992 Aschliman et al.
5,175,803 A 12/1992 Yeh
5,175,814 A 12/1992 Anick et al.
5,179,627 A 1/1993 Sweet et al.
5,179,652 A 1/1993 Rozmanith et al.
5,194,950 A 3/1993 Murakami et al.
5,195,034 A 3/1993 Garneau et al.
5,195,167 A 3/1993 Bahl et al.
5,197,005 A 3/1993 Shwartz et al.
5,199,077 A 3/1993 Wilcox et al.
5,201,034 A 4/1993 Matsuura et al.
5,202,952 A 4/1993 Gillick et al.
5,208,862 A 5/1993 Ozawa
5,210,689 A 5/1993 Baker et al.
5,212,638 A 5/1993 Bernath
5,212,821 A 5/1993 Gorin et al.
5,216,747 A 6/1993 Hardwick et al.
5,218,700 A 6/1993 Beechick
5,220,629 A 6/1993 Kosaka et al.
5,220,639 A 6/1993 Lee
5,220,657 A 6/1993 Bly et al.
5,222,146 A 6/1993 Bahl et al.
5,230,036 A 7/1993 Akamine et al.
5,231,670 A 7/1993 Goldhor et al.
5,235,680 A 8/1993 Bijnagte
5,237,502 A 8/1993 White et al.
5,241,619 A 8/1993 Schwartz et al.
5,252,951 A 10/1993 Tannenbaum et al.
5,253,325 A 10/1993 Clark
5,257,387 A 10/1993 Richek et al.
5,260,697 A 11/1993 Barrett et al.
5,266,931 A 11/1993 Tanaka
5,266,949 A 11/1993 Rossi
5,267,345 A 11/1993 Brown et al.
5,268,990 A 12/1993 Cohen et al.
5,274,771 A 12/1993 Hamilton et al.
5,274,818 A 12/1993 Vasilevsky et al.
5,276,616 A 1/1994 Kuga et al.
5,276,794 A 1/1994 Lamb, Jr.
5,278,980 A 1/1994 Pedersen et al.
5,282,265 A 1/1994 Rohra Suda et al.
5,283,818 A 2/1994 Klausner et al.
5,287,448 A 2/1994 Nicol et al.
5,289,562 A 2/1994 Mizuta et al.
RE34,562 E 3/1994 Murakami et al.
5,291,286 A 3/1994 Murakami et al.
5,293,254 A 3/1994 Eschbach
5,293,448 A 3/1994 Honda
5,293,452 A 3/1994 Picone et al.
5,296,642 A 3/1994 Konishi
5,297,170 A 3/1994 Eyuboglu et al.
5,297,194 A 3/1994 Hunt et al.
5,299,125 A 3/1994 Baker et al.
5,299,284 A 3/1994 Roy
5,301,109 A 4/1994 Landauer et al.
5,303,406 A 4/1994 Hansen et al.
5,305,205 A 4/1994 Weber et al.
5,305,768 A 4/1994 Gross et al.
5,309,359 A 5/1994 Katz et al.
5,315,689 A 5/1994 Kanazawa et al.
5,317,507 A 5/1994 Gallant
5,317,647 A 5/1994 Pagallo
5,325,297 A 6/1994 Bird et al.
5,325,298 A 6/1994 Gallant
5,325,462 A 6/1994 Farrett
5,326,270 A 7/1994 Ostby et al.
5,327,342 A 7/1994 Roy
5,327,498 A 7/1994 Hamon
5,329,608 A 7/1994 Bocchieri et al.
5,333,236 A 7/1994 Bahl et al.
5,333,266 A 7/1994 Boaz et al.
5,333,275 A 7/1994 Wheatley et al.
5,335,011 A 8/1994 Addeo et al.
5,335,276 A 8/1994 Thompson et al.
5,341,293 A 8/1994 Vertelney et al.
5,341,466 A 8/1994 Perlin et al.
5,345,536 A 9/1994 Hoshimi et al.
5,349,645 A 9/1994 Zhao
5,353,374 A 10/1994 Wilson et al.
5,353,376 A 10/1994 Oh et al.
5,353,377 A 10/1994 Kuroda et al.
5,353,408 A 10/1994 Kato et al.
5,353,432 A 10/1994 Richek et al.
5,357,431 A 10/1994 Nakada et al.
5,367,640 A 11/1994 Hamilton et al.
5,369,575 A 11/1994 Lamberti et al.
5,369,577 A 11/1994 Kadashevich et al.
5,371,853 A 12/1994 Kao et al.
5,371,901 A 12/1994 Reed et al.
5,373,566 A 12/1994 Murdock
5,377,103 A 12/1994 Lamberti et al.
5,377,301 A 12/1994 Rosenberg et al.
5,377,303 A 12/1994 Firman
5,384,671 A 1/1995 Fisher
5,384,892 A 1/1995 Strong
5,384,893 A 1/1995 Hutchins
5,386,494 A 1/1995 White
5,386,556 A 1/1995 Hedin et al.
5,390,236 A 2/1995 Klausner et al.
5,390,279 A 2/1995 Strong
5,390,281 A 2/1995 Luciw et al.
5,392,419 A 2/1995 Walton
5,396,625 A 3/1995 Parkes
5,400,434 A 3/1995 Pearson
5,404,295 A 4/1995 Katz et al.
5,406,305 A 4/1995 Shimomura et al.
5,408,060 A 4/1995 Muurinen
5,412,756 A 5/1995 Bauman et al.
5,412,804 A 5/1995 Krishna
5,412,806 A 5/1995 Du et al.
5,418,951 A 5/1995 Damashek
5,422,656 A 6/1995 Allard et al.
5,424,947 A 6/1995 Nagao et al.
5,425,108 A 6/1995 Hwang et al.
5,428,731 A 6/1995 Powers, III
5,434,777 A 7/1995 Luciw
5,440,615 A 8/1995 Caccuro et al.
5,442,598 A 8/1995 Haikawa et al.
5,442,780 A 8/1995 Takanashi et al.
5,444,823 A 8/1995 Nguyen
5,449,368 A 9/1995 Kuzmak
5,450,523 A 9/1995 Zhao
5,455,888 A 10/1995 Iyengar et al.

(56) References Cited

U.S. PATENT DOCUMENTS 5,457,768 A 10/1995 Tsuboi et al.
5,459,488 A 10/1995 Geiser
5,463,696 A 10/1995 Beernink et al.
5,463,725 A 10/1995 Henckel et al.
5,465,401 A 11/1995 Thompson
5,469,529 A 11/1995 Bimbot et al.
5,471,611 A 11/1995 McGregor
5,473,728 A 12/1995 Luginbuhl et al.
5,475,587 A 12/1995 Anick et al.
5,475,796 A 12/1995 Iwata
5,477,447 A 12/1995 Luciw et al.
5,477,448 A 12/1995 Golding et al.
5,477,451 A 12/1995 Brown et al.
5,479,488 A 12/1995 Lenning et al.
5,481,739 A 1/1996 Staats
5,483,261 A 1/1996 Yasutake
5,485,372 A 1/1996 Golding et al.
5,485,543 A 1/1996 Aso
5,488,204 A 1/1996 Mead et al.
5,488,727 A 1/1996 Agrawal et al.
5,490,234 A 2/1996 Narayan
5,491,758 A 2/1996 Bellegarda et al.
5,491,772 A 2/1996 Hardwick et al.
5,493,677 A 2/1996 Balogh
5,495,604 A 2/1996 Harding et al.
5,497,319 A 3/1996 Chong et al.
5,500,903 A 3/1996 Gulli
5,500,905 A 3/1996 Martin et al.
5,500,937 A 3/1996 Thompson-Rohrlich
5,502,774 A 3/1996 Bellegarda et al.
5,502,790 A 3/1996 Yi
5,502,791 A 3/1996 Nishimura et al.
5,515,475 A 5/1996 Gupta et al.
5,521,816 A 5/1996 Roche et al.
5,524,140 A 6/1996 Klausner et al.
5,533,182 A 7/1996 Bates et al.
5,535,121 A 7/1996 Roche et al.
5,536,902 A 7/1996 Serra et al.
5,537,317 A 7/1996 Schabes et al.
5,537,618 A 7/1996 Boulton et al.
5,537,647 A 7/1996 Hermansky et al.
5,543,588 A 8/1996 Bisset et al.
5,543,897 A 8/1996 Altrieth, III
5,544,264 A 8/1996 Bellegarda et al.
5,548,507 A 8/1996 Martino et al.
5,555,343 A 9/1996 Luther
5,555,344 A 9/1996 Zunkler
5,559,301 A 9/1996 Bryan, Jr. et al.
5,559,945 A 9/1996 Beaudet et al.
5,564,446 A 10/1996 Wiltshire
5,565,888 A 10/1996 Selker
5,568,536 A 10/1996 Tiller et al.
5,568,540 A 10/1996 Greco et al.
5,570,324 A 10/1996 Geil
5,572,576 A 11/1996 Klausner et al.
5,574,823 A 11/1996 Hassanein et al.
5,574,824 A 11/1996 Slyh et al.
5,577,135 A 11/1996 Grajski et al.
5,577,164 A 11/1996 Kaneko et al.
5,577,241 A 11/1996 Spencer
5,578,808 A 11/1996 Taylor
5,579,037 A 11/1996 Tahara et al.
5,579,436 A 11/1996 Chou et al.
5,581,484 A 12/1996 Prince
5,581,652 A 12/1996 Abe et al.
5,581,655 A 12/1996 Cohen et al.
5,583,993 A 12/1996 Foster et al.
5,584,024 A 12/1996 Shwartz
5,594,641 A 1/1997 Kaplan et al.
5,596,260 A 1/1997 Moravec et al.
5,596,676 A 1/1997 Swaminathan et al.
5,596,994 A 1/1997 Bro
5,608,624 A 3/1997 Luciw
5,608,698 A 3/1997 Yamanoi et al.
5,608,841 A 3/1997 Tsuboka
5,610,812 A 3/1997 Schabes et al.
5,613,036 A 3/1997 Strong
5,613,122 A 3/1997 Burnard et al.
5,615,378 A 3/1997 Nishino et al.
5,615,384 A 3/1997 Allard et al.
5,616,876 A 4/1997 Cluts
5,617,386 A 4/1997 Choi
5,617,507 A 4/1997 Lee et al.
5,617,539 A 4/1997 Ludwig et al.
5,619,583 A 4/1997 Page et al.
5,619,694 A 4/1997 Shimazu
5,621,859 A 4/1997 Schwartz et al.
5,621,903 A 4/1997 Luciw et al.
5,627,939 A 5/1997 Huang et al.
5,634,084 A 5/1997 Malsheen et al.
5,636,325 A 6/1997 Farrett
5,638,425 A 6/1997 Meador, III et al.
5,638,489 A 6/1997 Tsuboka
5,638,523 A 6/1997 Mullet et al.
5,640,487 A 6/1997 Lau et al.
5,642,464 A 6/1997 Yue et al.
5,642,466 A 6/1997 Narayan
5,642,519 A 6/1997 Martin
5,644,656 A 7/1997 Akra et al.
5,644,727 A 7/1997 Atkins
5,644,735 A 7/1997 Luciw et al.
5,649,060 A 7/1997 Ellozy et al.
5,652,828 A 7/1997 Silverman
5,652,884 A 7/1997 Palevich
5,652,897 A 7/1997 Linebarger et al.
5,661,787 A 8/1997 Pocock
5,664,055 A 9/1997 Kroon
5,670,985 A 9/1997 Cappels, Sr. et al.
5,675,819 A 10/1997 Schuetze
5,682,475 A 10/1997 Johnson et al.
5,682,539 A 10/1997 Conrad et al.
5,684,513 A 11/1997 Decker
5,687,077 A 11/1997 Gough, Jr.
5,687,136 A 11/1997 Borenstein
5,689,287 A 11/1997 Mackinlay et al.
5,689,618 A 11/1997 Gasper et al.
5,692,205 A 11/1997 Berry et al.
5,696,962 A 12/1997 Kupiec
5,699,082 A 12/1997 Marks et al.
5,701,400 A 12/1997 Amado
5,706,442 A 1/1998 Anderson et al.
5,708,659 A 1/1998 Rostoker et al.
5,708,822 A 1/1998 Wical
5,710,886 A 1/1998 Christensen et al.
5,710,922 A 1/1998 Alley et al.
5,712,949 A 1/1998 Kato et al.
5,712,957 A 1/1998 Waibel et al.
5,715,468 A 2/1998 Budzinski
5,717,877 A 2/1998 Orion et al.
5,721,827 A 2/1998 Logan et al.
5,721,949 A 2/1998 Smith et al.
5,724,406 A 3/1998 Juster
5,724,985 A 3/1998 Snell et al.
5,726,672 A 3/1998 Hernandez et al.
5,727,950 A 3/1998 Cook et al.
5,729,694 A 3/1998 Holzrichter et al.
5,729,704 A 3/1998 Stone et al.
5,732,216 A 3/1998 Logan et al.
5,732,390 A 3/1998 Katayanagi et al.
5,732,395 A 3/1998 Silverman
5,734,750 A 3/1998 Arai et al.
5,734,791 A 3/1998 Acero et al.
5,736,974 A 4/1998 Selker
5,737,487 A 4/1998 Bellegarda et al.
5,737,734 A 4/1998 Schultz
5,739,451 A 4/1998 Winksy et al.
5,740,143 A 4/1998 Suetomi
5,742,705 A 4/1998 Parthasarathy
5,742,736 A 4/1998 Haddock
5,745,116 A 4/1998 Pisutha-Arnond
5,745,873 A 4/1998 Braida et al.
5,748,512 A 5/1998 Vargas
5,748,974 A 5/1998 Johnson
5,749,071 A 5/1998 Silverman

(56) References Cited

U.S. PATENT DOCUMENTS

| | | | |
|---|---|---|---|
| 5,749,081 | A | 5/1998 | Whiteis |
| 5,751,906 | A | 5/1998 | Silverman |
| 5,757,358 | A | 5/1998 | Osga |
| 5,757,979 | A | 5/1998 | Hongo et al. |
| 5,758,079 | A | 5/1998 | Ludwig et al. |
| 5,758,083 | A | 5/1998 | Singh et al. |
| 5,758,314 | A | 5/1998 | McKenna |
| 5,759,101 | A | 6/1998 | Von Kohorn |
| 5,761,640 | A | 6/1998 | Kalyanswamy et al. |
| 5,765,131 | A | 6/1998 | Stentiford et al. |
| 5,765,168 | A | 6/1998 | Burrows |
| 5,771,276 | A | 6/1998 | Wolf |
| 5,774,834 | A | 6/1998 | Visser |
| 5,774,855 | A | 6/1998 | Foti et al. |
| 5,774,859 | A | 6/1998 | Houser et al. |
| 5,777,614 | A | 7/1998 | Ando et al. |
| 5,778,405 | A | 7/1998 | Ogawa |
| 5,790,978 | A | 8/1998 | Olive et al. |
| 5,794,050 | A | 8/1998 | Dahlgren et al. |
| 5,794,182 | A | 8/1998 | Manduchi et al. |
| 5,794,207 | A | 8/1998 | Walker et al. |
| 5,794,237 | A | 8/1998 | Gore, Jr. |
| 5,797,008 | A | 8/1998 | Burrows |
| 5,799,268 | A | 8/1998 | Boguraev |
| 5,799,269 | A | 8/1998 | Schabes et al. |
| 5,799,276 | A | 8/1998 | Komissarchik et al. |
| 5,801,692 | A | 9/1998 | Muzio et al. |
| 5,802,466 | A | 9/1998 | Gallant et al. |
| 5,802,526 | A | 9/1998 | Fawcett et al. |
| 5,812,697 | A | 9/1998 | Sakai et al. |
| 5,812,698 | A | 9/1998 | Platt et al. |
| 5,815,142 | A | 9/1998 | Allard et al. |
| 5,815,225 | A | 9/1998 | Nelson |
| 5,818,142 | A | 10/1998 | Edleblute et al. |
| 5,818,451 | A | 10/1998 | Bertram et al. |
| 5,818,924 | A | 10/1998 | King et al. |
| 5,822,288 | A | 10/1998 | Shinada |
| 5,822,720 | A | 10/1998 | Bookman et al. |
| 5,822,730 | A | 10/1998 | Roth et al. |
| 5,822,743 | A | 10/1998 | Gupta et al. |
| 5,825,349 | A | 10/1998 | Meier et al. |
| 5,825,352 | A | 10/1998 | Bisset et al. |
| 5,825,881 | A | 10/1998 | Colvin, Sr. |
| 5,826,261 | A | 10/1998 | Spencer |
| 5,828,768 | A | 10/1998 | Eatwell et al. |
| 5,828,999 | A | 10/1998 | Bellegarda et al. |
| 5,832,433 | A | 11/1998 | Yashchin et al. |
| 5,832,435 | A | 11/1998 | Silverman |
| 5,833,134 | A | 11/1998 | Ho et al. |
| 5,835,077 | A | 11/1998 | Dao et al. |
| 5,835,079 | A | 11/1998 | Shieh |
| 5,835,721 | A | 11/1998 | Donahue et al. |
| 5,835,732 | A | 11/1998 | Kikinis et al. |
| 5,835,893 | A | 11/1998 | Ushioda |
| 5,839,106 | A | 11/1998 | Bellegarda |
| 5,841,902 | A | 11/1998 | Tu |
| 5,842,165 | A | 11/1998 | Raman et al. |
| 5,845,255 | A | 12/1998 | Mayaud |
| 5,848,410 | A | 12/1998 | Walls et al. |
| 5,850,480 | A | 12/1998 | Scanlon |
| 5,850,629 | A | 12/1998 | Holm et al. |
| 5,854,893 | A | 12/1998 | Ludwig et al. |
| 5,855,000 | A | 12/1998 | Waibel et al. |
| 5,857,184 | A | 1/1999 | Lynch |
| 5,859,636 | A | 1/1999 | Pandit |
| 5,860,063 | A | 1/1999 | Gorin et al. |
| 5,860,064 | A | 1/1999 | Henton |
| 5,860,075 | A | 1/1999 | Hashizume et al. |
| 5,862,223 | A | 1/1999 | Walker et al. |
| 5,862,233 | A | 1/1999 | Poletti |
| 5,864,806 | A | 1/1999 | Mokbel et al. |
| 5,864,815 | A | 1/1999 | Rozak et al. |
| 5,864,844 | A | 1/1999 | James et al. |
| 5,864,855 | A | 1/1999 | Ruocco et al. |
| 5,864,868 | A | 1/1999 | Contois |
| 5,867,799 | A | 2/1999 | Lang et al. |
| 5,870,710 | A | 2/1999 | Ozawa et al. |
| 5,873,056 | A | 2/1999 | Liddy et al. |
| 5,875,427 | A | 2/1999 | Yamazaki |
| 5,875,429 | A | 2/1999 | Douglas |
| 5,875,437 | A | 2/1999 | Atkins |
| 5,876,396 | A | 3/1999 | Lo et al. |
| 5,877,751 | A | 3/1999 | Kanemitsu et al. |
| 5,877,757 | A | 3/1999 | Baldwin et al. |
| 5,878,393 | A | 3/1999 | Hata et al. |
| 5,878,394 | A | 3/1999 | Muhling |
| 5,878,396 | A | 3/1999 | Henton |
| 5,880,411 | A | 3/1999 | Gillespie et al. |
| 5,880,731 | A | 3/1999 | Liles et al. |
| 5,884,039 | A | 3/1999 | Ludwig et al. |
| 5,884,323 | A | 3/1999 | Hawkins et al. |
| 5,890,117 | A | 3/1999 | Silverman |
| 5,890,122 | A | 3/1999 | Van et al. |
| 5,891,180 | A | 4/1999 | Greeninger et al. |
| 5,893,126 | A | 4/1999 | Drews et al. |
| 5,893,132 | A | 4/1999 | Huffman et al. |
| 5,895,448 | A | 4/1999 | Vysotsky et al. |
| 5,895,464 | A | 4/1999 | Bhandari et al. |
| 5,895,466 | A | 4/1999 | Goldberg et al. |
| 5,896,321 | A | 4/1999 | Miller et al. |
| 5,896,500 | A | 4/1999 | Ludwig et al. |
| 5,898,933 | A | 4/1999 | Kaschke |
| 5,899,972 | A | 5/1999 | Miyazawa et al. |
| 5,905,498 | A | 5/1999 | Diament et al. |
| 5,909,666 | A | 6/1999 | Gould et al. |
| 5,912,951 | A | 6/1999 | Checchio et al. |
| 5,912,952 | A | 6/1999 | Brendzel |
| 5,913,193 | A | 6/1999 | Huang et al. |
| 5,915,001 | A | 6/1999 | Uppaluru et al. |
| 5,915,236 | A | 6/1999 | Gould et al. |
| 5,915,238 | A | 6/1999 | Tjaden |
| 5,915,249 | A | 6/1999 | Spencer |
| 5,917,487 | A | 6/1999 | Ulrich |
| 5,918,303 | A | 6/1999 | Yamaura et al. |
| 5,920,327 | A | 7/1999 | Seidensticker, Jr. |
| 5,920,836 | A | 7/1999 | Gould et al. |
| 5,920,837 | A | 7/1999 | Gould et al. |
| 5,923,757 | A | 7/1999 | Hocker et al. |
| 5,924,068 | A | 7/1999 | Richard et al. |
| 5,926,769 | A | 7/1999 | Valimaa et al. |
| 5,926,789 | A | 7/1999 | Barbara et al. |
| 5,930,408 | A | 7/1999 | Seto |
| 5,930,751 | A | 7/1999 | Cohrs et al. |
| 5,930,754 | A | 7/1999 | Karaali et al. |
| 5,930,769 | A | 7/1999 | Rose |
| 5,930,783 | A | 7/1999 | Li et al. |
| 5,933,477 | A | 8/1999 | Wu |
| 5,933,806 | A | 8/1999 | Beyerlein et al. |
| 5,933,822 | A | 8/1999 | Braden-Harder et al. |
| 5,936,926 | A | 8/1999 | Yokouchi et al. |
| 5,937,163 | A | 8/1999 | Lee et al. |
| 5,940,811 | A | 8/1999 | Norris |
| 5,940,841 | A | 8/1999 | Schmuck et al. |
| 5,941,944 | A | 8/1999 | Messerly |
| 5,943,043 | A | 8/1999 | Furuhata et al. |
| 5,943,049 | A | 8/1999 | Matsubara et al. |
| 5,943,052 | A | 8/1999 | Allen et al. |
| 5,943,429 | A | 8/1999 | Haendel et al. |
| 5,943,443 | A | 8/1999 | Itonori et al. |
| 5,943,670 | A | 8/1999 | Prager |
| 5,946,647 | A | 8/1999 | Miller et al. |
| 5,948,040 | A | 9/1999 | DeLorme et al. |
| 5,949,961 | A | 9/1999 | Sharman |
| 5,950,123 | A | 9/1999 | Schwelb et al. |
| 5,952,992 | A | 9/1999 | Helms |
| 5,953,541 | A | 9/1999 | King et al. |
| 5,956,021 | A | 9/1999 | Kubota et al. |
| 5,956,699 | A | 9/1999 | Wong et al. |
| 5,960,394 | A | 9/1999 | Gould et al. |
| 5,960,422 | A | 9/1999 | Prasad |
| 5,963,208 | A | 10/1999 | Dolan et al. |
| 5,963,924 | A | 10/1999 | Williams et al. |
| 5,963,964 | A | 10/1999 | Nielsen |
| 5,966,126 | A | 10/1999 | Szabo |

(56) References Cited

U.S. PATENT DOCUMENTS 5,970,446 A 10/1999 Goldberg et al.
5,970,474 A 10/1999 LeRoy et al.
5,973,676 A 10/1999 Kawakura
5,974,146 A 10/1999 Randle et al.
5,977,950 A 11/1999 Rhyne
5,982,352 A 11/1999 Pryor
5,982,891 A 11/1999 Ginter et al.
5,982,902 A 11/1999 Terano
5,983,179 A 11/1999 Gould et al.
5,983,216 A 11/1999 Kirsch et al.
5,987,132 A 11/1999 Rowney
5,987,140 A 11/1999 Rowney et al.
5,987,401 A 11/1999 Trudeau
5,987,404 A 11/1999 Della Pietra et al.
5,987,415 A 11/1999 Breese et al.
5,987,440 A 11/1999 O'Neil et al.
5,990,887 A 11/1999 Redpath et al.
5,991,441 A 11/1999 Jourjine
5,995,460 A 11/1999 Takagi et al.
5,995,590 A 11/1999 Brunet et al.
5,998,972 A 12/1999 Gong
5,999,169 A 12/1999 Lee
5,999,895 A 12/1999 Forest
5,999,908 A 12/1999 Abelow
5,999,927 A 12/1999 Tukey et al.
6,006,274 A 12/1999 Hawkins et al.
6,009,237 A 12/1999 Hirabayashi et al.
6,011,585 A 1/2000 Anderson
6,014,428 A 1/2000 Wolf
6,016,471 A 1/2000 Kuhn et al.
6,018,705 A 1/2000 Gaudet
6,018,711 A 1/2000 French-St. George et al.
6,020,881 A 2/2000 Naughton et al.
6,023,536 A 2/2000 Visser
6,023,676 A 2/2000 Erell
6,023,684 A 2/2000 Pearson
6,024,288 A 2/2000 Gottlich et al.
6,026,345 A 2/2000 Shah et al.
6,026,375 A 2/2000 Hall et al.
6,026,388 A 2/2000 Liddy et al.
6,026,393 A 2/2000 Gupta et al.
6,029,132 A 2/2000 Kuhn et al.
6,029,135 A 2/2000 Krasle
6,035,267 A 3/2000 Watanabe et al.
6,035,303 A 3/2000 Baer et al.
6,035,336 A 3/2000 Lu et al.
6,038,533 A 3/2000 Buchsbaum et al.
6,040,824 A 3/2000 Maekawa et al.
6,041,023 A 3/2000 Lakhansingh
6,047,255 A 4/2000 Williamson
6,052,654 A 4/2000 Gaudet et al.
6,052,656 A 4/2000 Suda et al.
6,054,990 A 4/2000 Tran
6,055,514 A 4/2000 Wren
6,055,531 A 4/2000 Bennett et al.
6,064,767 A 5/2000 Muir et al.
6,064,959 A 5/2000 Young et al.
6,064,960 A 5/2000 Bellegarda et al.
6,064,963 A 5/2000 Gainsboro
6,067,519 A 5/2000 Lowry
6,069,648 A 5/2000 Suso et al.
6,070,138 A 5/2000 Iwata
6,070,139 A 5/2000 Miyazawa et al.
6,070,140 A 5/2000 Tran
6,070,147 A 5/2000 Harms et al.
6,073,033 A 6/2000 Campo
6,073,036 A 6/2000 Heikkinen et al.
6,073,097 A 6/2000 Gould et al.
6,076,051 A 6/2000 Messerly et al.
6,076,060 A 6/2000 Lin et al.
6,076,088 A 6/2000 Paik et al.
6,078,914 A 6/2000 Redfern
6,081,750 A 6/2000 Hoffberg et al.
6,081,774 A 6/2000 de Hita et al.
6,081,780 A 6/2000 Lumelsky
6,094,649 A 6/2000 Bowen et al.
6,085,204 A 7/2000 Chijiwa et al.
6,088,671 A 7/2000 Gould et al.
6,088,731 A 7/2000 Kiraly et al.
6,092,043 A 7/2000 Squires et al.
6,097,391 A 8/2000 Wilcox
6,101,468 A 8/2000 Gould et al.
6,101,470 A 8/2000 Eide et al.
6,105,865 A 8/2000 Hardesty
6,108,627 A 8/2000 Sabourin
6,108,640 A 8/2000 Slotznick
6,111,562 A 8/2000 Downs et al.
6,111,572 A 8/2000 Blair et al.
6,116,907 A 9/2000 Baker et al.
6,119,101 A 9/2000 Peckover
6,121,960 A 9/2000 Carroll et al.
6,122,340 A 9/2000 Darley et al.
6,122,614 A 9/2000 Kahn et al.
6,122,616 A 9/2000 Henton
6,122,647 A 9/2000 Horowitz et al.
6,125,284 A 9/2000 Moore et al.
6,125,346 A 9/2000 Nishimura et al.
6,125,356 A 9/2000 Brockman et al.
6,129,582 A 10/2000 Wilhite et al.
6,138,098 A 10/2000 Shieber et al.
6,138,158 A 10/2000 Boyle et al.
6,141,642 A 10/2000 Oh
6,141,644 A 10/2000 Kuhn et al.
6,144,377 A 11/2000 Oppermann et al.
6,144,380 A 11/2000 Shwarts et al.
6,144,938 A 11/2000 Surace et al.
6,144,939 A 11/2000 Pearson et al.
6,151,401 A 11/2000 Annaratone
6,154,551 A 11/2000 Frenkel
6,154,720 A 11/2000 Onishi et al.
6,157,935 A 12/2000 Tran et al.
6,161,084 A 12/2000 Messerly et al.
6,161,087 A 12/2000 Wightman et al.
6,161,944 A 12/2000 Leman
6,163,769 A 12/2000 Acero et al.
6,163,809 A 12/2000 Buckley
6,167,369 A 12/2000 Schulze
6,169,538 B1 1/2001 Nowlan et al.
6,172,948 B1 1/2001 Keller et al.
6,173,194 B1 1/2001 Vanttila
6,173,251 B1 1/2001 Ito et al.
6,173,261 B1 1/2001 Arai et al.
6,173,263 B1 1/2001 Conkie
6,173,279 B1 1/2001 Levin et al.
6,177,905 B1 1/2001 Welch
6,177,931 B1 1/2001 Alexander et al.
6,179,432 B1 1/2001 Zhang et al.
6,182,028 B1 1/2001 Karaali et al.
6,185,533 B1 2/2001 Holm et al.
6,188,391 B1 2/2001 Seely et al.
6,188,999 B1 2/2001 Moody
6,191,939 B1 2/2001 Burnett
6,192,253 B1 2/2001 Charlier et al.
6,192,340 B1 2/2001 Abecassis
6,195,641 B1 2/2001 Loring et al.
6,205,456 B1 3/2001 Nakao
6,208,044 B1 3/2001 Viswanadham et al.
6,208,932 B1 3/2001 Ohmura et al.
6,208,956 B1 3/2001 Motoyama
6,208,964 B1 3/2001 Sabourin
6,208,967 B1 3/2001 Pauws et al.
6,208,971 B1 3/2001 Bellegarda et al.
6,212,564 B1 4/2001 Harter et al.
6,216,102 B1 4/2001 Martino et al.
6,216,131 B1 4/2001 Liu et al.
6,217,183 B1 4/2001 Shipman
6,222,347 B1 4/2001 Gong
6,226,403 B1 5/2001 Parthasarathy
6,226,533 B1 5/2001 Akahane
6,226,614 B1 5/2001 Mizuno et al.
6,226,655 B1 5/2001 Borman et al.
6,230,322 B1 5/2001 Saib et al.
6,232,539 B1 5/2001 Looney et al.
6,232,966 B1 5/2001 Kurlander

(56) References Cited

U.S. PATENT DOCUMENTS

| | | | |
|---|---|---|---|
| 6,233,545 | B1 | 5/2001 | Datig |
| 6,233,547 | B1 | 5/2001 | Denber et al. |
| 6,233,559 | B1 | 5/2001 | Balakrishnan |
| 6,233,578 | B1 | 5/2001 | Machihara et al. |
| 6,237,025 | B1 | 5/2001 | Ludwig et al. |
| 6,240,303 | B1 | 5/2001 | Katzur |
| 6,243,681 | B1 | 6/2001 | Guji et al. |
| 6,246,981 | B1 | 6/2001 | Papineni et al. |
| 6,248,946 | B1 | 6/2001 | Dwek |
| 6,249,606 | B1 | 6/2001 | Kiraly et al. |
| 6,259,436 | B1 | 7/2001 | Moon et al. |
| 6,259,826 | B1 | 7/2001 | Pollard et al. |
| 6,260,011 | B1 | 7/2001 | Heckerman et al. |
| 6,260,013 | B1 | 7/2001 | Sejnoha |
| 6,260,016 | B1 | 7/2001 | Holm et al. |
| 6,260,024 | B1 | 7/2001 | Shkedy |
| 6,266,637 | B1 | 7/2001 | Donovan et al. |
| 6,268,859 | B1 | 7/2001 | Andresen et al. |
| 6,269,712 | B1 | 8/2001 | Zentmyer |
| 6,271,835 | B1 | 8/2001 | Hoeksma |
| 6,272,456 | B1 | 8/2001 | De Campos |
| 6,272,464 | B1 | 8/2001 | Kraz et al. |
| 6,275,795 | B1 | 8/2001 | Tzirkel-Hancock |
| 6,275,824 | B1 | 8/2001 | O'Flaherty et al. |
| 6,278,443 | B1 | 8/2001 | Amro et al. |
| 6,278,970 | B1 | 8/2001 | Milner |
| 6,282,507 | B1 | 8/2001 | Horiguchi et al. |
| 6,285,785 | B1 | 9/2001 | Bellegarda et al. |
| 6,285,786 | B1 | 9/2001 | Seni et al. |
| 6,289,085 | B1 | 9/2001 | Miyashita et al. |
| 6,289,124 | B1 | 9/2001 | Okamoto |
| 6,289,301 | B1 | 9/2001 | Higginbotham et al. |
| 6,289,353 | B1 | 9/2001 | Hazlehurst et al. |
| 6,292,772 | B1 | 9/2001 | Kantrowitz |
| 6,292,778 | B1 | 9/2001 | Sukkar |
| 6,295,390 | B1 | 9/2001 | Kobayashi et al. |
| 6,295,541 | B1 | 9/2001 | Bodnar et al. |
| 6,297,818 | B1 | 10/2001 | Ulrich et al. |
| 6,298,314 | B1 | 10/2001 | Blackadar et al. |
| 6,298,321 | B1 | 10/2001 | Karlov et al. |
| 6,300,947 | B1 | 10/2001 | Kanevsky |
| 6,304,844 | B1 | 10/2001 | Pan et al. |
| 6,304,846 | B1 | 10/2001 | George et al. |
| 6,307,548 | B1 | 10/2001 | Flinchem et al. |
| 6,308,149 | B1 | 10/2001 | Gaussier et al. |
| 6,310,610 | B1 | 10/2001 | Beaton et al. |
| 6,311,157 | B1 | 10/2001 | Strong |
| 6,311,189 | B1 | 10/2001 | deVries et al. |
| 6,317,237 | B1 | 11/2001 | Nakao et al. |
| 6,317,594 | B1 | 11/2001 | Gossman et al. |
| 6,317,707 | B1 | 11/2001 | Bangalore et al. |
| 6,317,831 | B1 | 11/2001 | King |
| 6,321,092 | B1 | 11/2001 | Fitch et al. |
| 6,321,179 | B1 | 11/2001 | Glance et al. |
| 6,323,846 | B1 | 11/2001 | Westerman et al. |
| 6,324,502 | B1 | 11/2001 | Handel et al. |
| 6,324,512 | B1 | 11/2001 | Junqua et al. |
| 6,330,538 | B1 | 12/2001 | Breen |
| 6,331,867 | B1 | 12/2001 | Eberhard et al. |
| 6,332,175 | B1 | 12/2001 | Birrell et al. |
| 6,334,103 | B1 | 12/2001 | Surace et al. |
| 6,335,722 | B1 | 1/2002 | Tani et al. |
| 6,336,365 | B1 | 1/2002 | Blackadar et al. |
| 6,336,727 | B1 | 1/2002 | Kim |
| 6,340,937 | B1 | 1/2002 | Stepita-Klauco |
| 6,341,316 | B1 | 1/2002 | Kloba et al. |
| 6,343,267 | B1 | 1/2002 | Kuhn et al. |
| 6,345,250 | B1 | 2/2002 | Martin |
| 6,351,522 | B1 | 2/2002 | Vitikainen |
| 6,351,762 | B1 | 2/2002 | Ludwig et al. |
| 6,353,442 | B1 | 3/2002 | Masui |
| 6,353,794 | B1 | 3/2002 | Davis et al. |
| 6,356,210 | B1 | 3/2002 | Ellis |
| 6,356,287 | B1 | 3/2002 | Ruberry et al. |
| 6,356,854 | B1 | 3/2002 | Schubert et al. |
| 6,356,864 | B1 | 3/2002 | Foltz et al. |
| 6,356,905 | B1 | 3/2002 | Gershman et al. |
| 6,357,147 | B1 | 3/2002 | Darley et al. |
| 6,359,572 | B1 | 3/2002 | Vale |
| 6,359,970 | B1 | 3/2002 | Burgess |
| 6,360,227 | B1 | 3/2002 | Aggarwal et al. |
| 6,360,237 | B1 | 3/2002 | Schulz et al. |
| 6,363,348 | B1 | 3/2002 | Besling et al. |
| 6,366,883 | B1 | 4/2002 | Campbell et al. |
| 6,366,884 | B1 | 4/2002 | Beillegarda et al. |
| 6,374,217 | B1 | 4/2002 | Bellegarda |
| 6,377,530 | B1 | 4/2002 | Burrows |
| 6,377,925 | B1 | 4/2002 | Greene, Jr. et al. |
| 6,377,928 | B1 | 4/2002 | Saxena et al. |
| 6,381,593 | B1 | 4/2002 | Yano et al. |
| 6,385,586 | B1 | 5/2002 | Dietz |
| 6,385,662 | B1 | 5/2002 | Moon et al. |
| 6,389,114 | B1 | 5/2002 | Dowens et al. |
| 6,397,183 | B1 | 5/2002 | Baba et al. |
| 6,397,186 | B1 | 5/2002 | Bush et al. |
| 6,400,806 | B1 | 6/2002 | Uppaluru |
| 6,401,065 | B1 | 6/2002 | Kanevsky et al. |
| 6,405,169 | B1 | 6/2002 | Kondo et al. |
| 6,405,238 | B1 | 6/2002 | Votipka |
| 6,408,272 | B1 | 6/2002 | White et al. |
| 6,411,924 | B1 | 6/2002 | De Hita et al. |
| 6,411,932 | B1 | 6/2002 | Molnar et al. |
| 6,415,250 | B1 | 7/2002 | Van Den Akker |
| 6,417,873 | B1 | 7/2002 | Fletcher et al. |
| 6,421,305 | B1 | 7/2002 | Gioscia et al. |
| 6,421,672 | B1 | 7/2002 | McAllister et al. |
| 6,421,707 | B1 | 7/2002 | Miller et al. |
| 6,424,944 | B1 | 7/2002 | Hikawa |
| 6,430,551 | B1 | 8/2002 | Thelen et al. |
| 6,434,522 | B1 | 8/2002 | Tsuboka |
| 6,434,524 | B1 | 8/2002 | Weber |
| 6,434,604 | B1 | 8/2002 | Harada et al. |
| 6,437,818 | B1 | 8/2002 | Ludwig et al. |
| 6,438,523 | B1 | 8/2002 | Oberteuffer et al. |
| 6,442,518 | B1 | 8/2002 | Van Thong et al. |
| 6,442,523 | B1 | 8/2002 | Siegel |
| 6,446,076 | B1 | 9/2002 | Burkey et al. |
| 6,448,485 | B1 | 9/2002 | Barile |
| 6,448,986 | B1 | 9/2002 | Smith |
| 6,449,620 | B1 | 9/2002 | Draper et al. |
| 6,453,281 | B1 | 9/2002 | Walters et al. |
| 6,453,292 | B2 | 9/2002 | Ramaswamy et al. |
| 6,453,315 | B1 | 9/2002 | Weissman et al. |
| 6,456,616 | B1 | 9/2002 | Rantanen |
| 6,456,972 | B1 | 9/2002 | Gladstein et al. |
| 6,460,015 | B1 | 10/2002 | Hetherington et al. |
| 6,460,029 | B1 | 10/2002 | Fries et al. |
| 6,462,778 | B1 | 10/2002 | Abram et al. |
| 6,463,128 | B1 | 10/2002 | Elwin |
| 6,466,654 | B1 | 10/2002 | Cooper et al. |
| 6,467,924 | B2 | 10/2002 | Shipman |
| 6,469,712 | B1 | 10/2002 | Hilpert, Jr. et al. |
| 6,469,722 | B1 | 10/2002 | Kinoe et al. |
| 6,469,732 | B1 | 10/2002 | Chang et al. |
| 6,470,347 | B1 | 10/2002 | Gillam |
| 6,473,630 | B1 | 10/2002 | Baranowski et al. |
| 6,477,488 | B1 | 11/2002 | Bellegarda |
| 6,477,494 | B2 | 11/2002 | Hyde-Thomson et al. |
| 6,487,533 | B2 | 11/2002 | Hyde-Thomson et al. |
| 6,487,534 | B1 | 11/2002 | Thelen et al. |
| 6,487,663 | B1 | 11/2002 | Jaisimha et al. |
| 6,489,951 | B1 | 12/2002 | Wong et al. |
| 6,490,560 | B1 | 12/2002 | Ramaswamy et al. |
| 6,493,006 | B1 | 12/2002 | Gourdol et al. |
| 6,493,428 | B1 | 12/2002 | Hillier |
| 6,493,652 | B1 | 12/2002 | Ohlenbusch et al. |
| 6,493,667 | B1 | 12/2002 | De Souza et al. |
| 6,499,013 | B1 | 12/2002 | Weber |
| 6,499,014 | B1 | 12/2002 | Chihara |
| 6,499,016 | B1 | 12/2002 | Anderson et al. |
| 6,501,937 | B1 | 12/2002 | Ho et al. |
| 6,502,022 | B1 | 12/2002 | Chastain et al. |
| 6,502,194 | B1 | 12/2002 | Berman et al. |
| 6,505,158 | B1 | 1/2003 | Conkie |

(56) References Cited

U.S. PATENT DOCUMENTS 6,505,175 B1 1/2003 Silverman et al.
6,505,183 B1 1/2003 Loofbourrow et al.
6,510,406 B1 1/2003 Marchisio
6,510,412 B1 1/2003 Sasai et al.
6,510,417 B1 1/2003 Woods et al.
6,513,006 B2 1/2003 Howard et al.
6,513,008 B2 1/2003 Pearson et al.
6,513,063 B1 1/2003 Julia et al.
6,519,565 B1 2/2003 Clements et al.
6,519,566 B1 2/2003 Boyer et al.
6,523,026 B1 2/2003 Gillis
6,523,061 B1 2/2003 Halverson et al.
6,523,172 B1 2/2003 Martinez-Guerra et al.
6,526,351 B2 2/2003 Whitham
6,526,382 B1 2/2003 Yuschik
6,526,395 B1 2/2003 Morris
6,529,592 B1 3/2003 Khan
6,529,608 B2 3/2003 Gersabeck et al.
6,532,444 B1 3/2003 Weber
6,532,446 B1 3/2003 King
6,535,610 B1 3/2003 Stewart
6,535,852 B2 3/2003 Eide
6,535,983 B1 3/2003 McCormack et al.
6,536,139 B2 3/2003 Darley et al.
6,538,665 B2 3/2003 Crow et al.
6,542,171 B1 4/2003 Satou et al.
6,542,584 B1 4/2003 Sherwood et al.
6,546,262 B1 4/2003 Freadman
6,546,367 B2 4/2003 Otsuka
6,546,388 B1 4/2003 Edlund et al.
6,549,497 B2 4/2003 Miyamoto et al.
6,553,343 B1 4/2003 Kagoshima et al.
6,553,344 B2 4/2003 Bellegarda et al.
6,556,971 B1 4/2003 Rigsby et al.
6,556,983 B1 4/2003 Altschuler et al.
6,560,903 B1 5/2003 Darley
6,563,769 B1 5/2003 Van Der Meulen
6,564,186 B1 5/2003 Kiraly et al.
6,567,549 B1 5/2003 Marianetti et al.
6,570,557 B1 5/2003 Westerman et al.
6,570,596 B2 5/2003 Frederiksen
6,582,342 B2 6/2003 Kaufman
6,583,806 B2 6/2003 Ludwig et al.
6,584,464 B1 6/2003 Warthen
6,587,403 B1 7/2003 Keller et al.
6,587,404 B1 7/2003 Keller et al.
6,590,303 B1 7/2003 Austin et al.
6,591,379 B1 7/2003 LeVine et al.
6,594,673 B1 7/2003 Smith et al.
6,594,688 B2 7/2003 Ludwig et al.
6,597,345 B2 7/2003 Hirshberg
6,598,021 B1 7/2003 Shambaugh et al.
6,598,022 B2 7/2003 Yuschik
6,598,039 B1 7/2003 Livowsky
6,598,054 B2 7/2003 Schuetze et al.
6,601,026 B2 7/2003 Appelt et al.
6,601,234 B1 7/2003 Bowman-Amuah
6,603,837 B1 8/2003 Kesanupalli et al.
6,604,059 B2 8/2003 Strubbe et al.
6,606,101 B1 8/2003 Malamud et al.
6,606,388 B1 8/2003 Townsend et al.
6,606,632 B1 8/2003 Saulpaugh et al.
6,611,789 B1 8/2003 Darley
6,615,172 B1 9/2003 Bennett et al.
6,615,175 B1 9/2003 Gazdzinski
6,615,176 B2 9/2003 Lewis et al.
6,615,220 B1 9/2003 Austin et al.
6,621,768 B1 9/2003 Keller et al.
6,621,892 B1 9/2003 Banister et al.
6,622,121 B1 9/2003 Crepy et al.
6,622,136 B2 9/2003 Russell
6,623,529 B1 9/2003 Lakritz
6,625,583 B1 9/2003 Silverman et al.
6,628,808 B1 9/2003 Bach et al.
6,631,186 B1 10/2003 Adams et al.
6,631,346 B1 10/2003 Karaorman et al.
6,633,741 B1 10/2003 Posa et al.
6,633,846 B1 10/2003 Bennett et al.
6,633,932 B1 10/2003 Bork et al.
6,642,940 B1 11/2003 Dakss et al.
6,643,401 B1 11/2003 Kashioka et al.
6,643,824 B1 11/2003 Bates et al.
6,647,260 B2 11/2003 Dusse et al.
6,650,735 B2 11/2003 Burton et al.
6,651,042 B1 11/2003 Field et al.
6,651,218 B1 11/2003 Adler et al.
6,654,740 B2 11/2003 Tokuda et al.
6,658,389 B1 12/2003 Alpdemir
6,658,408 B2 12/2003 Yano et al.
6,658,577 B2 12/2003 Huppi et al.
6,662,023 B1 12/2003 Helle
6,665,639 B2 12/2003 Mozer et al.
6,665,640 B1 12/2003 Bennett et al.
6,665,641 B1 12/2003 Coorman et al.
6,671,672 B1 12/2003 Heck
6,671,683 B2 12/2003 Kanno
6,671,856 B1 12/2003 Gillam
6,675,169 B1 1/2004 Bennett et al.
6,675,233 B1 1/2004 Du et al.
6,677,932 B1 1/2004 Westerman
6,680,675 B1 1/2004 Suzuki
6,684,187 B1 1/2004 Conkie
6,684,376 B1 1/2004 Kerzman et al.
6,690,387 B2 2/2004 Zimmerman et al.
6,690,800 B2 2/2004 Resnick
6,690,828 B2 2/2004 Meyers
6,690,956 B2 2/2004 Chua et al.
6,691,064 B2 2/2004 Vroman
6,691,090 B1 2/2004 Laurila et al.
6,691,111 B2 2/2004 Lazaridis et al.
6,691,151 B1 2/2004 Cheyer et al.
6,694,295 B2 2/2004 Lindholm et al.
6,694,297 B2 2/2004 Sato
6,697,780 B1 2/2004 Beutnagel et al.
6,697,824 B1 2/2004 Bowman-Amuah
6,701,294 B1 3/2004 Ball et al.
6,701,305 B1 3/2004 Holt et al.
6,701,318 B2 3/2004 Fox et al.
6,704,015 B1 3/2004 Bovarnick et al.
6,704,034 B1 3/2004 Rodriguez et al.
6,704,698 B1 3/2004 Paulsen, Jr. et al.
6,704,710 B2 3/2004 Strong
6,708,153 B2 3/2004 Brittan et al.
6,711,585 B1 3/2004 Copperman et al.
6,714,221 B1 3/2004 Christie et al.
6,716,139 B1 4/2004 Hosseinzadeh-Dolkhani et al.
6,718,324 B2 4/2004 Edlund et al.
6,718,331 B2 4/2004 Davis et al.
6,720,980 B1 4/2004 Lui et al.
6,721,706 B1 4/2004 Strubbe et al.
6,721,728 B2 4/2004 McGreevy
6,721,734 B1 4/2004 Subasic et al.
6,724,370 B2 4/2004 Dutta et al.
6,725,197 B1 4/2004 Wuppermann et al.
6,728,675 B1 4/2004 Maddalozzo, Jr. et al.
6,728,681 B2 4/2004 Whitham
6,728,729 B1 4/2004 Jawa et al.
6,731,312 B2 5/2004 Robbin
6,732,142 B1 5/2004 Bates et al.
6,735,632 B1 5/2004 Kiraly et al.
6,738,738 B2 5/2004 Henton
6,741,264 B1 5/2004 Lesser
6,742,021 B1 5/2004 Halverson et al.
6,751,296 B1 6/2004 Albal et al.
6,751,592 B1 6/2004 Shiga
6,751,595 B2 6/2004 Busayapongchai et al.
6,751,621 B1 6/2004 Calistri-Yeh et al.
6,754,504 B1 6/2004 Reed
6,757,362 B1 6/2004 Cooper et al.
6,757,365 B1 6/2004 Bogard
6,757,646 B2 6/2004 Marchisio
6,757,653 B2 6/2004 Buth et al.
6,757,718 B1 6/2004 Halverson et al.
6,760,412 B1 7/2004 Loucks

(56) References Cited

U.S. PATENT DOCUMENTS 6,760,700 B2 7/2004 Lewis et al.
6,760,754 B1 7/2004 Isaacs et al.
6,762,741 B2 7/2004 Weindorf
6,762,777 B2 7/2004 Carroll
6,763,089 B2 7/2004 Feigenbaum
6,766,294 B2 7/2004 MacGinite et al.
6,766,320 B1 7/2004 Want et al.
6,766,324 B2 7/2004 Carlson et al.
6,768,979 B1 7/2004 Menendez-Pidal et al.
6,772,123 B2 8/2004 Cooklev et al.
6,772,195 B1 8/2004 Hatlelid et al.
6,772,394 B1 8/2004 Kamada
6,775,358 B1 8/2004 Breitenbach et al.
6,778,951 B1 8/2004 Contractor
6,778,952 B2 8/2004 Bellegarda
6,778,962 B1 8/2004 Kasai et al.
6,778,970 B2 8/2004 Au
6,778,979 B2 8/2004 Grefenstette et al.
6,782,510 B1 8/2004 Gross et al.
6,784,901 B1 8/2004 Harvey et al.
6,789,094 B2 9/2004 Rudoff et al.
6,789,231 B1 9/2004 Reynar et al.
6,790,704 B2 9/2004 Doyle et al.
6,792,082 B1 9/2004 Levine
6,792,086 B1 9/2004 Saylor et al.
6,792,407 B2 9/2004 Kibre et al.
6,794,566 B2 9/2004 Pachet
6,795,059 B2 9/2004 Endo
6,799,226 B1 9/2004 Robbin et al.
6,801,604 B2 10/2004 Maes et al.
6,801,964 B1 10/2004 Mahdavi
6,803,905 B1 10/2004 Capps et al.
6,804,649 B2 10/2004 Miranda
6,804,677 B2 10/2004 Shadmon et al.
6,807,536 B2 10/2004 Achlioptas et al.
6,807,574 B1 10/2004 Partovi et al.
6,810,379 B1 10/2004 Vermeulen et al.
6,813,218 B1 11/2004 Antonelli et al.
6,813,491 B1 11/2004 McKinney
6,813,607 B1 11/2004 Faruquie et al.
6,816,578 B1 11/2004 Kredo et al.
6,820,055 B2 11/2004 Saindon et al.
6,829,018 B2 12/2004 Lin et al.
6,829,603 B1 12/2004 Chai et al.
6,832,194 B1 12/2004 Mozer et al.
6,832,381 B1 12/2004 Mathur et al.
6,836,651 B2 12/2004 Segal et al.
6,836,760 B1 12/2004 Bellegarda et al.
6,839,464 B2 1/2005 Hawkins et al.
6,839,669 B1 1/2005 Gould et al.
6,839,670 B1 1/2005 Stammler et al.
6,839,742 B1 1/2005 Dyer et al.
6,842,767 B1 1/2005 Partovi et al.
6,847,966 B1 1/2005 Sommer et al.
6,847,979 B2 1/2005 Allemang et al.
6,850,775 B1 2/2005 Berg
6,850,887 B2 2/2005 Epstein et al.
6,851,115 B1 2/2005 Cheyer et al.
6,856,259 B1 2/2005 Sharp
6,857,800 B2 2/2005 Zhang et al.
6,859,931 B1 2/2005 Cheyer et al.
6,862,568 B2 3/2005 Case
6,862,710 B1 3/2005 Marchisio
6,865,533 B2 3/2005 Addison et al.
6,868,045 B1 3/2005 Schroder
6,868,385 B1 3/2005 Gerson
6,870,529 B1 3/2005 Davis
6,871,346 B1 3/2005 Kumbalimutt et al.
6,873,986 B2 3/2005 McConnell et al.
6,876,947 B1 4/2005 Darley et al.
6,877,003 B2 4/2005 Ho et al.
6,879,957 B1 4/2005 Pechter et al.
6,882,335 B2 4/2005 Saarinen
6,882,337 B2 4/2005 Shetter
6,882,747 B2 4/2005 Thawonmas et al.
6,882,955 B1 4/2005 Ohlenbusch et al.
6,882,971 B2 4/2005 Craner
6,885,734 B1 4/2005 Eberle et al.
6,889,361 B1 5/2005 Bates et al.
6,895,084 B1 5/2005 Saylor et al.
6,895,257 B2 5/2005 Boman et al.
6,895,380 B2 5/2005 Sepe, Jr.
6,895,558 B1 5/2005 Loveland
6,898,550 B1 5/2005 Blackadar et al.
6,901,364 B2 5/2005 Nguyen et al.
6,901,399 B1 5/2005 Corston et al.
6,904,405 B2 6/2005 Suominen
6,907,112 B1 6/2005 Guedalia et al.
6,907,140 B2 6/2005 Matsugu et al.
6,910,004 B2 6/2005 Tarbouriech et al.
6,910,007 B2 6/2005 Stylianou et al.
6,910,186 B2 6/2005 Kim
6,911,971 B2 6/2005 Suzuki et al.
6,912,407 B1 6/2005 Clarke et al.
6,912,498 B2 6/2005 Stevens et al.
6,912,499 B1 6/2005 Sabourin et al.
6,915,138 B2 7/2005 Kraft
6,915,246 B2 7/2005 Gusler et al.
6,917,373 B2 7/2005 Vong et al.
6,918,677 B2 7/2005 Shipman
6,924,828 B1 8/2005 Hirsch
6,925,438 B2 8/2005 Mohamed et al.
6,928,149 B1 8/2005 Panjwani et al.
6,928,614 B1 8/2005 Everhart
6,931,255 B2 8/2005 Mekuria
6,931,384 B1 8/2005 Horvitz et al.
6,932,708 B2 8/2005 Yamashita et al.
6,934,394 B1 8/2005 Anderson
6,934,684 B2 8/2005 Alpdemir et al.
6,934,756 B2 8/2005 Maes
6,934,812 B1 8/2005 Robbin et al.
6,937,975 B1 8/2005 Elworthy
6,937,986 B2 8/2005 Denenberg et al.
6,944,593 B2 9/2005 Kuzunuki et al.
6,948,094 B2 9/2005 Schultz et al.
6,950,087 B2 9/2005 Knox et al.
6,950,502 B1 9/2005 Jenkins
6,952,799 B2 10/2005 Edwards et al.
6,954,755 B2 10/2005 Reisman
6,954,899 B1 10/2005 Anderson
6,956,845 B2 10/2005 Baker et al.
6,957,076 B2 10/2005 Hunzinger
6,957,183 B2 10/2005 Malayath et al.
6,960,734 B1 11/2005 Park
6,961,699 B1 11/2005 Kahn et al.
6,961,912 B2 11/2005 Aoki et al.
6,963,759 B1 11/2005 Gerson
6,963,841 B2 11/2005 Handal et al.
6,964,023 B2 11/2005 Maes et al.
6,965,376 B2 11/2005 Tani et al.
6,965,863 B1 11/2005 Zuberec et al.
6,968,311 B2 11/2005 Knockeart et al.
6,970,820 B2 11/2005 Junqua et al.
6,970,881 B1 11/2005 Mohan et al.
6,970,915 B1 11/2005 Partovi et al.
6,970,935 B1 11/2005 Maes
6,976,090 B2 12/2005 Ben-Shaul et al.
6,978,127 B1 12/2005 Bulthuis et al.
6,978,239 B2 12/2005 Chu et al.
6,980,949 B2 12/2005 Ford
6,980,955 B2 12/2005 Okutani et al.
6,983,251 B1 1/2006 Umemoto et al.
6,985,858 B2 1/2006 Frey et al.
6,985,865 B1 1/2006 Packingham et al.
6,988,071 B1 1/2006 Gazdzinski
6,990,450 B2 1/2006 Case et al.
6,996,520 B2 2/2006 Levin
6,996,531 B2 2/2006 Korall et al.
6,996,575 B2 2/2006 Cox et al.
6,999,066 B2 2/2006 Litwiller
6,999,914 B1 2/2006 Boerner et al.
6,999,925 B2 2/2006 Fischer et al.
6,999,927 B2 2/2006 Mozer et al.
7,000,189 B2 2/2006 Dutta et al.

(56) References Cited

U.S. PATENT DOCUMENTS 7,002,556 B2 2/2006 Tsukada et al.
7,003,099 B1 2/2006 Zhang et al.
7,003,463 B1 2/2006 Maes et al.
7,003,522 B1 2/2006 Reynar et al.
7,006,969 B2 2/2006 Atal
7,006,973 B1 2/2006 Genly
7,007,239 B1 2/2006 Hawkins et al.
7,010,581 B2 3/2006 Brown et al.
7,013,289 B2 3/2006 Horn et al.
7,013,308 B1 3/2006 Tunstall-Pedoe
7,013,429 B2 3/2006 Fujimoto et al.
7,015,894 B2 3/2006 Morohoshi
7,020,685 B1 3/2006 Chen et al.
7,023,979 B1 4/2006 Wu et al.
7,024,363 B1 4/2006 Comerford et al.
7,024,364 B2 4/2006 Guerra et al.
7,024,366 B1 4/2006 Deyoe et al.
7,024,460 B2 4/2006 Koopmas et al.
7,027,568 B1 4/2006 Simpson et al.
7,027,974 B1 4/2006 Busch et al.
7,027,990 B2 4/2006 Sussman
7,028,252 B1 4/2006 Baru et al.
7,030,861 B1 4/2006 Westerman et al.
7,031,530 B2 4/2006 Driggs et al.
7,031,909 B2 4/2006 Mao et al.
7,035,794 B2 4/2006 Sirivara
7,035,801 B2 4/2006 Jimenez-Feltstrom
7,035,807 B1 4/2006 Brittain et al.
7,036,128 B1 4/2006 Julia et al.
7,038,659 B2 5/2006 Rajkowski
7,039,588 B2 5/2006 Okutani et al.
7,043,420 B2 5/2006 Ratnaparkhi
7,043,422 B2 5/2006 Gao et al.
7,046,230 B2 5/2006 Zadesky et al.
7,046,850 B2 5/2006 Braspenning et al.
7,047,193 B1 5/2006 Bellegarda
7,050,550 B2 5/2006 Steinbiss et al.
7,050,976 B1 5/2006 Packingham
7,050,977 B1 5/2006 Bennett
7,051,096 B1 5/2006 Krawiec et al.
7,054,419 B2 5/2006 Culliss
7,054,888 B2 5/2006 LaChapelle et al.
7,057,607 B2 6/2006 Mayoraz et al.
7,058,569 B2 6/2006 Coorman et al.
7,058,888 B1 6/2006 Gjerstad et al.
7,058,889 B2 6/2006 Trovato et al.
7,062,223 B2 6/2006 Gerber et al.
7,062,225 B2 6/2006 White
7,062,428 B2 6/2006 Hogenhout et al.
7,062,438 B2 6/2006 Kobayashi et al.
7,065,185 B1 6/2006 Koch
7,065,485 B1 6/2006 Chong-White et al.
7,069,213 B2 6/2006 Thompson
7,069,220 B2 6/2006 Coffman et al.
7,069,560 B1 6/2006 Cheyer et al.
7,072,686 B1 7/2006 Schrager
7,072,941 B2 7/2006 Griffin et al.
7,076,527 B2 7/2006 Bellegarda et al.
7,079,713 B2 7/2006 Simmons
7,082,322 B2 7/2006 Harano
7,084,758 B1 8/2006 Cole
7,084,856 B2 8/2006 Huppi
7,085,723 B2 8/2006 Ross et al.
7,085,960 B2 8/2006 Bouat et al.
7,088,345 B2 8/2006 Robinson et al.
7,089,292 B1 8/2006 Roderick et al.
7,092,370 B2 8/2006 Jiang et al.
7,092,887 B2 8/2006 Mozer et al.
7,092,928 B1 8/2006 Elad et al.
7,092,950 B2 8/2006 Wong et al.
7,093,693 B1 8/2006 Gazdzinski
7,095,733 B1 8/2006 Yarlagadda et al.
7,096,183 B2 8/2006 Junqua
7,100,117 B1 8/2006 Chwa et al.
7,103,548 B2 9/2006 Squibbs et al.
7,107,204 B1 9/2006 Liu et al.
7,111,248 B2 9/2006 Mulvey et al.
7,111,774 B2 9/2006 Song
7,113,803 B2 9/2006 Dehlin
7,113,943 B2 9/2006 Bradford et al.
7,115,035 B2 10/2006 Tanaka
7,117,231 B2 10/2006 Fischer et al.
7,123,696 B2 10/2006 Lowe
7,124,081 B1 10/2006 Bellegarda
7,124,082 B2 10/2006 Freedman
7,124,164 B1 10/2006 Chemtob
7,127,046 B1 10/2006 Smith et al.
7,127,396 B2 10/2006 Chu et al.
7,127,403 B1 10/2006 Saylor et al.
7,133,900 B1 11/2006 Szeto
7,136,710 B1 11/2006 Hoffberg et al.
7,136,818 B1 11/2006 Cosatto et al.
7,137,126 B1 11/2006 Coffman et al.
7,139,697 B2 11/2006 Hakkinen et al.
7,139,714 B2 11/2006 Bennett et al.
7,139,722 B2 11/2006 Perrella et al.
7,143,028 B2 11/2006 Hillis et al.
7,143,038 B2 11/2006 Katae
7,143,040 B2 11/2006 Durston et al.
7,146,319 B2 12/2006 Hunt
7,146,437 B2 12/2006 Robbin et al.
7,149,319 B2 12/2006 Roeck
7,149,695 B1 12/2006 Bellegarda
7,149,964 B1 12/2006 Cottrille et al.
7,152,070 B1 12/2006 Musick et al.
7,152,093 B2 12/2006 Ludwig et al.
7,154,526 B2 12/2006 Foote et al.
7,155,668 B2 12/2006 Holland et al.
7,158,647 B2 1/2007 Azima et al.
7,159,174 B2 1/2007 Johnson et al.
7,162,412 B2 1/2007 Yamada et al.
7,162,482 B1 1/2007 Dunning
7,165,073 B2 1/2007 Vandersluis
7,166,791 B2 1/2007 Robbin et al.
7,171,360 B2 1/2007 Huang et al.
7,174,042 B1 2/2007 Simmons et al.
7,174,295 B1 2/2007 Kivimaki
7,174,297 B2 2/2007 Guerra et al.
7,174,298 B2 2/2007 Sharma
7,177,794 B2 2/2007 Mani et al.
7,177,798 B2 2/2007 Hsu et al.
7,177,817 B1 2/2007 Khosla et al.
7,181,386 B2 2/2007 Mohri et al.
7,181,388 B2 2/2007 Tian
7,184,064 B2 2/2007 Zimmerman et al.
7,185,276 B2 2/2007 Keswa
7,188,085 B2 3/2007 Pelletier
7,190,351 B1 3/2007 Goren
7,190,794 B2 3/2007 Hinde
7,191,118 B2 3/2007 Bellegarda
7,191,131 B1 3/2007 Nagao
7,193,615 B2 3/2007 Kim et al.
7,194,186 B1 3/2007 Strub et al.
7,194,413 B2 3/2007 Mahoney et al.
7,194,471 B1 3/2007 Nagatsuka et al.
7,194,611 B2 3/2007 Bear et al.
7,194,699 B2 3/2007 Thomson et al.
7,197,120 B2 3/2007 Luehrig et al.
7,197,460 B1 3/2007 Gupta et al.
7,200,550 B2 4/2007 Menezes et al.
7,200,558 B2 4/2007 Kato et al.
7,200,559 B2 4/2007 Wang
7,203,646 B2 4/2007 Bennett
7,206,809 B2 4/2007 Ludwig et al.
7,212,964 B1 5/2007 Alshawi et al.
7,216,008 B2 5/2007 Sakata
7,216,073 B2 5/2007 Lavi et al.
7,216,080 B2 5/2007 Tsiao et al.
7,218,920 B2 5/2007 Hyon
7,218,943 B2 5/2007 Klassen et al.
7,219,063 B2 5/2007 Schalk et al.
7,219,123 B1 5/2007 Fiechter et al.
7,225,125 B2 5/2007 Bennett et al.
7,228,278 B2 6/2007 Nguyen et al.

(56) References Cited

U.S. PATENT DOCUMENTS

| | | | |
|---|---|---|---|
| 7,231,343 | B1 | 6/2007 | Treadgold et al. |
| 7,231,597 | B1 | 6/2007 | Braun et al. |
| 7,233,790 | B2 | 6/2007 | Kjellberg et al. |
| 7,233,904 | B2 | 6/2007 | Luisi |
| 7,234,026 | B2 | 6/2007 | Robbin et al. |
| 7,236,932 | B1 | 6/2007 | Grajski |
| 7,240,002 | B2 | 7/2007 | Minamino et al. |
| 7,243,130 | B2 | 7/2007 | Horvitz et al. |
| 7,243,305 | B2 | 7/2007 | Schabes et al. |
| 7,246,118 | B2 | 7/2007 | Chastain et al. |
| 7,246,151 | B2 | 7/2007 | Isaacs et al. |
| 7,251,454 | B2 | 7/2007 | White |
| 7,254,773 | B2 | 8/2007 | Bates et al. |
| 7,259,752 | B1 | 8/2007 | Simmons |
| 7,260,529 | B1 | 8/2007 | Lengen |
| 7,260,567 | B2 | 8/2007 | Parikh et al. |
| 7,263,373 | B2 | 8/2007 | Mattisson |
| 7,266,189 | B1 | 9/2007 | Day |
| 7,266,495 | B1 | 9/2007 | Beaufays et al. |
| 7,266,496 | B2 | 9/2007 | Wang et al. |
| 7,266,499 | B2 | 9/2007 | Surace et al. |
| 7,269,544 | B2 | 9/2007 | Simske |
| 7,269,556 | B2 | 9/2007 | Kiss et al. |
| 7,272,224 | B1 | 9/2007 | Normile et al. |
| 7,275,063 | B2 | 9/2007 | Horn |
| 7,277,088 | B2 | 10/2007 | Robinson et al. |
| 7,277,854 | B2 | 10/2007 | Bennett et al. |
| 7,277,855 | B1 | 10/2007 | Acker et al. |
| 7,280,958 | B2 | 10/2007 | Pavlov et al. |
| 7,283,072 | B1 | 10/2007 | Plachta et al. |
| 7,289,102 | B2 | 10/2007 | Hinckley et al. |
| 7,290,039 | B1 | 10/2007 | Lisitsa et al. |
| 7,292,579 | B2 | 11/2007 | Morris |
| 7,292,979 | B2 | 11/2007 | Karas et al. |
| 7,296,230 | B2 | 11/2007 | Fukatsu et al. |
| 7,299,033 | B2 | 11/2007 | Kjellberg et al. |
| 7,302,392 | B1 | 11/2007 | Thenthiruperai et al. |
| 7,302,394 | B1 | 11/2007 | Baray et al. |
| 7,302,686 | B2 | 11/2007 | Togawa |
| 7,308,404 | B2 | 12/2007 | Venkataraman et al. |
| 7,308,408 | B1 | 12/2007 | Stifelman et al. |
| 7,310,329 | B2 | 12/2007 | Vieri et al. |
| 7,310,600 | B1 | 12/2007 | Garner et al. |
| 7,310,605 | B2 | 12/2007 | Janakiraman et al. |
| 7,313,523 | B1 | 12/2007 | Bellegarda et al. |
| 7,315,809 | B2 | 1/2008 | Xun |
| 7,315,818 | B2 | 1/2008 | Stevens et al. |
| 7,319,957 | B2 | 1/2008 | Robinson et al. |
| 7,321,783 | B2 | 1/2008 | Kim |
| 7,322,023 | B2 | 1/2008 | Shulman et al. |
| 7,324,833 | B2 | 1/2008 | White et al. |
| 7,324,947 | B2 | 1/2008 | Jordan et al. |
| 7,328,155 | B2 | 2/2008 | Endo et al. |
| 7,345,670 | B2 | 3/2008 | Armstrong |
| 7,345,671 | B2 | 3/2008 | Robbin et al. |
| 7,349,953 | B2 | 3/2008 | Lisitsa et al. |
| 7,353,139 | B1 | 4/2008 | Burrell et al. |
| 7,359,493 | B1 | 4/2008 | Wang et al. |
| 7,359,671 | B2 | 4/2008 | Richenstein et al. |
| 7,359,851 | B2 | 4/2008 | Tong et al. |
| 7,360,158 | B1 | 4/2008 | Beeman |
| 7,362,738 | B2 | 4/2008 | Taube et al. |
| 7,363,227 | B2 | 4/2008 | Mapes-Riordan et al. |
| 7,365,260 | B2 | 4/2008 | Kawashima |
| 7,366,461 | B1 | 4/2008 | Brown |
| 7,373,612 | B2 | 5/2008 | Risch et al. |
| 7,376,556 | B2 | 5/2008 | Bennett |
| 7,376,632 | B1 | 5/2008 | Sadek et al. |
| 7,376,645 | B2 | 5/2008 | Bernard |
| 7,378,963 | B1 | 5/2008 | Begault et al. |
| 7,379,874 | B2 | 5/2008 | Schmid et al. |
| 7,380,203 | B2 | 5/2008 | Keely et al. |
| 7,383,170 | B2 | 6/2008 | Mills et al. |
| 7,386,438 | B1 | 6/2008 | Franz et al. |
| 7,386,449 | B2 | 6/2008 | Sun et al. |
| 7,386,799 | B1 | 6/2008 | Clanton et al. |
| 7,389,224 | B1 | 6/2008 | Elworthy |
| 7,389,225 | B1 | 6/2008 | Jensen et al. |
| 7,392,185 | B2 | 6/2008 | Bennett |
| 7,394,947 | B2 | 7/2008 | Li et al. |
| 7,398,209 | B2 | 7/2008 | Kennewick et al. |
| 7,401,300 | B2 | 7/2008 | Nurmi |
| 7,403,938 | B2 | 7/2008 | Harrison et al. |
| 7,403,941 | B2 | 7/2008 | Bedworth et al. |
| 7,404,143 | B2 | 7/2008 | Freelander et al. |
| 7,409,337 | B1 | 8/2008 | Potter et al. |
| 7,409,347 | B1 | 8/2008 | Bellegarda |
| 7,412,389 | B2 | 8/2008 | Yang |
| 7,412,470 | B2 | 8/2008 | Masuno et al. |
| 7,415,100 | B2 | 8/2008 | Cooper et al. |
| 7,418,382 | B1 | 8/2008 | Maes |
| 7,418,389 | B2 | 8/2008 | Chu et al. |
| 7,418,392 | B1 | 8/2008 | Mozer et al. |
| 7,426,467 | B2 | 9/2008 | Nashida et al. |
| 7,426,468 | B2 | 9/2008 | Coifman et al. |
| 7,427,024 | B1 | 9/2008 | Gazdzinski et al. |
| 7,428,541 | B2 | 9/2008 | Houle |
| 7,433,869 | B2 | 10/2008 | Gollapudi |
| 7,433,921 | B2 | 10/2008 | Ludwig et al. |
| 7,441,184 | B2 | 10/2008 | Frerebeau et al. |
| 7,443,316 | B2 | 10/2008 | Lim |
| 7,444,589 | B2 | 10/2008 | Zellner |
| 7,447,360 | B2 | 11/2008 | Li et al. |
| 7,447,635 | B1 | 11/2008 | Konopka et al. |
| 7,447,637 | B1 | 11/2008 | Grant et al. |
| 7,451,081 | B1 | 11/2008 | Gajic et al. |
| 7,454,351 | B2 | 11/2008 | Jeschke et al. |
| 7,460,652 | B2 | 12/2008 | Chang |
| 7,467,087 | B1 | 12/2008 | Gillick et al. |
| 7,467,164 | B2 | 12/2008 | Marsh |
| 7,472,061 | B1 | 12/2008 | Alewine et al. |
| 7,472,065 | B2 | 12/2008 | Aaron et al. |
| 7,475,010 | B2 | 1/2009 | Chao |
| 7,475,063 | B2 | 1/2009 | Datta et al. |
| 7,477,238 | B2 | 1/2009 | Fux et al. |
| 7,477,240 | B2 | 1/2009 | Yanagisawa |
| 7,478,037 | B2 | 1/2009 | Strong |
| 7,478,091 | B2 | 1/2009 | Mojsilovic et al. |
| 7,478,129 | B1 | 1/2009 | Chemtob |
| 7,479,948 | B2 | 1/2009 | Kim et al. |
| 7,479,949 | B2 | 1/2009 | Jobs et al. |
| 7,483,832 | B2 | 1/2009 | Tischer |
| 7,483,894 | B2 | 1/2009 | Cao |
| 7,487,089 | B2 | 2/2009 | Mozer |
| 7,487,093 | B2 | 2/2009 | Mutsuno et al. |
| 7,490,034 | B2 | 2/2009 | Finnigan et al. |
| 7,490,039 | B1 | 2/2009 | Shaffer et al. |
| 7,493,560 | B1 | 2/2009 | Kipnes et al. |
| 7,496,498 | B2 | 2/2009 | Chu et al. |
| 7,496,512 | B2 | 2/2009 | Zhao et al. |
| 7,499,923 | B2 | 3/2009 | Kawatani |
| 7,502,738 | B2 | 3/2009 | Kennewick et al. |
| 7,505,795 | B1 | 3/2009 | Lim et al. |
| 7,508,324 | B2 | 3/2009 | Suraqui |
| 7,508,373 | B2 | 3/2009 | Lin et al. |
| 7,516,123 | B2 | 4/2009 | Betz et al. |
| 7,519,327 | B2 | 4/2009 | White |
| 7,522,927 | B2 | 4/2009 | Fitch et al. |
| 7,523,036 | B2 | 4/2009 | Akabane et al. |
| 7,523,108 | B2 | 4/2009 | Cao |
| 7,526,466 | B2 | 4/2009 | Au |
| 7,526,738 | B2 | 4/2009 | Ording et al. |
| 7,528,713 | B2 | 5/2009 | Singh et al. |
| 7,529,671 | B2 | 5/2009 | Rockenbeck et al. |
| 7,529,676 | B2 | 5/2009 | Koyama |
| 7,535,997 | B1 | 5/2009 | McQuaide, Jr. et al. |
| 7,536,029 | B2 | 5/2009 | Choi et al. |
| 7,536,565 | B2 | 5/2009 | Girish et al. |
| 7,538,685 | B1 * | 5/2009 | Cooper et al. ................ 340/692 |
| 7,539,619 | B1 | 5/2009 | Seligman et al. |
| 7,539,656 | B2 | 5/2009 | Fratkina et al. |
| 7,541,940 | B2 | 6/2009 | Upton |
| 7,542,967 | B2 | 6/2009 | Hurst-Hiller et al. |
| 7,543,232 | B2 | 6/2009 | Easton, Jr. et al. |

(56) References Cited

U.S. PATENT DOCUMENTS 7,546,382 B2 6/2009 Healey et al.
7,546,529 B2 6/2009 Reynar et al.
7,548,895 B2 6/2009 Pulsipher
7,552,045 B2 6/2009 Barliga et al.
7,552,055 B2 6/2009 Lecoeuche
7,555,431 B2 6/2009 Bennett
7,555,496 B1 6/2009 Lantrip et al.
7,558,381 B1 7/2009 Ali et al.
7,558,730 B2 7/2009 Davis et al.
7,559,026 B2 7/2009 Girish et al.
7,561,069 B2 7/2009 Horstemeyer
7,562,007 B2 7/2009 Hwang
7,562,032 B2 7/2009 Abbosh et al.
7,565,104 B1 7/2009 Brown et al.
7,565,380 B1 7/2009 Venkatachary
7,567,861 B2 7/2009 Inagaki
7,571,106 B2 8/2009 Cao et al.
7,577,522 B2 8/2009 Rosenberg
7,580,551 B1 8/2009 Srihari et al.
7,580,576 B2 8/2009 Wang et al.
7,580,839 B2 8/2009 Tamura et al.
7,584,092 B2 9/2009 Brockett et al.
7,584,093 B2 9/2009 Potter et al.
7,584,278 B2 9/2009 Rajarajan et al.
7,584,429 B2 9/2009 Fabritius
7,593,868 B2 9/2009 Margiloff et al.
7,596,269 B2 9/2009 King et al.
7,596,499 B2 9/2009 Anguera et al.
7,596,606 B2 9/2009 Codignotto
7,596,765 B2 9/2009 Almas
7,599,918 B2 10/2009 Shen et al.
7,603,381 B2 10/2009 Burke et al.
7,609,179 B2 10/2009 Diaz-Gutierrez et al.
7,610,258 B2 10/2009 Yuknewicz et al.
7,613,264 B2 11/2009 Wells et al.
7,614,008 B2 11/2009 Ording
7,617,094 B2 11/2009 Aoki et al.
7,620,407 B1 11/2009 Donald et al.
7,620,549 B2 11/2009 Di Cristo et al.
7,623,119 B2 11/2009 Autio et al.
7,624,007 B2 11/2009 Bennett
7,627,481 B1 12/2009 Kuo et al.
7,630,901 B2 12/2009 Omi
7,633,076 B2 12/2009 Huppi et al.
7,634,409 B2 12/2009 Kennewick et al.
7,634,413 B1 12/2009 Kuo et al.
7,634,718 B2 12/2009 Nakajima
7,634,732 B1 12/2009 Blagsvedt et al.
7,636,657 B2 12/2009 Ju et al.
7,640,158 B2 12/2009 Detlef et al.
7,640,160 B2 12/2009 Di Cristo et al.
7,643,990 B1 1/2010 Bellegarda
7,647,225 B2 1/2010 Bennett et al.
7,649,454 B2 1/2010 Singh et al.
7,649,877 B2 1/2010 Vieri et al.
7,653,883 B2 1/2010 Hotelling et al.
7,656,393 B2 2/2010 King et al.
7,657,424 B2 2/2010 Bennett
7,657,844 B2 2/2010 Gibson et al.
7,657,849 B2 2/2010 Chaudhri et al.
7,663,607 B2 2/2010 Hotelling et al.
7,664,558 B2 2/2010 Lindahl et al.
7,664,638 B2 2/2010 Cooper et al.
7,669,134 B1 2/2010 Christie et al.
7,672,841 B2 3/2010 Bennett
7,672,952 B2 3/2010 Isaacson et al.
7,673,238 B2 3/2010 Girish et al.
7,673,340 B1 3/2010 Cohen et al.
7,676,026 B1 3/2010 Baxter, Jr.
7,676,365 B2 3/2010 Hwang et al.
7,676,463 B2 3/2010 Thompson et al.
7,679,534 B2 3/2010 Kay et al.
7,680,649 B2 3/2010 Park
7,681,126 B2 3/2010 Roose
7,683,886 B2 3/2010 Willey
7,683,893 B2 3/2010 Kim
7,684,985 B2 3/2010 Dominach et al.
7,684,990 B2 3/2010 Caskey et al.
7,684,991 B2 3/2010 Stohr et al.
7,689,245 B2 3/2010 Cox et al.
7,689,408 B2 3/2010 Chen et al.
7,689,409 B2 3/2010 Heinecke
7,689,421 B2 3/2010 Li et al.
7,693,715 B2 4/2010 Hwang et al.
7,693,717 B2 4/2010 Kahn et al.
7,693,719 B2 4/2010 Chu et al.
7,693,720 B2 4/2010 Kennewick et al.
7,698,131 B2 4/2010 Bennett
7,702,500 B2 4/2010 Blaedow
7,702,508 B2 4/2010 Bennett
7,706,510 B2 4/2010 Ng
7,707,026 B2 4/2010 Liu
7,707,027 B2 4/2010 Balchandran et al.
7,707,032 B2 4/2010 Wang et al.
7,707,221 B1 4/2010 Dunning et al.
7,707,267 B2 4/2010 Lisitsa et al.
7,710,262 B2 5/2010 Ruha
7,711,129 B2 5/2010 Lindahl et al.
7,711,550 B1 5/2010 Feinberg et al.
7,711,565 B1 5/2010 Gazdzinski
7,711,672 B2 5/2010 Au
7,712,053 B2 5/2010 Bradford et al.
7,716,056 B2 5/2010 Weng et al.
7,716,216 B1 5/2010 Harik et al.
7,720,674 B2 5/2010 Kaiser et al.
7,720,683 B1 5/2010 Vermeulen et al.
7,721,226 B2 5/2010 Barabe et al.
7,721,301 B2 5/2010 Wong et al.
7,724,242 B2 5/2010 Hillis et al.
7,725,307 B2 5/2010 Bennett
7,725,318 B2 5/2010 Gavalda et al.
7,725,320 B2 5/2010 Bennett
7,725,321 B2 5/2010 Bennett
7,725,838 B2 5/2010 Williams
7,729,904 B2 6/2010 Bennett
7,729,916 B2 6/2010 Coffman et al.
7,734,461 B2 6/2010 Kwak et al.
7,735,012 B2 6/2010 Naik
7,739,588 B2 6/2010 Reynar et al.
7,742,953 B2 6/2010 King et al.
7,743,188 B2 6/2010 Haitani et al.
7,747,616 B2 6/2010 Yamada et al.
7,752,152 B2 7/2010 Paek et al.
7,756,868 B2 7/2010 Lee
7,757,173 B2 7/2010 Beaman
7,757,182 B2 7/2010 Elliott et al.
7,761,296 B1 7/2010 Bakis et al.
7,763,842 B2 7/2010 Hsu et al.
7,774,204 B2 8/2010 Mozer et al.
7,774,388 B1 8/2010 Runchey
7,778,432 B2 8/2010 Larsen
7,778,595 B2 8/2010 White et al.
7,778,632 B2 8/2010 Kurlander et al.
7,779,353 B2 8/2010 Grigoriu et al.
7,779,356 B2 8/2010 Griesmer
7,779,357 B2 8/2010 Naik
7,783,283 B2 8/2010 Kuusinen et al.
7,783,486 B2 8/2010 Rosser et al.
7,788,590 B2 8/2010 Taboada et al.
7,797,265 B2 9/2010 Brinker et al.
7,797,269 B2 9/2010 Rieman et al.
7,797,331 B2 9/2010 Theimer et al.
7,801,721 B2 9/2010 Rosart et al.
7,801,728 B2 9/2010 Ben-David et al.
7,801,729 B2 9/2010 Mozer
7,805,299 B2 9/2010 Coifman
7,809,565 B2 10/2010 Coifman
7,809,569 B2 10/2010 Attwater et al.
7,809,570 B2 10/2010 Kennewick et al.
7,809,610 B2 10/2010 Cao
7,809,744 B2 10/2010 Nevidomski et al.
7,818,165 B2 10/2010 Carlgren et al.
7,818,176 B2 10/2010 Freeman et al.
7,818,215 B2 10/2010 King et al.

(56) References Cited

U.S. PATENT DOCUMENTS 7,818,291 B2 10/2010 Ferguson et al.
7,818,672 B2 10/2010 Mccormack et al.
7,822,608 B2 10/2010 Cross, Jr. et al.
7,823,123 B2 10/2010 Sabbouh
7,826,945 B2 11/2010 Zhang et al.
7,827,047 B2 11/2010 Anderson et al.
7,831,423 B2 11/2010 Schubert
7,831,426 B2 11/2010 Bennett
7,831,432 B2 11/2010 Bodin et al.
7,836,437 B2 11/2010 Kacmarcik et al.
7,840,400 B2 11/2010 Lavi et al.
7,840,447 B2 11/2010 Kleinrock et al.
7,840,581 B2 11/2010 Ross et al.
7,840,912 B2 11/2010 Elias et al.
7,848,924 B2 12/2010 Nurminen et al.
7,848,926 B2 12/2010 Goto et al.
7,853,444 B2 12/2010 Wang et al.
7,853,445 B2 12/2010 Bachenko et al.
7,853,574 B2 12/2010 Kraenzel et al.
7,853,577 B2 12/2010 Sundaresan et al.
7,853,664 B1 12/2010 Wang et al.
7,853,900 B2 12/2010 Nguyen et al.
7,865,817 B2 1/2011 Ryan et al.
7,869,999 B2 1/2011 Amato et al.
7,870,118 B2 1/2011 Jiang et al.
7,873,519 B2 1/2011 Bennett
7,873,654 B2 1/2011 Bernard
7,877,705 B2 1/2011 Chambers et al.
7,880,730 B2 2/2011 Robinson et al.
7,881,936 B2 2/2011 Longé et al.
7,885,390 B2 2/2011 Chaudhuri et al.
7,885,844 B1 2/2011 Cohen et al.
7,886,233 B2 2/2011 Rainisto et al.
7,889,184 B2 2/2011 Blumenberg et al.
7,889,185 B2 2/2011 Blumenberg et al.
7,890,330 B2 2/2011 Ozkaragoz et al.
7,890,652 B2 2/2011 Bull et al.
7,895,531 B2 2/2011 Radtke et al.
7,899,666 B2 3/2011 Varone
7,908,287 B1 3/2011 Katragadda
7,912,289 B2 3/2011 Kansai et al.
7,912,699 B1 3/2011 Saraclar et al.
7,912,702 B2 3/2011 Bennett
7,912,720 B1 3/2011 Hakkani-Tur et al.
7,912,828 B2 3/2011 Bonnet et al.
7,913,185 B1 3/2011 Benson et al.
7,916,979 B2 3/2011 Simmons
7,917,367 B2 3/2011 Di Cristo et al.
7,917,497 B2 3/2011 Harrison et al.
7,920,678 B2 4/2011 Cooper et al.
7,920,682 B2 4/2011 Byrne et al.
7,920,857 B2 4/2011 Lau et al.
7,925,525 B2 4/2011 Chin
7,925,610 B2 4/2011 Elbaz et al.
7,929,805 B2 4/2011 Wang et al.
7,930,168 B2 4/2011 Weng et al.
7,930,183 B2 4/2011 Odell et al.
7,930,197 B2 4/2011 Ozzie et al.
7,936,339 B2 5/2011 Marggraff et al.
7,936,863 B2 5/2011 John et al.
7,937,075 B2 5/2011 Zellner
7,941,009 B2 5/2011 Li et al.
7,945,294 B2 5/2011 Zhang et al.
7,945,470 B1 5/2011 Cohen et al.
7,949,529 B2 5/2011 Weider et al.
7,949,534 B2 5/2011 Davis et al.
7,949,752 B2 5/2011 Lange et al.
7,953,679 B2 5/2011 Chidlovskii et al.
7,957,975 B2 6/2011 Burns et al.
7,962,179 B2 6/2011 Huang
7,974,844 B2 7/2011 Sumita
7,974,972 B2 7/2011 Cao
7,975,216 B2 7/2011 Woolf et al.
7,983,478 B2 7/2011 Liu et al.
7,983,915 B2 7/2011 Knight et al.
7,983,917 B2 7/2011 Kennewick et al.
7,983,919 B2 7/2011 Conkie
7,983,997 B2 7/2011 Allen et al.
7,984,062 B2 7/2011 Dunning et al.
7,986,431 B2 7/2011 Emori et al.
7,987,151 B2 7/2011 Schott et al.
7,987,244 B1 7/2011 Lewis et al.
7,991,614 B2 8/2011 Washio et al.
7,992,085 B2 8/2011 Wang-Aryattanwanich et al.
7,996,228 B2 8/2011 Miller et al.
7,996,589 B2 8/2011 Schultz et al.
7,996,792 B2 8/2011 Anzures et al.
7,999,669 B2 8/2011 Singh et al.
8,000,453 B2 8/2011 Cooper et al.
8,005,664 B2 8/2011 Hanumanthappa
8,005,679 B2 8/2011 Jordan et al.
8,006,180 B2 8/2011 Tunning et al.
8,015,006 B2 9/2011 Kennewick et al.
8,015,011 B2 9/2011 Nagano et al.
8,015,144 B2 9/2011 Zheng et al.
8,018,431 B1 9/2011 Zehr et al.
8,019,271 B1 9/2011 Izdepski
8,020,104 B2 9/2011 Robarts et al.
8,024,195 B2 9/2011 Mozer et al.
8,027,836 B2 9/2011 Baker et al.
8,031,943 B2 10/2011 Chen et al.
8,032,383 B1 10/2011 Bhardwaj et al.
8,036,901 B2 10/2011 Mozer
8,037,034 B2 10/2011 Plachta et al.
8,041,557 B2 10/2011 Liu
8,041,570 B2 10/2011 Mirkovic et al.
8,041,611 B2 10/2011 Kleinrock et al.
8,042,053 B2 10/2011 Darwish et al.
8,046,363 B2 10/2011 Cha et al.
8,050,500 B1 11/2011 Batty et al.
8,055,502 B2 11/2011 Clark et al.
8,055,708 B2 11/2011 Chitsaz et al.
8,060,824 B2 11/2011 Brownrigg et al.
8,064,753 B2 11/2011 Freeman
8,065,143 B2 11/2011 Yanagihara
8,065,155 B1 11/2011 Gazdzinski
8,065,156 B2 11/2011 Gazdzinski
8,069,046 B2 11/2011 Kennewick et al.
8,069,422 B2 11/2011 Sheshagiri et al.
8,073,681 B2 12/2011 Baldwin et al.
8,077,153 B2 12/2011 Benko et al.
8,078,473 B1 12/2011 Gazdzinski
8,082,153 B2 12/2011 Coffman et al.
8,082,498 B2 12/2011 Salamon et al.
8,090,571 B2 1/2012 Elshishiny et al.
8,095,364 B2 1/2012 Longéet al.
8,099,289 B2 1/2012 Mozer et al.
8,099,395 B2 1/2012 Pabla et al.
8,099,418 B2 1/2012 Inoue et al.
8,103,510 B2 1/2012 Sato
8,107,401 B2 1/2012 John et al.
8,112,275 B2 2/2012 Kennewick et al.
8,112,280 B2 2/2012 Lu
8,117,037 B2 2/2012 Gazdzinski
8,117,542 B2 2/2012 Radtke et al.
8,121,413 B2 2/2012 Hwang et al.
8,121,837 B2 2/2012 Agapi et al.
8,122,094 B1 2/2012 Kotab
8,122,353 B2 2/2012 Bouta
8,131,557 B2 3/2012 Davis et al.
8,135,115 B1 3/2012 Hogg, Jr. et al.
8,138,912 B2 3/2012 Singh et al.
8,140,335 B2 3/2012 Kennewick et al.
8,140,567 B2 3/2012 Padovitz et al.
8,145,489 B2 3/2012 Freeman et al.
8,150,694 B2 4/2012 Kennewick et al.
8,150,700 B2 4/2012 Shin et al.
8,155,956 B2 4/2012 Cho et al.
8,156,005 B2 4/2012 Vieri
8,160,883 B2 4/2012 Lecoeuche
8,165,321 B2 4/2012 Paquier et al.
8,165,886 B1 4/2012 Gagnon et al.
8,166,019 B1 4/2012 Lee et al.
8,170,790 B2 5/2012 Lee et al.

(56) References Cited

U.S. PATENT DOCUMENTS 8,179,370 B1 5/2012 Yamasani et al.
8,188,856 B2 5/2012 Singh et al.
8,190,359 B2 5/2012 Bourne
8,195,467 B2 6/2012 Mozer et al.
8,200,495 B2 6/2012 Braho et al.
8,201,109 B2 6/2012 Van Os et al.
8,204,238 B2 6/2012 Mozer
8,205,788 B1 6/2012 Gazdzinski et al.
8,209,183 B1 6/2012 Patel et al.
8,213,911 B2 7/2012 Williams et al.
8,219,115 B1 7/2012 Nelissen
8,219,406 B2 7/2012 Yu et al.
8,219,407 B1 7/2012 Roy et al.
8,219,608 B2 7/2012 alSafadi et al.
8,224,649 B2 7/2012 Chaudhari et al.
8,233,919 B2 7/2012 Haag et al.
8,239,207 B2 8/2012 Seligman et al.
8,255,217 B2 8/2012 Stent et al.
8,260,247 B2 9/2012 Lazaridis et al.
8,270,933 B2 9/2012 Riemer et al.
8,275,621 B2 9/2012 Alewine et al.
8,279,171 B2 10/2012 Hirai et al.
8,280,438 B2 10/2012 Barbera
8,285,546 B2 10/2012 Reich
8,285,551 B2 10/2012 Gazdzinski
8,285,553 B2 10/2012 Gazdzinski
8,290,777 B1 10/2012 Nguyen et al.
8,290,778 B2 10/2012 Gazdzinski
8,290,781 B2 10/2012 Gazdzinski
8,296,146 B2 10/2012 Gazdzinski
8,296,153 B2 10/2012 Gazdzinski
8,296,380 B1 10/2012 Kelly et al.
8,296,383 B2 10/2012 Lindahl
8,300,801 B2 10/2012 Sweeney et al.
8,301,456 B2 10/2012 Gazdzinski
8,311,834 B1 11/2012 Gazdzinski
8,311,835 B2 11/2012 Lecoeuche et al.
8,326,627 B2 12/2012 Kennewick et al.
8,332,224 B2 12/2012 Di Cristo et al.
8,332,748 B1 12/2012 Karam
8,335,689 B2 12/2012 Wittenstein et al.
8,345,665 B2 1/2013 Vieri et al.
8,352,183 B2 1/2013 Thota et al.
8,352,268 B2 1/2013 Naik et al.
8,352,272 B2 1/2013 Rogers et al.
8,355,919 B2 1/2013 Silverman et al.
8,359,234 B2 1/2013 Vieri
8,370,158 B2 2/2013 Gazdzinski
8,371,503 B2 2/2013 Gazdzinski
8,374,871 B2 2/2013 Ehsani et al.
8,375,320 B2 2/2013 Kotler et al.
8,380,504 B1 2/2013 Peden et al.
8,381,107 B2 2/2013 Rottler et al.
8,381,135 B2 2/2013 Hotelling et al.
8,396,714 B2 3/2013 Rogers et al.
8,423,288 B2 4/2013 Stahl et al.
8,428,758 B2 4/2013 Naik et al.
8,447,612 B2 5/2013 Gazdzinski
8,479,122 B2 7/2013 Hotelling et al.
8,489,599 B2 7/2013 Bellotti
8,498,857 B2 7/2013 Kopparapu et al.
8,521,513 B2 8/2013 Millett et al.
8,583,416 B2 11/2013 Huang et al.
8,583,511 B2 11/2013 Hendrickson
8,589,869 B2 11/2013 Wolfram
8,595,004 B2 11/2013 Koshinaka
8,620,659 B2 12/2013 Di Cristo et al.
8,620,662 B2 12/2013 Bellegarda
8,645,137 B2 2/2014 Bellegarda et al.
8,655,901 B1 2/2014 Li et al.
8,660,849 B2 2/2014 Gruber et al.
8,660,970 B1 2/2014 Fiedorowicz
8,676,904 B2 3/2014 Lindahl et al.
8,677,377 B2 3/2014 Cheyer et al.
8,688,446 B2 4/2014 Yanagihara et al.
8,695,074 B2 4/2014 Saraf et al.
8,696,364 B2 4/2014 Cohen
8,706,472 B2 4/2014 Ramerth et al.
8,731,610 B2 5/2014 Appaji
8,760,537 B2 6/2014 Johnson et al.
8,768,693 B2 7/2014 Lempel et al.
8,838,457 B2 9/2014 Cerra et al.
8,862,252 B2 10/2014 Rottler et al.
8,880,405 B2 11/2014 Cerra et al.
8,886,540 B2 11/2014 Cerra et al.
8,898,568 B2 11/2014 Bull et al.
8,909,693 B2 12/2014 Frissora et al.
8,938,688 B2 1/2015 Bradford et al.
8,943,423 B2 1/2015 Merrill et al.
8,972,878 B2 3/2015 David et al.
9,071,701 B2 6/2015 Donaldson et al.
9,101,279 B2 8/2015 Ritchey et al.
9,112,984 B2 8/2015 Sejnoha et al.
9,171,541 B2 10/2015 Kennewick et al.
9,502,025 B2 11/2016 Kennewick et al.
9,620,113 B2 4/2017 Kennewick et al.
2001/0000534 A1* 4/2001 Matulich ............ H05B 37/0236 704/275
2001/0005859 A1 6/2001 Okuyama et al.
2001/0020259 A1 9/2001 Sekiguchi et al.
2001/0027396 A1 10/2001 Sato
2001/0029455 A1 10/2001 Chin et al.
2001/0030660 A1 10/2001 Zainoulline
2001/0032080 A1 10/2001 Fukada
2001/0041021 A1 11/2001 Boyle et al.
2001/0042107 A1 11/2001 Palm
2001/0044724 A1 11/2001 Hon et al.
2001/0047264 A1 11/2001 Roundtree
2001/0056342 A1 12/2001 Piehn et al.
2001/0056347 A1 12/2001 Chazan et al.
2002/0001395 A1 1/2002 Davis et al.
2002/0002039 A1 1/2002 Qureshey et al.
2002/0002413 A1 1/2002 Tokue
2002/0002461 A1 1/2002 Tetsumoto
2002/0004703 A1 1/2002 Gaspard, II
2002/0010581 A1 1/2002 Euler et al.
2002/0010584 A1 1/2002 Schultz et al.
2002/0010726 A1 1/2002 Rogson
2002/0010798 A1 1/2002 Ben-Shaul et al.
2002/0013707 A1 1/2002 Shaw et al.
2002/0013784 A1 1/2002 Swanson
2002/0013852 A1 1/2002 Janik
2002/0015024 A1 2/2002 Westerman et al.
2002/0015064 A1 2/2002 Robotham et al.
2002/0021278 A1 2/2002 Hinckley et al.
2002/0026315 A1 2/2002 Miranda
2002/0026456 A1 2/2002 Bradford
2002/0031254 A1 3/2002 Lantrip et al.
2002/0031262 A1 3/2002 Imagawa et al.
2002/0032048 A1* 3/2002 Kitao et al. .................. 455/569
2002/0032564 A1 3/2002 Ehsani et al.
2002/0032751 A1 3/2002 Bharadwaj
2002/0035467 A1 3/2002 Morimoto et al.
2002/0035469 A1 3/2002 Holzapfel
2002/0035474 A1 3/2002 Alpdemir
2002/0040297 A1 4/2002 Tsiao et al.
2002/0040359 A1 4/2002 Green et al.
2002/0042707 A1 4/2002 Zhao et al.
2002/0045438 A1 4/2002 Tagawa et al.
2002/0045961 A1 4/2002 Gibbs et al.
2002/0046025 A1 4/2002 Hain
2002/0046315 A1 4/2002 Miller et al.
2002/0052730 A1 5/2002 Nakao
2002/0052740 A1 5/2002 Charlesworth et al.
2002/0052747 A1 5/2002 Sarukkai
2002/0054094 A1 5/2002 Matsuda
2002/0055844 A1 5/2002 L'Esperance et al.
2002/0055934 A1 5/2002 Lipscomb et al.
2002/0059066 A1 5/2002 O'hagan
2002/0059068 A1 5/2002 Rose et al.
2002/0065659 A1 5/2002 Isono et al.
2002/0065797 A1 5/2002 Meidan et al.
2002/0067308 A1 6/2002 Robertson
2002/0069063 A1 6/2002 Buchner et al.

(56) References Cited

U.S. PATENT DOCUMENTS

| | | | |
|---|---|---|---|
| 2002/0069071 A1 | 6/2002 | Knockeart et al. | |
| 2002/0069220 A1 | 6/2002 | Tran | |
| 2002/0072816 A1 | 6/2002 | Shdema et al. | |
| 2002/0072908 A1 | 6/2002 | Case et al. | |
| 2002/0072914 A1 | 6/2002 | Alshawi et al. | |
| 2002/0077082 A1 | 6/2002 | Cruickshank | |
| 2002/0077817 A1 | 6/2002 | Atal | |
| 2002/0078041 A1 | 6/2002 | Wu | |
| 2002/0080163 A1 | 6/2002 | Morey | |
| 2002/0085037 A1 | 7/2002 | Leavitt et al. | |
| 2002/0087508 A1 | 7/2002 | Hull et al. | |
| 2002/0091511 A1 | 7/2002 | Hellwig et al. | |
| 2002/0095286 A1 | 7/2002 | Ross et al. | |
| 2002/0095290 A1 | 7/2002 | Kahn et al. | |
| 2002/0099547 A1 | 7/2002 | Chu et al. | |
| 2002/0099552 A1 | 7/2002 | Rubin et al. | |
| 2002/0101447 A1 | 8/2002 | Carro | |
| 2002/0103641 A1 | 8/2002 | Kuo et al. | |
| 2002/0103644 A1 | 8/2002 | Brocious et al. | |
| 2002/0103646 A1 | 8/2002 | Kochanski et al. | |
| 2002/0107684 A1 | 8/2002 | Gao | |
| 2002/0109709 A1 | 8/2002 | Sagar | |
| 2002/0110248 A1 | 8/2002 | Kovales et al. | |
| 2002/0111810 A1 | 8/2002 | Khan et al. | |
| 2002/0116082 A1 | 8/2002 | Gudorf | |
| 2002/0116171 A1 | 8/2002 | Russell | |
| 2002/0116185 A1 | 8/2002 | Cooper et al. | |
| 2002/0116189 A1 | 8/2002 | Yeh et al. | |
| 2002/0116420 A1 | 8/2002 | Allam et al. | |
| 2002/0120697 A1 | 8/2002 | Generous et al. | |
| 2002/0120925 A1 | 8/2002 | Logan | |
| 2002/0122053 A1 | 9/2002 | Dutta et al. | |
| 2002/0123894 A1 | 9/2002 | Woodward | |
| 2002/0126097 A1 | 9/2002 | Savolainen | |
| 2002/0128827 A1 | 9/2002 | Bu et al. | |
| 2002/0128840 A1 | 9/2002 | Hinde et al. | |
| 2002/0129057 A1 | 9/2002 | Spielberg | |
| 2002/0133347 A1 | 9/2002 | Schoneburg et al. | |
| 2002/0133348 A1 | 9/2002 | Pearson et al. | |
| 2002/0135565 A1 | 9/2002 | Gordon et al. | |
| 2002/0135618 A1 | 9/2002 | Maes et al. | |
| 2002/0137505 A1 | 9/2002 | Eiche et al. | |
| 2002/0138254 A1 | 9/2002 | Isaka et al. | |
| 2002/0138265 A1 | 9/2002 | Stevens et al. | |
| 2002/0138270 A1 | 9/2002 | Bellegarda et al. | |
| 2002/0138616 A1 | 9/2002 | Basson et al. | |
| 2002/0140679 A1 | 10/2002 | Wen | |
| 2002/0143533 A1 | 10/2002 | Lucas et al. | |
| 2002/0143542 A1 | 10/2002 | Eide | |
| 2002/0143551 A1 | 10/2002 | Sharma et al. | |
| 2002/0143826 A1 | 10/2002 | Day et al. | |
| 2002/0151297 A1 | 10/2002 | Remboski et al. | |
| 2002/0152045 A1 | 10/2002 | Dowling et al. | |
| 2002/0152255 A1 | 10/2002 | Smith et al. | |
| 2002/0154160 A1 | 10/2002 | Hosokawa | |
| 2002/0161865 A1 | 10/2002 | Nguyen | |
| 2002/0163544 A1 | 11/2002 | Baker et al. | |
| 2002/0164000 A1 | 11/2002 | Cohen et al. | |
| 2002/0165918 A1 | 11/2002 | Bettis | |
| 2002/0167534 A1 | 11/2002 | Burke | |
| 2002/0169592 A1 | 11/2002 | Aityan | |
| 2002/0169605 A1 | 11/2002 | Damiba et al. | |
| 2002/0173273 A1 | 11/2002 | Spurgat et al. | |
| 2002/0173889 A1 | 11/2002 | Odinak et al. | |
| 2002/0173961 A1 | 11/2002 | Guerra | |
| 2002/0173962 A1 | 11/2002 | Tang et al. | |
| 2002/0173966 A1 | 11/2002 | Henton | |
| 2002/0177993 A1 | 11/2002 | Veditz et al. | |
| 2002/0184027 A1 | 12/2002 | Brittan et al. | |
| 2002/0184189 A1 | 12/2002 | Hay et al. | |
| 2002/0189426 A1 | 12/2002 | Hirade et al. | |
| 2002/0191029 A1 | 12/2002 | Gillespie et al. | |
| 2002/0193996 A1 | 12/2002 | Squibbs et al. | |
| 2002/0198714 A1 | 12/2002 | Zhou | |
| 2002/0198715 A1 | 12/2002 | Belrose | |
| 2003/0001881 A1 | 1/2003 | Mannheimer et al. | |
| 2003/0002632 A1 | 1/2003 | Bhogal et al. | |
| 2003/0013483 A1 | 1/2003 | Ausems et al. | |
| 2003/0016770 A1 | 1/2003 | Trans et al. | |
| 2003/0020760 A1 | 1/2003 | Takatsu et al. | |
| 2003/0026402 A1 | 2/2003 | Clapper | |
| 2003/0028380 A1 | 2/2003 | Freeland et al. | |
| 2003/0033153 A1 | 2/2003 | Olson et al. | |
| 2003/0033214 A1 | 2/2003 | Mikkelsen et al. | |
| 2003/0037073 A1 | 2/2003 | Tokuda et al. | |
| 2003/0037254 A1 | 2/2003 | Fischer et al. | |
| 2003/0040908 A1 | 2/2003 | Yang et al. | |
| 2003/0046075 A1 | 3/2003 | Stone | |
| 2003/0046401 A1 | 3/2003 | Abbott et al. | |
| 2003/0046434 A1 | 3/2003 | Flanagin et al. | |
| 2003/0050781 A1 | 3/2003 | Tamura et al. | |
| 2003/0051136 A1 | 3/2003 | Curtis et al. | |
| 2003/0055537 A1* | 3/2003 | Odinak .................. | B60K 35/00 701/1 |
| 2003/0061317 A1 | 3/2003 | Brown et al. | |
| 2003/0061570 A1 | 3/2003 | Hatori et al. | |
| 2003/0063073 A1 | 4/2003 | Geaghan et al. | |
| 2003/0065805 A1 | 4/2003 | Barnes, Jr. | |
| 2003/0074195 A1 | 4/2003 | Bartosik et al. | |
| 2003/0074198 A1 | 4/2003 | Sussman | |
| 2003/0074457 A1 | 4/2003 | Kluth | |
| 2003/0076301 A1 | 4/2003 | Tsuk et al. | |
| 2003/0078766 A1 | 4/2003 | Appelt et al. | |
| 2003/0078780 A1 | 4/2003 | Kochanski et al. | |
| 2003/0078969 A1 | 4/2003 | Sprague et al. | |
| 2003/0079024 A1 | 4/2003 | Hough et al. | |
| 2003/0079038 A1 | 4/2003 | Robbin et al. | |
| 2003/0080991 A1 | 5/2003 | Crow et al. | |
| 2003/0083113 A1* | 5/2003 | Chua .................. | H04M 1/6083 455/569.2 |
| 2003/0083878 A1 | 5/2003 | Lee et al. | |
| 2003/0083884 A1 | 5/2003 | Odinak et al. | |
| 2003/0084350 A1 | 5/2003 | Eibach et al. | |
| 2003/0085870 A1 | 5/2003 | Hinckley | |
| 2003/0086699 A1 | 5/2003 | Benyamin et al. | |
| 2003/0088414 A1 | 5/2003 | Huang et al. | |
| 2003/0088421 A1 | 5/2003 | Maes et al. | |
| 2003/0090467 A1 | 5/2003 | Hohl et al. | |
| 2003/0090474 A1 | 5/2003 | Schaefer | |
| 2003/0095096 A1 | 5/2003 | Robbin et al. | |
| 2003/0097210 A1 | 5/2003 | Horst et al. | |
| 2003/0097379 A1 | 5/2003 | Ireton | |
| 2003/0097408 A1 | 5/2003 | Kageyama et al. | |
| 2003/0098892 A1 | 5/2003 | Hiipakka | |
| 2003/0099335 A1 | 5/2003 | Tanaka et al. | |
| 2003/0101045 A1 | 5/2003 | Moffatt et al. | |
| 2003/0115060 A1 | 6/2003 | Junqua et al. | |
| 2003/0115064 A1 | 6/2003 | Gusler et al. | |
| 2003/0115186 A1 | 6/2003 | Wilkinson et al. | |
| 2003/0115552 A1 | 6/2003 | Jahnke et al. | |
| 2003/0117365 A1 | 6/2003 | Shteyn | |
| 2003/0120494 A1 | 6/2003 | Jost et al. | |
| 2003/0122787 A1 | 7/2003 | Zimmerman et al. | |
| 2003/0125927 A1 | 7/2003 | Seme | |
| 2003/0125955 A1 | 7/2003 | Arnold et al. | |
| 2003/0126559 A1 | 7/2003 | Fuhrmann | |
| 2003/0128819 A1 | 7/2003 | Lee et al. | |
| 2003/0133694 A1 | 7/2003 | Yeo | |
| 2003/0134678 A1 | 7/2003 | Tanaka | |
| 2003/0135740 A1 | 7/2003 | Talmor et al. | |
| 2003/0144846 A1 | 7/2003 | Denenberge et al. | |
| 2003/0145285 A1 | 7/2003 | Miyahira et al. | |
| 2003/0147512 A1 | 8/2003 | Abburi | |
| 2003/0149557 A1 | 8/2003 | Cox et al. | |
| 2003/0149567 A1 | 8/2003 | Schmitz et al. | |
| 2003/0149978 A1 | 8/2003 | Plotnick | |
| 2003/0152203 A1 | 8/2003 | Berger et al. | |
| 2003/0152894 A1 | 8/2003 | Townshend | |
| 2003/0154081 A1 | 8/2003 | Chu et al. | |
| 2003/0157968 A1 | 8/2003 | Boman et al. | |
| 2003/0158735 A1 | 8/2003 | Yamada et al. | |
| 2003/0158737 A1 | 8/2003 | Csicsatka | |
| 2003/0160702 A1 | 8/2003 | Tanaka | |
| 2003/0160830 A1 | 8/2003 | Degross | |

(56) References Cited

U.S. PATENT DOCUMENTS

2003/0163316 A1 8/2003 Addison et al.
2003/0164848 A1 9/2003 Dutta et al.
2003/0167167 A1 9/2003 Gong
2003/0167318 A1 9/2003 Robbin et al.
2003/0167335 A1 9/2003 Alexander
2003/0171928 A1 9/2003 Falcon et al.
2003/0171936 A1 9/2003 Sall et al.
2003/0174830 A1 9/2003 Boyer et al.
2003/0179222 A1 9/2003 Noma et al.
2003/0182115 A1 9/2003 Malayath et al.
2003/0182394 A1 9/2003 Ryngler et al.
2003/0187655 A1 10/2003 Dunsmuir
2003/0187844 A1 10/2003 Li et al.
2003/0187925 A1 10/2003 Inala et al.
2003/0188005 A1 10/2003 Yoneda et al.
2003/0188192 A1 10/2003 Tang et al.
2003/0190074 A1 10/2003 Loudon et al.
2003/0191645 A1 10/2003 Zhou
2003/0193481 A1 10/2003 Sokolsky
2003/0194080 A1 10/2003 Michaelis et al.
2003/0195741 A1 10/2003 Mani et al.
2003/0197736 A1 10/2003 Murphy
2003/0197744 A1 10/2003 Irvine
2003/0200858 A1 10/2003 Xie
2003/0204392 A1 10/2003 Finnigan et al.
2003/0204492 A1 10/2003 Wolf et al.
2003/0208756 A1 11/2003 Macrae et al.
2003/0210266 A1 11/2003 Cragun et al.
2003/0212961 A1 11/2003 Soin et al.
2003/0214519 A1 11/2003 Smith et al.
2003/0224760 A1 12/2003 Day
2003/0228863 A1 12/2003 Vander Veen et al.
2003/0228909 A1 12/2003 Tanaka et al.
2003/0229490 A1 12/2003 Etter
2003/0229616 A1 12/2003 Wong
2003/0233230 A1 12/2003 Ammicht et al.
2003/0233237 A1 12/2003 Garside et al.
2003/0233240 A1 12/2003 Kaatrasalo
2003/0234824 A1 12/2003 Litwiller
2003/0236663 A1 12/2003 Dimitrova et al.
2004/0001396 A1 1/2004 Keller et al.
2004/0006467 A1 1/2004 Anisimovich et al.
2004/0012556 A1 1/2004 Yong et al.
2004/0013252 A1 1/2004 Craner
2004/0021676 A1 2/2004 Chen et al.
2004/0022373 A1 2/2004 Suder et al.
2004/0023643 A1 2/2004 Vander Veen et al.
2004/0030554 A1 2/2004 Boxberger-Oberoi et al.
2004/0030556 A1 2/2004 Bennett
2004/0030996 A1 2/2004 Van Liempd et al.
2004/0034520 A1 2/2004 Langkilde-geary et al.
2004/0036715 A1 2/2004 Warren
2004/0048627 A1 3/2004 Olvera-Hernandez
2004/0049391 A1 3/2004 Polanyi et al.
2004/0051729 A1 3/2004 Borden, IV
2004/0052338 A1 3/2004 Celi, Jr. et al.
2004/0054530 A1 3/2004 Davis et al.
2004/0054533 A1 3/2004 Bellegarda
2004/0054534 A1 3/2004 Junqua
2004/0054535 A1 3/2004 Mackie et al.
2004/0054541 A1 3/2004 Kryze et al.
2004/0054690 A1 3/2004 Hillerbrand et al.
2004/0055446 A1 3/2004 Robbin et al.
2004/0056899 A1 3/2004 Sinclair, II et al.
2004/0059577 A1 3/2004 Pickering
2004/0059790 A1 3/2004 Austin-Lane et al.
2004/0061717 A1 4/2004 Menon et al.
2004/0062367 A1 4/2004 Fellenstein et al.
2004/0064593 A1 4/2004 Sinclair et al.
2004/0069122 A1 4/2004 Wilson
2004/0070567 A1 4/2004 Longe et al.
2004/0070612 A1 4/2004 Sinclair et al.
2004/0073427 A1 4/2004 Moore
2004/0073428 A1 4/2004 Zlokarnik et al.
2004/0076086 A1 4/2004 Keller et al.
2004/0078382 A1 4/2004 Mercer et al.
2004/0082368 A1 4/2004 Yoon
2004/0085162 A1 5/2004 Agarwal et al.
2004/0085368 A1 5/2004 Johnson, Jr. et al.
2004/0086120 A1 5/2004 Akins, III et al.
2004/0093213 A1 5/2004 Conkie
2004/0093215 A1 5/2004 Gupta et al.
2004/0094018 A1 5/2004 Ueshima et al.
2004/0096105 A1 5/2004 Holtsberg
2004/0098250 A1 5/2004 Kimchi et al.
2004/0100479 A1 5/2004 Nakano et al.
2004/0106432 A1 6/2004 Kanamori et al.
2004/0107169 A1 6/2004 Lowe
2004/0111266 A1 6/2004 Coorman et al.
2004/0111332 A1 6/2004 Baar et al.
2004/0114731 A1 6/2004 Gillett et al.
2004/0122656 A1 6/2004 Abir
2004/0122664 A1 6/2004 Lorenzo et al.
2004/0124583 A1 7/2004 Landis
2004/0125088 A1 7/2004 Zimmerman et al.
2004/0125922 A1 7/2004 Specht
2004/0127198 A1 7/2004 Roskind et al.
2004/0127241 A1 7/2004 Shostak
2004/0128137 A1 7/2004 Bush et al.
2004/0133817 A1 7/2004 Choi
2004/0135701 A1 7/2004 Yasuda et al.
2004/0135774 A1 7/2004 La Monica
2004/0136510 A1 7/2004 Vander Veen
2004/0138869 A1 7/2004 Heinecke
2004/0145607 A1 7/2004 Alderson
2004/0153306 A1 8/2004 Tanner et al.
2004/0160419 A1 8/2004 Padgitt
2004/0162741 A1 8/2004 Flaxer et al.
2004/0174399 A1 9/2004 Wu et al.
2004/0174434 A1 9/2004 Walker et al.
2004/0176958 A1 9/2004 Salmenkaita et al.
2004/0177319 A1 9/2004 Horn
2004/0178994 A1 9/2004 Kairls, Jr.
2004/0181392 A1 9/2004 Parikh et al.
2004/0183833 A1 9/2004 Chua
2004/0186713 A1 9/2004 Gomas et al.
2004/0186714 A1 9/2004 Baker
2004/0186777 A1 9/2004 Margiloff et al.
2004/0193398 A1 9/2004 Chu et al.
2004/0193420 A1 9/2004 Kennewick et al.
2004/0193421 A1 9/2004 Blass
2004/0193426 A1 9/2004 Maddux et al.
2004/0196256 A1 10/2004 Wobbrock et al.
2004/0198436 A1 10/2004 Alden
2004/0199375 A1 10/2004 Ehsani et al.
2004/0199387 A1 10/2004 Wang et al.
2004/0199663 A1 10/2004 Horvitz et al.
2004/0203520 A1 10/2004 Schirtzinger et al.
2004/0205151 A1 10/2004 Sprigg et al.
2004/0205671 A1 10/2004 Sukehiro et al.
2004/0208302 A1 10/2004 Urban et al.
2004/0210634 A1 10/2004 Ferrer et al.
2004/0213419 A1 10/2004 Varma et al.
2004/0215731 A1 10/2004 Tzann-en Szeto
2004/0216049 A1 10/2004 Lewis et al.
2004/0218451 A1 11/2004 Said et al.
2004/0220798 A1 11/2004 Chi et al.
2004/0223485 A1 11/2004 Arellano et al.
2004/0223599 A1 11/2004 Bear et al.
2004/0224638 A1 11/2004 Fadell et al.
2004/0225501 A1 11/2004 Cutaia et al.
2004/0225650 A1* 11/2004 Cooper ................ H04M 3/527
2004/0225746 A1 11/2004 Niell et al.
2004/0230637 A1 11/2004 Lecoueche et al.
2004/0236778 A1 11/2004 Junqua et al.
2004/0242286 A1 12/2004 Benco et al.
2004/0243412 A1 12/2004 Gupta et al.
2004/0243419 A1 12/2004 Wang
2004/0249629 A1 12/2004 Webster
2004/0249667 A1 12/2004 Oon
2004/0252119 A1 12/2004 Hunleth et al.
2004/0252604 A1 12/2004 Johnson et al.
2004/0252966 A1 12/2004 Holloway et al.
2004/0254791 A1 12/2004 Coifman et al.

(56) References Cited

U.S. PATENT DOCUMENTS

2004/0254792 A1 12/2004 Busayapongchai et al.
2004/0257432 A1 12/2004 Girish et al.
2004/0259536 A1 12/2004 Keskar et al.
2004/0261023 A1 12/2004 Bier
2004/0262051 A1 12/2004 Carro
2004/0263636 A1 12/2004 Cutler et al.
2004/0267825 A1 12/2004 Novak et al.
2004/0268253 A1 12/2004 Demello et al.
2004/0268262 A1 12/2004 Gupta et al.
2005/0002507 A1 1/2005 Timmins et al.
2005/0010409 A1 1/2005 Hull et al.
2005/0012723 A1 1/2005 Pallakoff
2005/0015254 A1 1/2005 Beaman
2005/0015772 A1 1/2005 Saare et al.
2005/0022114 A1 1/2005 Shanahan et al.
2005/0024341 A1 2/2005 Gillespie et al.
2005/0024345 A1 2/2005 Easily et al.
2005/0027385 A1 2/2005 Yueh
2005/0030175 A1 2/2005 Wolfe
2005/0031106 A1 2/2005 Henderson
2005/0033582 A1 2/2005 Gadd et al.
2005/0033771 A1 2/2005 Schmitter et al.
2005/0034164 A1 2/2005 Sano et al.
2005/0038657 A1 2/2005 Roth et al.
2005/0039141 A1 2/2005 Burke et al.
2005/0043946 A1 2/2005 Ueyama et al.
2005/0043949 A1 2/2005 Roth et al.
2005/0044569 A1 2/2005 Marcus
2005/0045373 A1 3/2005 Born
2005/0049880 A1 3/2005 Roth et al.
2005/0055212 A1 3/2005 Nagao
2005/0055403 A1 3/2005 Britten
2005/0058438 A1 3/2005 Hayashi
2005/0060155 A1 3/2005 Chu et al.
2005/0071165 A1 3/2005 Hofstader et al.
2005/0071332 A1 3/2005 Ortega et al.
2005/0071437 A1 3/2005 Bear et al.
2005/0074113 A1 4/2005 Mathew et al.
2005/0075874 A1 4/2005 Balchandran et al.
2005/0080613 A1 4/2005 Colledge et al.
2005/0080620 A1 4/2005 Rao et al.
2005/0080625 A1 4/2005 Bennett et al.
2005/0080632 A1 4/2005 Endo et al.
2005/0080780 A1 4/2005 Colledge et al.
2005/0086059 A1 4/2005 Bennett
2005/0086255 A1 4/2005 Schran et al.
2005/0086605 A1 4/2005 Ferrer et al.
2005/0091118 A1 4/2005 Fano
2005/0094475 A1 5/2005 Naoi
2005/0099398 A1 5/2005 Garside et al.
2005/0100214 A1 5/2005 Zhang et al.
2005/0102144 A1 5/2005 Rapoport
2005/0102614 A1 5/2005 Brockett et al.
2005/0102625 A1 5/2005 Lee et al.
2005/0105712 A1 5/2005 Williams et al.
2005/0108001 A1 5/2005 Aarskog
2005/0108017 A1 5/2005 Esser et al.
2005/0108074 A1 5/2005 Bloechl et al.
2005/0108338 A1 5/2005 Simske et al.
2005/0108344 A1 5/2005 Tafoya et al.
2005/0114124 A1 5/2005 Liu et al.
2005/0114140 A1 5/2005 Brackett et al.
2005/0119890 A1 6/2005 Hirose
2005/0119897 A1 6/2005 Bennett et al.
2005/0125216 A1 6/2005 Chitrapura et al.
2005/0125235 A1 6/2005 Lazay et al.
2005/0131951 A1 6/2005 Zhang et al.
2005/0132301 A1 6/2005 Ikeda
2005/0136949 A1 6/2005 Barnes, Jr.
2005/0138305 A1 6/2005 Zellner
2005/0140504 A1 6/2005 Marshall et al.
2005/0143972 A1 6/2005 Gopalakrishnan et al.
2005/0144003 A1 6/2005 Iso-Sipila
2005/0144070 A1 6/2005 Cheshire
2005/0144568 A1 6/2005 Gruen et al.
2005/0148356 A1 7/2005 Ferguson et al.
2005/0149214 A1 7/2005 Yoo et al.
2005/0149330 A1 7/2005 Katae
2005/0149332 A1 7/2005 Kuzunuki et al.
2005/0149510 A1 7/2005 Shafrir
2005/0152558 A1 7/2005 Van Tassel
2005/0152602 A1 7/2005 Chen et al.
2005/0154578 A1 7/2005 Tong et al.
2005/0154591 A1 7/2005 Lecoeuche
2005/0159939 A1 7/2005 Mohler et al.
2005/0162395 A1 7/2005 Unruh
2005/0165607 A1 7/2005 DiFabbrizio et al.
2005/0166153 A1 7/2005 Eytchison et al.
2005/0177445 A1 8/2005 Church
2005/0181770 A1 8/2005 Helferich
2005/0182616 A1 8/2005 Kotipalli
2005/0182627 A1 8/2005 Tanaka et al.
2005/0182628 A1 8/2005 Choi
2005/0182629 A1 8/2005 Coorman et al.
2005/0182630 A1 8/2005 Miro et al.
2005/0182765 A1 8/2005 Liddy
2005/0187773 A1 8/2005 Filoche et al.
2005/0190970 A1 9/2005 Griffin
2005/0192801 A1 9/2005 Lewis et al.
2005/0195077 A1 9/2005 Mcculloch et al.
2005/0195429 A1 9/2005 Archbold
2005/0196733 A1 9/2005 Budra et al.
2005/0201572 A1 9/2005 Lindahl et al.
2005/0202854 A1* 9/2005 Kortum .................. H01R 27/00
455/571
2005/0203747 A1 9/2005 Lecoeuche
2005/0203991 A1 9/2005 Kawamura et al.
2005/0209848 A1 9/2005 Ishii
2005/0210394 A1 9/2005 Crandall et al.
2005/0216331 A1 9/2005 Ahrens et al.
2005/0222843 A1 10/2005 Kahn et al.
2005/0222973 A1 10/2005 Kaiser
2005/0228665 A1 10/2005 Kobayashi et al.
2005/0245243 A1 11/2005 Zuniga
2005/0246350 A1 11/2005 Canaran
2005/0246365 A1 11/2005 Lowles et al.
2005/0246726 A1 11/2005 Labrou et al.
2005/0255874 A1 11/2005 Stewart-Baxter et al.
2005/0267738 A1 12/2005 Wilkinson et al.
2005/0267757 A1 12/2005 Iso-Sipila et al.
2005/0271216 A1 12/2005 Lashkari
2005/0273337 A1 12/2005 Erell et al.
2005/0273626 A1 12/2005 Pearson et al.
2005/0278297 A1 12/2005 Nelson
2005/0278643 A1 12/2005 Ukai et al.
2005/0278647 A1 12/2005 Leavitt et al.
2005/0283364 A1 12/2005 Longe et al.
2005/0283726 A1 12/2005 Lunati
2005/0283729 A1 12/2005 Morris et al.
2005/0288934 A1 12/2005 Omi
2005/0288936 A1 12/2005 Busayapongchai et al.
2005/0289463 A1 12/2005 Wu et al.
2006/0001652 A1 1/2006 Chiu et al.
2006/0004570 A1 1/2006 Ju et al.
2006/0004744 A1 1/2006 Nevidomski et al.
2006/0007174 A1 1/2006 Shen
2006/0009973 A1 1/2006 Nguyen et al.
2006/0013414 A1 1/2006 Shih
2006/0015341 A1 1/2006 Baker
2006/0015819 A1 1/2006 Hawkins et al.
2006/0018446 A1 1/2006 Schmandt et al.
2006/0018492 A1 1/2006 Chiu et al.
2006/0020890 A1 1/2006 Kroll et al.
2006/0025999 A1 2/2006 Feng et al.
2006/0026233 A1 2/2006 Tenembaum et al.
2006/0026521 A1 2/2006 Hotelling et al.
2006/0026535 A1 2/2006 Hotelling et al.
2006/0026536 A1 2/2006 Hotelling et al.
2006/0033724 A1 2/2006 Chaudhri et al.
2006/0035632 A1 2/2006 Sorvari et al.
2006/0036946 A1 2/2006 Radtke et al.
2006/0041424 A1 2/2006 Todhunter et al.
2006/0041431 A1 2/2006 Maes
2006/0047632 A1 3/2006 Zhang

(56) References Cited

U.S. PATENT DOCUMENTS

2006/0050865 A1 3/2006 Kortum et al.
2006/0052141 A1* 3/2006 Suzuki ...................... 455/569.1
2006/0053365 A1 3/2006 Hollander et al.
2006/0053379 A1 3/2006 Henderson et al.
2006/0053387 A1 3/2006 Ording
2006/0058999 A1 3/2006 Barker et al.
2006/0059437 A1 3/2006 Conklin
2006/0060762 A1 3/2006 Chan et al.
2006/0061488 A1 3/2006 Dunton
2006/0067535 A1 3/2006 Culbert et al.
2006/0067536 A1 3/2006 Culbert et al.
2006/0069567 A1 3/2006 Tischer et al.
2006/0069664 A1 3/2006 Ling et al.
2006/0072248 A1 4/2006 Watanabe et al.
2006/0072716 A1 4/2006 Pham
2006/0074628 A1 4/2006 Elbaz et al.
2006/0074660 A1 4/2006 Waters et al.
2006/0074674 A1 4/2006 Zhang et al.
2006/0074750 A1 4/2006 Clark et al.
2006/0074898 A1 4/2006 Gavalda et al.
2006/0077055 A1 4/2006 Basir
2006/0080098 A1 4/2006 Campbell
2006/0085187 A1 4/2006 Barquilla
2006/0085465 A1 4/2006 Nori et al.
2006/0085757 A1 4/2006 Andre et al.
2006/0093998 A1 5/2006 Vertegaal
2006/0095265 A1 5/2006 Chu et al.
2006/0095790 A1 5/2006 Nguyen et al.
2006/0095846 A1 5/2006 Nurmi
2006/0095848 A1 5/2006 Naik
2006/0097991 A1 5/2006 Hotelling et al.
2006/0100848 A1 5/2006 Cozzi et al.
2006/0100849 A1 5/2006 Chan
2006/0101354 A1 5/2006 Hashimoto et al.
2006/0103633 A1 5/2006 Gioeli
2006/0106592 A1 5/2006 Brockett et al.
2006/0106594 A1 5/2006 Brockett et al.
2006/0106595 A1 5/2006 Brockett et al.
2006/0111906 A1 5/2006 Cross et al.
2006/0111909 A1 5/2006 Maes et al.
2006/0116874 A1 6/2006 Samuelsson et al.
2006/0116877 A1 6/2006 Pickering et al.
2006/0117002 A1 6/2006 Swen
2006/0119582 A1 6/2006 Ng et al.
2006/0122834 A1 6/2006 Bennett
2006/0122836 A1 6/2006 Cross et al.
2006/0129929 A1 6/2006 Weber et al.
2006/0132812 A1 6/2006 Barnes et al.
2006/0135214 A1 6/2006 Zhang et al.
2006/0136213 A1 6/2006 Hirose et al.
2006/0141990 A1 6/2006 Zak et al.
2006/0143007 A1 6/2006 Koh et al.
2006/0143559 A1 6/2006 Spielberg et al.
2006/0143576 A1 6/2006 Gupta et al.
2006/0148520 A1 7/2006 Baker et al.
2006/0150087 A1 7/2006 Cronenberger et al.
2006/0152496 A1 7/2006 Knaven
2006/0153040 A1 7/2006 Girish et al.
2006/0156252 A1 7/2006 Sheshagiri et al.
2006/0156307 A1 7/2006 Kunjithapatham et al.
2006/0161870 A1 7/2006 Hotelling et al.
2006/0161871 A1 7/2006 Hotelling et al.
2006/0161872 A1 7/2006 Rytivaara et al.
2006/0165105 A1 7/2006 Shenfield et al.
2006/0167676 A1 7/2006 Plumb
2006/0168150 A1 7/2006 Naik et al.
2006/0168507 A1 7/2006 Hansen
2006/0168539 A1 7/2006 Hawkins et al.
2006/0172720 A1 8/2006 Islam et al.
2006/0174207 A1 8/2006 Deshpande
2006/0178868 A1 8/2006 Billerey-Mosier
2006/0181519 A1 8/2006 Vernier et al.
2006/0183466 A1 8/2006 Lee et al.
2006/0184886 A1 8/2006 Chung et al.
2006/0187073 A1 8/2006 Lin et al.
2006/0190269 A1 8/2006 Tessel et al.
2006/0190577 A1 8/2006 Yamada
2006/0193518 A1 8/2006 Dong
2006/0195206 A1 8/2006 Moon et al.
2006/0195323 A1 8/2006 Monne et al.
2006/0197753 A1 9/2006 Hotelling
2006/0197755 A1 9/2006 Bawany
2006/0200253 A1 9/2006 Hoffberg et al.
2006/0200342 A1 9/2006 Corston-Oliver et al.
2006/0200347 A1 9/2006 Kim et al.
2006/0205432 A1 9/2006 Hawkins et al.
2006/0206454 A1 9/2006 Forstall et al.
2006/0212415 A1 9/2006 Backer et al.
2006/0217967 A1 9/2006 Goertzen et al.
2006/0221738 A1 10/2006 Park et al.
2006/0221788 A1 10/2006 Lindahl et al.
2006/0224570 A1 10/2006 Quiroga et al.
2006/0229870 A1 10/2006 Kobal
2006/0229876 A1 10/2006 Aaron et al.
2006/0230410 A1 10/2006 Kurganov et al.
2006/0234680 A1 10/2006 Doulton
2006/0235550 A1 10/2006 Csicsatka et al.
2006/0235700 A1 10/2006 Wong et al.
2006/0235841 A1 10/2006 Betz et al.
2006/0236262 A1 10/2006 Bathiche et al.
2006/0239419 A1 10/2006 Joseph et al.
2006/0239471 A1 10/2006 Mao et al.
2006/0240866 A1 10/2006 Eilts et al.
2006/0242190 A1 10/2006 Wnek
2006/0246955 A1 11/2006 Nirhamo et al.
2006/0247931 A1 11/2006 Caskey et al.
2006/0252457 A1 11/2006 Schrager
2006/0253210 A1 11/2006 Rosenberg
2006/0253787 A1 11/2006 Fogg
2006/0256934 A1 11/2006 Mazor
2006/0262876 A1 11/2006 LaDue
2006/0265208 A1 11/2006 Assadollahi
2006/0265503 A1 11/2006 Jones et al.
2006/0265648 A1 11/2006 Rainisto et al.
2006/0271627 A1 11/2006 Szczepanek
2006/0274051 A1 12/2006 Longe et al.
2006/0274905 A1 12/2006 Lindahl et al.
2006/0277058 A1 12/2006 J"maev et al.
2006/0282264 A1 12/2006 Denny et al.
2006/0282415 A1 12/2006 Shibata et al.
2006/0286527 A1 12/2006 Morel
2006/0288024 A1 12/2006 Braica
2006/0291666 A1 12/2006 Ball et al.
2006/0293876 A1 12/2006 Kamatani et al.
2006/0293880 A1 12/2006 Elshishiny et al.
2006/0293886 A1 12/2006 Odell et al.
2007/0003026 A1 1/2007 Hodge et al.
2007/0004451 A1 1/2007 C. Anderson
2007/0005368 A1 1/2007 Chutorash et al.
2007/0005849 A1 1/2007 Oliver
2007/0006098 A1 1/2007 Krumm et al.
2007/0011154 A1 1/2007 Musgrove et al.
2007/0014420 A1* 1/2007 Brown .................... H03G 1/02
381/110
2007/0016401 A1 1/2007 Ehsani et al.
2007/0016563 A1 1/2007 Omoigui
2007/0016865 A1 1/2007 Johnson et al.
2007/0021956 A1 1/2007 Qu et al.
2007/0022380 A1 1/2007 Swartz et al.
2007/0025704 A1 2/2007 Tsukazaki et al.
2007/0026852 A1 2/2007 Logan et al.
2007/0027732 A1 2/2007 Hudgens
2007/0028009 A1 2/2007 Robbin et al.
2007/0032247 A1 2/2007 Shaffer et al.
2007/0033003 A1 2/2007 Morris
2007/0033026 A1 2/2007 Bartosik et al.
2007/0033054 A1 2/2007 Snitkovskiy et al.
2007/0036117 A1 2/2007 Taube et al.
2007/0036294 A1 2/2007 Chaudhuri et al.
2007/0038436 A1 2/2007 Cristoe et al.
2007/0038609 A1 2/2007 Wu
2007/0040813 A1 2/2007 Kushler et al.
2007/0041361 A1 2/2007 Iso-Sipila

(56) References Cited

U.S. PATENT DOCUMENTS

| | | | |
|---|---|---|---|
| 2007/0042812 | A1* | 2/2007 | Basir .................. H04M 1/6091 455/569.2 |
| 2007/0043568 | A1 | 2/2007 | Dhanakshirur et al. |
| 2007/0043574 | A1 | 2/2007 | Coffman et al. |
| 2007/0043687 | A1* | 2/2007 | Bodart ................ G06Q 10/107 |
| 2007/0044038 | A1 | 2/2007 | Horentrup et al. |
| 2007/0046641 | A1 | 3/2007 | Lim |
| 2007/0047719 | A1 | 3/2007 | Dhawan et al. |
| 2007/0050184 | A1 | 3/2007 | Drucker et al. |
| 2007/0050191 | A1 | 3/2007 | Weider et al. |
| 2007/0050393 | A1 | 3/2007 | Vogel et al. |
| 2007/0050712 | A1 | 3/2007 | Hull et al. |
| 2007/0052586 | A1 | 3/2007 | Horstemeyer |
| 2007/0055493 | A1 | 3/2007 | Lee |
| 2007/0055508 | A1 | 3/2007 | Zhao et al. |
| 2007/0055514 | A1 | 3/2007 | Beattie et al. |
| 2007/0055525 | A1 | 3/2007 | Kennewick et al. |
| 2007/0055529 | A1 | 3/2007 | Kanevsky et al. |
| 2007/0058832 | A1 | 3/2007 | Hug et al. |
| 2007/0060107 | A1 | 3/2007 | Day |
| 2007/0061487 | A1 | 3/2007 | Moore et al. |
| 2007/0061712 | A1 | 3/2007 | Bodin et al. |
| 2007/0061754 | A1 | 3/2007 | Ardhanari et al. |
| 2007/0067173 | A1 | 3/2007 | Bellegarda |
| 2007/0067272 | A1 | 3/2007 | Flynt et al. |
| 2007/0072553 | A1 | 3/2007 | Barbera |
| 2007/0073540 | A1 | 3/2007 | Hirakawa et al. |
| 2007/0073541 | A1 | 3/2007 | Tian |
| 2007/0073543 | A1 | 3/2007 | Hammler et al. |
| 2007/0073745 | A1 | 3/2007 | Scott et al. |
| 2007/0075965 | A1 | 4/2007 | Huppi et al. |
| 2007/0079027 | A1 | 4/2007 | Marriott et al. |
| 2007/0080936 | A1 | 4/2007 | Tsuk et al. |
| 2007/0083467 | A1 | 4/2007 | Lindahl et al. |
| 2007/0083623 | A1 | 4/2007 | Nishimura et al. |
| 2007/0088556 | A1 | 4/2007 | Andrew |
| 2007/0089132 | A1 | 4/2007 | Qureshey et al. |
| 2007/0089135 | A1 | 4/2007 | Qureshey et al. |
| 2007/0093277 | A1 | 4/2007 | Cavacuiti et al. |
| 2007/0094026 | A1 | 4/2007 | Ativanichayaphong et al. |
| 2007/0098195 | A1 | 5/2007 | Holmes |
| 2007/0100206 | A1 | 5/2007 | Lin et al. |
| 2007/0100602 | A1 | 5/2007 | Kim |
| 2007/0100619 | A1 | 5/2007 | Purho et al. |
| 2007/0100635 | A1 | 5/2007 | Mahajan et al. |
| 2007/0100709 | A1 | 5/2007 | Lee et al. |
| 2007/0100790 | A1 | 5/2007 | Cheyer et al. |
| 2007/0100883 | A1 | 5/2007 | Rose et al. |
| 2007/0106512 | A1 | 5/2007 | Acero et al. |
| 2007/0106513 | A1 | 5/2007 | Boillot et al. |
| 2007/0106674 | A1 | 5/2007 | Agrawal et al. |
| 2007/0116194 | A1 | 5/2007 | Agapi et al. |
| 2007/0116195 | A1 | 5/2007 | Thompson et al. |
| 2007/0118377 | A1 | 5/2007 | Badino et al. |
| 2007/0118378 | A1 | 5/2007 | Skuratovsky |
| 2007/0121846 | A1 | 5/2007 | Altberg et al. |
| 2007/0124149 | A1 | 5/2007 | Shen et al. |
| 2007/0124676 | A1 | 5/2007 | Amundsen et al. |
| 2007/0127888 | A1 | 6/2007 | Hayashi et al. |
| 2007/0128777 | A1 | 6/2007 | Yin et al. |
| 2007/0129059 | A1 | 6/2007 | Nadarajah et al. |
| 2007/0129098 | A1 | 6/2007 | Cheng et al. |
| 2007/0130014 | A1 | 6/2007 | Altberg et al. |
| 2007/0130128 | A1 | 6/2007 | Garg et al. |
| 2007/0132738 | A1 | 6/2007 | Lowles et al. |
| 2007/0135187 | A1 | 6/2007 | Kreiner et al. |
| 2007/0135949 | A1 | 6/2007 | Snover et al. |
| 2007/0136064 | A1 | 6/2007 | Carroll |
| 2007/0136778 | A1 | 6/2007 | Birger et al. |
| 2007/0143163 | A1 | 6/2007 | Weiss et al. |
| 2007/0149252 | A1 | 6/2007 | Jobs et al. |
| 2007/0150842 | A1 | 6/2007 | Chaudhri et al. |
| 2007/0152978 | A1 | 7/2007 | Kocienda et al. |
| 2007/0152980 | A1 | 7/2007 | Kocienda et al. |
| 2007/0155346 | A1 | 7/2007 | Mijatovic et al. |
| 2007/0156410 | A1 | 7/2007 | Stohr et al. |
| 2007/0156627 | A1 | 7/2007 | D'Alicandro |
| 2007/0157089 | A1 | 7/2007 | Van Os et al. |
| 2007/0157268 | A1 | 7/2007 | Girish et al. |
| 2007/0162296 | A1 | 7/2007 | Altberg et al. |
| 2007/0162414 | A1 | 7/2007 | Horowitz et al. |
| 2007/0168922 | A1 | 7/2007 | Kaiser et al. |
| 2007/0173233 | A1 | 7/2007 | Vander Veen et al. |
| 2007/0173267 | A1 | 7/2007 | Klassen et al. |
| 2007/0174188 | A1 | 7/2007 | Fish |
| 2007/0174396 | A1 | 7/2007 | Kumar et al. |
| 2007/0179776 | A1 | 8/2007 | Segond et al. |
| 2007/0179778 | A1 | 8/2007 | Gong et al. |
| 2007/0180383 | A1 | 8/2007 | Naik |
| 2007/0182595 | A1 | 8/2007 | Ghasabian |
| 2007/0185551 | A1 | 8/2007 | Meadows et al. |
| 2007/0185754 | A1 | 8/2007 | Schmidt |
| 2007/0185831 | A1 | 8/2007 | Churcher |
| 2007/0185917 | A1 | 8/2007 | Prahlad et al. |
| 2007/0188901 | A1 | 8/2007 | Heckerman et al. |
| 2007/0192027 | A1 | 8/2007 | Lee et al. |
| 2007/0192105 | A1 | 8/2007 | Neeracher et al. |
| 2007/0192293 | A1 | 8/2007 | Swen |
| 2007/0192403 | A1 | 8/2007 | Heine et al. |
| 2007/0192744 | A1 | 8/2007 | Reponen |
| 2007/0198269 | A1 | 8/2007 | Braho et al. |
| 2007/0198273 | A1 | 8/2007 | Hennecke |
| 2007/0198566 | A1 | 8/2007 | Sustik |
| 2007/0203955 | A1 | 8/2007 | Pomerantz |
| 2007/0207785 | A1 | 9/2007 | Chatterjee et al. |
| 2007/0207796 | A1 | 9/2007 | Yan |
| 2007/0208569 | A1 | 9/2007 | Subramanian et al. |
| 2007/0208579 | A1 | 9/2007 | Peterson |
| 2007/0208726 | A1 | 9/2007 | Krishnaprasad et al. |
| 2007/0211071 | A1 | 9/2007 | Slotznick et al. |
| 2007/0213099 | A1 | 9/2007 | Bast |
| 2007/0213857 | A1 | 9/2007 | Bodin et al. |
| 2007/0219777 | A1 | 9/2007 | Chu et al. |
| 2007/0219803 | A1 | 9/2007 | Chiu et al. |
| 2007/0219983 | A1 | 9/2007 | Fish |
| 2007/0225980 | A1 | 9/2007 | Sumita |
| 2007/0225984 | A1 | 9/2007 | Milstein et al. |
| 2007/0226652 | A1 | 9/2007 | Kikuchi et al. |
| 2007/0229323 | A1 | 10/2007 | Plachta et al. |
| 2007/0230729 | A1 | 10/2007 | Naylor et al. |
| 2007/0233490 | A1 | 10/2007 | Yao |
| 2007/0233497 | A1 | 10/2007 | Paek et al. |
| 2007/0233692 | A1 | 10/2007 | Lisa et al. |
| 2007/0233725 | A1 | 10/2007 | Michmerhuizen et al. |
| 2007/0238488 | A1 | 10/2007 | Scott |
| 2007/0238489 | A1 | 10/2007 | Scott |
| 2007/0238520 | A1 | 10/2007 | Kacmarcik |
| 2007/0239429 | A1 | 10/2007 | Johnson et al. |
| 2007/0241885 | A1 | 10/2007 | Clipsham |
| 2007/0244702 | A1 | 10/2007 | Kahn et al. |
| 2007/0247441 | A1 | 10/2007 | Kim et al. |
| 2007/0255435 | A1 | 11/2007 | Cohen et al. |
| 2007/0255979 | A1 | 11/2007 | Deily et al. |
| 2007/0257890 | A1 | 11/2007 | Hotelling et al. |
| 2007/0258642 | A1 | 11/2007 | Thota |
| 2007/0260460 | A1 | 11/2007 | Hyatt |
| 2007/0260595 | A1 | 11/2007 | Beatty et al. |
| 2007/0260822 | A1 | 11/2007 | Adams |
| 2007/0261080 | A1 | 11/2007 | Saetti |
| 2007/0265831 | A1 | 11/2007 | Dinur et al. |
| 2007/0271104 | A1 | 11/2007 | McKay |
| 2007/0271510 | A1 | 11/2007 | Grigoriu et al. |
| 2007/0274468 | A1 | 11/2007 | Cai |
| 2007/0276651 | A1 | 11/2007 | Bliss et al. |
| 2007/0276714 | A1 | 11/2007 | Beringer |
| 2007/0276810 | A1 | 11/2007 | Rosen |
| 2007/0277088 | A1 | 11/2007 | Bodin et al. |
| 2007/0281603 | A1 | 12/2007 | Nath et al. |
| 2007/0282595 | A1 | 12/2007 | Tunning et al. |
| 2007/0285958 | A1 | 12/2007 | Platchta et al. |
| 2007/0286363 | A1 | 12/2007 | Burg et al. |
| 2007/0288241 | A1 | 12/2007 | Cross et al. |
| 2007/0288449 | A1 | 12/2007 | Datta et al. |
| 2007/0291108 | A1 | 12/2007 | Huber et al. |

(56) References Cited

U.S. PATENT DOCUMENTS

2007/0294077 A1 12/2007 Narayanan et al.
2007/0294263 A1 12/2007 Punj et al.
2007/0299664 A1 12/2007 Peters et al.
2007/0299831 A1 12/2007 Williams et al.
2007/0300140 A1 12/2007 Makela et al.
2007/0300185 A1 12/2007 Macbeth et al.
2008/0010355 A1 1/2008 Vieri et al.
2008/0012950 A1 1/2008 Lee et al.
2008/0013751 A1 1/2008 Hiselius
2008/0015864 A1 1/2008 Ross et al.
2008/0016575 A1 1/2008 Vincent et al.
2008/0021708 A1* 1/2008 Bennett ............... G06F 17/3043 704/257
2008/0022208 A1 1/2008 Morse
2008/0031475 A1 2/2008 Goldstein
2008/0033719 A1 2/2008 Hall et al.
2008/0034032 A1 2/2008 Healey et al.
2008/0034044 A1 2/2008 Bhakta et al.
2008/0036743 A1 2/2008 Westerman et al.
2008/0040339 A1 2/2008 Zhou et al.
2008/0042970 A1 2/2008 Liang et al.
2008/0043936 A1 2/2008 Liebermann
2008/0043943 A1 2/2008 Sipher et al.
2008/0046239 A1 2/2008 Boo
2008/0046422 A1 2/2008 Lee et al.
2008/0046820 A1 2/2008 Lee et al.
2008/0046948 A1 2/2008 Verosub
2008/0048908 A1 2/2008 Sato
2008/0049905 A1 2/2008 Seo
2008/0052063 A1 2/2008 Bennett et al.
2008/0052073 A1 2/2008 Goto et al.
2008/0052077 A1 2/2008 Bennett et al.
2008/0055194 A1 3/2008 Baudino et al.
2008/0056459 A1 3/2008 Vallier et al.
2008/0056579 A1 3/2008 Guha
2008/0059190 A1 3/2008 Chu et al.
2008/0059200 A1 3/2008 Puli
2008/0059876 A1 3/2008 Hantler et al.
2008/0062141 A1 3/2008 Chaudhri
2008/0065382 A1 3/2008 Gerl et al.
2008/0071529 A1 3/2008 Silverman et al.
2008/0071544 A1 3/2008 Beaufays et al.
2008/0075296 A1 3/2008 Lindahl et al.
2008/0076972 A1 3/2008 Dorogusker et al.
2008/0077310 A1 3/2008 Murlidar et al.
2008/0077384 A1 3/2008 Agapi et al.
2008/0077386 A1 3/2008 Gao et al.
2008/0077391 A1 3/2008 Chino et al.
2008/0077393 A1 3/2008 Gao et al.
2008/0077406 A1 3/2008 Ganong, III
2008/0077859 A1 3/2008 Schabes et al.
2008/0079566 A1 4/2008 Singh et al.
2008/0082332 A1 4/2008 Mallett et al.
2008/0082338 A1 4/2008 O'Neil et al.
2008/0082390 A1 4/2008 Hawkins et al.
2008/0082576 A1 4/2008 Bodin et al.
2008/0082651 A1 4/2008 Singh et al.
2008/0084974 A1 4/2008 Dhanakshirur
2008/0085689 A1 4/2008 Zellner
2008/0091406 A1 4/2008 Baldwin et al.
2008/0091426 A1 4/2008 Rempel et al.
2008/0091443 A1 4/2008 Strope et al.
2008/0096533 A1 4/2008 Manfredi et al.
2008/0096726 A1 4/2008 Riley et al.
2008/0097937 A1 4/2008 Hadjarian
2008/0098302 A1 4/2008 Roose
2008/0098480 A1 4/2008 Henry et al.
2008/0057922 A1 5/2008 Kokes et al.
2008/0100579 A1 5/2008 Robinson et al.
2008/0109222 A1 5/2008 Liu
2008/0114480 A1 5/2008 Harb
2008/0114598 A1 5/2008 Prieto et al.
2008/0114841 A1 5/2008 Lambert
2008/0118143 A1 5/2008 Gordon et al.
2008/0120102 A1 5/2008 Rao
2008/0120112 A1 5/2008 Jordan et al.
2008/0120342 A1 5/2008 Reed et al.
2008/0122796 A1 5/2008 Jobs et al.
2008/0126077 A1 5/2008 Thorn
2008/0126091 A1 5/2008 Clark et al.
2008/0126093 A1 5/2008 Sivadas
2008/0126100 A1 5/2008 Grost et al.
2008/0129520 A1 6/2008 Lee
2008/0130867 A1 6/2008 Bowen
2008/0131006 A1 6/2008 Oliver
2008/0132221 A1 6/2008 Willey et al.
2008/0133215 A1 6/2008 Sarukkai
2008/0133228 A1 6/2008 Rao
2008/0133230 A1* 6/2008 Herforth ................ G01C 21/26 704/235
2008/0133241 A1 6/2008 Baker et al.
2008/0133245 A1 6/2008 Proulx et al.
2008/0133956 A1 6/2008 Fadell
2008/0140413 A1 6/2008 Millman et al.
2008/0140416 A1 6/2008 Shostak
2008/0140652 A1 6/2008 Millman et al.
2008/0140657 A1 6/2008 Azvine et al.
2008/0141125 A1 6/2008 Ghassabian et al.
2008/0141180 A1 6/2008 Reed et al.
2008/0141182 A1 6/2008 Barsness et al.
2008/0146245 A1 6/2008 Appaji
2008/0146290 A1 6/2008 Sreeram et al.
2008/0147408 A1 6/2008 Da Palma et al.
2008/0147411 A1 6/2008 Dames et al.
2008/0147874 A1 6/2008 Yoneda et al.
2008/0150900 A1 6/2008 Han
2008/0154600 A1 6/2008 Tian et al.
2008/0154612 A1 6/2008 Evermann et al.
2008/0154828 A1 6/2008 Antebi et al.
2008/0157867 A1 7/2008 Krah
2008/0162137 A1 7/2008 Saitoh et al.
2008/0162471 A1 7/2008 Bernard
2008/0163119 A1 7/2008 Kim et al.
2008/0163131 A1 7/2008 Hirai et al.
2008/0165144 A1 7/2008 Forstall et al.
2008/0165980 A1 7/2008 Pavlovic et al.
2008/0165994 A1 7/2008 Caren et al.
2008/0167013 A1 7/2008 Novick et al.
2008/0167858 A1 7/2008 Christie et al.
2008/0168366 A1 7/2008 Kocienda et al.
2008/0183473 A1 7/2008 Nagano et al.
2008/0189099 A1 8/2008 Friedman et al.
2008/0189106 A1 8/2008 Low et al.
2008/0189110 A1 8/2008 Freeman et al.
2008/0189114 A1 8/2008 Fail et al.
2008/0189606 A1 8/2008 Rybak
2008/0195312 A1 8/2008 Aaron et al.
2008/0195601 A1 8/2008 Ntoulas et al.
2008/0195940 A1 8/2008 Gail et al.
2008/0200142 A1 8/2008 Abdel-Kader et al.
2008/0201306 A1* 8/2008 Cooper et al. .................... 707/3
2008/0201375 A1 8/2008 Khedouri et al.
2008/0204379 A1 8/2008 Perez-Noguera
2008/0207176 A1 8/2008 Brackbill et al.
2008/0208585 A1 8/2008 Ativanichayaphong et al.
2008/0208587 A1 8/2008 Ben-David et al.
2008/0212796 A1 9/2008 Denda
2008/0219641 A1 9/2008 Sandrew et al.
2008/0221866 A1 9/2008 Katragadda et al.
2008/0221880 A1 9/2008 Cerra et al.
2008/0221889 A1 9/2008 Cerra et al.
2008/0221903 A1 9/2008 Kanevsky et al.
2008/0222118 A1 9/2008 Scian et al.
2008/0228463 A1 9/2008 Mori et al.
2008/0228485 A1 9/2008 Owen
2008/0228490 A1 9/2008 Fischer et al.
2008/0228496 A1 9/2008 Yu et al.
2008/0228928 A1 9/2008 Donelli et al.
2008/0229185 A1 9/2008 Lynch
2008/0229218 A1 9/2008 Maeng
2008/0235017 A1 9/2008 Satomura et al.
2008/0235024 A1 9/2008 Goldberg et al.
2008/0235027 A1 9/2008 Cross
2008/0240569 A1 10/2008 Tonouchi

(56) References Cited

U.S. PATENT DOCUMENTS

2008/0242280 A1 10/2008 Shapiro et al.
2008/0244390 A1 10/2008 Fux et al.
2008/0244446 A1 10/2008 Lefevre et al.
2008/0247519 A1 10/2008 Abella et al.
2008/0248797 A1 10/2008 Freeman et al.
2008/0249770 A1 10/2008 Kim et al.
2008/0253577 A1 10/2008 Eppolito
2008/0254419 A1 10/2008 Cohen
2008/0254425 A1 10/2008 Cohen
2008/0255837 A1 10/2008 Kahn et al.
2008/0255845 A1 10/2008 Bennett
2008/0256613 A1 10/2008 Grover
2008/0259022 A1 10/2008 Mansfield et al.
2008/0262838 A1 10/2008 Nurminen et al.
2008/0262846 A1 10/2008 Burns et al.
2008/0270118 A1 10/2008 Kuo et al.
2008/0270138 A1 10/2008 Knight et al.
2008/0270139 A1 10/2008 Shi et al.
2008/0270140 A1 10/2008 Hertz et al.
2008/0277473 A1 11/2008 Kotlarsky et al.
2008/0281510 A1 11/2008 Shahine
2008/0292112 A1 11/2008 Valenzuela et al.
2008/0294651 A1 11/2008 Masuyama et al.
2008/0294981 A1 11/2008 Balzano et al.
2008/0298766 A1 12/2008 Wen et al.
2008/0299523 A1 12/2008 Chai et al.
2008/0300871 A1 12/2008 Gilbert
2008/0300878 A1 12/2008 Bennett
2008/0306727 A1 12/2008 Thurmair et al.
2008/0312909 A1 12/2008 Hermansen et al.
2008/0313335 A1 12/2008 Jung et al.
2008/0316183 A1 12/2008 Westerman et al.
2008/0319753 A1 12/2008 Hancock
2008/0319763 A1 12/2008 Di Fabbrizio et al.
2009/0003115 A1 1/2009 Lindahl et al.
2009/0005012 A1 1/2009 Van Heugten
2009/0005891 A1 1/2009 Batson et al.
2009/0006096 A1 1/2009 Li et al.
2009/0006097 A1 1/2009 Etezadi et al.
2009/0006099 A1 1/2009 Sharpe et al.
2009/0006100 A1 1/2009 Badger et al.
2009/0006343 A1 1/2009 Platt et al.
2009/0006345 A1 1/2009 Platt et al.
2009/0006488 A1 1/2009 Lindahl et al.
2009/0006671 A1 1/2009 Batson et al.
2009/0007001 A1 1/2009 Morin et al.
2009/0011709 A1 1/2009 Akasaka et al.
2009/0012748 A1 1/2009 Beish et al.
2009/0012775 A1 1/2009 El Hady et al.
2009/0018828 A1 1/2009 Nakadai et al.
2009/0018834 A1* 1/2009 Cooper et al. ................ 704/257
2009/0018835 A1* 1/2009 Cooper et al. ................ 704/257
2009/0018839 A1* 1/2009 Cooper et al. ................ 704/260
2009/0018840 A1 1/2009 Lutz et al.
2009/0019061 A1 1/2009 Scannell, Jr.
2009/0022329 A1 1/2009 Mahowald
2009/0028435 A1 1/2009 Wu et al.
2009/0030800 A1 1/2009 Grois
2009/0030978 A1 1/2009 Johnson et al.
2009/0043583 A1 2/2009 Agapi et al.
2009/0048821 A1 2/2009 Yam et al.
2009/0048845 A1 2/2009 Burckart et al.
2009/0049067 A1 2/2009 Murray
2009/0055179 A1 2/2009 Cho et al.
2009/0055186 A1 2/2009 Lance et al.
2009/0058823 A1 3/2009 Kocienda
2009/0058860 A1 3/2009 Fong et al.
2009/0060472 A1 3/2009 Bull et al.
2009/0063974 A1 3/2009 Bull et al.
2009/0064031 A1 3/2009 Bull et al.
2009/0070097 A1 3/2009 Wu et al.
2009/0070102 A1 3/2009 Maegawa
2009/0070114 A1 3/2009 Staszak
2009/0074214 A1 3/2009 Bradford et al.
2009/0076792 A1 3/2009 Lawson-Tancred
2009/0076796 A1 3/2009 Daraselia
2009/0076819 A1 3/2009 Wouters et al.
2009/0076821 A1 3/2009 Brenner et al.
2009/0076825 A1 3/2009 Bradford et al.
2009/0077165 A1 3/2009 Rhodes et al.
2009/0083035 A1 3/2009 Huang et al.
2009/0083036 A1 3/2009 Zhao et al.
2009/0083037 A1 3/2009 Gleason et al.
2009/0083047 A1 3/2009 Lindahl et al.
2009/0089058 A1 4/2009 Bellegarda
2009/0092260 A1 4/2009 Powers
2009/0092261 A1 4/2009 Bard
2009/0092262 A1 4/2009 Costa et al.
2009/0094029 A1 4/2009 Koch et al.
2009/0094033 A1 4/2009 Mozer et al.
2009/0097634 A1 4/2009 Nambiar et al.
2009/0097637 A1 4/2009 Boscher et al.
2009/0098903 A1 4/2009 Donaldson et al.
2009/0100049 A1 4/2009 Cao
2009/0100454 A1 4/2009 Weber
2009/0104898 A1 4/2009 Harris
2009/0106026 A1 4/2009 Ferrieux
2009/0106376 A1 4/2009 Tom et al.
2009/0106397 A1 4/2009 O'Keefe
2009/0112572 A1 4/2009 Thorn
2009/0112596 A1* 4/2009 Syrdal .................. G10L 13/027
704/260
2009/0112677 A1 4/2009 Rhett
2009/0112892 A1 4/2009 Cardie et al.
2009/0119108 A1* 5/2009 Noh ..................... G10L 13/047
704/260
2009/0119587 A1 5/2009 Allen et al.
2009/0123021 A1 5/2009 Jung et al.
2009/0123071 A1 5/2009 Iwasaki
2009/0125477 A1 5/2009 Lu et al.
2009/0128505 A1 5/2009 Partridge et al.
2009/0132253 A1 5/2009 Bellegarda
2009/0137286 A1 5/2009 Luke et al.
2009/0138736 A1 5/2009 Chin
2009/0138828 A1 5/2009 Schultz et al.
2009/0144049 A1 6/2009 Haddad et al.
2009/0144609 A1 6/2009 Liang et al.
2009/0146848 A1 6/2009 Ghassabian
2009/0150147 A1 6/2009 Jacoby et al.
2009/0150156 A1 6/2009 Kennewick et al.
2009/0153288 A1 6/2009 Hope et al.
2009/0154669 A1 6/2009 Wood et al.
2009/0157382 A1 6/2009 Bar
2009/0157384 A1 6/2009 Toutanova et al.
2009/0157401 A1 6/2009 Bennett
2009/0158423 A1 6/2009 Orlassino et al.
2009/0160803 A1 6/2009 Hashimoto
2009/0163243 A1 6/2009 Barbera
2009/0164441 A1 6/2009 Cheyer
2009/0164655 A1 6/2009 Pettersson et al.
2009/0164937 A1 6/2009 Alviar et al.
2009/0167508 A1 7/2009 Fadell et al.
2009/0167509 A1 7/2009 Fadell et al.
2009/0171578 A1 7/2009 Kim et al.
2009/0171664 A1 7/2009 Kennewick et al.
2009/0172108 A1 7/2009 Singh
2009/0172542 A1 7/2009 Girish et al.
2009/0174667 A1 7/2009 Kocienda et al.
2009/0174677 A1 7/2009 Gehani et al.
2009/0177300 A1 7/2009 Lee
2009/0177461 A1 7/2009 Ehsani et al.
2009/0182445 A1 7/2009 Girish et al.
2009/0182702 A1 7/2009 Miller
2009/0187402 A1 7/2009 Scholl
2009/0187577 A1 7/2009 Reznik et al.
2009/0191895 A1 7/2009 Singh et al.
2009/0192782 A1 7/2009 Drewes
2009/0198497 A1 8/2009 Kwon
2009/0204409 A1 8/2009 Mozer et al.
2009/0210230 A1* 8/2009 Schwarz ................ G10L 15/08
704/252
2009/0213134 A1 8/2009 Stephanick et al.
2009/0215466 A1 8/2009 Ahl et al.
2009/0215503 A1 8/2009 Zhang et al.

(56) References Cited

U.S. PATENT DOCUMENTS

| | | | |
|---|---|---|---|
| 2009/0216704 | A1 | 8/2009 | Zheng et al. |
| 2009/0222270 | A2 | 9/2009 | Likens et al. |
| 2009/0222488 | A1 | 9/2009 | Boerries et al. |
| 2009/0228126 | A1 | 9/2009 | Spielberg et al. |
| 2009/0228273 | A1 | 9/2009 | Wang et al. |
| 2009/0228281 | A1 | 9/2009 | Singleton et al. |
| 2009/0228792 | A1 | 9/2009 | Van Os et al. |
| 2009/0228842 | A1 | 9/2009 | Westerman et al. |
| 2009/0234638 | A1 | 9/2009 | Ranjan et al. |
| 2009/0234655 | A1 | 9/2009 | Kwon |
| 2009/0239202 | A1 | 9/2009 | Stone |
| 2009/0239552 | A1 | 9/2009 | Churchill et al. |
| 2009/0240485 | A1 | 9/2009 | Dalal et al. |
| 2009/0241054 | A1 | 9/2009 | Hendricks |
| 2009/0241760 | A1 | 10/2009 | Georges |
| 2009/0247237 | A1 | 10/2009 | Mittleman et al. |
| 2009/0248182 | A1 | 10/2009 | Logan et al. |
| 2009/0249198 | A1 | 10/2009 | Davis et al. |
| 2009/0252350 | A1 | 10/2009 | Seguin |
| 2009/0253457 | A1 | 10/2009 | Seguin |
| 2009/0253463 | A1 | 10/2009 | Shin et al. |
| 2009/0254339 | A1 | 10/2009 | Seguin |
| 2009/0254345 | A1 | 10/2009 | Fleizach et al. |
| 2009/0259475 | A1 | 10/2009 | Yamagami et al. |
| 2009/0259969 | A1 | 10/2009 | Pallakoff |
| 2009/0265368 | A1 | 10/2009 | Crider et al. |
| 2009/0271109 | A1 | 10/2009 | Lee et al. |
| 2009/0271175 | A1 | 10/2009 | Bodin et al. |
| 2009/0271176 | A1 | 10/2009 | Bodin et al. |
| 2009/0271178 | A1 | 10/2009 | Bodin et al. |
| 2009/0274315 | A1 | 11/2009 | Carnes et al. |
| 2009/0281789 | A1 | 11/2009 | Waibel et al. |
| 2009/0284482 | A1 | 11/2009 | Chin |
| 2009/0286514 | A1 | 11/2009 | Lichorowic et al. |
| 2009/0287583 | A1 | 11/2009 | Holmes |
| 2009/0290718 | A1 | 11/2009 | Kahn et al. |
| 2009/0292987 | A1 | 11/2009 | Sorenson |
| 2009/0296552 | A1 | 12/2009 | Hicks et al. |
| 2009/0298474 | A1* | 12/2009 | George ...................... 455/412.2 |
| 2009/0299745 | A1 | 12/2009 | Kennewick et al. |
| 2009/0299849 | A1 | 12/2009 | Cao et al. |
| 2009/0300391 | A1 | 12/2009 | Jessup et al. |
| 2009/0300488 | A1 | 12/2009 | Salamon et al. |
| 2009/0304198 | A1 | 12/2009 | Herre et al. |
| 2009/0306967 | A1 | 12/2009 | Nicolov et al. |
| 2009/0306969 | A1 | 12/2009 | Goud et al. |
| 2009/0306979 | A1 | 12/2009 | Jaiswal et al. |
| 2009/0306980 | A1 | 12/2009 | Shin |
| 2009/0306981 | A1 | 12/2009 | Cromack et al. |
| 2009/0306985 | A1 | 12/2009 | Roberts et al. |
| 2009/0306988 | A1 | 12/2009 | Chen et al. |
| 2009/0306989 | A1 | 12/2009 | Kaji |
| 2009/0307162 | A1 | 12/2009 | Bui et al. |
| 2009/0307201 | A1 | 12/2009 | Dunning et al. |
| 2009/0307584 | A1 | 12/2009 | Davidson et al. |
| 2009/0313023 | A1 | 12/2009 | Jones |
| 2009/0313026 | A1 | 12/2009 | Coffman et al. |
| 2009/0313544 | A1 | 12/2009 | Wood et al. |
| 2009/0313564 | A1 | 12/2009 | Rottler et al. |
| 2009/0316943 | A1 | 12/2009 | Frigola Munoz et al. |
| 2009/0318119 | A1 | 12/2009 | Basir et al. |
| 2009/0318198 | A1 | 12/2009 | Carroll |
| 2009/0319266 | A1 | 12/2009 | Brown et al. |
| 2009/0319272 | A1 | 12/2009 | Coulomb et al. |
| 2009/0326936 | A1 | 12/2009 | Nagashima |
| 2009/0326938 | A1 | 12/2009 | Marila et al. |
| 2009/0326949 | A1 | 12/2009 | Douthitt et al. |
| 2009/0327977 | A1 | 12/2009 | Bachfischer et al. |
| 2010/0004931 | A1 | 1/2010 | Ma et al. |
| 2010/0005081 | A1 | 1/2010 | Bennett |
| 2010/0013760 | A1 | 1/2010 | Hirai et al. |
| 2010/0013796 | A1 | 1/2010 | Abileah et al. |
| 2010/0019834 | A1 | 1/2010 | Zerbe et al. |
| 2010/0023318 | A1 | 1/2010 | Lemoine |
| 2010/0023320 | A1 | 1/2010 | Di Cristo et al. |
| 2010/0030928 | A1 | 2/2010 | Conroy et al. |
| 2010/0031143 | A1 | 2/2010 | Rao et al. |
| 2010/0036655 | A1 | 2/2010 | Cecil et al. |
| 2010/0036660 | A1 | 2/2010 | Bennett |
| 2010/0037183 | A1 | 2/2010 | Miyashita et al. |
| 2010/0042400 | A1 | 2/2010 | Block et al. |
| 2010/0049514 | A1 | 2/2010 | Kennewick et al. |
| 2010/0050064 | A1 | 2/2010 | Liu et al. |
| 2010/0054512 | A1 | 3/2010 | Solum |
| 2010/0057457 | A1 | 3/2010 | Ogata et al. |
| 2010/0057643 | A1 | 3/2010 | Yang |
| 2010/0060646 | A1 | 3/2010 | Unsal et al. |
| 2010/0063804 | A1 | 3/2010 | Sato et al. |
| 2010/0063825 | A1 | 3/2010 | Williams et al. |
| 2010/0063961 | A1 | 3/2010 | Guiheneuf et al. |
| 2010/0064113 | A1 | 3/2010 | Lindahl et al. |
| 2010/0067723 | A1 | 3/2010 | Bergmann et al. |
| 2010/0067867 | A1 | 3/2010 | Lin et al. |
| 2010/0070281 | A1 | 3/2010 | Conkie et al. |
| 2010/0070899 | A1 | 3/2010 | Hunt et al. |
| 2010/0076760 | A1 | 3/2010 | Kraenzel et al. |
| 2010/0079501 | A1 | 4/2010 | Ikeda et al. |
| 2010/0080398 | A1 | 4/2010 | Waldmann |
| 2010/0080470 | A1 | 4/2010 | Deluca et al. |
| 2010/0081456 | A1 | 4/2010 | Singh et al. |
| 2010/0081487 | A1 | 4/2010 | Chen et al. |
| 2010/0082327 | A1 | 4/2010 | Rogers et al. |
| 2010/0082328 | A1 | 4/2010 | Rogers et al. |
| 2010/0082329 | A1 | 4/2010 | Silverman et al. |
| 2010/0082346 | A1 | 4/2010 | Rogers et al. |
| 2010/0082347 | A1 | 4/2010 | Rogers et al. |
| 2010/0082348 | A1 | 4/2010 | Silverman et al. |
| 2010/0082349 | A1 | 4/2010 | Bellegarda et al. |
| 2010/0082970 | A1 | 4/2010 | Lindahl et al. |
| 2010/0086152 | A1 | 4/2010 | Rank et al. |
| 2010/0086153 | A1 | 4/2010 | Hagen et al. |
| 2010/0086156 | A1 | 4/2010 | Rank et al. |
| 2010/0088020 | A1 | 4/2010 | Sano et al. |
| 2010/0088093 | A1 | 4/2010 | Lee et al. |
| 2010/0088100 | A1 | 4/2010 | Lindahl |
| 2010/0100212 | A1 | 4/2010 | Lindahl et al. |
| 2010/0100384 | A1 | 4/2010 | Ju et al. |
| 2010/0103776 | A1 | 4/2010 | Chan |
| 2010/0106500 | A1 | 4/2010 | McKee et al. |
| 2010/0114856 | A1 | 5/2010 | Kuboyama |
| 2010/0121637 | A1 | 5/2010 | Roy et al. |
| 2010/0125460 | A1 | 5/2010 | Mellott et al. |
| 2010/0125811 | A1 | 5/2010 | Moore et al. |
| 2010/0131273 | A1 | 5/2010 | Aley-Raz et al. |
| 2010/0131498 | A1 | 5/2010 | Linthicum et al. |
| 2010/0131899 | A1 | 5/2010 | Hubert |
| 2010/0138215 | A1 | 6/2010 | Williams |
| 2010/0138224 | A1 | 6/2010 | Bedingfield, Sr. |
| 2010/0138416 | A1 | 6/2010 | Bellotti |
| 2010/0138680 | A1 | 6/2010 | Brisebois et al. |
| 2010/0138798 | A1 | 6/2010 | Wilson et al. |
| 2010/0142740 | A1 | 6/2010 | Roerup |
| 2010/0145694 | A1 | 6/2010 | Ju et al. |
| 2010/0145700 | A1 | 6/2010 | Kennewick et al. |
| 2010/0146442 | A1 | 6/2010 | Nagasaka et al. |
| 2010/0153115 | A1 | 6/2010 | Klee et al. |
| 2010/0161313 | A1 | 6/2010 | Karttunen |
| 2010/0161554 | A1 | 6/2010 | Datuashvili et al. |
| 2010/0164897 | A1 | 7/2010 | Morin et al. |
| 2010/0169075 | A1 | 7/2010 | Raffa et al. |
| 2010/0169097 | A1 | 7/2010 | Nachman et al. |
| 2010/0171713 | A1 | 7/2010 | Kwok et al. |
| 2010/0174544 | A1 | 7/2010 | Heifets |
| 2010/0179932 | A1 | 7/2010 | Yoon et al. |
| 2010/0179991 | A1 | 7/2010 | Nachman et al. |
| 2010/0185448 | A1 | 7/2010 | Meisel |
| 2010/0185949 | A1 | 7/2010 | Jaeger |
| 2010/0197359 | A1* | 8/2010 | Harris ........................ 455/569.1 |
| 2010/0204986 | A1 | 8/2010 | Kennewick et al. |
| 2010/0211199 | A1 | 8/2010 | Naik et al. |
| 2010/0216509 | A1 | 8/2010 | Riemer et al. |
| 2010/0217604 | A1 | 8/2010 | Baldwin et al. |
| 2010/0222098 | A1 | 9/2010 | Garg |
| 2010/0223055 | A1 | 9/2010 | Mclean |

(56) References Cited

U.S. PATENT DOCUMENTS

2010/0228540 A1 9/2010 Bennett
2010/0228691 A1 9/2010 Yang et al.
2010/0231474 A1 9/2010 Yamagajo et al.
2010/0235167 A1 9/2010 Bourdon
2010/0235341 A1 9/2010 Bennett
2010/0235729 A1 9/2010 Kocienda et al.
2010/0235770 A1 9/2010 Ording et al.
2010/0241418 A1 9/2010 Maeda et al.
2010/0250542 A1 9/2010 Fujimaki
2010/0250599 A1 9/2010 Schmidt et al.
2010/0255858 A1 10/2010 Juhasz
2010/0257160 A1 10/2010 Cao
2010/0257478 A1 10/2010 Longe et al.
2010/0262599 A1 10/2010 Nitz
2010/0268539 A1 10/2010 Xu et al.
2010/0274753 A1 10/2010 Liberty et al.
2010/0277579 A1 11/2010 Cho et al.
2010/0278320 A1 11/2010 Arsenault et al.
2010/0278453 A1 11/2010 King
2010/0280983 A1 11/2010 Cho et al.
2010/0281034 A1 11/2010 Petrou et al.
2010/0286985 A1 11/2010 Kennewick et al.
2010/0287514 A1 11/2010 Cragun et al.
2010/0293460 A1 11/2010 Budelli
2010/0299133 A1 11/2010 Kopparapu et al.
2010/0299138 A1 11/2010 Kim
2010/0299142 A1 11/2010 Freeman et al.
2010/0302056 A1 12/2010 Dutton et al.
2010/0305807 A1 12/2010 Basir et al.
2010/0305947 A1 12/2010 Schwarz et al.
2010/0312547 A1 12/2010 van Os et al.
2010/0312566 A1 12/2010 Odinak et al.
2010/0318576 A1 12/2010 Kim
2010/0322438 A1 12/2010 Siotis
2010/0324895 A1 12/2010 Kurzweil et al.
2010/0324905 A1 12/2010 Kurzweil et al.
2010/0325573 A1 12/2010 Estrada et al.
2010/0325588 A1 12/2010 Reddy et al.
2010/0332224 A1 12/2010 Mäkeläet al.
2010/0332235 A1 12/2010 David
2010/0332280 A1 12/2010 Bradley et al.
2010/0332348 A1 12/2010 Cao
2010/0332428 A1 12/2010 McHenry et al.
2010/0332976 A1 12/2010 Fux et al.
2010/0333030 A1 12/2010 Johns
2011/0002487 A1 1/2011 Panther et al.
2011/0009107 A1 1/2011 Guba et al.
2011/0010178 A1 1/2011 Lee et al.
2011/0010644 A1 1/2011 Merrill et al.
2011/0016150 A1 1/2011 Engstrom et al.
2011/0018695 A1 1/2011 Bells et al.
2011/0021213 A1* 1/2011 Carr .................... H04B 5/0031 455/456.4
2011/0022292 A1 1/2011 Shen et al.
2011/0022394 A1 1/2011 Wide et al.
2011/0022952 A1 1/2011 Wu et al.
2011/0029616 A1 2/2011 Wang et al.
2011/0033064 A1 2/2011 Johnson et al.
2011/0034183 A1 2/2011 Haag et al.
2011/0035144 A1 2/2011 Okamoto et al.
2011/0038489 A1 2/2011 Visser et al.
2011/0047072 A1 2/2011 Ciurea
2011/0047161 A1 2/2011 Myaeng et al.
2011/0050591 A1 3/2011 Kim et al.
2011/0054647 A1 3/2011 Chipchase et al.
2011/0054901 A1 3/2011 Qin et al.
2011/0055256 A1 3/2011 Phillips et al.
2011/0060584 A1 3/2011 Ferrucci et al.
2011/0060587 A1 3/2011 Phillips et al.
2011/0060589 A1 3/2011 Weinberg
2011/0060807 A1 3/2011 Martin et al.
2011/0065456 A1 3/2011 Brennan et al.
2011/0066468 A1 3/2011 Huang et al.
2011/0072492 A1 3/2011 Mohler et al.
2011/0076994 A1 3/2011 Kim et al.
2011/0082688 A1 4/2011 Kim et al.
2011/0083079 A1 4/2011 Farrell et al.
2011/0087491 A1 4/2011 Wittenstein et al.
2011/0090078 A1 4/2011 Km et al.
2011/0092187 A1 4/2011 Miller
2011/0093261 A1 4/2011 Angott
2011/0093265 A1 4/2011 Stent et al.
2011/0093271 A1 4/2011 Bernard et al.
2011/0099000 A1 4/2011 Rai et al.
2011/0103682 A1 5/2011 Chidlovskii et al.
2011/0105097 A1 5/2011 Tadayon et al.
2011/0106736 A1 5/2011 Aharonson et al.
2011/0110502 A1 5/2011 Daye et al.
2011/0111724 A1 5/2011 Baptiste
2011/0112827 A1 5/2011 Kennewick et al.
2011/0112837 A1 5/2011 Kurki-Suonio et al.
2011/0112921 A1 5/2011 Kennewick et al.
2011/0116610 A1 5/2011 Shaw et al.
2011/0119049 A1 5/2011 Ylonen
2011/0119051 A1 5/2011 Li et al.
2011/0125540 A1 5/2011 Jang et al.
2011/0130958 A1 6/2011 Stahl et al.
2011/0131036 A1 6/2011 Di Cristo et al.
2011/0131038 A1 6/2011 Oyaizu et al.
2011/0131045 A1 6/2011 Cristo et al.
2011/0143811 A1 6/2011 Rodriguez
2011/0144857 A1 6/2011 Wingrove et al.
2011/0144973 A1 6/2011 Bocchieri et al.
2011/0144999 A1 6/2011 Jang et al.
2011/0145718 A1 6/2011 Ketola et al.
2011/0151830 A1* 6/2011 Blanda et al. ............. 455/404.2
2011/0153209 A1 6/2011 Geelen
2011/0153330 A1 6/2011 Yazdani et al.
2011/0157029 A1 6/2011 Tseng
2011/0161076 A1 6/2011 Davis et al.
2011/0161079 A1* 6/2011 Gruhn et al. ................ 704/235
2011/0161309 A1 6/2011 Lung et al.
2011/0161852 A1 6/2011 Vainio et al.
2011/0167350 A1 7/2011 Hoellwarth
2011/0175810 A1 7/2011 Markovic et al.
2011/0179002 A1 7/2011 Dumitru et al.
2011/0179372 A1 7/2011 Moore et al.
2011/0184721 A1 7/2011 Subramanian et al.
2011/0184730 A1 7/2011 LeBeau et al.
2011/0191271 A1 8/2011 Baker et al.
2011/0191344 A1 8/2011 Jin et al.
2011/0195758 A1 8/2011 Damale et al.
2011/0201387 A1 8/2011 Paek et al.
2011/0205149 A1 8/2011 Tom
2011/0209088 A1 8/2011 Hinckley et al.
2011/0212717 A1 9/2011 Rhoads et al.
2011/0218855 A1 9/2011 Cao et al.
2011/0219018 A1 9/2011 Bailey et al.
2011/0224972 A1 9/2011 Millett et al.
2011/0231182 A1 9/2011 Weider et al.
2011/0231188 A1 9/2011 Kennewick et al.
2011/0231474 A1 9/2011 Locker et al.
2011/0238407 A1 9/2011 Kent
2011/0238408 A1 9/2011 Larcheveque et al.
2011/0238676 A1 9/2011 Liu et al.
2011/0242007 A1 10/2011 Gray et al.
2011/0249144 A1 10/2011 Chang
2011/0260861 A1 10/2011 Singh et al.
2011/0264643 A1 10/2011 Cao
2011/0274303 A1 11/2011 Filson et al.
2011/0276598 A1 11/2011 Kozempel
2011/0279368 A1 11/2011 Klein et al.
2011/0282888 A1 11/2011 Koperski et al.
2011/0288861 A1 11/2011 Kurzweil et al.
2011/0298585 A1 12/2011 Barry
2011/0306426 A1 12/2011 Novak et al.
2011/0307491 A1 12/2011 Fisk et al.
2011/0307810 A1 12/2011 Hilerio et al.
2011/0314032 A1 12/2011 Bennett et al.
2011/0314404 A1 12/2011 Kotler et al.
2012/0002820 A1 1/2012 Leichter
2012/0011138 A1 1/2012 Dunning et al.
2012/0013609 A1 1/2012 Reponen et al.
2012/0016678 A1 1/2012 Gruber et al.

(56) References Cited

U.S. PATENT DOCUMENTS

| | | | |
|---|---|---|---|
| 2012/0020490 | A1 | 1/2012 | Leichter |
| 2012/0022787 | A1 | 1/2012 | LeBeau et al. |
| 2012/0022857 | A1 | 1/2012 | Baldwin et al. |
| 2012/0022860 | A1 | 1/2012 | Lloyd et al. |
| 2012/0022868 | A1 | 1/2012 | LeBeau et al. |
| 2012/0022869 | A1 | 1/2012 | Lloyd et al. |
| 2012/0022870 | A1 | 1/2012 | Kristjansson et al. |
| 2012/0022872 | A1 | 1/2012 | Gruber et al. |
| 2012/0022874 | A1 | 1/2012 | Lloyd et al. |
| 2012/0022876 | A1 | 1/2012 | LeBeau et al. |
| 2012/0023088 | A1 | 1/2012 | Cheng et al. |
| 2012/0034904 | A1 | 2/2012 | LeBeau et al. |
| 2012/0035907 | A1 | 2/2012 | Lebeau et al. |
| 2012/0035908 | A1 | 2/2012 | LeBeau et al. |
| 2012/0035924 | A1 | 2/2012 | Jitkoff et al. |
| 2012/0035925 | A1 | 2/2012 | Friend et al. |
| 2012/0035931 | A1 | 2/2012 | LeBeau et al. |
| 2012/0035932 | A1 | 2/2012 | Jitkoff et al. |
| 2012/0036556 | A1 | 2/2012 | Lebeau et al. |
| 2012/0042343 | A1 | 2/2012 | Laligand et al. |
| 2012/0053815 | A1 | 3/2012 | Montanari et al. |
| 2012/0053945 | A1 | 3/2012 | Gupta et al. |
| 2012/0056815 | A1 | 3/2012 | Mehra |
| 2012/0078627 | A1 | 3/2012 | Wagner |
| 2012/0082317 | A1 | 4/2012 | Pance et al. |
| 2012/0084086 | A1 | 4/2012 | Gilbert et al. |
| 2012/0108221 | A1 | 5/2012 | Thomas et al. |
| 2012/0116770 | A1 | 5/2012 | Chen et al. |
| 2012/0124126 | A1 | 5/2012 | Alcazar et al. |
| 2012/0136572 | A1 | 5/2012 | Norton |
| 2012/0137367 | A1 | 5/2012 | Dupont et al. |
| 2012/0149394 | A1 | 6/2012 | Singh et al. |
| 2012/0150580 | A1 | 6/2012 | Norton |
| 2012/0158293 | A1 | 6/2012 | Burnham |
| 2012/0158422 | A1 | 6/2012 | Burnham et al. |
| 2012/0163710 | A1 | 6/2012 | Skaff et al. |
| 2012/0173464 | A1 | 7/2012 | Tur et al. |
| 2012/0174121 | A1 | 7/2012 | Treat et al. |
| 2012/0185237 | A1 | 7/2012 | Gajic et al. |
| 2012/0197995 | A1 | 8/2012 | Caruso |
| 2012/0197998 | A1 | 8/2012 | Kessel et al. |
| 2012/0201362 | A1 | 8/2012 | Crossan et al. |
| 2012/0214141 | A1 | 8/2012 | Raya et al. |
| 2012/0214517 | A1 | 8/2012 | Singh et al. |
| 2012/0221339 | A1 | 8/2012 | Wang et al. |
| 2012/0221552 | A1 | 8/2012 | Reponen et al. |
| 2012/0245719 | A1 | 9/2012 | Story, Jr. et al. |
| 2012/0245941 | A1 | 9/2012 | Cheyer |
| 2012/0245944 | A1 | 9/2012 | Gruber et al. |
| 2012/0252367 | A1 | 10/2012 | Gaglio et al. |
| 2012/0252540 | A1 | 10/2012 | Kirigaya |
| 2012/0254152 | A1 | 10/2012 | Park et al. |
| 2012/0265528 | A1 | 10/2012 | Gruber et al. |
| 2012/0265535 | A1 | 10/2012 | Bryant-Rich et al. |
| 2012/0271625 | A1 | 10/2012 | Bernard |
| 2012/0271635 | A1 | 10/2012 | Ljolje |
| 2012/0271676 | A1 | 10/2012 | Aravamudan et al. |
| 2012/0284027 | A1 | 11/2012 | Mallett et al. |
| 2012/0290300 | A1 | 11/2012 | Lee et al. |
| 2012/0296649 | A1 | 11/2012 | Bansal et al. |
| 2012/0304124 | A1 | 11/2012 | Chen et al. |
| 2012/0309363 | A1 | 12/2012 | Gruber et al. |
| 2012/0310642 | A1 | 12/2012 | Cao et al. |
| 2012/0310649 | A1 | 12/2012 | Cannistraro et al. |
| 2012/0310652 | A1 | 12/2012 | O'Sullivan |
| 2012/0311478 | A1 | 12/2012 | Van Os et al. |
| 2012/0311583 | A1 | 12/2012 | Gruber et al. |
| 2012/0311584 | A1 | 12/2012 | Gruber et al. |
| 2012/0311585 | A1 | 12/2012 | Gruber et al. |
| 2012/0317498 | A1 | 12/2012 | Logan et al. |
| 2012/0330660 | A1 | 12/2012 | Jaiswal |
| 2012/0330661 | A1 | 12/2012 | Lindahl |
| 2013/0006633 | A1 | 1/2013 | Grokop et al. |
| 2013/0006638 | A1 | 1/2013 | Lindahl |
| 2013/0055099 | A1 | 2/2013 | Yao et al. |
| 2013/0073286 | A1 | 3/2013 | Bastea-Forte et al. |
| 2013/0080167 | A1 | 3/2013 | Mozer |
| 2013/0080177 | A1 | 3/2013 | Chen |
| 2013/0085761 | A1 | 4/2013 | Bringert et al. |
| 2013/0110505 | A1 | 5/2013 | Gruber et al. |
| 2013/0110515 | A1 | 5/2013 | Guzzoni et al. |
| 2013/0110518 | A1 | 5/2013 | Gruber et al. |
| 2013/0110519 | A1 | 5/2013 | Cheyer et al. |
| 2013/0110520 | A1 | 5/2013 | Cheyer et al. |
| 2013/0111348 | A1 | 5/2013 | Gruber et al. |
| 2013/0111487 | A1 | 5/2013 | Cheyer et al. |
| 2013/0115927 | A1 | 5/2013 | Gruber et al. |
| 2013/0117022 | A1 | 5/2013 | Chen et al. |
| 2013/0170738 | A1 | 7/2013 | Capuozzo et al. |
| 2013/0185066 | A1 | 7/2013 | Tzirkel-hancock et al. |
| 2013/0185074 | A1 | 7/2013 | Gruber et al. |
| 2013/0185081 | A1 | 7/2013 | Cheyer et al. |
| 2013/0225128 | A1 | 8/2013 | Gomar |
| 2013/0238647 | A1 | 9/2013 | Thompson |
| 2013/0268956 | A1 | 10/2013 | Recco |
| 2013/0275117 | A1 | 10/2013 | Winer |
| 2013/0275138 | A1 | 10/2013 | Gruber et al. |
| 2013/0275899 | A1 | 10/2013 | Schubert et al. |
| 2013/0289991 | A1 | 10/2013 | Eshwar et al. |
| 2013/0304758 | A1 | 11/2013 | Gruber et al. |
| 2013/0325443 | A1 | 12/2013 | Begeja et al. |
| 2013/0346068 | A1 | 12/2013 | Solem et al. |
| 2014/0074483 | A1 | 3/2014 | Van Os |
| 2014/0080428 | A1 | 3/2014 | Rhoads et al. |
| 2014/0086458 | A1 | 3/2014 | Rogers et al. |
| 2014/0096209 | A1 | 4/2014 | Saraf et al. |
| 2014/0152577 | A1 | 6/2014 | Yuen et al. |
| 2014/0195252 | A1 | 7/2014 | Gruber et al. |
| 2014/0274211 | A1 | 9/2014 | Sejnoha et al. |
| 2014/0278435 | A1 | 9/2014 | Ganong, III et al. |
| 2014/0365407 | A1 | 12/2014 | Brown et al. |
| 2015/0234636 | A1 | 8/2015 | Barnes, Jr. |
| 2019/0095050 | A1 | 3/2019 | Gruber et al. |

FOREIGN PATENT DOCUMENTS

| | | | |
|---|---|---|---|
| CN | 1263385 | A | 8/2000 |
| CN | 1274440 | A | 11/2000 |
| CN | 1494695 | A | 5/2004 |
| CN | 1673939 | A | 9/2005 |
| CN | 1864204 | A | 11/2006 |
| CN | 1959628 | A | 5/2007 |
| CN | 101162153 | A | 4/2008 |
| CN | 101183525 | A | 5/2008 |
| CN | 101272558 | A | 9/2008 |
| CN | 101297541 | A | 10/2008 |
| CN | 101325756 | A | 12/2008 |
| CN | 101448340 | A | 6/2009 |
| CN | 101535983 | A | 9/2009 |
| CN | 101557432 | A | 10/2009 |
| CN | 101847405 | A | 9/2010 |
| CN | 101939740 | A | 1/2011 |
| CN | 102137193 | A | 7/2011 |
| CN | 102160043 | A | 8/2011 |
| CN | 102685295 | A | 9/2012 |
| CN | 102693725 | A | 9/2012 |
| CN | 102792320 | A | 11/2012 |
| CN | 102917004 | A | 2/2013 |
| DE | 3837590 | A1 | 5/1990 |
| DE | 4126902 | A1 | 2/1992 |
| DE | 4334773 | A1 | 4/1994 |
| DE | 4445023 | A1 | 6/1996 |
| DE | 10-2004-029203 | A1 | 12/2005 |
| DE | 198 41 541 | B4 | 12/2007 |
| EP | 0030390 | A1 | 6/1981 |
| EP | 0057514 | A1 | 8/1982 |
| EP | 0138061 | B1 | 9/1984 |
| EP | 0138061 | A1 | 4/1985 |
| EP | 0218859 | A2 | 4/1987 |
| EP | 0262938 | A1 | 4/1988 |
| EP | 0283995 | A2 | 9/1988 |
| EP | 0293259 | A2 | 11/1988 |
| EP | 0299572 | A2 | 1/1989 |
| EP | 0313975 | A2 | 5/1989 |

(56) References Cited

FOREIGN PATENT DOCUMENTS

| | | | |
|---|---|---|---|
| EP | 0314908 | A2 | 5/1989 |
| EP | 0327408 | A2 | 8/1989 |
| EP | 0389271 | A2 | 9/1990 |
| EP | 0411675 | A2 | 2/1991 |
| EP | 0441089 | A2 | 8/1991 |
| EP | 0464712 | A2 | 1/1992 |
| EP | 0476972 | A2 | 3/1992 |
| EP | 0558312 | A1 | 9/1993 |
| EP | 0559349 | A1 | 9/1993 |
| EP | 0559349 | B1 | 9/1993 |
| EP | 0570660 | A1 | 11/1993 |
| EP | 0575146 | A2 | 12/1993 |
| EP | 0578604 | A1 | 1/1994 |
| EP | 0586996 | A2 | 3/1994 |
| EP | 0609030 | A1 | 8/1994 |
| EP | 0651543 | A2 | 5/1995 |
| EP | 0679005 | A1 | 10/1995 |
| EP | 0795811 | A1 | 9/1997 |
| EP | 0476972 | B1 | 5/1998 |
| EP | 0845894 | A2 | 6/1998 |
| EP | 0863453 | A1 | 9/1998 |
| EP | 0863469 | A2 | 9/1998 |
| EP | 0867860 | A2 | 9/1998 |
| EP | 0869697 | A2 | 10/1998 |
| EP | 0889626 | A1 | 1/1999 |
| EP | 0917077 | A2 | 5/1999 |
| EP | 0691023 | B1 | 9/1999 |
| EP | 0946032 | A2 | 9/1999 |
| EP | 0981236 | A1 | 2/2000 |
| EP | 0982732 | A1 | 3/2000 |
| EP | 0984430 | A2 | 3/2000 |
| EP | 1001588 | A2 | 5/2000 |
| EP | 1014277 | A1 | 6/2000 |
| EP | 1028425 | A2 | 8/2000 |
| EP | 1028426 | A2 | 8/2000 |
| EP | 1047251 | A2 | 10/2000 |
| EP | 1076302 | A1 | 2/2001 |
| EP | 1091615 | A1 | 4/2001 |
| EP | 1107229 | A2 | 6/2001 |
| EP | 1229496 | A2 | 8/2002 |
| EP | 1233600 | A2 | 8/2002 |
| EP | 1245023 | A1 | 10/2002 |
| EP | 1246075 | A2 | 10/2002 |
| EP | 1280326 | A1 | 1/2003 |
| EP | 1311102 | A1 | 5/2003 |
| EP | 1315084 | A1 | 5/2003 |
| EP | 1315086 | A1 | 5/2003 |
| EP | 1347361 | A1 | 9/2003 |
| EP | 1379061 | A2 | 1/2004 |
| EP | 1432219 | A1 | 6/2004 |
| EP | 1435620 | A1 | 7/2004 |
| EP | 1480421 | A1 | 11/2004 |
| EP | 1517228 | A2 | 3/2005 |
| EP | 1536612 | A1 | 6/2005 |
| EP | 1566948 | A1 | 8/2005 |
| EP | 1650938 | A1 | 4/2006 |
| EP | 1693829 | A1 | 8/2006 |
| EP | 1181802 | B1 | 2/2007 |
| EP | 1818786 | A1 | 8/2007 |
| EP | 1892700 | A1 | 2/2008 |
| EP | 1912205 | A2 | 4/2008 |
| EP | 1939860 | A1 | 7/2008 |
| EP | 0651543 | B1 | 9/2008 |
| EP | 1909263 | B1 | 1/2009 |
| EP | 1335620 | B1 | 3/2009 |
| EP | 2069895 | A1 | 6/2009 |
| EP | 2094032 | A1 | 8/2009 |
| EP | 2109295 | A1 | 10/2009 |
| EP | 1720375 | B1 | 7/2010 |
| EP | 2205010 | A1 | 7/2010 |
| EP | 2309491 | A1 | 4/2011 |
| EP | 2400373 | A1 | 12/2011 |
| EP | 2431842 | A2 | 3/2012 |
| GB | 2293667 | A | 4/1996 |
| GB | 2310559 | A | 8/1997 |
| GB | 2342802 | A | 4/2000 |
| GB | 2346500 | A | 8/2000 |
| GB | 2352377 | A | 1/2001 |
| GB | 2384399 | A | 7/2003 |
| GB | 2402855 | A | 12/2004 |
| GB | 2445436 | A | 7/2008 |
| IT | FI20010199 | A1 | 4/2003 |
| JP | 57-41731 | A | 3/1982 |
| JP | 59-57336 | A | 4/1984 |
| JP | 2-86397 | A | 3/1990 |
| JP | 2-153415 | A | 6/1990 |
| JP | 3-113578 | A | 5/1991 |
| JP | 4-236624 | A | 8/1992 |
| JP | 5-79951 | A | 3/1993 |
| JP | 5-165459 | A | 7/1993 |
| JP | 5-293126 | A | 11/1993 |
| JP | 06 019965 | | 1/1994 |
| JP | 6-69954 | A | 3/1994 |
| JP | 6-110650 | A | 4/1994 |
| JP | 6-274586 | A | 9/1994 |
| JP | 6-332617 | A | 12/1994 |
| JP | 7-110751 | A | 4/1995 |
| JP | 7-199379 | A | 8/1995 |
| JP | 7-320051 | A | 12/1995 |
| JP | 7-320079 | A | 12/1995 |
| JP | 8-63330 | A | 3/1996 |
| JP | 8-185265 | A | 7/1996 |
| JP | 8223281 | A | 8/1996 |
| JP | 8-227341 | A | 9/1996 |
| JP | 9-18585 | A | 1/1997 |
| JP | 9-55792 | A | 2/1997 |
| JP | 9-259063 | A | 10/1997 |
| JP | 9-265457 | A | 10/1997 |
| JP | 10-31497 | A | 2/1998 |
| JP | 10-105324 | A | 4/1998 |
| JP | 11-6743 | A | 1/1999 |
| JP | 11-45241 | A | 2/1999 |
| JP | 2000-090119 | A | 3/2000 |
| JP | 2000-99225 | A | 4/2000 |
| JP | 2000-134407 | A | 5/2000 |
| JP | 2000-163031 | A | 6/2000 |
| JP | 2000-207167 | A | 7/2000 |
| JP | 2000-224663 | A | 8/2000 |
| JP | 2000-339137 | A | 12/2000 |
| JP | 2001-34290 | A | 2/2001 |
| JP | 2001-56233 | A | 2/2001 |
| JP | 2001 125896 | | 5/2001 |
| JP | 2001-148899 | A | 5/2001 |
| JP | 2002-14954 | A | 1/2002 |
| JP | 2002 024212 | | 1/2002 |
| JP | 2002-33794 | A | 1/2002 |
| JP | 2002-041624 | A | 2/2002 |
| JP | 2002-82893 | A | 3/2002 |
| JP | 2002-534716 | A | 10/2002 |
| JP | 2002-342033 | A | 11/2002 |
| JP | 2002-344880 | A | 11/2002 |
| JP | 2002-542501 | A | 12/2002 |
| JP | 2003-44091 | A | 2/2003 |
| JP | 2003-84877 | A | 3/2003 |
| JP | 2003 517158 | A | 5/2003 |
| JP | 2003-233568 | A | 8/2003 |
| JP | 2003-244317 | A | 8/2003 |
| JP | 2003-288356 | A | 10/2003 |
| JP | 2004-48804 | A | 2/2004 |
| JP | 2004-54080 | A | 2/2004 |
| JP | 2004-505322 | A | 2/2004 |
| JP | 2004-505525 | A | 2/2004 |
| JP | 2004-086356 | A | 3/2004 |
| JP | 2004-152063 | A | 5/2004 |
| JP | 2005-070645 | A | 3/2005 |
| JP | 2005-86624 | A | 3/2005 |
| JP | 2005-506602 | A | 3/2005 |
| JP | 2005-92441 | A | 4/2005 |
| JP | 2005-181386 | A | 7/2005 |
| JP | 2005-189454 | A | 7/2005 |
| JP | 2005-221678 | A | 8/2005 |
| JP | 2005-283843 | A | 10/2005 |
| JP | 2005-311864 | A | 11/2005 |
| JP | 2006-023860 | A | 1/2006 |

(56) References Cited

FOREIGN PATENT DOCUMENTS

| | | | |
|---|---|---|---|
| JP | 2006-31092 | A | 2/2006 |
| JP | 2006-80617 | A | 3/2006 |
| JP | 2006-107438 | A | 4/2006 |
| JP | 2006-146008 | A | 6/2006 |
| JP | 2006-195637 | A | 7/2006 |
| JP | 2007-4633 | A | 1/2007 |
| JP | 2007-53796 | A | 3/2007 |
| JP | 2007-193794 | A | 8/2007 |
| JP | 2007-206317 | A | 8/2007 |
| JP | 2007-299352 | A | 11/2007 |
| JP | 2007-333603 | A | 12/2007 |
| JP | 2008-26381 | A | 2/2008 |
| JP | 2008-39928 | A | 2/2008 |
| JP | 2008-090545 | A | 4/2008 |
| JP | 2008-97003 | A | 4/2008 |
| JP | 2008-134949 | A | 6/2008 |
| JP | 2008-526101 | A | 7/2008 |
| JP | 2008-217468 | A | 9/2008 |
| JP | 2008-233678 | A | 10/2008 |
| JP | 2008-236448 | A | 10/2008 |
| JP | 2008-271481 | A | 11/2008 |
| JP | 2009-2850 | A | 1/2009 |
| JP | 2009-503623 | A | 1/2009 |
| JP | 2009 036999 | | 2/2009 |
| JP | 2009-047920 | A | 3/2009 |
| JP | 2009-98490 | A | 5/2009 |
| JP | 2009-186989 | A | 8/2009 |
| JP | 2009-205367 | A | 9/2009 |
| JP | 2009-294913 | A | 12/2009 |
| JP | 2009-294946 | A | 12/2009 |
| JP | 2010-078979 | A | 4/2010 |
| JP | 2010-157207 | A | 7/2010 |
| JP | 2010-535377 | A | 11/2010 |
| JP | 2010-287063 | A | 12/2010 |
| JP | 2011-41026 | A | 2/2011 |
| JP | 2011-59659 | A | 3/2011 |
| JP | 2013-511214 | A | 3/2013 |
| JP | 2013-517566 | A | 5/2013 |
| JP | 2015-501022 | A | 1/2015 |
| KR | 10-1999-0073234 | A | 10/1999 |
| KR | 11-2002-0013984 | A | 2/2002 |
| KR | 10-2002-0057262 | A | 7/2002 |
| KR | 10-2002-0069952 | A | 9/2002 |
| KR | 10-2003-0016993 | A | 3/2003 |
| KR | 10-2004-0044632 | A | 5/2004 |
| KR | 10-2005-0083561 | A | 8/2005 |
| KR | 10-2005-0090568 | A | 9/2005 |
| KR | 10-2006-0011603 | A | 2/2006 |
| KR | 10-2006-0012730 | A | 2/2006 |
| KR | 10-2006-0073574 | A | 6/2006 |
| KR | 10-2007-0024262 | A | 3/2007 |
| KR | 10-2007-0057496 | | 6/2007 |
| KR | 10-2007-0071675 | A | 7/2007 |
| KR | 10-2007-0100837 | A | 10/2007 |
| KR | 10-0776800 | B1 | 11/2007 |
| KR | 10-2008-001227 | | 2/2008 |
| KR | 10-0810500 | B1 | 3/2008 |
| KR | 10-0819928 | B1 | 4/2008 |
| KR | 10-2008-0049647 | A | 6/2008 |
| KR | 10 2008 10932 | A | 12/2008 |
| KR | 10-2009-0001716 | A | 1/2009 |
| KR | 10 2009 086805 | A | 8/2009 |
| KR | 10-0920267 | B1 | 10/2009 |
| KR | 10-2010-0032792 | | 4/2010 |
| KR | 10-2010-0119519 | A | 11/2010 |
| KR | 10 2011 01134 | A | 10/2011 |
| KR | 10-2012-0020164 | A | 3/2012 |
| KR | 10-1193668 | B1 | 12/2012 |
| NL | 1014847 | C1 | 10/2001 |
| RU | 2273106 | C2 | 3/2006 |
| RU | 2349970 | C2 | 3/2009 |
| RU | 2353068 | C2 | 4/2009 |
| TW | 200643744 | A | 12/2006 |
| TW | 200735621 | A | 9/2007 |
| TW | 200801988 | A | 1/2008 |
| WO | 1993/020640 | A1 | 10/1993 |
| WO | 1994/016434 | A1 | 7/1994 |
| WO | 1994/029788 | A1 | 12/1994 |
| WO | WO 95/02221 | | 1/1995 |
| WO | 1995/016950 | A1 | 6/1995 |
| WO | 1995/017746 | A1 | 6/1995 |
| WO | 1997/010586 | A1 | 3/1997 |
| WO | WO 97/26612 | | 7/1997 |
| WO | 1997/029614 | A1 | 8/1997 |
| WO | 1997/038488 | A1 | 10/1997 |
| WO | 1997/049044 | A1 | 12/1997 |
| WO | 1998/009270 | A1 | 3/1998 |
| WO | 1998/033111 | A1 | 7/1998 |
| WO | WO 98/41956 | | 9/1998 |
| WO | WO 99/01834 | | 1/1999 |
| WO | WO 99/08238 | | 2/1999 |
| WO | 1999/016181 | A1 | 4/1999 |
| WO | WO 99/56227 | | 11/1999 |
| WO | 2000/019697 | A1 | 4/2000 |
| WO | 2000/022820 | A1 | 4/2000 |
| WO | 2000/029964 | A1 | 5/2000 |
| WO | 2000/030070 | A2 | 5/2000 |
| WO | 2000/038041 | A1 | 6/2000 |
| WO | 00/41065 | A1 | 7/2000 |
| WO | 2000/044173 | A1 | 7/2000 |
| WO | 2000/063766 | A1 | 10/2000 |
| WO | WO 2000/60435 | | 10/2000 |
| WO | WO 2000/60435 | A3 | 10/2000 |
| WO | 2000/068936 | A1 | 11/2000 |
| WO | 2001/006489 | A1 | 1/2001 |
| WO | 2001/030046 | A2 | 4/2001 |
| WO | 2001/030047 | A2 | 4/2001 |
| WO | 2001/033569 | A1 | 5/2001 |
| WO | 2001/035391 | A1 | 5/2001 |
| WO | 2001/046946 | A1 | 6/2001 |
| WO | 2001/065413 | A1 | 9/2001 |
| WO | 2001/067753 | A1 | 9/2001 |
| WO | 02/10900 | A2 | 2/2002 |
| WO | 2002/025610 | A1 | 3/2002 |
| WO | 2002/031814 | A1 | 4/2002 |
| WO | 2002/037469 | A2 | 5/2002 |
| WO | 2002/071259 | A1 | 9/2002 |
| WO | WO 02/073603 | A1 | 9/2002 |
| WO | 2003/003152 | A2 | 1/2003 |
| WO | 2003/003765 | A1 | 1/2003 |
| WO | 2003/023786 | A2 | 3/2003 |
| WO | 2003/041364 | A2 | 5/2003 |
| WO | 2003/049494 | A1 | 6/2003 |
| WO | 2003/056789 | A1 | 7/2003 |
| WO | 2003/067202 | A2 | 8/2003 |
| WO | 2003/084196 | A1 | 10/2003 |
| WO | 2003/094489 | A1 | 11/2003 |
| WO | 2004/008801 | A1 | 1/2004 |
| WO | 2004/025938 | A1 | 3/2004 |
| WO | 2004/047415 | A1 | 6/2004 |
| WO | 2004/055637 | A2 | 7/2004 |
| WO | 2004/057486 | A1 | 7/2004 |
| WO | 2004/061850 | A1 | 7/2004 |
| WO | 2004/084413 | A2 | 9/2004 |
| WO | 2005/003920 | A2 | 1/2005 |
| WO | 2005/008505 | A1 | 1/2005 |
| WO | 2005/008899 | A1 | 1/2005 |
| WO | 2005/010725 | A2 | 2/2005 |
| WO | 2005/027472 | A2 | 3/2005 |
| WO | 2005/027485 | A1 | 3/2005 |
| WO | 2005/031737 | A1 | 4/2005 |
| WO | 2005/034085 | A1 | 4/2005 |
| WO | 2005/041455 | A1 | 5/2005 |
| WO | 2005/059895 | A1 | 6/2005 |
| WO | 2005/069171 | A1 | 7/2005 |
| WO | 2005/101176 | A2 | 10/2005 |
| WO | 2006/020305 | A2 | 2/2006 |
| WO | 2006/054724 | A1 | 5/2006 |
| WO | 2006/056822 | A1 | 6/2006 |
| WO | 2006/078246 | A1 | 7/2006 |
| WO | 2006/101649 | A2 | 9/2006 |
| WO | 2006/133571 | A1 | 12/2006 |
| WO | WO 2006/129967 | A1 | 12/2006 |
| WO | 2007/002753 | A2 | 1/2007 |

(56) References Cited

FOREIGN PATENT DOCUMENTS

| | | | |
|---|---|---|---|
| WO | 2007/080559 | A2 | 7/2007 |
| WO | 2007/083894 | A1 | 7/2007 |
| WO | 2008/030970 | A2 | 3/2008 |
| WO | 2008/071231 | A1 | 6/2008 |
| WO | WO 2008/085742 | A2 | 7/2008 |
| WO | WO 2008/109835 | A2 | 9/2008 |
| WO | 2008/140236 | A1 | 11/2008 |
| WO | 2008/153639 | A1 | 12/2008 |
| WO | 2009/009240 | A2 | 1/2009 |
| WO | 2009/016631 | A2 | 2/2009 |
| WO | 2009/017280 | A1 | 2/2009 |
| WO | 2009/104126 | A1 | 8/2009 |
| WO | 2009/156438 | A1 | 12/2009 |
| WO | 2010/075623 | A1 | 7/2010 |
| WO | 2011/057346 | A1 | 5/2011 |
| WO | 2011/060106 | A1 | 5/2011 |
| WO | WO 2011/088053 | A2 | 7/2011 |
| WO | 2011/116309 | A1 | 9/2011 |
| WO | 2011/133543 | A1 | 10/2011 |
| WO | 2011/150730 | A1 | 12/2011 |
| WO | 2011/163350 | A1 | 12/2011 |
| WO | 2012/154317 | A1 | 11/2012 |
| WO | 2012/167168 | A2 | 12/2012 |
| WO | 2013/048880 | A1 | 4/2013 |

OTHER PUBLICATIONS

Car Working Group, "Hands-Free Profile 1.5 HFP1.5_SPEC", Bluetooth Doc, available at <www.bluetooth.org>, Nov. 25, 2005, 93 pages.

Cohen et al., "Voice User Interface Design,", Excerpts from Chapter 1 and Chapter 10, 2004, 36 pages.

Carpendale et al., "3-Dimensional Pliable Surfaces: For the Effective Presentation of Visual Information", UIST '95 Proceedings of the 8th Annual ACM Symposium on User Interface and Software Technology, Nov. 14-17, 1995, pp. 217-226.

Carpendale et al., "Extending Distortion Viewing from 2D to 3D", IEEE Computer Graphics and Applications, Jul./Aug. 1997, pp. 42-51.

Carpendale et al., "Making Distortions Comprehensible", IEEE Proceedings of Symposium on Visual Languages, 1997, 10 pages.

Casner et al., "N-Way Conferencing with Packet Video", The Third International Workshop on Packet Video, Mar. 22-23, 1990, pp. 1-6.

Chakarova et al., "Digital Still Cameras—Downloading Images to a Computer", Multimedia Reporting and Convergence, available at <http://journalism.berkeley.edu/multimedia/tutorials/stillcams/downloading.html>, retrieved on May 9, 2005, 2 pages.

Chartier, David, "Using Multi-Network Meebo Chat Service on Your iPhone", available at <http://www.tuaw.com/2007/07/04/using-multi-network-meebo-chat-service-on-your-iphone/>, Jul. 4, 2007, 5 pages.

Extended European Search Report (includes European Search Report and European Search Opinion) received for European Patent Application No. 06256215.2, dated Feb. 20, 2007, 6 pages.

Extended European Search Report (includes Supplementary European Search Report and Search Opinion) received for European Patent Application No. 07863218.9, dated Dec. 9, 2010, 7 pages.

Extended European Search Report (includes European Search Report and European Search Opinion) received for European Patent Application No. 12186113.2, dated Apr. 28, 2014, 14 pages.

Extended European Search Report (includes European Search Report and European Search Opinion) received for European Patent Application No. 13155688.8, dated Aug. 22, 2013, 11 pages.

Abcom Pty. Ltd. "12.1" 925 Candela Mobile PC", LCDHardware.com, available at <http://www.lcdhardware.com/panel/12_1_panel/default.asp.>, retrieved on Dec. 19, 2002, 2 pages.

Cisco Systems, Inc., "Cisco Unity Unified Messaging User Guide", Release 4.0(5), Apr. 14, 2005, 152 pages.

Cisco Systems, Inc., "Installation Guide for Cisco Unity Unified Messaging with Microsoft Exchange 2003/2000 (With Failover Configured)", Release 4.0(5), Apr. 14, 2005, 152 pages.

Cisco Systems, Inc., "Operations Manager Tutorial, Cisco's IPC Management Solution", 2006, 256 pages.

Coleman, David W., "Meridian Mail Voice Mail System Integrates Voice Processing and Personal Computing", Speech Technology, vol. 4, No. 2, Mar./Apr. 1988, pp. 84-87.

Compaq, "Personal Jukebox", available at <http://research.compaq.com/SRC/pjb/>, 2001, 3 pages.

Compaq Inspiration Technology, "Personal Jukebox (PJB)—Systems Research Center and PAAD", Oct. 13, 2000, 25 pages.

Conkie et al., "Preselection of Candidate Units in a Unit Selection-Based Text-to-Speech Synthesis System", ISCA, 2000, 4 pages.

Conklin, Jeffrey, "A Survey of Hypertext", MCC Software Technology Program, Dec. 1987, 40 pages.

Copperi et al., "CELP Coding for High Quality Speech at 8 kbits/s", Proceedings of IEEE International Acoustics, Speech and Signal Processing Conference, Apr. 1986), as reprinted in Vector Quantization (IEEE Press), 1990, pp. 324-327.

Corr, Paul, "Macintosh Utilities for Special Needs Users", available at <http://homepage.mac.com/corrp/macsupt/columns/specneeds.html>, Feb. 1994 (content updated Sep. 19, 1999), 4 pages.

Creative, "Creative NOMAD MuVo", available at <http://web.archive.org/web/20041024075901/www.creative.com/products/product.asp?category=213&subcategory=216&product=4983>, retrieved on Jun. 7, 2006, 1 page.

Creative, "Creative NOMAD MuVo TX", available at <http://web.archive.org/web/20041024175952/www.creative.com/products/pfriendly.asp?product=9672>, retrieved on Jun. 6, 2006, 1 page.

Creative, "Digital MP3 Player", available at <http://web.archive.org/web/20041024074823/www.creative. com/products/product.asp?category=213&subcategory=216&product=4983, 2004, 1 page.

Creative Technology Ltd., "Creative NOMAD®: Digital Audio Player: User Guide (On-Line Version)", available at <http://ec1.images-amazon.com/media/i3d/01/A/man-migrate/MANUAL000010757.pdf>, Jun. 1999, 40 pages.

Creative Technology Ltd., "Creative NOMAD® II: Getting Started—User Guide (On Line Version)", available at <http://ec1.images-amazon.com/media/i3d/01/A/man-migrate/MANUAL000026434.pdf>, Apr. 2000, 46 pages.

Creative Technology Ltd., "Nomad Jukebox", User Guide, Version 1.0, Aug. 2000, 52 pages.

Croft et al., "Task Support in an Office System", Proceedings of the Second ACM-SIGOA Conference on Office Information Systems, 1984, pp. 22-24.

Crowley et al., "MMConf: An Infrastructure for Building Shared Multimedia Applications", CSCW 90 Proceedings, Oct. 1990, pp. 329-342.

Cuperman et al., "Vector Predictive Coding of Speech at 16 kbit s/s", (IEEE Transactions on Communications, Jul. 1985), as reprinted in Vector Quantization (IEEE Press, 1990), 1990, pp. 300-311.

ABF Software, "Lens—Magnifying Glass 1.5", available at <http://download.com/3000-2437-10262078.html?tag=1st-0-1>, retrieved on Feb. 11, 2004, 1 page.

Davis et al., "Stone Soup Translation", Department of Linguistics, Ohio State University, 2001, 11 pages.

De Herrera, Chris, "Microsoft ActiveSync 3.1", Version 1.02, available at <http://www.cewindows.net/wce/activesync3.1.htm>, Oct. 13, 2000, 8 pages.

Degani et al., "'Soft' Controls for Hard Displays: Still a Challenge", Proceedings of the 36th Annual Meeting of the Human Factors Society, 1992, pp. 52-56.

Del Strother, Jonathan, "Coverflow", available at <http://www.steelskies.com/coverflow>, retrieved on Jun. 15, 2006, 14 pages.

Diamond Multimedia Systems, Inc., "Rio PMP300: User's Guide", available at <http://ec1.images-amazon.com/media/i3d/01/a/man-migrate/MANUAL000022854.pdf>, 1998, 28 pages.

Dickinson et al., "Palmtips: Tiny Containers for All Your Data", PC Magazine, vol. 9, Mar. 1990, p. 218(3).

Digital Equipment Corporation, "OpenVMS RTL DECtalk (DTK$) Manual", May 1993, 56 pages.

Donahue et al., "Whiteboards: A Graphical Database Tool", ACM Transactions on Office Information Systems, vol. 4, No. 1, Jan. 1986, pp. 24-41.

(56) References Cited

OTHER PUBLICATIONS

Dourish et al., "Portholes: Supporting Awareness in a Distributed Work Group", CHI 1992;, May 1992, pp. 541-547.
Abut et al., "Low-Rate Speech Encoding Using Vector Quantization and Subband Coding", (Proceedings of the IEEE International Acoustics, Speech and Signal Processing Conference, Apr. 1986), as reprinted in Vector Quantization IEEE Press, 1990, pp. 312-315.
Dyslexic.com, "AlphaSmart 3000 with CoWriter SmartApplet: Don Johnston Special Needs", available at <http://www.dyslexic.com/procuts.php?catid- 2&pid=465&PHPSESSID=2511b800000f7da>, retrieved on Dec. 6, 2005, 13 pages.
Edwards, John R., "Q&A: Integrated Software with Macros and an Intelligent Assistant", Byte Magazine, vol. 11, No. 1, Jan. 1986, pp. 120-122.
Egido, Carmen, "Video Conferencing as a Technology to Support Group Work: A Review of its Failures", Bell Communications Research, 1988, pp. 13-24.
Elliot, Chip, "High-Quality Multimedia Conferencing Through a Long-Haul Packet Network", BBN Systems and Technologies, 1993, pp. 91-98.
Elliott et al., "Annotation Suggestion and Search for Personal Multimedia Objects on the Web", CIVR, Jul. 7-9, 2008, pp. 75-84.
Elofson et al., "Delegation Technologies: Environmental Scanning with Intelligent Agents", Jour. of Management Info. Systems, Summer 1991, vol. 8, No. 1, 1991, pp. 37-62.
Eluminx, "Illuminated Keyboard", available at <http://www.elumix.com/>, retrieved on Dec. 19, 2002, 1 page.
Engst, Adam C., "SoundJam Keeps on Jammin", available at <http://db.tidbits.com/getbits.acgi?tbart=05988>, Jun. 19, 2000, 3 pages.
Ericsson Inc., "Cellular Phone with Integrated MP3 Player", Research Disclosure Journal No. 41815, Feb. 1999, 2 pages.
Omologo et al., "Microphone Array Based Speech Recognition with Different Talker-Array Positions", IEEE International Conference on Acoustics, Speech, and Signal Processing, vol. 1, Apr. 21-24, 1997, pp. 227-230.
Oregon Scientific, "512MB Waterproof MP3 Player with FM Radio & Built-in Pedometer", available at <http://www2.oregonscientific.com/shop/product.asp?cid=4&scid=11&pid=581>, retrieved on Jul. 31, 2006, 2 pages.
Oregon Scientific, "Waterproof Music Player with FM Radio and Pedometer (MP121)—User Manual", 2005, 24 pages.
Padilla, Alfredo, "Palm Treo 750 Cell Phone Review—Messaging", available at <http://www.wirelessinfo.com/content/palm-Treo-750-Cell-Phone-Review/Messaging.htm>, Mar. 17, 2007, 6 pages.
Palay et al., "The Andrew Toolkit: An Overview", Information Technology Center, Carnegie-Mellon University, 1988, pp. 1-15.
Palm, Inc., "User Guide : Your Palm® Treo.TM. 755p Smartphone", 2005-2007, 304 pages.
Panasonic, "Toughbook 28: Powerful, Rugged and Wireless", Panasonic: Toughbook Models, available at <http://www.panasonic.com/computer/notebook/html/01a_s8.htm>, retrieved on Dec. 19, 2002, 3 pages.
Parks et al., "Classification of Whale and Ice Sounds with a cochlear Model", IEEE, Mar. 1992.
Patterson et al., "Rendezvous: An Architecture for Synchronous Multi-User Applications", CSCW '90 Proceedings, 1990, pp. 317-328.
International Search Report received for PCT Patent Application No. PCT/US2002/033330, dated Feb. 4, 2003, 6 pages.
Ahmed et al., "Intelligent Natural Language Query Processor", TENCON '89, Fourth IEEE Region 10 International Conference, Nov. 22-24, 1989, pp. 47-49.
Ahuja et al., "A Comparison of Application Sharing Mechanisms in Real-Time Desktop Conferencing Systems", AT&T Bell Laboratories, 1990, pp. 238-248.
International Search Report and Written Opinion received for PCT Patent Application No. PCT/US2005/038819, dated Apr. 5, 2006, 12 pages.
International Search Report received for PCT Patent Application No. PCT/US2005/046797, dated Nov. 24, 2006, 6 pages.
Invitation to Pay Additional Fees and Partial Search Report received for PCT Application No. PCT/US2005/046797, dated Jul. 3, 2006, 6 pages.
Written Opinion received for PCT Patent Application No. PCT/US2005/046797, dated Nov. 24, 2006, 9 pages.
International Search Report and Written Opinion received for PCT Patent Application No. PCT/US2006/048669, dated Jul. 2, 2007, 12 pages.
International Search Report and Written Opinion received for PCT Patent Application No. PCT/US2006/048670, dated May 21, 2007, 11 pages.
Invitation to Pay Addition Fees and Partial International Search Report received for PCT Patent Application No. PCT/US2006/048738, dated Jul. 10, 2007, 4 pages.
International Search Report and Written Opinion received for PCT Patent Application No. PCT/US2006/048753, dated Jun. 19, 2007, 15 pages.
International Search Report and Written Opinion received for PCT Patent Application No. PCT/US2007/026243, dated Mar. 31, 2008, 10 pages.
International Search Report and Written Opinion received for PCT Patent Application No. PCT/US2007/077424, dated Jun. 19, 2008, 13 pages.
Invitation to Pay Additional Fees received for PCT Application No. PCT/US2007/077424, dated Apr. 29, 2008, 6 pages.
International Search Report and Written Opinion received for PCT Patent Application No. PCT/US2007/077443, dated Feb. 21, 2008, 8 pages.
International Search Report and Written Opinion received for PCT Patent Application No. PCT/US2007/088872, dated May 8, 2008, 8 pages.
International Search Report and Written Opinion received for PCT Patent Application No. PCT/US2007/088873, dated May 8, 2008, 7 pages.
International Search Report and Written Opinion received for PCT Patent Application No. PCT/US2008/000032, dated Jun. 12, 2008, 7 pages.
International Search Report and Written Opinion received for PCT Patent Application No. PCT/US2008/000042, dated May 21, 2008, 7 pages.
International Search Report and Written Opinion received for PCT Patent Application No. PCT/US2008/000043, dated Oct. 10, 2008, 12 pages.
Invitation to Pay Additional Fees received for PCT Patent Application No. PCT/US2008/000043, dated Jun. 27, 2008, 4 pages.
International Search Report and Written Opinion received for PCT Patent Application No. PCT/US2008/000045, dated Jun. 12, 2008, 7 pages.
International Search Report and Written Opinion received for PCT Patent Application No. PCT/US2008/000047, dated Sep. 11, 2008, 12 pages.
Invitation to Pay Additional Fees received for PCT Patent Application No. PCT/US2008/000047, dated Jul. 4, 2008, 4 pages.
International Search Report and Written Opinion received for PCT Patent Application No. PCT/US2008/000059, dated Sep. 19, 2008, 18 pages.
International Search Report and Written Opinion received for PCT Patent Application No. PCT/US2008/000061, dated Jul. 1, 2008, 13 pages.
International Search Report and Written Opinion received for PCT Patent Application No. PCT/US2008/050083, dated Jul. 4, 2008, 9 pages.
International Search Report and Written Opinion received for PCT Patent Application No. PCT/US2011/020350, dated Jun. 30, 2011, 17 pages.
Invitation to Pay Additional Fees and Partial International Search Report received for PCT Patent Application No. PCT/US2011/020350, dated Apr. 14, 2011, 5 pages.
International Preliminary Report on Patentability received for PCT Patent Application No. PCT/US2011/020861, dated Aug. 2, 2012, 11 pages.

(56) References Cited

OTHER PUBLICATIONS

Aikawa, K. "Time-Warping Neural Network for Phoneme Recognition", IEEE International Joint Conference on Neural Networks, vol. 3, Nov. 18-21, 1991, pp. 2122-2127.
Allen et al., "Automated Natural Spoken Dialog", Computer, vol. 35, No. 4, Apr. 2002, pp. 51-56.
Alleva et al., "Applying SPHINX-II to DARPA Wall Street Journal CSR Task", Proceedings of Speech and Natural Language Workshop, Feb. 1992, pp. 393-398.
Amrel Corporation, "Rocky Matrix BackLit Keyboard", available at <http://www.amrel.com/asi_matrixkeyboard.html>, retrieved on Dec. 19, 2002, 1 page.
International Search Report and Written Opinion received for PCT Patent Application No. PCT/US2012/034028, dated Jun. 11, 2012, 9 pages.
International Search Report and Written Opinion received for PCT Patent Application No. PCT/US2012/040931, dated Feb. 1, 2013, 4 pages (International Search Report only).
Apple, "VoiceOver", available at <http://www.apple.com/accessibility/voiceover/>, Feb. 2009, 5 pages.
Apple Computer, Inc., "Apple—iPod—Technical Specifications, iPod 20GB and 60GB Mac + PC", available at <http://www.apple.com/ipod/color/specs.html>, 2005, 3 pages.
International Search Report and Written Opinion received for PCT Patent Application No. PCT/US2013/041225, dated Aug. 23, 2013, 3 pages (International Search Report only).
Invitation to Pay Additional Fees received for PCT Patent Application No. PCT/US2013/047659, dated Feb. 27, 2014, 7 pages.
Invitation to Pay Additional Fees received for PCT Application No. PCT/US2013/052558, dated Nov. 7, 2013, 6 pages.
Pearl, Amy, "System Support for Integrated Desktop Video Conferencing", Sunmicrosystems Laboratories, Dec. 1992, pp. 1-15.
Penn et al., "Ale for Speech: A Translation Prototype", Bell Laboratories, 1999, 4 pages.
Phillipps, Ben, "Touchscreens are Changing the Face of Computers—Today's Users Have Five Types of Touchscreens to Choose from, Each with its Own Unique Characteristics", Electronic Products, Nov. 1994, pp. 63-70.
Schaffer et al., "Navigating Hierarchically Clustered Networks through Fisheye and Full-Zoom Methods", ACM Trascations on Computer-Human Interaction, vol. 3, No. 2, Jun. 1996, pp. 162-188.
Pickering, J. A., "Touch-Sensitive Screens: The Technologies and Their Application", International Journal of Man-Machine Studies, vol. 25, No. 3, Sep. 1986, pp. 249-269.
Pingali et al., "Audio-Visual Tracking for Natural Interactivity", ACM Multimedia, Oct. 1999, pp. 373-382.
Plaisant et al., "Touchscreen Interfaces for Alphanumeric Data Entry", Proceedings of the Human Factors and Ergonomics Society 36th Annual Meeting, 1992, pp. 293-297.
Plaisant et al., "Touchscreen Toggle Design", CHI'92, May 3-7, 1992, pp. 667-668.
Poly-Optical Products, Inc., "Poly-Optical Fiber Optic Membrane Switch Backlighting", available at <http://www.poly-optical.com/membrane_switches.html>, retrieved on Dec. 19, 2002, 3 pages.
Poor, Alfred, "Microsoft Publisher", PC Magazine, vol. 10, No. 20, Nov. 26, 1991, 1 page.
Potter et al., "An Experimental Evaluation of Three Touch Screen Strategies within a Hypertext Database", International Journal of Human-Computer Interaction, vol. 1, No. 1, 1989, pp. 41-52.
Potter et al., "Improving the Accuracy of Touch Screens: An Experimental Evaluation of Three Strategies", CHI '88 ACM, 1988, pp. 27-32.
Public Safety Technologies, "Tracer 2000 Computer", available at <http://www.pst911.com/tracer.html>, retrieved on Dec. 19, 2002, 3 pages.
Apple Computer, Inc., "Apple Announces iTunes 2", Press Release, Oct. 23, 2001, 2 pages.
Rabiner et al., "Digital Processing of Speech Signals", Prentice Hall, 1978, pp. 274-277.
Rampe et al., "SmartForm Designer and SmartForm Assistant", News release, Claris Corp., Jan. 9, 1989, 1 page.
Rao et al., "Exploring Large Tables with the Table Lens", Apple Inc., Video Clip, Xerox Corp., on a CD, 1994.
Rao et al., "Exploring Large Tables with the Table Lens", CHI'95 Mosaic of Creativity, ACM, May 7-11, 1995, pp. 403-404.
Rao et al., "The Table Lens: Merging Graphical and Symbolic Representations in an Interactive Focus+Context Visualization for Tabular Information", Proceedings of the ACM SIGCHI Conference on Human Factors in Computing Systems, Apr. 1994, pp. 1-7.
Raper, Larry K. ,"The C-MU PC Server Project", (CMU-ITC-86-051), Dec. 1986, pp. 1-30.
Ratcliffe et al., "Intelligent Agents Take U.S. Bows", MacWeek, vol. 6, No. 9, Mar. 2, 1992, 1 page.
Reddy, D. R., "Speech Recognition by Machine: A Review", Proceedings of the IEEE, Apr. 1976, pp. 501-531.
Reininger et al., "Speech and Speaker Independent Codebook Design in VQ Coding Schemes", (Proceedings of the IEEE International Acoustics, Speech and Signal Processing Conference, Mar. 1985), as reprinted in Vector Quantization (IEEE Press, 1990), 1990, pp. 271-273.
Ren et al., "Efficient Strategies for Selecting Small Targets on Pen-Based Systems: An Evaluation Experiment for Selection Strategies and Strategy Classifications", Proceedings of the IFIP TC2/TC13 WG2.7/WG13.4 Seventh Working Conference on Engineering for Human-Computer Interaction, vol. 150, 1998, pp. 19-37.
Ren et al., "Improving Selection Performance on Pen-Based Systems: A Study of Pen-Based Interaction for Selection Tasks", ACM Transactions on Computer-Human Interaction, vol. 7, No. 3, Sep. 2000, pp. 384-416.
Ren et al., "The Best among Six Strategies for Selecting a Minute Target and the Determination of the Minute Maximum Size of the Targets on a Pen-Based Computer", Human-Computer Interaction Interact, 1997, pp. 85-92.
Apple Computer, Inc., "Apple Introduces iTunes—World's Best and Easiest to Use Jukebox Software", Macworld Expo, Jan. 9, 2001, 2 pages.
Riecken, R D., "Adaptive Direct Manipulation", IEEE Xplore, 1991, pp. 1115-1120.
Rioport, "Rio 500: Getting Started Guide", available at <http://ec1.images-amazon.com/media/i3d/01/A/man-migrate/MANUAL000023453.pdf>, 1999, 2 pages.
Robbin et al., "MP3 Player and Encoder for Macintosh!", SoundJam MP Plus, Version 2.0, 2000, 76 pages.
Robertson et al., "Information Visualization Using 3D Interactive Animation", Communications of the ACM, vol. 36, No. 4, Apr. 1993, pp. 57-71.
Robertson et al., "The Document Lens", UIST '93, Nov. 3-5, 1993, pp. 101-108.
Root, Robert, "Design of a Multi-Media Vehicle for Social Browsing", Bell Communications Research, 1988, pp. 25-38.
Roseberry, Catherine, "How to Pair a Bluetooth Headset & Cell Phone", available at <http://mobileoffice.about.com/od/usingyourphone/ht/blueheadset_p.htm>, retrieved on Apr. 29, 2006, 2 pages.
Rosenberg et al., "An Overview of the Andrew Message System", Information Technology Center Carnegie-Mellon University, Jul. 1987, pp. 99-108.
Rosner et al., "In Touch: A Graphical User Interface Development Tool", IEEE Colloquium on Software Tools for Interface Design, Nov. 8, 1990, pp. 12/1-12/7.
Rossfrank, "Konstenlose Sprachmitteilungins Festnetz", XP002234425, Dec. 10, 2000, pp. 1-4.
Roucos et al., "A Segment Vocoder at 150 B/S", (Proceedings of the IEEE International Acoustics, Speech and Signal Processing Conference, Apr. 1983), as reprinted in Vector Quantization (IEEE Press, 1990), 1990, pp. 246-249.
Roucos et al., "High Quality Time-Scale Modification for Speech", Proceedings of the 1985 IEEE Conference on Acoustics, Speech and Signal Processing, 1985, pp. 493-496.
Sabin et al., "Product Code Vector Quantizers for Waveform and Voice Coding", (IEEE Transactions on Acoustics, Speech and Signal Processing, Jun. 1984), as reprinted in Vector Quantization (IEEE Press, 1990), 1990, pp. 274-288.

(56) References Cited

OTHER PUBLICATIONS

Apple Computer, Inc., "Apple's iPod Available in Stores Tomorrow", Press Release, Nov. 9, 2001, 1 page.
Santen, Jan P., "Assignment of Segmental Duration in Text-to-Speech Synthesis", Computer Speech and Language, vol. 8, No. 2, Apr. 1994, pp. 95-128.
Sarawagi, Sunita, "CRF Package Page", available at <http://crf.sourceforge.net/>, retrieved on Apr. 6, 2011, 2 pages.
Sarkar et al., "Graphical Fisheye Views", Communications of the ACM, vol. 37, No. 12, Dec. 1994, pp. 73-83.
Sarkar et al., "Graphical Fisheye Views of Graphs", Systems Research Center, Digital Equipment Corporation Mar. 17, 1992, 31 pages.
Sarkar et al., "Graphical Fisheye Views of Graphs", CHI '92 Proceedings of the SIGCHI Conference on Human Factors in Computing Systems, May 3-7, 1992, pp. 83-91.
Sarkar et al., "Stretching the Rubber Sheet: A Metaphor for Viewing Large Layouts on Small Screens", UIST'93, ACM, Nov. 3-5, 1993, pp. 81-91.
Sastry, Ravindra W., "A Need for Speed: A New Speedometer for Runners", submitted to the Department of Electrical Engineering and Computer Science at the Massachusetts Institute of Technology, 1999, pp. 1-42.
Schafer et al., "Digital Representations of Speech Signals", Proceedings of the IEEE, vol. 63, No. 4, Apr. 1975, pp. 662-677.
Eslambolchilar et al., "Making Sense of Fisheye Views", Second Dynamics and Interaction Workshop at University of Glasgow, Aug. 2005, 6 pages.
Eslambolchilar et al., "Multimodal Feedback for Tilt Controlled Speed Dependent Automatic Zooming", UIST'04, Oct. 24-27, 2004, 2 pages.
Fanty et al., "A Comparison of DFT, PLP and Cochleagram for Alphabet Recognition", IEEE, Nov. 1991.
Findlater et al., "Beyond QWERTY: Augmenting Touch-Screen Keyboards with Multi-Touch Gestures for Non-Alphanumeric Input", CHI '12, Austin, Texas, USA, May 5-10,2012, 4 pages.
Fisher et al., "Virtual Environment Display System", Interactive 3D Graphics, Oct. 23-24, 1986, pp. 77-87.
Forsdick, Harry, "Explorations into Real-Time Multimedia Conferencing", Proceedings of the Ifip Tc 6 International Symposium on Computer Message Systems, 1986, 331 pages.
Furnas et al., "Space-Scale Diagrams: Understanding Multiscale Interfaces", CHI '95 Proceedings of the SIGCHI Conference on Human Factors in Computing Systems, 1995, pp. 234-241.
Furnas, George W., "Effective View Navigation", Proceedings of the ACM SIGCHI Conference on Human Factors in Computing Systems, Mar. 1997, pp. 367-374.
Furnas, George W., "Generalized Fisheye Views", CHI '86 Proceedings of the SIGCHI Conference on Human Factors in Computing Systems, vol. 17, No. 4, Apr. 1986, pp. 16-23.
Furnas, George W., "The Fisheye Calendar System", Bellcore Technical Memorandum, Nov. 19, 1991.
Gardner, Jr., P. C., "A System for the Automated Office Environment", IBM Systems Journal, vol. 20, No. 3, 1981, pp. 321-345.
Garretson, R., "IBM Adds 'Drawing Assistant' Design Tool to Graphic Series", PC Week, vol. 2, No. 32, Aug. 13, 1985, 1 page.
Gaver et al., "One is Not Enough: Multiple Views in a Media Space", INTERCHI, Apr. 24-29, 1993, pp. 335-341.
Gaver et al., "Realizing a Video Environment: EuroPARC's Rave System", Rank Xerox Cambridge EuroPARC, 1992, pp. 27-35.
Giachin et al., "Word Juncture Modeling Using Inter-Word Context-Dependent Phone-Like Units", Cselt Technical Reports, vol. 20, No. 1, Mar. 1992, pp. 43-47.
Gillespie, Kelly, "Adventures in Integration", Data Based Advisor, vol. 9, No. 9, Sep. 1991, pp. 90-92.
Gillespie, Kelly, "Internationalize Your Applications with Unicode", Data Based Advisor, vol. 10, No. 10, Oct. 1992, pp. 136-137.
Gilloire et al., "Innovative Speech Processing for Mobile Terminals: An Annotated Bibliography", Signal Processing, vol. 80, No. 7, Jul. 2000, pp. 1149-1166.
Glinert-Stevens, Susan, "Microsoft Publisher: Desktop Wizardry", PC Sources, vol. 3, No. 2, Feb. 1992, 1 page.
Gmail, "About Group Chat", available at <http://mail.google.com/support/bin/answer.py?answer=81090>, Nov. 26, 2007, 2 pages.
Goldberg, Cheryl, "IBM Drawing Assistant: Graphics for the EGA", PC Magazine, vol. 4, No. 26, Dec. 24, 1985, 1 page.
Good et al., "Building a User-Derived Interface", Communications of the ACM; (Oct. 1984) vol. 27, No. 10, Oct. 1984, pp. 1032-1043.
Gray et al., "Rate Distortion Speech Coding with a Minimum Discrimination Information Distortion Measure", (IEEE Transactions on Information Theory, Nov. 1981), as reprinted in Vector Quantization (IEEE Press), 1990, pp. 208-221.
Greenberg, Saul, "A Fisheye Text Editor for Relaxed-Wysiwis Groupware", CHI '96 Companion, Vancouver, Canada, Apr. 13-18, 1996, 2 pages.
Griffin et al., "Signal Estimation From Modified Short-Time Fourier Transform", IEEE Transactions on Acoustics, Speech and Signal Processing, vol. ASSP-32, No. 2, Apr. 1984, pp. 236-243.
Gruhn et al., "A Research Perspective on Computer-Assisted Office Work", IBM Systems Journal, vol. 18, No. 3, 1979, pp. 432-456.
Hain et al., "The Papageno TTS System", Siemens AG, Corporate Technology, Munich, Germany TC-STAR Workshop, 2006, 6 pages.
Halbert, D. C., "Programming by Example", Dept. Electrical Engineering and Comp. Sciences, University of California, Berkley, Nov. 1984, pp. 1-76.
Hall, William S., "Adapt Your Program for Worldwide Use with Windows.TM. Internationalization Support", Microsoft Systems Journal, vol. 6, No. 6, Nov./Dec. 1991, pp. 29-58.
Haoui et al., "Embedded Coding of Speech: A Vector Quantization Approach", (Proceedings of the IEEE International Acoustics, Speech and Signal Processing Conference, Mar. 1985), as reprinted in Vector Quantization (IEEE Press, 1990), 1990, pp. 297-299.
Hartson et al., "Advances in Human-Computer Interaction", Chapters 1, 5, and 6, vol. 3, 1992, 121 pages.
Heger et al., "KNOWBOT: An Adaptive Data Base Interface", Nuclear Science and Engineering, V. 107, No. 2, Feb. 1991, pp. 142-157.
Hendrix et al., "The Intelligent Assistant: Technical Considerations Involved in Designing Q&A's Natural-Language Interface", Byte Magazine, Issue 14, Dec. 1987, 1 page.
Heyer et al., "Exploring Expression Data: Identification and Analysis of Coexpressed Genes", Genome Research, vol. 9, 1999, pp. 1106-1115.
Hill, R. D., "Some Important Features and Issues in User Interface Management System", Dynamic Graphics Project, University of Toronto, CSRI, vol. 21, No. 2, Apr. 1987, pp. 116-120.
Hinckley et al., "A Survey of Design Issues in Spatial Input", UIST '94 Proceedings of the 7th Annual ACM Symposium on User Interface Software and Technology, 1994, pp. 213-222.
Hiroshi, "TeamWork Station: Towards a Seamless Shared Workspace", NTT Human Interface Laboratories, CSCW 90 Proceedings, Oct. 1990, pp. 13-26.
Holmes, "Speech System and Research", 1955, pp. 129-135, 152-153.
Hon et al., "Towards Large Vocabulary Mandarin Chinese Speech Recognition", Conference on Acoustics, Speech, and Signal Processing, ICASSP-94, IEEE International, vol. 1, Apr. 1994, pp. 545-548.
Hopper, Andy, "Pandora—An Experimental System for Multimedia Applications", Olivetti Research Laboratory, Apr. 1990, pp. 19-34.
Howard, John H., "(Abstract) An Overview of the Andrew File System", Information Technology Center, Carnegie Mellon University; (CMU-ITC-88-062) to Appear in a future issue of the ACM Transactions on Computer Systems, 1988, pp. 1-6.
Huang et al., "Real-Time Software-Based Video Coder for Multimedia Communication Systems", Department of Computer Science and Information Engineering, 1993, 10 pages.
Hukin, R. W., "Testing an Auditory Model by Resynthesis", European Conference on Speech Communication and Technology, Sep. 26-29, 1989, pp. 243-246.
Hunt, "Unit Selection in a Concatenative Speech Synthesis System Using a Large Speech Database", Copyright 1996 IEEE. "To appear

(56) References Cited

OTHER PUBLICATIONS in Proc. ICASSP-96, May 7-10, Atlanta, GA" ATR Interpreting Telecommunications Research Labs, Kyoto Japan, 1996, pp. 373-376.
IBM, "Why Buy: ThinkPad", available at <http://www.pc.ibm.com/us/thinkpad/easeofuse.html>, retrieved on Dec. 19, 2002, 2 pages.
IBM Corporation, "Simon Says Here's How", Users Manual, 1994, 3 pages.
IChat AV, "Video Conferencing for the Rest of Us", Apple—Mac OS X—iChat AV, available at <http://www.apple.com/macosx/features/ichat/>, retrieved on Apr. 13, 2006, 3 pages.
IPhone Hacks, "Native iPhone MMS Application Released", available at <http://www.iphonehacks.com/2007/12/iPhone-mms-app.html>, retrieved on Dec. 25, 2007, 5 pages.
IPhonechat, "iChat for iPhone in JavaScript", available at <http://www.publictivity.com/iPhoneChat/>, retrieved on Dec. 25, 2007, 2 pages.
Jabra, "Bluetooth Headset: User Manual", 2005, 17 pages.
Alfred App, 2011, http://www.alfredapp.com/, 5 pages.
Ambite, JL., et al., "Design and Implementation of the CALO Query Manager," Copyright @ 2006, American Association for Artificial Intelligence, (www.aaai.org), 8 pages.
Ambite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.
Belvin, R. et al., "Development of the HRL Route Navigation Dialogue System," 2001, In Proceedings of the First International Conference on Human Language Technology Research, Paper, Copyright © 2001 HRL Laboratories, LLC, http://citeseerx.ist.psu.edu/viewdoc/summary?doi=10.1.1.10.6538, 5 pages.
Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.
Bussler, C., et al., "Web Service Execution Environment (WSMX)," Jun. 3, 2005, W3C Member Submission, http://www.w3.org/Submission/WSMX, 29 pages.
Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.
Chen, Y., "Multimedia Siri Finds and Plays Whatever You Ask for," Feb. 9, 2012, http://www.psfk.com/2012/02/multimedia-siri.html, 9 pages.
Cheyer, A., "About Adam Cheyer," Sep. 17, 2012, http://www.adam.cheyer.com/about.html, 2 pages.
Cheyer, A., "A Perspective on AI & Agent Technologies for SCM," VerticalNet, 2001 presentation, 22 pages.
Cheyer, A. et al., "Spoken Language and Multimodal Applications for Electronic Realties," © Springer-Verlag London Ltd, Virtual Reality 1999, 3:1-15, 15 pages.
Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.
Domingue, J., et al., "Web Service Modeling Ontology (WSMO)—An Ontology for Semantic Web Services," Jun. 9-10, 2005, position paper at the W3C Workshop on Frameworks for Semantics in Web Services, Innsbruck, Austria, 6 pages.
Elio, R. et al., "On Abstract Task Models and Conversation Policies," http://webdocs.cs.ualberta.ca/~ree/publications/papers2/ATS.AA99.pdf, May 1999, 10 pages.
Ericsson, S. et al., "Software illustrating a unified approach to multimodality and multilinguality in the in-home domain," Dec. 22, 2006, Talk and Look: Tools for Ambient Linguistic Knowledge, http://www.talk-project.eurice.eu/fileadmin/talk/publications_public/deliverables_public/D1_6.pdf, 127 pages.
Evi, "Meet Evi: the one mobile app that provides solutions for your everyday problems," Feb. 8, 2012, http://www.evi.com/, 3 pages.
Feigenbaum, E., et al., "Computer-assisted Semantic Annotation of Scientific Life Works," 2007, http://tomgruber.org/writing/stanford-cs300.pdf, 22 pages.
Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.
Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.
Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.
Glass, A., "Explaining Preference Learning," 2006, http://cs229.stanford.edu/proj2006/Glass-ExplainingPreferenceLearning.pdf, 5 pages.
Glass, J., et al., "Multilingual Spoken-Language Understanding in the MIT Voyager System," Aug. 1995, http://groups.csail.mit.edu/sls/publications/1995/speechcomm95-voyager.pdf, 29 pages.
Goddeau, D., et al., "A Form-Based Dialogue Manager for Spoken Language Applications," Oct. 1996, http://phasedance.com/pdf/icslp96.pdf, 4 pages.
Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.
Gruber, T. R., et al., "An Ontology for Engineering Mathematics," In Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.
Gruber, T. R., "A Translation Approach to Portable Ontology Specifications," Knowledge Systems Laboratory, Stanford University, Sep. 1992, Technical Report KSL 92-71, Revised Apr. 1993, 27 pages.
Gruber, T. R., "Automated Knowledge Acquisition for Strategic Knowledge," Knowledge Systems Laboratory, Machine Learning, 4, 293-336 (1989), 44 pages.
Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.
Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.
Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.
Gruber, T. R., "Collective Knowledge Systems: Where the Social Web meets the Semantic Web," Web Semantics: Science, Services and Agents on the World Wide Web (2007), doi:10.1016/j.websem.2007.11.011, keynote presentation given at the 5th International Semantic Web Conference, Nov. 7, 2006, 19 pages.
Gruber, T. R., "Despite our Best Efforts, Ontologies are not the Problem," AAAI Spring Symposium, Mar. 2008, http://tomgruber.org/writing/aaai-ss08.htm, 40 pages.
Gruber, T. R., "Enterprise Collaboration Management with Intraspect," Intraspect Software, Inc., Instraspect Technical White Paper Jul. 2001, 24 pages.
Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.
Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.

(56) References Cited

OTHER PUBLICATIONS

Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.
Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.
Gruber, T. R., Interactive Acquisition of Justifications: Learning "Why" by Being Told "What" Knowledge Systems Laboratory, Stanford University, Oct. 1990, Technical Report KSL 91-17, Revised Feb. 1991, 24 pages.
Gruber, T. R., "It is What it Does: The Pragmatics of Ontology for Knowledge Sharing," (c) 2000, 2003, http://www.cidoc-crm.org/docs/symposium_presentations/gruber_cidoc-ontology-2003.pdf, 21 pages.
Gruber, T. R., et al., "Machine-generated Explanations of Engineering Models: A Compositional Modeling Approach," (1993) In Proc. International Joint Conference on Artificial Intelligence, http://citeseerx.ist.psu.edu/viewdoc/summary?doi=10.1.1.34.930, 7 pages.
Gruber, T. R., "2021: Mass Collaboration and the Really New Economy," TNTY Futures, the newsletter of the Next Twenty Years series, vol. 1, Issue 6, Aug. 2001, http://www.tnty.com/newsletter/futures/archive/v01-05business.html, 5 pages.
Gruber, T. R., et al.,"NIKE: A National Infrastructure for Knowledge Exchange," Oct. 1994, http://www.eit.com/papers/nike/nike.html and nike.ps, 10 pages.
Gruber, T. R., "Ontologies, Web 2.0 and Beyond," Apr. 24, 2007, Ontology Summit 2007, http://tomgruber.org/writing/ontolog-social-web-keynote.pdf, 17 pages.
Gruber, T. R., "Ontology of Folksonomy: A Mash-up of Apples and Oranges," Originally published to the web in 2005, Int'l Journal on Semantic Web & Information Systems, 3(2), 2007, 7 pages.
Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.
Gruber, T. R., "TagOntology," Presentation to Tag Camp, www.tagcamp.org, Oct. 29, 2005, 20 pages.
Gruber, T. R., et al., "Toward a Knowledge Medium for Collaborative Product Development," In Artificial Intelligence in Design 1992, from Proceedings of the Second International Conference on Artificial Intelligence in Design, Pittsburgh, USA, Jun. 22-25, 1992, 19 pages.
Gruber, T. R., "Toward Principles for the Design of Ontologies Used for Knowledge Sharing," In International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.
Gruber, T. R., "Where the Social Web meets the Semantic Web," Presentation at the 5th International Semantic Web Conference, Nov. 7, 2006, 38 pages.
Guzzoni, D., et al., "A Unified Platform for Building Intelligent Web Interaction Assistants," Proceedings of the 2006 IEEE/WIC/ACM International Conference on Web Intelligence and Intelligent Agent Technology, Computer Society, 4 pages.
Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.
Guzzoni, D., et al., "Active, A Tool for Building Intelligent User Interfaces," ASC 2007, Palma de Mallorca, http://lsro.epfl.ch/page-34241.html, 6 pages.
Guzzoni, D., et al., "Active, A Platform for Building Intelligent Operating Rooms," Surgetica 2007 Computer-Aided Medical Interventions: tools and applications, pp. 191-198, Paris, 2007, Sauramps Médical, http://lsro.epfl.ch/page-68384-en.html, 8 pages.
Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.
Intraspect Software, "The Intraspect Knowledge Management Solution: Technical Overview," http://tomgruber.org/writing/intraspect-whitepaper-1998.pdf, 18 pages.
Julia, L., et al.,Un éditeur interactif de tableaux dessinés à main levée (An Interactive Editor for Hand-Sketched Tables), Traitement du Signal 1995, vol. 12, No. 6, 8 pages. No English Translation Available.
Karp, P. D., "A Generic Knowledge-Base Access Protocol," May 12, 1994, http://lecture.cs.buu.ac.th/~f50353/Document/gfp.pdf, 66 pages.
Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.
Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.
Lieberman, H., et al., "Out of context: Computer systems that adapt to, and learn from, context," 2000, IBM Systems Journal, vol. 39, Nos. 3/4, 2000, 16 pages.
Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.
Martin, D., et al., "The Open Agent Architecture: A Framework for building distributed software systems," Jan.-Mar. 1999, Applied Artificial Intelligence: An International Journal, vol. 13, No. 1-2, http://adam.cheyer.com/papers/oaa.pdf, 38 pages.
McGuire, J., et al., "SHADE: Technology for Knowledge-Based Collaborative Engineering," 1993, Journal of Concurrent Engineering: Applications and Research (CERA), 18 pages.
Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.
Milward, D., et al., "D2.2: Dynamic Multimodal Interface Reconfiguration," Talk and Look: Tools for Ambient Linguistic Knowledge, Aug. 8, 2006, http://www.ihmc.us/users/nblaylock/Pubs/Files/talk_d2.2.pdf, 69 pages.
Mitra, P., et al., "A Graph-Oriented Model for Articulation of Ontology Interdependencies," 2000, http://ilpubs.stanford.edu:8090/442/1/2000-20.pdf, 15 pages.
Moran, D. B., et al., "Multimodal User Interfaces in the Open Agent Architecture," Proc. of the 1997 International Conference on Intelligent User Interfaces (I UI97), 8 pages.
Mozer, M., "An Intelligent Environment Must be Adaptive," Mar./Apr. 1999, IEEE Intelligent Systems, 3 pages.
Mühlhäuser, M., "Context Aware Voice User Interfaces for Workflow Support," Darmstadt 2007, http://tuprints.ulb.tu-darmstadt.de/876/1/PhD.pdf, 254 pages.
Naone, E., "TR10: Intelligent Software Assistant," Mar.-Apr. 2009, Technology Review, http://www.technologyreview.com/printer_friendly_article.aspx?id=22117, 2 pages.
Neches, R., "Enabling Technology for Knowledge Sharing," Fall 1991, AI Magazine, pp. 37-56, (21 pages).
Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.
Notice of Allowance dated Feb. 29, 2012, received in U.S. Appl. No. 11/518,292, 29 pages (Cheyer).
Final Office Action dated May 10, 2011, received in U.S. Appl. No. 11/518,292, 14 pages (Cheyer).
Office Action dated Nov. 24, 2010, received in U.S. Appl. No. 11/518,292, 12 pages (Cheyer).
Office Action dated Nov. 9, 2009, received in U.S. Appl. No. 11/518,292, 10 pages (Cheyer).
Australian Office Action dated Nov. 13, 2012 for Application No. 2011205426, 7 pages.

(56) References Cited

OTHER PUBLICATIONS

Australian Office Action dated Oct. 31, 2012 for Application No. 2012101191, 6 pages.
EP Communication under Rule-161(2) and 162 EPC for Application No. 117079392.2-2201, 4 pages.
*Phoenix Solutions, Inc.* v. *West Interactive Corp.*, Document 40, Declaration of Christopher Schmandt Regarding the MIT Galaxy System dated Jul. 2, 2010, 162 pages.
Rice, J., et al., "Monthly Program: Nov. 14, 1995," The San Francisco Bay Area Chapter of ACM SIGCHI, http://www.baychi.org/calendar/19951114/, 2 pages.
Rice, J., et al., "Using the Web Instead of a Window System," Knowledge Systems Laboratory, Stanford University, (http://tomgruber.org/writing/ksl-95-69.pdf, Sep. 1995.) CHI '96 Proceedings: Conference on Human Factors in Computing Systems, Apr. 13-18, 1996, Vancouver, BC, Canada, 14 pages.
Rivlin, Z., et al., "Maestro: Conductor of Multimedia Analysis Technologies," 1999 SRI International, Communications of the Association for Computing Machinery (CACM), 7 pages.
Roddy, D., et al., "Communication and Collaboration in a Landscape of B2B eMarketplaces," VerticalNet Solutions, white paper, Jun. 15, 2000, 23 pages.
Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16...rep . . . , 4 pages.
Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.
Simonite, T., "One Easy Way to Make Siri Smarter," Oct. 18, 2011, Technology Review, http://www.technologyreview.com/printer_friendly_article.aspx?id=38915, 2 pages.
Stent, A., et al., "The CommandTalk Spoken Dialogue System," 1999, http://acl.ldc.upenn.edu/P/P99/P99-1024.pdf, 8 pages.
Tofel, K., et al., "SpeakTolt: A personal assistant for older iPhones, iPads," Feb. 9, 2012, http://gigaom.com/apple/speaktoit-siri-for-older-iphones-ipads/, 7 pages.
Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.
Tur, G., et al., "The-CALO-Meeting-Assistant System," IEEE Transactions on Audio, Speech, and Language Processing, vol. 18, No. 6, Aug. 2010, 11 pages.
Tur, G., et al., "The CALO Meeting Speech Recognition and Understanding System," 2008, Proc. IEEE Spoken Language Technology Workshop, 4 pages.
Vlingo, "Vlingo Launches Voice Enablement Application on Apple App Store," Vlingo press release dated Dec. 3, 2008, 2 pages.
Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.
YouTube, "Knowledge Navigator," 5:34 minute video uploaded to YouTube by Knownav on Apr. 29, 2008, http://www.youtube.com/watch?v=QRH8eimU_20, 1 page.
YouTube,"Send Text, Listen to and Send E-Mail 'By Voice' www.voiceassist.com," 2:11 minute video uploaded to YouTube by VoiceAssist on Jul 30, 2009, http://www.youtube.com/watch?v=0tEU61nHHA4, 1 page.
YouTube,"Text'nDrive App Demo—Listen and Reply to your Messages by Voice while Driving!," 1:57 minute video uploaded to YouTube by TextnDrive on Apr 27, 2010, http://www.youtube.com/watch?v=WaGfzoHsAMw, 1 page.
YouTube, "Voice on the Go (BlackBerry)," 2:51 minute video uploaded to YouTube by VoiceOnTheGo on Jul. 27, 2009, http://www.youtube.com/watch?v=pJqpVVgQS98w, 1 page.
Zue, V., "Conversational Interfaces: Advances and Challenges," Sep. 1997, http://www.cs.cmu.edu/~dod/papers/zue97.pdf, 10 pages.
Zue, V. W., "Toward Systems that Understand Spoken Language," Feb. 1994, ARPA Strategic Computing Institute, © 1994 IEEE, 9 pages.
International Search Report and Written Opinion dated Nov. 29, 2011, received in International Application No. PCT/US2011/20861, which corresponds to U.S. Appl. No. 12/987,982, 15 pages (Thomas Robert Gruber).
Agnäs, MS., et al., "Spoken Language Translator: First-Year Report," Jan. 1994, SICS (ISSN 0283-3638), SRI and Telia Research AB, 161 pages.
Allen, J., "Natural Language Understanding," 2nd Edition, Copyright © 1995 by The Benjamin/Cummings Publishing Company, Inc., 671 pages.
Alshawi, H., et al., "CLARE: A Contextual Reasoning and Cooperative Response Framework for the Core Language Engine," Dec. 1992, SRI International, Cambridge Computer Science Research Centre, Cambridge, 273 pages.
Alshawi, H., et al., "Declarative Derivation of Database Queries from Meaning Representations," Oct. 1991, Proceedings of the BANKAI Workshop on Intelligent Information Access, 12 pages.
Alshawi H., et al., "Logical Forms in the Core Language Engine," 1989, Proceedings of the 27th Annual Meeting of the Association for Computational Linguistics, 8 pages.
Alshawi, H., et al., "Overview of the Core Language Engine," Sep. 1988, Proceedings of Future Generation Computing Systems, Tokyo, 13 pages.
Alshawi, H., "Translation and Monotonic Interpretation/Generation," Jul. 1992, SRI International, Cambridge Computer Science Research Centre, Cambridge, 18 pages, http://www.cam.sri.com/tr/crc024/paper.ps.Z 1992.
Appelt, D., et al., "Fastus: A Finite-state Processor for Information Extraction from Real-world Text," 1993, Proceedings of IJCAI, 8 pages.
Appelt, D., et al., "SRI: Description of the JV-FASTUS System Used for MUC-5," 1993, SRI International, Artificial Intelligence Center, 19 pages.
Appelt, D., et al., SRI International Fastus System MUC-6 Test Results and Analysis, 1995, SRI International, Menlo Park, California, 12 pages.
Archbold, A., et al., "A Team User's Guide," Dec. 21, 1981, SRI International, 70 pages.
Bear, J., et al., "A System for Labeling Self-Repairs in Speech," Feb. 22, 1993, SRI International, 9 pages.
Bear, J., et al., "Detection and Correction of Repairs in Human-Computer Dialog," May 5, 1992, SRI International, 11 pages.
Bear, J., et al., "Integrating Multiple Knowledge Sources for Detection and Correction of Repairs in Human-Computer Dialog," 1992, Proceedings of the 30th annual meeting on Association for Computational Linguistics (ACL), 8 pages.
Bear, J., et al., "Using Information Extraction to Improve Document Retrieval," 1998, SRI International, Menlo Park, California, 11 pages.
Berry, P., et al., "Task Management under Change and Uncertainty Constraint Solving Experience with the CALO Project," 2005, Proceedings of CP'05 Workshop on Constraint Solving under Change, 5 pages.
Bobrow, R. et al., "Knowledge Representation for Syntactic/Semantic Processing," From: AAA-80 Proceedings. Copyright © 1980, AAAI, 8 pages.
Bouchou, B., et al., "Using Transducers in Natural Language Database Query," Jun. 17-19, 1999, Proceedings of 4th International Conference on Applications of Natural Language to Information Systems, Austria, 17 pages.
Bratt, H., et al., "The SRI Telephone-based ATIS System," 1995, Proceedings of ARPA Workshop on Spoken Language Technology, 3 pages.
Burke, R., et al., "Question Answering from Frequently Asked Question Files," 1997, AI Magazine, vol. 18, No. 2, 10 pages.
Burns, A., et al., "Development of a Web-Based Intelligent Agent for the Fashion Selection and Purchasing Process via Electronic Commerce," Dec. 31, 1998, Proceedings of the Americas Conference on Information system (AMCIS), 4 pages.

(56) References Cited

OTHER PUBLICATIONS

Carter, D., "Lexical Acquisition in the Core Language Engine," 1989, Proceedings of the Fourth Conference of the European Chapter of the Association for Computational Linguistics, 8 pages.
Carter, D., et al., "The Speech-Language Interface in the Spoken Language Translator," Nov. 23, 1994, SRI International, 9 pages.
Chai, J., et al., "Comparative Evaluation of a Natural Language Dialog Based System and a Menu Driven System for Information Access: a Case Study," Apr. 2000, Proceedings of the International Conference on Multimedia Information Retrieval (RIAO), Paris, 11 pages.
Cheyer, A., et al., "Multimodal Maps: An Agent-based Approach," International Conference on Cooperative Multimodal Communication, 1995, 15 pages.
Cheyer, A., et al., "The Open Agent Architecture," Autonomous Agents and Multi-Agent systems, vol. 4, Mar. 1, 2001, 6 pages.
Cheyer, A., et al., "The Open Agent Architecture: Building communities of distributed software agents" Feb. 21, 1998, Artificial Intelligence Center SRI International, Power Point presentation, downloaded from http://www.ai.sri.com/~oaa/, 25 pages.
Codd, E. F., "Databases: Improving Usability and Responsiveness—'How About Recently'," Copyright © 1978, by Academic Press, Inc., 28 pages.
Cohen, P.R., et al., "An Open Agent Architecture," 1994, 8 pages. http://citeseerx.ist.psu.edu/viewdoc/summary?doi=10.1.1.30.480.
Coles, L. S., et al., "Chemistry Question-Answering," Jun. 1969, SRI International, 15 pages.
Coles, L. S., "Techniques for Information Retrieval Using an Inferential Question-Answering System with Natural-Language Input," Nov. 1972, SRI International, 198 Pages.
Coles, L. S., "The Application of Theorem Proving to Information Retrieval," Jan. 1971, SRI International, 21 pages.
Constantinides, P., et al., "A Schema Based Approach to Dialog Control," 1998, Proceedings of the International Conference on Spoken Language Processing, 4 pages.
Craig, J., et al., "Deacon: Direct English Access and Control," Nov. 7-10, 1966 AFIPS Conference Proceedings, vol. 19, San Francisco, 18 pages.
Dar, S., et al., "DTL's DataSpot: Database Exploration Using Plain Language," 1998 Proceedings of the 24th VLDB Conference, New York, 5 pages.
Decker, K., et al., "Designing Behaviors for Information Agents," The Robotics Institute, Carnegie-Mellon University, paper, Jul. 6, 1996, 15 pages.
Decker, K., et al., "Matchmaking and Brokering," The Robotics Institute, Carnegie-Mellon University, paper, May 16, 1996, 19 pages.
Dowding, J., et al., "Gemini: A Natural Language System for Spoken-Language Understanding," 1993, Proceedings of the Thirty-First Annual Meeting of the Association for Computational Linguistics, 8 pages.
Dowding, J., et al., "Interleaving Syntax and Semantics in an Efficient Bottom-Up Parser," 1994, Proceedings of the 32nd Annual Meeting of the Association for Computational Linguistics, 7 pages.
Epstein, M., et al., "Natural Language Access to a Melanoma Data Base," Sep. 1978, SRI International, 7 pages.
Exhibit 1, "Natural Language Interface Using Constrained Intermediate Dictionary of Results," Classes/Subclasses Manually Reviewed for the Search of U.S. Pat. No. 7,177,798, Mar. 22, 2013, 1 page.
Exhibit 1, "Natural Language Interface Using Constrained Intermediate Dictionary of Results," List of Publications Manually reviewed for the Search of U.S. Pat. No. 7,177,798, Mar. 22, 2013, 1 page.
Ferguson, G., et al., "TRIPS: An Integrated Intelligent Problem-Solving Assistant," 1998, Proceedings of the Fifteenth National Conference on Artificial Intelligence (AAAI-98) and Tenth Conference on Innovative Applications of Artificial Intelligence (IAAI-98), 7 pages.
Fikes, R., et al., "A Network-based knowledge Representation and its Natural Deduction System," Jul. 1977, SRI International, 43 pages.
Garnbäck, B., et al., "The Swedish Core Language Engine," 1992 NOTEX Conference, 17 pages.
Glass, J., et al., "Multilingual Language Generation Across Multiple Domains," Sep. 18-22, 1994, International Conference on Spoken Language Processing, Japan, 5 pages.
Green, C. "The Application of Theorem Proving to Question-Answering Systems," Jun. 1969, SRI Stanford Research Institute, Artificial Intelligence Group, 169 pages.
Gregg, D. G., "DSS Access on the WWW: An Intelligent Agent Prototype," 1998 Proceedings of the Americas Conference on Information Systems-Association for Information Systems, 3 pages.
Grishman, R., "Computational Linguistics: An Introduction," © Cambridge University Press 1986, 172 pages.
Grosz, B. et al., "Dialogic: A Core Natural-Language Processing System," Nov. 9, 1982, SRI International, 17 pages.
Grosz, B. et al., "Research on Natural-Language Processing at SRI," Nov. 1981, SRI International, 21 pages.
Grosz, B., et al., "TEAM: An Experiment in the Design of Transportable Natural-Language Interfaces," Artificial Intelligence, vol. 32, 1987, 71 pages.
Grosz, B., "Team: A Transportable Natural-Language Interface System," 1983, Proceedings of the First Conference on Applied Natural Language Processing, 7 pages.
Guida, G., et al., "NLI: A Robust Interface for Natural Language Person-Machine Communication," Int. J. Man-Machine Studies, vol. 17, 1982, 17 pages.
Guzzoni, D., et al., "Active, A platform for Building Intelligent Software," Computational Intelligence 2006, 5 pages. http://www.informatik.uni-trierde/~ley/pers/hd/g/Guzzoni:Didier.
Guzzoni, D., "Active: A unified platform for building intelligent assistant applications," Oct. 25, 2007, 262 pages.
Guzzoni, D., et al., "Many Robots Make Short Work," 1996 AAAI Robot Contest, SRI International, 9 pages.
Haas, N., et al., "An Approach to Acquiring and Applying Knowledge," Nov. 1980, SRI International, 22 pages.
Hadidi, R., et al., "Students' Acceptance of Web-Based Course Offerings: An Empirical Assessment," 1998 Proceedings of the Americas Conference on Information Systems (AMCIS), 4 pages.
Hawkins, J., et al., "Hierarchical Temporal Memory: Concepts, Theory, and Terminology," Mar. 27, 2007, Numenta, Inc., 20 pages.
He, Q., et al., "Personal Security Agent: KQML-Based PKI," The Robotics Institute, Carnegie-Mellon University, paper, Oct. 1, 1997, 14 pages.
Hendrix, G. et al., "Developing a Natural Language Interface to Complex Data," ACM Transactions on Database Systems, vol. 3, No. 2, Jun. 1978, 43 pages.
Hendrix, G., "Human Engineering for Applied Natural Language Processing," Feb. 1977, SRI International, 27 pages.
Hendrix, G., "Klaus: A System for Managing Information and Computational Resources," Oct. 1980, SRI International, 34 pages.
Hendrix, G., "Lifer: A Natural Language Interface Facility," Dec. 1976, SRI Stanford Research Institute, Artificial Intelligence Center, 9 pages.
Hendrix, G., "Natural-Language Interface," Apr.-Jun. 1982, American Journal of Computational Linguistics, vol. 8, No. 2, 7 pages.
Hendrix, G., "The Lifer Manual: A Guide to Building Practical Natural Language Interfaces," Feb. 1977, SRI International, 76 pages.
Hendrix, G., et al., "Transportable Natural-Language Interfaces to Databases," Apr. 30, 1981, SRI International, 18 pages.
Hirschman, L., et al., "Multi-Site Data Collection and Evaluation in Spoken Language Understanding," 1993, Proceedings of the workshop on Human Language Technology, 6 pages.
Hobbs, J., et al., "Fastus: A System for Extracting Information from Natural-Language Text," Nov. 19, 1992, SRI International, Artificial Intelligence Center, 26 pages.
Hobbs, J., et al.,"Fastus: Extracting Information from Natural-Language Texts," 1992, SRI International, Artificial Intelligence Center, 22 pages.

(56) References Cited

OTHER PUBLICATIONS

Hobbs, J., "Sublanguage and Knowledge," Jun. 1984, SRI International, Artificial Intelligence Center, 30 pages.
Hodjat, B., et al., "Iterative Statistical Language Model Generation for Use with an Agent-Oriented Natural Language Interface," vol. 4 of the Proceedings of HCI International 2003, 7 pages.
Huang, X., et al., "The SPHINX-II Speech Recognition System: An Overview," Jan. 15, 1992, Computer, Speech and Language, 14 pages.
Issar, S., et al., "CMU's Robust Spoken Language Understanding System," 1993, Proceedings of Eurospeech, 4 pages.
Issar, S., "Estimation of Language Models for New Spoken Language Applications," Oct. 3-6, 1996, Proceedings of 4th International Conference on Spoken language Processing, Philadelphia, 4 pages.
Janas, J., "The Semantics-Based Natural Language Interface to Relational Databases," © Springer-Verlag Berlin Heidelberg 1986, Germany, 48 pages.
Johnson, J., "A Data Management Strategy for Transportable Natural Language Interfaces," Jun. 1989, doctoral thesis submitted to the Department of Computer Science, University of British Columbia, Canada, 285 pages.
Julia, L., et al., "http://www.speech.sri.com/DEMOS/ATIS.html," 1997, Proceedings of AAAI, Spring Symposium, 5 pages.
Kahn, M., et al., "CoABS Grid Scalability Experiments," 2003, Autonomous Agents and Multi-Agent Systems, vol. 7, 8 pages.
Kamel, M., et al., "A Graph Based Knowledge Retrieval System," © 1990 IEEE, 7 pages.
Katz, B., "Annotating the World Wide Web Using Natural Language," 1997, Proceedings of the 5th RIAO Conference on Computer Assisted Information Searching on the Internet, 7 pages.
Katz, B., "A Three-Step Procedure for Language Generation," Dec. 1980, Massachusetts Institute of Technology, Artificial Intelligence Laboratory, 42 pages.
Kats, B., et al., "Exploiting Lexical Regularities in Designing Natural Language Systems," 1988, Proceedings of the 12th International Conference on Computational Linguistics, Coling'88, Budapest, Hungary, 22 pages.
Katz, B., et al., "REXTOR: A System for Generating Relations from Natural Language," In Proceedings of the ACL Oct. 2000 Workshop on Natural Language Processing and Information Retrieval (NLP &IR), 11 pages.
Katz, B., "Using English for Indexing and Retrieving," 1988 Proceedings of the 1st RIAO Conference on User-Oriented Content-Based Text and Image (RIAO'88), 19 pages.
Konolige, K., "A Framework for a Portable Natural-Language Interface to Large Data Bases," Oct. 12, 1979, SRI International, Artificial Intelligence Center, 54 pages.
Laird, J., et al., "SOAR: An Architecture for General Intelligence," 1987, Artificial Intelligence vol. 33, 64 pages.
Langly, P., et al.,"A Design for the Icarus Architechture," SIGART Bulletin, vol. 2, No. 4, 6 pages.
Larks, "Intelligent Software Agents: Larks," 2006, downloaded on Mar. 15, 2013 from http://www.cs.cmu.edu/larks.html, 2 pages.
Martin, D., et al., "Building Distributed Software Systems with the Open Agent Architecture," Mar. 23-25, 1998, Proceedings of the Third International Conference on the Practical Application of Intelligent Agents and Multi-Agent Technology, 23 pages.
Martin, D., et al., "Development Tools for the Open Agent Architecture," Apr. 1996, Proceedings of the International Conference on the Practical Application of Intelligent Agents and Multi-Agent Technology, 17 pages.
Martin, D., et al., "Information Brokering in an Agent Architecture," Apr. 1997, Proceedings of the second International Conference on the Practical Application of Intelligent Agents and Multi-Agent Technology, 20 pages.
Martin, D., et al., "PAAM '98 Tutorial: Building and Using Practical Agent Applications," 1998, SRI International, 78 pages.
Martin, P., et al., "Transportability and Generality in a Natural-Language Interface System," Aug. 8-12, 1983, Proceedings of the Eight International Joint Conference on Artificial Intelligence, West Germany, 21 pages.
Matiasek, J., et al., "Tamic-P: A System for NL Access to Social Insurance Database," Jun. 17-19, 1999, Proceeding of the 4th International Conference on Applications of Natural Language to Information Systems, Austria, 7 pages.
Michos, S.E., et al., "Towards an adaptive natural language interface to command languages," Natural Language Engineering 2 (3), © 1994 Cambridge University Press, 19 pages.
Milstead, J., et al., "Metadata: Cataloging by Any Other Name . . . " Jan. 1999, Online, Copyright © 1999 Information Today, Inc., 18 pages.
Minker, W., et al., "Hidden Understanding Models for Machine Translation," 1999, Proceedings of ETRW on Interactive Dialogue in Multi-Modal Systems, 4 pages.
Modi, P. J., et al., "CMRadar: A Personal Assistant Agent for Calendar Management," © 2004, American Association for Artificial Intelligence, Intelligent Systems Demonstrations, 2 pages.
Moore, R., et al., "Combining Linguistic and Statistical Knowledge Sources in Natural-Language Processing for ATIS," 1995, SRI International, Artificial Intelligence Center, 4 pages.
Moore, R., "Handling Complex Queries in a Distributed Data Base," Oct. 8, 1979, SRI International, Artificial Intelligence Center, 38 pages.
Moore, R., "Practical Natural-Language Processing by Computer," Oct. 1981, SRI International, Artificial Intelligence Center, 34 pages.
Moore, R., et al., "SRI's Experience with the ATIS Evaluation," Jun. 24-27, 1990, Proceedings of a workshop held at Hidden Valley, Pennsylvania, 4 pages.
Moore, et al., "The Information Warefare Advisor: An Architecture for Interacting with Intelligent Agents Across the Web," Dec. 31, 1998 Proceedings of Americas Conference on Information Systems (AMCIS), 4 pages.
Moore, R., "The Role of Logic in Knowledge Representation and Commonsense Reasoning," Jun. 1982, SRI International, Artificial Intelligence Center, 19 pages.
Moore, R., "Using Natural-Language Knowledge Sources in Speech Recognition," Jan. 1999, SRI International, Artificial Intelligence Center, 24 pages.
Moran, D., et al., "Intelligent Agent-based User Interfaces," Oct. 12-13, 1995, Proceedings of International Workshop on Human Interface Technology, University of Aizu, Japan, 4 pages. http://www.dougmoran.com/dmoran/PAPERS/oaa-iwhit1995.pdf.
Moran, D., "Quantifier Scoping in the SRI Core Language Engine," 1988, Proceedings of the 26th annual meeting on Association for Computational Linguistics, 8 pages.
Motro, A., "Flex: A Tolerant and Cooperative User Interface to Databases," IEEE Transactions on Knowledge and Data Engineering, vol. 2, No. 2, Jun. 1990, 16 pages.
Murveit, H., et al., "Speech Recognition in SRI's Resource Management and ATIS Systems," 1991, Proceedings of the workshop on Speech and Natural Language (HTL'91), 7 pages.
OAA, "The Open Agent Architecture 1.0 Distribution Source Code," Copyright 1999, SRI International, 2 pages.
Odubiyi, J., et al., "SAIRE—a scalable agent-based information retrieval engine," 1997 Proceedings of the First International Conference on Autonomous Agents, 12 pages.
Owei, V., et al., "Natural Language Query Filtration in the Conceptual Query Language," © 1997 IEEE, 11 pages.
Pannu, A., et al., "A Learning Personal Agent for Text Filtering and Notification," 1996, The Robotics Institute School of Computer Science, Carnegie-Mellon University, 12 pages.
Pereira, "Logic for Natural Language Analysis," Jan. 1983, SRI International, Artificial Intelligence Center, 194 pages.
Perrault, C.R., et al., "Natural-Language Interfaces," Aug. 22, 1986, SRI International, 48 pages.
Pulman, S.G., et al., "Clare: A Combined Language and Reasoning Engine," 1993, Proceedings of JFIT Conference, 8 pages. URL: http://www.cam.sri.com/tr/crc042/paper.ps.Z.

(56) References Cited

OTHER PUBLICATIONS

Ravishankar, "Efficient Algorithms for Speech Recognition," May 15, 1996, Doctoral Thesis submitted to School of Computer Science, Computer Science Division, Carnegie Mellon University, Pittsburg, 146 pages.
Rayner, M., et al., "Adapting the Core Language Engine to French and Spanish," May 10, 1996, Cornell University Library, 9 pages. http://arxiv.org/abs/cmp-Ig/9605015.
Rayner, M., "Abductive Equivalential Translation and its application to Natural Language Database Interfacing," Sep. 1993 Dissertation paper, SRI International, 163 pages.
Rayner, M., et al., "Deriving Database Queries from Logical Forms by Abductive Definition Expansion," 1992, Proceedings of the Third Conference on Applied Natural Language Processing, ANLC'92, 8 pages.
Rayner, M., "Linguistic Domain Theories: Natural-Language Database Interfacing from First Principles," 1993, SRI International, Cambridge, 11 pages.
Rayner, M., et al., "Spoken Language Translation With Mid-90's Technology: A Case Study," 1993, Eurospeech, ISCA, 4 pages. http://dblp.uni-trier.de/db/conf/interspeech/eurospeech1993.html#RaynerBCCDGKKLPPS93.
Rudnicky, A.I., et al., "Creating Natural Dialogs in the Carnegie Mellon Communicator System".
Russell, S., et al., "Artificial Intelligence, A Modern Approach," © 1995 Prentice Hall, Inc., 121 pages.
Sacerdoti, E., et al., "A Ladder User's Guide (Revised)," Mar. 1980, SRI International, Artificial Intelligence Center, 39 pages.
Sagalowicz, D., "A D-Ladder User's Guide," Sep. 1980, SRI International, 42 pages.
Sameshima, Y., et al., "Authorization with security attributes and privilege delegation Access control beyond the ACL," Computer Communications, vol. 20, 1997, 9 pages.
San-Segundo, R., et al., "Confidence Measures for Dialogue Management in the CU Communicator System," Jun. 5-9, 2000, Proceedings of Acoustics, Speech, and Signal Processing (ICASSP'00), 4 pages.
Sato, H., "A Data Model, Knowledge Base, and Natural Language Processing for Sharing a Large Statistical Database," 1989, Statistical and Scientific Database Management, Lecture Notes in Computer Science, vol. 339, 20 pages.
Schnelle, D., "Context Aware Voice User Interfaces for Workflow Support," Aug. 27, 2007, Dissertation paper, 254 pages.
Sharoff, S., et al., "Register-domain Separation as a Methodology for Development of Natural Language Interfaces to Databases," 1999, Proceedings of Human-Computer Interaction (INTERACT'99), 7 pages.
Shimazu, H., et al., "CAPIT: Natural Language Interface Design Tool with Keyword Analyzer and Case-Based Parser," NEC Research & Development, vol. 33, No. 4, Oct. 1992, 11 pages.
Shinkle, L., "Team User's Guide," Nov. 1984, SRI International, Artificial Intelligence Center, 78 pages.
Shklar, L., et al., "Info Harness: Use of Automatically Generated Metadata for Search and Retrieval of Heterogeneous Information," 1995 Proceedings of CAiSE'95, Finland.
Singh, N., "Unifying Heterogeneous Information Models," 1998 Communications of the ACM, 13 pages.
Starr, B., et al., "Knowledge-Intensive Query Processing," May 31, 1998, Proceedings of the 5th KRDB Workshop, Seattle, 6 pages.
Stern, R., et al. "Multiple Approaches to Robust Speech Recognition," 1992, Proceedings of Speech and Natural Language Workshop, 6 pages.
Stickel, "A Nonclausal Connection-Graph Resolution Theorem-Proving Program," 1982, Proceedings of AAAI'82, 5 pages.
Sugumaran, V., "A Distributed Intelligent Agent-Based Spatial Decision Support System," Dec. 31, 1998, Proceedings of the Americas Conference on Information systems (AMCIS), 4 pages.
Sycara, K., et al., "Coordination of Multiple Intelligent Software Agents," International Journal of Cooperative Information Systems (IJCIS), vol. 5, Nos. 2 & 3, Jun. & Sep. 1996, 33 pages.
Sycara, K., et al., "Distributed Intelligent Agents," IEEE Expert, vol. 11, No. 6, Dec. 1996, 32 pages.
Sycara, K., et al., "Dynamic Service Matchmaking Among Agents in Open Information Environments ," 1999, SIGMOD Record, 7 pages.
Sycara, K., et al., "The RETSINA MAS Infrastructure," 2003, Autonomous Agents and Multi-Agent Systems, vol. 7, 20 pages.
Tyson, M., et al., "Domain-Independent Task Specification in the TACITUS Natural Language System," May 1990, SRI International, Artificial Intelligence Center, 16 pages.
Wahlster, W., et al., "Smartkom: multimodal communication with a life-like character," 2001 EUROSPEECH-Scandinavia, 7th European Conference on Speech Communication and Technology, 5 pages.
Waldinger, R., et al., "Deductive Question Answering from Multiple Resources," 2003, New Directions in Question Answering, published by AAAI, Menlo Park, 22 pages.
Walker, D., et al., "Natural Language Access to Medical Text," Mar. 1981, SRI International, Artificial Intelligence Center, 23 pages.
Waltz, D., "An English Language Question Answering System for a Large Relational Database," © 1978 ACM, vol. 21, No. 7, 14 pages.
Ward, W., et al., "A Class Based Language Model for Speech Recognition," © 1996 IEEE, 3 pages.
Ward, W., et al., "Recent Improvements in the CMU Spoken Language Understanding System," 1994, ARPA Human Language Technology Workshop, 4 pages.
Ward, W., "The CMU Air Travel Information Service: Understanding Spontaneous Speech," 3 pages.
Warren, D.H.D., et al., "An Efficient Easily Adaptable System for Interpreting Natural Language Queries," Jul.-Dec. 1982, American Journal of Computational Linguistics, vol. 8, No. 3-4, 11 pages.
Weizenbaum, J., "ELIZA—A Computer Program for the Study of Natural Language Communication Between Man and Machine," Communications of the ACM, vol. 9, No. 1, Jan. 1966, 10 pages.
Winiwarter, W., "Adaptive Natural Language Interfaces to FAQ Knowledge Bases," Jun. 17-19, 1999, Proceedings of 4th International Conference on Applications of Natural Language to Information Systems, Austria, 22 pages.
Wu, X. et al., "KDA: A Knowledge-based Database Assistant," Data Engineering, Feb. 6-10, 1989, Proceeding of the Fifth International Conference on Engineering (IEEE Cat. No. 89CH2695-5), 8 pages.
Yang, J., et al., "Smart Sight: A Tourist Assistant System," 1999 Proceedings of Third International Symposium on Wearable Computers, 6 pages.
Zeng, D., et al., "Cooperative Intelligent Software Agents," The Robotics Institute, Carnegie-Mellon University, Mar. 1995, 13 pages.
Zhao, L., "Intelligent Agents for Flexible Workflow Systems," Oct. 31, 1998 Proceedings of the Americas Conference on Information Systems (AMCIS), 4 pages.
Zue, V., et al., "From Interface to Content: Translingual Access and Delivery of On-Line Information," 1997, EUROSPEECH, 4 pages.
Zue, V., et al., "Jupiter: A Telephone-Based Conversational Interface for Weather Information," Jan. 2000, IEEE Transactions on Speech and Audio Processing, 13 pages.
Zue, V., et al., "Pegasus: A Spoken Dialogue Interface for On-Line Air Travel Planning," 1994 Elsevier, Speech Communication 15 (1994), 10 pages.
Zue, V., et al., "The Voyager Speech Understanding System: Preliminary Development and Evaluation," 1990, Proceedings of IEEE 1990 International Conference on Acoustics, Speech, and Signal Processing, 4 pages.
Extended European Search Report dated Jul. 16, 2013, received in Application No. 12186663.6-1910, which corresponds to U.S. Appl. No. 13/250,854, 8 pages (Gruber).
Final Office Action dated Jun. 13, 2013, received in U.S. Appl. No. 13/251,118, 42 pages (Gruber).
Office Action dated May 23, 2013, received in U.S. Appl. No. 13/784,694, 27 pages (Gruber).
"Interactive Voice", available at <http://www.helloivee.com/company/>, retrieved on Feb. 10, 2014, 2 pages.

(56) References Cited

OTHER PUBLICATIONS

"Meet Ivee, Your Wi-Fi Voice Activated Assistant", available at <http://www.helloivee.com/>, retrieved on Feb. 10, 2014, 8 pages.
"Speaker Recognition", Wikipedia, The Free Enclyclopedia, Nov. 2, 2010, 4 pages.
International Preliminary Report on Patentability received for PCT Patent Application No. PCT/US2012/029810, dated Oct. 3, 2013, 9 pages.
International Search Report and Written Opinion received for PCT Patent Application No. PCT/US2012/029810, dated Aug. 17, 2012, 11 pages.
Agnas et al., "Spoken Language Translator: First-Year Report", SICS (ISSN 0283-3638), SRI and Telia Research AB, Jan. 1994, 161 pages.
Allen, J., "Natural Language Understanding", 2nd Edition, The Benjamin/Cummings Publishing Company, Inc., 1995, 671 pages.
Viegas et al., "Chat Circles", SIGCHI Conference on Human Factors in Computing Systems, May 15-20, 1999, pp. 9-16.
Applebaum et al., "Enhancing the Discrimination of Speaker Independent Hidden Markov Models with Corrective Training", International Conference on Acoustics, Speech, and Signal Processing, May 23, 1989, pp. 302-305.
Bellegarda, Jerome R. "Latent Semantic Mapping", IEEE Signal Processing Magazine, vol. 22, No. 5, Sep. 2005, pp. 70-80.
Bellegarda et al., "Tied Mixture Continuous Parameter Modeling for Speech Recognition", IEEE Transactions on Acoustics, Speech and Signal Processing, vol. 38, No. 12, Dec. 1990, pp. 2033-2045.
Chang et al., "Discriminative Training of Dynamic Programming based Speech Recognizers", IEEE Transactions on Speech and Audio Processing, vol. 1, No. 2, Apr. 1993, pp. 135-143.
Cheyer et al., "Demonstration Video of Multimodal Maps Using an Agent Architecture", published by SRI International no later than 1996, as depicted in Exemplary Screenshots from video entitled 'Demonstration Video of Multimodal Maps Using an Agent Architecture, 1996, 6 pages.
Cheyer et al., "Demonstration Video of Multimodal Maps Using an Open- Agent Architecture", published by SRI International no later than 1996, as depicted in Exemplary Screenshots from video entitled 'Demonstration Video of Multimodal Maps Using an Open-Agent Architecture, 6 pages.
Cheyer, A., "Demonstration Video of Vanguard Mobile Portal", published by SRI International no later than 2004, as depicted in 'Exemplary Screenshots from video entitled Demonstration Video of Vanguard Mobile Portal', 2004, 10 pages.
Choi et al., "Acoustic and Visual Signal based Context Awareness System for Mobile Application", IEEE Transactions on Consumer Electronics, vol. 57, No. 2, May 2011, pp. 738-746.
Kickstarter, "Ivee Sleek: Wi-Fi Voice-Activated Assistant", available at <https://www.kickstarter.com/projects/ivee/ivee-sleek-wi-fi-voice-activated-assistant>, retrieved on Feb. 10, 2014, 13 pages.
Navigli, Roberto, "Word Sense Disambiguation: A Survey", ACM Computing Surveys, vol. 41, No. 2, Feb. 2009, 70 pages.
International Search Report and Written Opinion received for PCT Patent Application No. PCT/US2014/015418, dated Aug. 26, 2014, 17 pages.
Guim, Mark, "How to Set a Person-Based Reminder with Cortana", available at <http://www.wpcentral.com/how-to-person-based-reminder-cortana>, Apr. 26, 2014, 15 pages.
Miller, Chance, "Google Keyboard Updated with New Personalized Suggestions Feature", available at <http://9to5google.com/2014/03/19/google-keyboard-updated-with-new-personalized-suggestions-feature/>, Mar. 19, 2014, 4 pages.
Roddy et al., "Interface Issues in Text Based Chat Rooms", SIGCHI Bulletin, vol. 30, No. 2, Apr. 1998, pp. 119-123.
Bocchieri et al., "Use of Geographical Meta-Data in ASR Language and Acoustic Models", IEEE International Conference on Acoustics Speech and Signal Processing, 2010, pp. 5118-5121.
Davis et al., "A Personal Handheld Multi-Modal Shopping Assistant", IEEE, 2006, 9 pages.
Schnelle, Dirk, "Context Aware Voice User Interfaces for Workflow Support", Dissertation paper, Aug. 27, 2007, 254 pages.
SRI2009, "SRI Speech: Products: Software Development Kits: EduSpeak", available a <http://web.archive.org/web/20090828084033/http://www.speechatsri.com/products/eduspeak> shtml., 2009, 2 pages.
Stent et al., "Geo-Centric Language Models for Local Business Voice Search", AT&T Labs—Research, 2009, pp. 389-396.
Alshawi et al., "CLARE: A Contextual Reasoning and Co-operative Response Framework for the Core Language Engine", SRI International, Cambridge Computer Science Research Centre, Cambridge, Dec. 1992, 273 pages.
Alshawi et al., "Declarative Derivation of Database Queries from Meaning Representations", Proceedings of the BANKAI Workshop on Intelligent Information Access, Oct. 1991, 12 pages.
Alshawi et al., "Logical Forms in the Core Language Engine", Proceedings of the 27th Annual Meeting of the Association for Computational Linguistics, 1989, pp. 25-32.
Alshawi et al., "Overview of the Core Language Engine", Proceedings of Future Generation Computing Systems, Tokyo, 13 pages.
Alshawi, H., "Translation and Monotonic Interpretation/Generation", SRI International, Cambridge Computer Science Research Centre, Cambridge, available at <http://www.cam.sri.com/tr/crc024/paper.ps.Z1992>, Jul. 1992, 18 pages.
Appelt et al., "Fastus: A Finite-State Processor for Information Extraction from Real-world Text", Proceedings of IJCAI, 1993, 8 pages.
Appelt et al., "SRI International Fastus System MUC-6 Test Results and Analysis", SRI International, Menlo Park, California, 1995, 12 pages.
Appelt et al., "SRI: Description of the JV-FASTUS System used for MUC-5", SRI International, Artificial Intelligence Center, 1993, 19 pages.
Chen, Yi, "Multimedia Siri Finds and Plays Whatever You Ask for", PSFK Report, Feb. 9, 2012, 9 pages.
Cheyer, Adam, "A Perspective on AI & Agent Technologies for SCM", VerticalNet Presentation, 2001, 22 pages.
Cheyer, Adam, "About Adam Cheyer", available at <http://www.adam.cheyer.com/about.html>, retrieved on Sep. 17, 2012, 2 pages.
Cheyer et al., "Spoken Language and Multimodal Applications for Electronic Realties", Virtual Reality, vol. 3, 1999, pp. 1-15.
Cutkosky et al., "PACT: An Experiment in Integrating Concurrent Engineering Systems", Journal & Magazines, Computer, vol. 26, No. 1, Jan. 1993, 14 pages.
Domingue et al., "Web Service Modeling Ontology (WSMO)—An Ontology for Semantic Web Services", Position Paper at the W3C Workshop on Frameworks for Semantics in Web Services, Innsbruck, Austria, Jun. 2005, 6 pages.
Elio et al., "On Abstract Task Models and Conversation Policies", Proc. Workshop on Specifying and Implementing Conversation Policies, Autonomous Agents'99 Conference, 1999, pp. 1-10.
Ericsson et al., "Software Illustrating a Unified Approach to Multimodality and Multilinguality in the In-Home Domain", Talk and Look: Tools for Ambient Linguistic Knowledge, Dec. 2006, 127 pages.
Evi, "Meet Evi: The One Mobile Application that Provides Solutions for your Everyday Problems", Feb. 2012, 3 pages.
Feigenbaum et al., "Computer-Assisted Semantic Annotation of Scientific Life Works", Oct. 15, 2007, 22 pages.
Gannes, Liz, "Alfred App Gives Personalized Restaurant Recommendations", AllThingsD, Jul. 18, 2011, pp. 1-3.
Gautier et al., "Generating Explanations of Device Behavior Using Compositional Modeling and Causal Ordering", CiteSeerx, 1993, pp. 89-97.
Gervasio et al., "Active Preference Learning for Personalized Calendar Scheduling Assistance", CiteSeerx, Proceedings of IUI'05, Jan. 2005, pp. 90-97.
Glass, Alyssa, "Explaining Preference Learning", CiteSeerx, 2006, pp. 1-5.
Glass et al., "Multilingual Spoken-Language Understanding in the MIT Voyager System", Available online at <http://groups.csail.mit.edu/sls/publications/1995/speechcomm95-voyager.pdf>, Aug. 1995, 29 pages.

(56) References Cited

OTHER PUBLICATIONS

Scheifler, R. W., "The X Window System", MIT Laboratory for Computer Science and Gettys, Jim Digital Equipment Corporation and MIT Project Athena; ACM Transactions on Graphics, vol. 5, No. 2, Apr. 1986, pp. 79-109.
Schluter et al., "Using Phase Spectrum Information for Improved Speech Recognition Performance", IEEE International Conference on Acoustics, Speech, and Signal Processing, 2001, pp. 133-136.
Schmandt et al., "A Conversational Telephone Messaging System", IEEE Transactions on Consumer Electronics, vol. CE-30, Aug. 1984, pp. xxi-xxiv.
Schmandt et al., "Phone Slave: A Graphical Telecommunications Interface", Society for Information Display, International Symposium Digest of Technical Papers, Jun. 1984, 4 pages.
Schmandt et al., "Phone Slave: A Graphical Telecommunications Interface", Proceedings of the SID, vol. 26, No. 1, 1985, pp. 79-82.
Schmid, H., "Part-of-speech tagging with neural networks", COLING '94 Proceedings of the 15th conference on Computational linguistics—vol. 1, 1994, pp. 172-176.
Schooler et al., "A Packet-switched Multimedia Conferencing System", by Eve Schooler, et al; ACM SIGOIS Bulletin, vol. I, No. 1, Jan. 1989, pp. 12-22.
Schooler et al., "An Architecture for Multimedia Connection Management", Proceedings IEEE 4th Comsoc International Workshop on Multimedia Communications, Apr. 1992, pp. 271-274.
Schooler et al., "Multimedia Conferencing: Has it Come of Age?", Proceedings 24th Hawaii International Conference on System Sciences, vol. 3, Jan. 1991, pp. 707-716.
Schooler et al., "The Connection Control Protocol: Architecture Overview", USC/Information Sciences Institute, Jan. 28, 1992, pp. 1-6.
Schooler, Eve, "A Distributed Architecture for Multimedia Conference Control", ISI Research Report, Nov. 1991, pp. 1-18.
Schooler, Eve M., "Case Study: Multimedia Conference Control in a Packet-Switched Teleconferencing System", Journal of Internetworking: Research and Experience, vol. 4, No. 2, Jun. 1993, pp. 99-120.
Schooler, Eve M., "The Impact of Scaling on a Multimedia Connection Architecture", Multimedia Systems, vol. 1, No. 1, 1993, pp. 2-9.
Schütze, H., "Distributional part-of-speech tagging", EACL '95 Proceedings of the seventh conference on European chapter of the Association for Computational Linguistics, 1995, pp. 141-148.
Schütze, Hinrich, "Part-of-speech induction from scratch", ACL '93 Proceedings of the 31st annual meeting on Association for Computational Linguistics, 1993, pp. 251-258.
Schwartz et al., "Context-Dependent Modeling for Acoustic-Phonetic Recognition of Continuous Speech", IEEE International Conference on Acoustics, Speech, and Signal Processing, vol. 10, Apr. 1985, pp. 1205-1208.
Schwartz et al., "Improved Hidden Markov Modeling of Phonemes for Continuous Speech Recognition", IEEE International Conference on Acoustics, Speech, and Signal Processing, vol. 9, 1984, pp. 21-24.
Schwartz et al., "The N-Best Algorithm: An Efficient and Exact Procedure for Finding the N Most Likely Sentence Hypotheses", IEEE, 1990, pp. 81-84.
Scott et al., "Designing Touch Screen Numeric Keypads: Effects of Finger Size, Key Size, and Key Spacing", Proceedings of the Human Factors and Ergonomics Society 41st Annual Meeting, Oct. 1997, pp. 360-364.
Seagrave, Jim, "A Faster Way to Search Text", EXE, vol. 5, No. 3, Aug. 1990, pp. 50-52.
Sears et al., "High Precision Touchscreens: Design Strategies and Comparisons with a Mouse", International Journal of Man-Machine Studies, vol. 34, No. 4, Apr. 1991, pp. 593-613.
Sears et al., "Investigating Touchscreen Typing: The Effect of Keyboard Size on Typing Speed", Behavior & Information Technology, vol. 12, No. 1, 1993, pp. 17-22.
Sears et al., "Touchscreen Keyboards", Apple Inc., Video Clip, Human-Computer Interaction Laboratory, on a CD, Apr. 1991.
Seide et al., "Improving Speech Understanding by Incorporating Database Constraints and Dialogue History", Proceedings of Fourth International Conference on Philadelphia 1996, pp. 1017-1020.
Shiraki et al., "LPC Speech Coding Based on Variable-Length Segment Quantization", (IEEE Transactions on Acoustics, Speech and Signal Processing, Sep. 1988), as reprinted in Vector Quantization (IEEE Press, 1990), 1990, pp. 250-257.
Shneiderman, Ben, "Designing the User Interface: Strategies for Effective Human-Computer Interaction", Second Edition, 1992, 599 pages.
Shneiderman, Ben, "Designing the User Interface: Strategies for Effective Human-Computer Interaction", Third Edition, 1998, 669 pages.
Shneiderman, Ben, "Direct Manipulation for Comprehensible, Predictable and Controllable User Interfaces", Proceedings of the 2nd International Conference on Intelligent User Interfaces, 1997, pp. 33-39.
Shneiderman, Ben, "Sparks of Innovation in Human-Computer Interaction", 1993, (Table of Contents, Title Page, Ch. 4, Ch. 6 and List of References).
Shneiderman, Ben, "The Eyes Have It: A Task by Data Type Taxonomy for Information Visualizations", IEEE Proceedings of Symposium on Visual Languages, 1996, pp. 336-343.
Shneiderman, Ben, "Touch Screens Now Offer Compelling Uses", IEEE Software, Mar. 1991, pp. 93-94.
Shoham et al., "Efficient Bit and Allocation for an Arbitrary Set of Quantizers", (IEEE Transactions on Acoustics, Speech, and Signal Processing, Sep. 1988) as reprinted in Vector Quantization (IEEE Press, 1990), 1990, pp. 289-296.
Simkovitz, Daniel, "LP-DOS Magnifies the PC Screen", IEEE, 1992, pp. 203-204.
Singh et al., "Automatic Generation of Phone Sets and Lexical Transcriptions", Acoustics, Speech and Signal Processing (ICASSP'00), 2000, 1 page.
Sinitsyn, Alexander, "A Synchronization Framework for Personal Mobile Servers", Proceedings of the Second IEEE Annual Conference on Pervasive Computing and Communications Workshops, Piscataway, 2004, pp. 1, 3 and 5.
Slaney et al., "On the Importance of Time—A Temporal Representation of Sound", Visual Representation of Speech Signals, 1993, pp. 95-116.
Smeaton, Alan F., "Natural Language Processing and Information Retrieval", Information Processing and Management, vol. 26, No. 1, 1990, pp. 19-20.
Smith et al., "Guidelines for Designing User Interface Software", User Lab, Inc., Aug. 1986, pp. 1-384.
Smith et al., "Relating Distortion to Performance in Distortion Oriented Displays", Proceedings of Sixth Australian Conference on Computer-Human Interaction, Nov. 1996, pp. 6-11.
Sony Eiicsson Corporate, "Sony Ericsson to introduce Auto pairing. TM. to Improve Bluetooth.TM. Connectivity Between Headsets and Phones", Press Release, available at <http://www.sonyericsson.com/spg.jsp?cc=global&lc=en&ver=4001&template=pc3_1_ 1&z . . . >, Sep. 28, 2005, 2 pages.
Soong et al., "A High Quality Subband Speech Coder with Backward Adaptive Predictor and Optimal Time-Frequency Bit Assignment", (Proceedings of the IEEE International Acoustics, Speech, and Signal Processing Conference, Apr. 1986), as reprinted in Vector Quantization (IEEE Press, 1990), 1990, pp. 316-319.
Spiller, Karen, "Low-Decibel Earbuds Keep Noise at a Reasonable Level", available at <http://www.nashuatelegraph.com/apps/pbcs.dll/article?Date=20060813&Cate . . . >, Aug. 13, 2006, 3 pages.
Apple Computer, Inc., "Inside Macintosh", vol. VI, 1985.
Srinivas et al., "Monet: A Multi-Media System for Conferencing and Application Sharing in Distributed Systems", CERC Technical Report Series Research Note, Feb. 1992.
Stealth Computer Corporation, "Peripherals for Industrial Keyboards & Pointing Devices", available at <http://www.stealthcomputer.com/peripherals_oem.htm>, retrieved on Dec. 19, 2002, 6 pages.
Steinberg, Gene, "Sonicblue Rio Car (10 GB, Reviewed: 6 GB)", available at <http://electronics.cnet.com/electronics/0-6342420-1304-4098389.htrnl>, Dec. 12, 2000, 2 pages.

(56) References Cited

OTHER PUBLICATIONS

Su, Joseph C., "A Review of Telesensory's Vista PCI Screen Magnification System", Journal of Visual Impairment & Blindness, Oct. 1998, pp. 705, 707-710.
Stone et al., "The Movable Filter as a User Interface Tool", CHI '94 Human Factors in Computing Systems, 1994, pp. 306-312.
Su et al., "A Review of ZoomText Xtra Screen Magnification Program for Windows 95", Journal of Visual Impairment & Blindness, Feb. 1998, pp. 116-119.
"BluePhoneElite: Features", available at <http://www.reelintelligence.com/BluePhoneElite/features.shtml,>, retrieved on Sep. 25, 2006, 2 pages.
"Digital Audio in the New Era", Electronic Design and Application, No. 6, Jun. 30, 2003, 3 pages.
"Mobile Speech Solutions, Mobile Accessibility", SVOX AG Product Information Sheet, available at <http://www.svox.com/site/bra840604/con782768/mob965831936.aSQ?osLang=1>, Sep. 27, 2012, 1 page.
"N200 Hands-Free Bluetooth Car Kit", available at <www.wirelessground.com>, retrieved on Mar. 19, 2007, 3 pages.
"PhatNoise", Voice Index on Tap, Kenwood Music Keg, available at <http://www.phatnoise.com/kenwood/kenwoodssamail.html>, retrieved on Jul. 13, 2006, 1 page.
"What is Fuzzy Logic?", available at <http://www.cs.cmu.edu>, retrieved on Apr. 15, 1993, 5 pages.
"Windows XP: A Big Surprise!—Experiencing Amazement from Windows XP", New Computer, No. 2, Feb. 28, 2002, 8 pages.
Aikawa et al., "Generation for Multilingual MT", available at <http://mtarchive.info/MTS-2001-Aikawa.pdf>, retrieved on Sep. 18, 2001, 6 pages.
Anhui USTC IFL Ytek Co. Ltd., "Flytek Research Center Information Datasheet", available at <http://www.iflttek.com/english/Research.htm>, retrieved on Oct. 15, 2004, 3 pages.
Borden IV, G.R., "An Aural User Interface for Ubiquitous Computing", Proceedings of the 6th International Symposium on Wearable Computers, IEEE, 2002, 2 pages.
Brain, Marshall, "How MP3 Files Work", available at <http://www.howstuffworks.com>, retrieved on Mar. 19, 2007, 4 pages.
Busemann et al., "Natural Language Diaglogue Service for Appointment Scheduling Agents", Technical Report RR-97-02, Deutsches Forschungszentrum fur Kunstliche Intelligenz GmbH, 1997, 8 pages.
Dusan et al., "Multimodal Interaction on PDA's Integrating Speech and Pen Inputs", Eurospeech Geneva, 2003, 4 pages.
Lamel et al., "Generation and synthesis of Broadcast Messages", Proceedings of ESCA-NATO Workshop: Applications of Speech Technology, Sep. 1, 1993, 4 pages.
Lyons et al., "Augmenting Conversations Using Dual-Purpose Speech", Proceedings of the 17th Annual ACM Symposium on User interface Software and Technology, 2004, 10 pages.
Macsimum News, "Apple Files Patent for an Audio Interface for the iPod", available at <http://www.macsimumnews.com/index.php/archive/apple_files_patent_for_an_audio_interface_for_the_ipod>, retrieved on Jul. 13, 2006, 8 pages.
International Search Report and Written Opinion received for PCT Patent Application No. PCT/US2004/016519, dated Nov. 3, 2005, 6 pages.
Invitation to Pay Additional Fees and Partial International Search Report received for PCT Patent Application No. PCT/US2004/016519, dated Aug. 4, 2005, 6 pages.
International Search Report received for PCT Patent Application No. PCT/US2011/037014, dated Oct. 4, 2011, 6 pages.
Invitation to Pay Additional Search Fees received for PCT Application No. PCT/US2011/037014, dated Aug. 2, 2011, 6 pages.
International Search Report and Written Opinion received for PCT Patent Application No. PCT/US2012/043098, dated Nov. 14, 2012, 9 pages.
International Search Report and Written Opinion received for PCT Patent Application No. PCT/US2013/040971, dated Nov. 12, 2013, 11 pages.
Quazza et al., "Actor: A Multilingual Unit-Selection Speech Synthesis System", Proceedings of 4th ISCA Tutorial and Research Workshop on Speech Synthesis, Jan. 1, 2001, 6 pages.
Ricker, Thomas, "Apple Patents Audio User Interface", Engadget, available at <http://www.engadget.com/2006/05/04/apple-patents-audio-user-interface/>, May 4, 2006, 6 pages.
Santaholma, Marianne E., "Grammar Sharing Techniques for Rule-based Multilingual NLP Systems", Proceedings of the 16th Nordic Conference of Computational Linguistics, NODALIDA 2007, May 25, 2007, 8 pages.
Taylor et al., "Speech Synthesis by Phonological Structure Matching", International Speech Communication Association, vol. 2, Section 3, 1999, 4 pages.
Xu et al., "Speech-Based Interactive Games for Language Learning: Reading, Translation, and Question-Answering", Computational Linguistics and Chinese Language Processing, vol. 14, No. 2, Jun. 2009, pp. 133-160.
Yunker, John, "Beyond Borders: Web Globalization Strategies", New Riders, Aug. 22, 2002, 11 pages.
International Search Report received for PCT Patent Application No. PCT/GB2009/051684, dated Mar. 12, 2010, 4 pages.
International Preliminary Report on Patentability received for PCT Patent Application No. PCT/GB2009/051684, dated Jun. 23, 2011, 10 pages.
Cucerzan et al., "Bootstrapping a Multilingual Part-of-Speech Tagger in One Person-Day", In Proceedings of the 6th Conference on Natural Language Learning, vol. 20, 2002, pp. 1-7.
Schone et al., "Knowledge-Free Induction of Morphology Using Latent Semantic Analysis", Proceedings of the 2nd Workshop on Learning Language in Logic and the 4th Conference on Computational Natural Language Learning, vol. 7, 2000, pp. 67-72.
Phillips, Dick, "The Multi-Media Workstation", SIGGRAPH '89 Panel Proceedings, 1989, pp. 93-109.
Gong et al., "Guidelines for Handheld Mobile Device Interface Design", Proceedings of DSI 2004 Annual Meeting, 2004, pp. 3751-3756.
Horvitz et al., "Handsfree Decision Support: Toward a Non-invasive Human-Computer Interface", Proceedings of the Symposium on Computer Applications in Medical Care, IEEE Computer Society Press, 1995, p. 955.
Horvitz et al., "In Pursuit of Effective Handsfree Decision Support: Coupling Bayesian Inference, Speech Understanding, and User Models", 1995, 8 pages.
Apple Computer, "Knowledge Navigator", published by Apple Computer no later than 2008, as depicted in Exemplary Screenshots from video, 2008, 7 page.
Mactech, "KeyStrokes 3.5 for Mac OS X Boosts Word Prediction", available at <http://www.mactech.com/news/?p=1007129>, retrieved on Jan. 7, 2008, 3 pages.
Mahedero et al., "Natural Language Processing of Lyrics", In Proceedings of the 13th Annual ACM International Conference on Multimedia, ACM, Nov. 6-11, 2005, 4 pages.
Marcus et al., "Building a Large Annotated Corpus of English: The Penn Treebank", Computational Linguistics, vol. 19, No. 2, 1993, pp. 313-330.
Markel et al., "Linear Production of Speech", Reviews, 1976, pp. xii, 288.
Masui, Toshiyuki, "POBox: An Efficient Text Input Method for Handheld and Ubiquitous Computers", Proceedings of the 1st International Symposium on Handheld and Ubiquitous Computing, 1999, 12 pages.
Matsui et al., "Speaker Adaptation of Tied-Mixture-Based Phoneme Models for Text-Prompted Speaker Recognition", 1994 IEEE International Conference on Acoustics, Speech and Signal Processing, Apr. 19-22, 1994, 1-125-1-128.
Matsuzawa, A, "Low-Voltage and Low-Power Circuit Design for Mixed Analog/Digital Systems in Portable Equipment", IEEE Journal of Solid-State Circuits, vol. 29, No. 4, 1994, pp. 470-480.
Mellinger, David K., "Feature-Map Methods for Extracting Sound Frequency Modulation", IEEE Computer Society Press, 1991, pp. 795-799.
Menico, Costas, "Faster String Searches", Dr. Dobb's Journal, vol. 14, No. 7, Jul. 1989, pp. 74-77.

(56) References Cited

OTHER PUBLICATIONS

Menta, Richard, "1200 Song MP3 Portable is a Milestone Player", available at <http://www.mp3newswire.net/stories/personaljuke.html>, Jan. 11, 2000, 4 pages.
Meyer, Mike, "A Shell for Modern Personal Computers", University of California, Aug. 1987, pp. 13-19.
Meyrowitz et al., "Bruwin: An Adaptable Design Strategy for Window Manager/Virtual Terminal Systems", Department of Computer Science, Brown University, 1981, pp. 180-189.
Miastkowski, Stan, "paperWorks Makes Paper Intelligent", Byte Magazine, Jun. 1992.
Microsoft, "Turn on and Use Magnifier", available at <http://www.microsoft.com/windowsxp/using/accessibility/magnifierturnon.mspx>, retrieved on Jun. 6, 2009.
Microsoft Corporation, Microsoft Office Word 2003 (SP2), Microsoft Corporation, SP3 as of 2005, pp. MSWord 2003 Figures 1-5, 1983-2003.
Microsoft Corporation, "Microsoft MS-DOS Operating System User's Guide", Microsoft Corporation, 1982, pp. 4-1 to 4-16, 5-1 to 5-19.
Microsoft Press, "Microsoft Windows User's Guide for the Windows Graphical Environment", version 3.0, 1985-1990, pp. 33-41 & 70-74.
Microsoft Windows XP, "Magnifier Utility", Oct. 25, 2001, 2 pages.
Microsoft Word 2000 Microsoft Corporation, pp. MSWord Figures 1-5, 1999.
Microsoft/Ford, "Basic Sync Commands", www.SyncMyRide.com, Sep. 14, 2007, 1 page.
Milner, N. P., "A Review of Human Performance and Preferences with Different Input Devices to Computer Systems", Proceedings of the Fourth Conference of the British Computer Society on People and Computers, Sep. 5-9, 1988, pp. 341-352.
Miniman, Jared, "Applian Software's Replay Radio and Player v1.02", pocketnow.com—Review, available at <http://www.pocketnow.com/reviews/replay/replay.htm>, Jul. 31, 2001, 16 pages.
Moberg et al., "Cross-Lingual Phoneme Mapping for Multilingual Synthesis Systems", Proceedings of the 8th International Conference on Spoken Language Processing, Jeju Island, Korea, Interspeech 2004, Oct. 4-8, 2004, 4 pages.
Moberg, M., "Contributions to Multilingual Low-Footprint TTS System for Hand-Held Devices", Doctoral Thesis, Tampere University of Technology, Aug. 17, 2007, 82 pages.
Mobile Tech News, "T9 Text Input Software Updated", available at <http://www.mobiletechnews.com/info/2004/11/23/122155.html>, Nov. 23, 2004, 4 pages.
Mok et al., "Media Searching on Mobile Devices", IEEE EIT 2007 Proceedings, 2007, pp. 126-129.
Morland, D. V., "Human Factors Guidelines for Terminal Interface Design", Communications ofthe ACM vol. 26, No. 7, Jul. 1983, pp. 484-494.
Morris et al., "Andrew: A Distributed Personal Computing Environment", Communications of the ACM, (Mar. 1986); vol. 29 No. 3 Mar. 1986, pp. 184-201.
Muller et al., "CSCW'92 Demonstrations", 1992, pp. 11-14.
Musicmatch, "Musicmatch and Xing Technology Introduce Musicmatch Jukebox", Press Releases, available at <http://www.musicmatch.com/info/company/press/releases/?year= 1998&release=2>, May 18, 1998, 2 pages.
Muthesamy et al., "Speaker-Independent Vowel Recognition: Spectograms versus Cochleagrams", IEEE, Apr. 1990.
My Cool Aids, "What's New", available at <http://www.mycoolaids.com/>, 2012, 1 page.
Myers, Brad A., "Shortcutter for Palm", available at <http://www.cs.cmu.edu/~pebbles/v5/shortcutter/palm/index.html>, retrieved on Jun. 18, 2014, 10 pages.
Nadoli et al., "Intelligent Agents in the Simulation of Manufacturing Systems", Proceedings of the SCS Multiconference on AI and Simulation, 1989, 1 page.
Nakagawa et al., "Unknown Word Guessing and Part-of-Speech Tagging Using Support Vector Machines", Proceedings of the 6th NLPRS, 2001, pp. 325-331.
Ahlstrom et al., "Overcoming Touchscreen User Fatigue by Workplace Design", CHI '92 Posters and Short Talks of the 1992 SIGCHI Conference on Human Factors in Computing Systems, 1992, pp. 101-102.
NCIP, "NCIP Library: Word Prediction Collection", available at <http://www2.edc.org/ncip/library/wp/toc.htm>, 1998, 4 pages.
NCIP, "What is Word Prediction?", available at <http://www2.edc.org/NCIP/library/wp/what_is.htm>, 1998, 2 pages.
NCIP Staff, "Magnification Technology", available at <http://www2.edc.org/ncip/library/vi/magnifi.htm>, 1994, 6 pages.
Newton, Harry, "Newton's Telecom Dictionary", Mar. 1998, pp. 62, 155, 610-611, 771.
Nguyen et al., "Generic Manager for Spoken Dialogue Systems", In DiaBruck: 7th Workshop on the Semantics and Pragmatics of Dialogue, Proceedings, 2003, 2 pages.
Nilsson, B. A., "Microsoft Publisher is an Honorable Start for DTP Beginners", Computer Shopper, Feb. 1, 1992, 2 pages.
Noik, Emanuel G., "Layout-Independent Fisheye Views of Nested Graphs", IEEE Proceedings of Symposium on Visual Languages, 1993, 6 pages.
Nonhoff-Arps et al., "StraBenmusik: Portable MP3-Spieler mit USB Anschluss", CT Magazin Fuer Computer Technik, Verlag Heinz Heise GMBH, Hannover DE, No. 25, 2000, pp. 166-175.
Northern Telecom, "Meridian Mail PC User Guide", 1988, 17 Pages.
Notenboom, Leo A., "Can I Retrieve Old MSN Messenger Conversations?", available at <http://ask-leo.com/can_i_retrieve_old_msn_messenger_conversations.html>, Mar. 11, 2004, 23 pages.
O'Connor, Rory J., "Apple Banking on Newton's Brain", San Jose Mercury News, Apr. 22, 1991.
Ohsawa et al., "A computational Model of an Intelligent Agent Who Talks with a Person", Research Reports on Information Sciences, Series C, No. 92, Apr. 1989, pp. 1-18.
Ohtomo et al., "Two-Stage Recognition Method of Hand-Written Chinese Characters Using an Integrated Neural Network Model", Denshi Joohoo Tsuushin Gakkai Ronbunshi, D-II, vol. J74, Feb. 1991, pp. 158-165.
Okazaki et al., "Multi-Fisheye Transformation Method for Large-Scale Network Maps", IEEE Japan, vol. 44, No. 6, 1995, pp. 495-500.
Sullivan, Danny, "How Google Instant's Autocomplete Suggestions Work", available at <http://searchengineland.com/how-google-instant-autocomplete-suggestions-work-62592>, Apr. 6, 2011, 12 pages.
Summerfield et al., "ASIC Implementation of the Lyon Cochlea Model", Proceedings of the 1992 International Conference on Acoustics, Speech and Signal Processing, IEEE, vol. V, 1992, pp. 673-676.
T3 Magazine, "Creative MuVo TX 256MB", available at <http://www.t3.co.uk/reviews/entertainment/mp3_player/creative_muvo_tx_256mb>, Aug. 17, 2004, 1 page.
TAOS, "TAOS, Inc. Announces Industry's First Ambient Light Sensor to Convert Light Intensity to Digital Signals", News Release, available at <http://www.taosinc.com/presssrelease_090902.htm>, Sep. 16, 2002, 3 pages.
Apple Computer, Inc., "iTunes 2, Playlist Related Help Screens", iTunes v2.0, 2000-2001, 8 pages.
Tello, Ernest R., "Natural-Language Systems", Mastering AI Tools and Techniques, Howard W. Sams & Company, 1988.
TG3 Electronics, Inc., "BL82 Series Backlit Keyboards", available at <http://www.tg3electronics.com/products/backlit/backlit.htm>, retrieved on Dec. 19, 2002, 2 pages.
The HP 150, "Hardware: Compact, Powerful, and Innovative", vol. 8, No. 10, Oct. 1983, pp. 36-50.
Tidwell, Jenifer, "Animated Transition", Designing Interfaces, Patterns for effective Interaction Design, Nov. 2005, First Edition, 4 pages.
Touch, Joseph, "Zoned Analog Personal Teleconferencing", USC / Information Sciences Institute, 1993, pp. 1-19.

(56) References Cited

OTHER PUBLICATIONS

Toutanova et al., "Feature-Rich Part-of-Speech Tagging with a Cyclic Dependency Network", Computer Science Dept., Stanford University, Stanford CA 94305-9040, 2003, 8 pages.
Trigg et al., "Hypertext Habitats: Experiences of Writers in NoteCards", Hypertext '87 Papers; Intelligent Systems Laboratory, Xerox Palo Alto Research Center, 1987, pp. 89-108.
Trowbridge, David, "Using Andrew for Development of Educational Applications", Center for Design of Educational Computing, Carnegie-Mellon University (CMU-ITC-85-065), Jun. 2, 1985, pp. 1-6.
Tsao et al., "Matrix Quantizer Design for LPC Speech Using the Generalized Lloyd Algorithm", (IEEE Transactions on Acoustics, Speech and Signal Processing, Jun. 1985), as reprinted in Vector Quantization (IEEE Press, 1990), 1990, pp. 237-245.
Turletti, Thierry, "The INRIA Videoconferencing System (IVS)", Oct. 1994, pp. 1-7.
Uslan et al., "A Review of Henter-Joyce's MAGic for Windows NT", Journal of Visual Impairment and Blindness, Dec. 1999, pp. 666-668.
Uslan et al., "A Review of Supernova Screen Magnification Program for Windows", Journal of Visual Impairment & Blindness, Feb. 1999, pp. 108-110.
Uslan et al., "A Review of Two Screen Magnification Programs for Windows 95: Magnum 95 and LP-Windows", Journal of Visual Impairment & Blindness, Sep.-Oct. 1997, pp. 9-13.
Veiga, Alex, "AT&T Wireless Launching Music Service", available at <http://bizyahoo.com/ap/041005/at_t_mobile_music_5.html?printer=1>, Oct. 5, 2004, 2 pages.
Vogel et al., "Shift: A Technique for Operating Pen-Based Interfaces Using Touch", CHI '07 Proceedings, Mobile Interaction Techniques I, Apr. 28-May 3, 2007, pp. 657-666.
W3C Working Draft, "Speech Synthesis Markup Language Specification for the Speech Interface Framework", available at <http://www.w3org./TR/speech-synthesis>, retrieved on Dec. 14, 2000, 42 pages.
Wadlow, M. G., "The Role of Human Interface Guidelines in the Design of Multimedia Applications", Carnegie Mellon University (To be Published in Current Psychology: Research and Reviews, Summer 1990 (CMU-ITC-91-101), 1990, pp. 1-22.
Walker et al., "The LOCUS Distributed Operating System 1", University of California Los Angeles, 1983, pp. 49-70.
Wang et al., "An Initial Study on Large Vocabulary Continuous Mandarin Speech Recognition with Limited Training Data Based on Sub-Syllabic Models", International Computer Symposium, vol. 2, 1994, pp. 1140-1145.
Wang et al., "Tone Recognition of Continuous Mandarin Speech Based on Hidden Markov Model", International Journal of Pattern Recognition and Artificial Intelligence, vol. 8, 1994, pp. 233-245.
Ware et al., "The DragMag Image Magnifier", CHI '95 Mosaic of Creativity, May 7-11, 1995, pp. 407-408.
Ware et al., "The DragMag Image Magnifier Prototype I", Apple Inc., Video Clip, Marlon, on a CD, Applicant is not Certain about the Date for the Video Clip., 1995.
Watabe et al., "Distributed Multiparty Desktop Conferencing System: MERMAID", CSCW 90 Proceedings, Oct. 1990, pp. 27-38.
White, George M., "Speech Recognition, Neural Nets, and Brains", Jan. 1992, pp. 1-48.
Wikipedia, "Acoustic Model", available at <http://en.wikipedia.org/wiki/AcousticModel>, retrieved on Sep. 14, 2011, 2 pages.
Wikipedia, "Language Model", available at <http://en.wikipedia.org/wiki/Language_model>, retrieved on Sep. 14, 2011, 3 pages.
Wikipedia, "Speech Recognition", available at <http://en.wikipedia.org/wiki/Speech_recognition>, retrieved on Sep. 14, 2011, 10 pages.
Wilensky et al., "Talking to UNIX in English: An Overview of UC", Communications of the ACM, vol. 27, No. 6, Jun. 1984, pp. 574-593.
Wilson, Mark, "New iPod Shuffle Moves Buttons to Headphones, Adds Text to Speech", available at <http://gizmodo.com/5167946/new-ipod-shuffle-moves-buttons-to-headphones-adds-text-to-speech>, Mar. 11, 2009, 13 pages.
Wirelessinfo, "SMS/MMS Ease of Use (8.0)", available at <http://www.wirelessinfo.com/content/palm-Treo-750-Cell-Phone-Review/Messaging.htm>, Mar. 2007, 3 pages.
Wong et al., "An 800 Bit/s Vector Quantization LPC Vocoder", (IEEE Transactions on Acoustics, Speech and Signal Processing, Oct. 1982), as reprinted in Vector Quantization (IEEE Press, 1990), 1990, pp. 222-232.
Wong et al., "Very Low Data Rate Speech Compression with LPC Vector and Matrix Quantization", (Proceedings of the IEEE Int'l Acoustics, Speech and Signal Processing Conference, Apr. 1983), as reprinted in Vector Quantization (IEEE Press, 1990), 1990, pp. 233-236.
Wu et al., "Automatic Generation of Synthesis Units and Prosodic Information for Chinese Concatenative Synthesis", Speech Communication, vol. 35, No. 3-4, Oct. 2001, pp. 219-237.
Yang et al., "Auditory Representations of Acoustic Signals", IEEE Transactions of Information Theory, vol. 38, No. 2, Mar. 1992, pp. 824-839.
Yang et al., "Hidden Markov Model for Mandarin Lexical Tone Recognition", IEEE Transactions on Acoustics, Speech and Signal Processing, vol. 36, No. 7, Jul. 1988, pp. 988-992.
Yiourgalis et al., "Text-to-Speech system for Greek", ICASSP 91, vol. 1, May 14-17, 1991., pp. 525-528.
Zainab, "Google Input Tools Shows Onscreen Keyboard in Multiple Languages [Chrome]", available at <http://www.addictivetips.com/internet-tips/google-input-tools-shows-multiple-language-onscreen-keyboards-chrome/>, Jan. 3, 2012, 3 pages.
Zelig, "A Review of the Palm Treo 750v", available at <http://www.mtekk.com.au/Articles/tabid/54/articleType/ArticleView/articleId/769/A-Review-of-the-Palm-Treo-750v.aspx>, Feb. 5, 2007, 3 pages.
Zhang et al., "Research of Text Classification Model Based on Latent Semantic Analysis and Improved HS-SVM", Intelligent Systems and Applications (ISA), 2010 2nd International Workshop, May 22-23, 2010, 5 pages.
Ziegler, K, "A Distributed Information System Study", IBM Systems Journal, vol. 18, No. 3, 1979, pp. 374-401.
Zipnick et al., "U.S. Appl. No. 10/859,661, filed Jun. 2, 2004".
"2004 Chrysler Pacifica: U-Connect Hands-Free Communication System", The Best and Brightest of 2004, Brief Article, Automotive Industries, Sep. 2003, 1 page.
"2007 Lexus GS 450h 4dr Sedan (3.5L 6cyl Gas/Electric Hybrid CVT)", available at <http://review.cnet.com/4505-10865_16-31833144.html>, retrieved on Aug. 3, 2006, 10 pages.
"All Music Website", available at <http://www.allmusic.com/>, retrieved on Mar. 19, 2007, 2 pages.
"BluePhoneElite: About", available at <http://www.reelintelligence.com/BluePhoneElite>, retrieved on Sep. 25, 2006, 2 pages.
Apple Computer, Inc., "iTunes 2: Specification Sheet", 2001, 2 pages.
Apple Computer, Inc., "iTunes, Playlist Related Help Screens", iTunes v1.0, 2000-2001, 8 pages.
Apple Computer, Inc., "QuickTime Movie Playback Programming Guide", Aug. 11, 2005, pp. 1-58.
Apple Computer, Inc., "QuickTime Overview", Aug. 11, 2005, pp. 1-34.
Apple Computer, Inc., "Welcome to Tiger", available at <http://www.maths.dundee.ac.uk/software/Welcome_to_Mac_OS_X_v10.4_Tiger.pdf>, 2005, pp. 1-32.
"Corporate Ladder", BLOC Publishing Corporation, 1991, 1 page.
Arango et al., "Touring Machine: A Software Platform for Distributed Multimedia Applications", 1992 IFIP International Conference on Upper Layer Protocols, Architectures, and Applications, May 1992, pp. 1-11.
Arons, Barry M., "The Audio-Graphical Interface to a Personal Integrated Telecommunications System", Thesis Submitted to the Department of Architecture at the Massachusetts Institute of Technology, Jun. 1984, 88 pages.
Badino et al., "Language Independent Phoneme Mapping for Foreign TTS", 5th ISCA Speech Synthesis Workshop, Pittsburgh, PA, Jun. 14-16, 2004, 2 pages.

(56) References Cited

OTHER PUBLICATIONS

Baechtle et al., "Adjustable Audio Indicator", IBM Technical Disclosure Bulletin, Jul. 1, 1984, 2 pages.
Baeza-Yates, Ricardo, "Visualization of Large Answers in Text Databases", AVI '96 Proceedings of the Workshop on Advanced Visual Interfaces, 1996, pp. 101-107.
Bahl et al., "Recognition of a Continuously Read Natural Corpus", IEEE International Conference on Acoustics, Speech, and Signal Processing, vol. 3, Apr. 1978, pp. 422-424.
Bajarin, Tim, "With Low End Launched, Apple Turns to Portable Future", PC Week, vol. 7, Oct. 1990, p. 153 (1).
Barthel, B., "Information Access for Visually Impaired Persons: Do We Still Keep a "Document" in "Documentation"?", Professional Communication Conference, Sep. 1995, pp. 62-66.
Baudel et al., "2 Techniques for Improved HC Interaction: Toolglass & Magic Lenses: The See-Through Interface", Apple Inc., Video Clip, CHI'94 Video Program on a CD, 1994.
Beck et al., "Integrating Natural Language, Query Processing, and Semantic Data Models", COMCON Spring '90. IEEE Computer Society International Conference, 1990, Feb. 26-Mar. 2, 1990, pp. 538-543.
Bederson et al., "Pad++: A Zooming Graphical Interface for Exploring Alternate Interface Physics", UIST' 94 Proceedings of the 7th Annual ACM symposium on User Interface Software and Technology, Nov. 1994, pp. 17-26.
Bederson et al., "The Craft of Information Visualization", Elsevier Science, Inc., 2003, 435 pages.
"Diagrammaker", Action Software, 1989.
"Diagram-Master", Ashton-Tate, 1989.
Benel et al., "Optimal Size and Spacing of Touchscreen Input Areas", Human-Computer Interaction—INTERACT, 1987, pp. 581-585.
Beringer et al., "Operator Behavioral Biases Using High-Resolution Touch Input Devices", Proceedings of the Human Factors and Ergonomics Society 33rd Annual Meeting, 1989, 3 pages.
Beringer, Dennis B., "Target Size, Location, Sampling Point and Instruction Set: More Effects on Touch Panel Operation", Proceedings of the Human Factors and Ergonomics Society 34th Annual Meeting, 1990, 5 pages.
Bernabei et al., "Graphical I/O Devices for Medical Users", 14th Annual International Conference of the IEEE on Engineering in Medicine and Biology Society, vol. 3, 1992, pp. 834-836.
Bernstein, Macrophone, "Speech Corpus", IEEE/ICASSP, Apr. 22, 1994, pp. 1-81 to 1-84.
Berry et al., "Symantec", New version of MORE.TM, Apr. 10, 1990, 1 page.
Best Buy, "When it Comes to Selecting a Projection TV, Toshiba Makes Everything Perfectly Clear", Previews of New Releases, available at <http://www.bestbuy.com/HomeAudioVideo/Specials/ToshibaTVFeatures.asp>, retrieved on Jan. 23, 2003, 5 pages.
Betts et al., "Goals and Objectives for User Interface Software", Computer Graphics, vol. 21, No. 2, Apr. 1987, pp. 73-78.
Biemann, Chris, "Unsupervised Part-of-Speech Tagging Employing Efficient Graph Clustering", Proceeding COLING ACL '06 Proceedings of the 21st International Conference on computational Linguistics and 44th Annual Meeting of the Association for Computational Linguistics: Student Research Workshop, 2006, pp. 7-12.
Bier et al., "Toolglass and Magic Lenses: The See-Through Interface", Computer Graphics (SIGGRAPH '93 Proceedings), vol. 27, 1993, pp. 73-80.
Birrell, Andrew, "Personal Jukebox (PJB)", available at <http://birrell.org/andrew/talks/pjb-overview.ppt>, Oct. 13, 2000, 6 pages.
Black et al., "Multilingual Text-to-Speech Synthesis", Acoustics, Speech and Signal Processing (ICASSP'04) Proceedings of the IEEE International Conference, vol. 3, May 17-21, 2004, 4 pages.
Bleher et al., "A Graphic Interactive Application Monitor", IBM Systems Journal, vol. 19, No. 3, Sep. 1980, pp. 382-402.
Bluetooth PC Headsets, "'Connecting' Your Bluetooth Headset with Your Computer", Enjoy Wireless VoIP Conversations, available at <http://www.bluetoothpcheadsets.com/connect.htm>, retrieved on Apr. 29, 2006, 4 pages.
Card et al., "Readings in Information Visualization Using Vision to Think", Interactive Technologies, 1999, 712 pages.
Bociurkiw, Michael, "Product Guide: Vanessa Matz", available at <http://www.forbes.com/asap/2000/1127/vmartz_print.html>, retrieved on Jan. 23, 2003, 2 pages.
"Glossary of Adaptive Technologies: Word Prediction", available at <http://www.utoronto.ca/atrc/reference/techwordpred.html>, retrieved on Dec. 6, 2005, 5 pages.
Borenstein, Nathaniel S., "Cooperative Work in the Andrew Message System", Information Technology Center and Computer Science Department, Carnegie Mellon University; Thyberg, Chris A. Academic Computing, Carnegie Mellon University, 1988, pp. 306-323.
Boy, Guy A., "Intelligent Assistant Systems", Harcourt Brace Jovanovicy, 1991, 1 page.
"IAP Sports Lingo 0x09 Protocol V1.00", May 1, 2006, 17 pages.
Brown et al., "Browing Graphs Using a Fisheye View", Apple Inc., Video Clip, Systems Research Center, CHI '92 Continued Proceedings on a CD, 1992.
Brown et al., "Browsing Graphs Using a Fisheye View", CHI '93 Proceedings of the INTERACT '93 and CHI '93 Conference on Human Factors in Computing Systems, 1993, p. 516.
Burger, D., "Improved Access to Computers for the Visually Handicapped: New Prospects and Principles", IEEE Transactions on Rehabilitation Engineering, vol. 2, No. 3, Sep. 1994, pp. 111-118.
"IEEE 1394 (Redirected from Firewire", Wikipedia, The Free Encyclopedia, available at <http://www.wikipedia.org/wiki/Firewire>, retrieved on Jun. 8, 2003, 2 pages.
Butler, Travis, "Archos Jukebox 6000 Challenges Nomad Jukebox", available at <http://tidbits.com/article/6521>, Aug. 13, 2001, 5 pages.
Butler, Travis, "Portable MP3: The Nomad Jukebox", available at <http://tidbits.com/article/6261>, Jan. 8, 2001, 4 pages.
Buxton et al., "EuroPARC's Integrated Interactive Intermedia Facility (IIIF): Early Experiences", Proceedings of the IFIP WG 8.4 Conference on Multi-User Interfaces and Applications, 1990, pp. 11-34.
CALL Centre, "Word Prediction", The CALL Centre & Scottish Executive Education Dept., 1999, pp. 63-73.
Campbell et al., "An Expandable Error-Protected 4800 BPS CELP Coder (U.S. Federal Standard 4800 BPS Voice Coder)", (Proceedings of IEEE Int'l Acoustics, Speech, and Signal Processing Conference, May 1983), as reprinted in Vector Quantization (IEEE Press, 1990), 1990, pp. 328-330.
Jabra, "Bluetooth Introduction", 2004, 15 pages.
Jabra Corporation, "FreeSpeak: BT200 User Manual", 2002, 42 pages.
Jaybird, "Everything Wrong with AIM: Because We've All Thought About it", available at <http://www.psychonoble.com/archives/articles/82.html>, May 24, 2006, 3 pages.
Jeffay et al., "Kernel Support for Live Digital Audio and Video", In Proc. of the Second Intl. Workshop on Network and Operating System Support for Digital Audio and Video, vol. 614, Nov. 1991, pp. 10-21.
Jelinek et al., "Interpolated Estimation of Markov Source Parameters from Sparse Data", In Proceedings of the Workshop on Pattern Recognition in Practice May 1980, pp. 381-397.
Johnson, Jeff A., "A Comparison of User Interfaces for Panning on a Touch-Controlled Display", CHI '95 Proceedings, 1995, 8 pages.
Kaeppner et al., "Architecture of HeiPhone: A Testbed for Audio/Video Teleconferencing", IBM European Networking Center, 1993.
Kamba et al., "Using Small Screen Space More Efficiently", CHI '96 Proceedings of the SIGCHI Conference on Human Factors in Computing Systems, Apr. 13-18, 1996, pp. 383-390.
Kang et al., "Quality Improvement of LPC-Processed Noisy Speech by Using Spectral Subtraction", IEEE Transactions on Acoustics, Speech and Signal Processing, vol. 37, No. 6, Jun. 1989, pp. 939-942.

(56) References Cited

OTHER PUBLICATIONS

Keahey et al., "Non-Linear Image Magnification", Apr. 24, 1996, 11 pages.
Keahey et al., "Nonlinear Magnification Fields", Proceedings of the 1997 IEEE Symposium on Information Visualization, 1997, 12 pages.
Keahey et al., "Techniques for Non-Linear Magnification Transformations", IEEE Proceedings of Symposium on Information Visualization, Oct. 1996, pp. 38-45.
Keahey et al., "Viewing Text With Non-Linear Magnification: An Experimental Study", Department of Computer Science, Indiana University, Apr. 24, 1996, pp. 1-9.
Kennedy, P. J., "Digital Data Storage Using Video Disc", IBM Technical Disclosure Bulletin, vol. 24, No. 2, Jul. 1981, p. 1171.
Kerr, "An Incremental String Search in C: This Data Matching Algorithm Narrows the Search Space with each Keystroke", Computer Language, vol. 6, No. 12, Dec. 1989, pp. 35-39.
Abut et al., "Vector Quantization of Speech and Speech-Like Waveforms", (IEEE Transactions on Acoustics, Speech, and Signal Processing, Jun. 1982), as reprinted in Vector Quantization (IEEE Press, 1990), 1990, pp. 258-270.
Kim, E.A. S., "The Structure and Processing of Fundamental Frequency Contours", University of Cambridge, Doctoral Thesis, Apr. 1987, 378 pages.
Kirstein et al., "Piloting of Multimedia Integrated Communications for European Researchers", Proc. INET '93, 1993, pp. 1-12.
Kjelldahl et al., "Multimedia—Principles, Systems, and Applications", Proceedings of the 1991 Eurographics Workshop on Multimedia Systems, Applications, and Interaction, Apr. 1991.
Kline et al., "Improving GUI Accessibility for People with Low Vision", CHI '95 Proceedings of the SIGCHI Conference on Human Factors in Computing Systems, May 7-11, 1995, pp. 114-121.
Kline et al., "UnWindows 1.0: X Windows Tools for Low Vision Users", ACM SIGCAPH Computers and the Physically Handicapped, No. 49, Mar. 1994, pp. 1-5.
Knight et al., "Heuristic Search", Production Systems, Artificial Intelligence, 2nd ed., McGraw-Hill, Inc., 1983-1991.
Kroon et al., "Quantization Procedures for the Excitation in CELP Coders", (Proceedings of IEEE International Acoustics, Speech, and Signal Processing Conference, Apr. 1987), as reprinted in Vector Quantization (IEEE Press, 1990), 1990, pp. 320-323.
Kuo et al., "A Radical-Partitioned coded Block Adaptive Neural Network Structure for Large-Volume Chinese Characters Recognition", International Joint Conference on Neural Networks, vol. 3, Jun. 1992, pp. 597-601.
Kuo et al., "A Radical-Partitioned Neural Network System Using a Modified Sigmoid Function and a Weight-Dotted Radical Selector for Large-Volume Chinese Character Recognition VLSI", IEEE Int. Symp. Circuits and Systems, Jun. 1994, pp. 3862-3865.
Kurlander et al., "Comic Chat", [Online], 1996 [Retrieved on: Feb 4, 2013], SIGGRAPH '96 Proceedings of the 23rd annual conference on Computer graphics and interactive techniques, [Retrieved from: http://delivery.acm.org/10.1145/240000/237260/p225-kurlander.pdf], 1996, pp. 225-236.
LaFace et al., "A Fast Segmental Viterbi Algorithm for Large Vocabulary Recognition", International Conference on Acoustics, Speech, and Signal Processing, vol. 1, May 1995, pp. 560-563.
Lafferty et al., "Conditional Random Fields: Probabilistic Models for Segmenting and Labeling Sequence Data", Proceedings of the 18th International Conference on Machine Learning, 2001, 9 pages.
Adium, "AboutAdium—Adium X—Trac", available at <http://web.archive.org/web/20070819113247/http://trac.adiumx.com/wiki/AboutAdium>, retrieved on Nov. 25, 2011, 2 pages.
Lamping et al., "Laying Out and Visualizing Large Trees Using a Hyperbolic Space", Proceedings of the ACM Symposium on User Interface Software and Technology, Nov. 1994, pp. 13-14.
Lamping et al., "Visualizing Large Trees Using the Hyperbolic Browser", Apple Inc., Video Clip, MIT Media Library, on a CD, 1995.
Lantz et al., "Towards a Universal Directory Service", Departments of Computer Science and Electrical Engineering, Stanford University, 1985, pp. 250-260.
Lantz, Keith, "An Experiment in Integrated Multimedia Conferencing", 1986, pp. 267-275.
Lauwers et al., "Collaboration Awareness in Support of Collaboration Transparency: Requirements for the Next Generation of Shared Window Systems", CHI'90 Proceedings, 1990, pp. 303-311.
Lauwers et al., "Replicated Architectures for Shared Window Systems: A Critique", COCS '90 Proceedings of the ACM SIGOIS and IEEE CS TC-OA conference on Office information systems, ACM SIGOIS Bulletin, 1990, pp. 249-260.
Lazzaro, Joseph J., "Adapting Desktop Computers to Meet the Needs of Disabled Workers is Easier Than You Might Think", Computers for the Disabled, BYTE Magazine, Jun. 1993, 4 pages.
Leahy et al., "Effect of Touch Screen Target Location on User Accuracy", Proceedings of the Human Factors Society 34th Annual Meeting, 1990, 5 pages.
Lee, Kai-Fu, "Automatic Speech Recognition", 1989, 14 pages (Table of Contents).
Leung et al., "A Review and Taxonomy of Distortion-Oriented Presentation Techniques", ACM Transactions on Computer-Human Interaction (TOCHI), vol. 1, No. 2, Jun. 1994, pp. 126-160.
Levinson et al., "Speech synthesis in telecommunications", IEEE Communications Magazine, vol. 31, No. 11, Nov. 1993, pp. 46-53.
Lewis, "Speech synthesis in a computer aided learning environment", UK IT, Mar. 19-22, 1990, pp. 294-298.
Lewis, Peter, "Two New Ways to Buy Your Bits", CNN Money, available at <http://money.cnn.com/2003/12/30/commentary/ontechnology/download/>,, Dec. 31, 2003, 4 pages.
Lieberman, Henry, "A Multi-Scale, Multi-Layer, Translucent Virtual Space", Proceedings of IEEE Conference on Information Visualization, Aug. 1997, pp. 124-131.
Lieberman, Henry, "Powers of Ten Thousand: Navigating in Large Information Spaces", Proceedings of the ACM Symposium on User Interface Software and Technology, Nov. 1994, pp. 1-2.
Lyon, R., "A Computational Model of Binaural Localization and Separation", Proceedings of IEEE International Conference on Acoustics, Speech and Signal Processing, Apr. 1983, pp. 1148-1151.
Ahlberg et al., "The Alphaslider: A Compact and Rapid Selector", CHI '94 Proceedings of the SIGCHI Conference on Human Factors in Computing Systems, Apr. 1994, pp. 365-371.
Lyons, Richard F., "CCD Correlators for Auditory Models", Proceedings of the Twenty-Fifth Asilomar Conference on Signals, Systems and Computers, Nov. 4-6, 1991, pp. 785-789.
MacKenzie et al., "Alphanumeric Entry on Pen-Based Computers", International Journal of Human-Computer Studies, vol. 41, 1994, pp. 775-792.
MacKinlay et al., "The Perspective Wall: Detail and Context Smoothly Integrated", ACM, 1991, pp. 173-179.
Ahlberg et al., "Visual Information Seeking: Tight Coupling of Dynamic Query Filters with Starfield Displays", Proceedings of the SIGCHI Conference on Human Factors in Computing Systems, Apr. 24-28, 1994, pp. 313-317.
Acero, A., et al., "Environmental Robustness in Automatic Speech Recognition," International Conference on Acoustics, Speech, and Signal Processing (ICASSP'90), Apr. 3-6, 1990, 4 pages.
Acero, A., et al., "Robust Speech Recognition by Normalization of the Acoustic Space," International Conference on Acoustics, Speech, and Signal Processing, 1991, 4 pages.
Ahlbom, G., et al., "Modeling Spectral Speech Transitions Using Temporal Decomposition Techniques," IEEE International Conference of Acoustics, Speech, and Signal Processing (ICASSP'87), Apr. 1987, vol. 12, 4 pages.
Aikawa, K., "Speech Recognition Using Time-Warping Neural Networks," Proceedings of the 1991 IEEE Workshop on Neural Networks for Signal Processing, Sep. 30 to Oct. 1, 1991, 10 pages.
Anastasakos, A., et al., "Duration Modeling in Large Vocabulary Speech Recognition," International Conference on Acoustics, Speech, and Signal Processing (ICASSP'95), May 9-12, 1995, 4 pages.
Anderson, R. H., "Syntax-Directed Recognition of Hand-Printed Two-Dimensional Mathematics," In Proceedings of Symposium on

(56) References Cited

OTHER PUBLICATIONS

Interactive Systems for Experimental Applied Mathematics: Proceedings of the Association for Computing Machinery Inc. Symposium, © 1967, 12 pages.
Ansari, R., et al., "Pitch Modification of Speech using a Low-Sensitivity Inverse Filter Approach," IEEE Signal Processing Letters, vol. 5, No. 3, Mar. 1998, 3 pages.
Anthony, N. J., et al., "Supervised Adaption for Signature Verification System," Jun. 1, 1978, IBM Technical Disclosure, 3 pages.
Apple Computer, "Guide Maker User's Guide," © Apple Computer, Inc., Apr. 27, 1994, 8 pages.
Apple Computer, "Introduction to Apple Guide," © Apple Computer, Inc., Apr. 28, 1994, 20 pages.
Asanović, K., et al., "Experimental Determination of Precision Requirements for Back-Propagation Training of Artificial Neural Networks," In Proceedings of the 2nd International Conference of Microelectronics for Neural Networks, 1991, www.ICSI.Berkeley.EDU, 7 pages.
Atal, B. S., "Efficient Coding of LPC Parameters by Temporal Decomposition," IEEE International Conference on Acoustics, Speech, and Signal Processing (ICASSP'83), Apr. 1983, 4 pages.
Bahl, L. R., et al., "Acoustic Markov Models Used in the Tangora Speech Recognition System," In Proceeding of International Conference on Acoustics, Speech, and Signal Processing (ICASSP'88), Apr. 11-14, 1988, vol. 1, 4 pages.
Bahl, L. R., et al., "A Maximum Likelihood Approach to Continuous Speech Recognition," IEEE Transaction on Pattern Analysis and Machine Intelligence, vol. PAMI-5, No. 2, Mar. 1983, 13 pages.
Bahl, L. R., et al., "A Tree-Based Statistical Language Model for Natural Language Speech Recognition," IEEE Transactions on Acoustics, Speech and Signal Processing, vol. 37, Issue 7, Jul. 1989, 8 pages.
Bahl, L. R., et al., "Large Vocabulary Natural Language Continuous Speech Recognition," In Proceedings of 1989 International Conference on Acoustics, Speech, and Signal Processing, May 23-26, 1989, vol. 1, 6 pages.
Bahl, L. R., et al, "Multonic Markov Word Models for Large Vocabulary Continuous Speech Recognition," IEEE Transactions on Speech and Audio Processing, vol. 1, No. 3, Jul. 1993, 11 pages.
Bahl, L. R., et al., "Speech Recognition with Continuous-Parameter Hidden Markov Models," In Proceeding of International Conference on Acoustics, Speech, and Signal Processing (ICASSP'88), Apr. 11-14, 1988, vol. 1, 8 pages.
Banbrook, M., "Nonlinear Analysis of Speech from a Synthesis Perspective," A thesis submitted for the degree of Doctor of Philosophy, The University of Edinburgh, Oct. 15, 1996, 35 pages.
Belaid, A., et al., "A Syntactic Approach for Handwritten Mathematical Formula Recognition," IEEE Transactions on Pattern Analysis and Machine Intelligence, vol. PAMI-6, No. 1, Jan. 1984, 7 pages.
Bellegarda, E. J., et al., "On-Line Handwriting Recognition Using Statistical Mixtures," Advances in Handwriting and Drawings: A Multidisciplinary Approach, Europia, 6th International IGS Conference on Handwriting and Drawing, Paris—France, Jul. 1993, 11 pages.
Bellegarda, J. R., "A Latent Semantic Analysis Framework for Large-Span Language Modeling," 5th European Conference on Speech, Communication and Technology, (EUROSPEECH'97), Sep. 22-25, 1997, 4 pages.
Bellegarda, J. R., "A Multispan Language Modeling Framework for Large Vocabulary Speech Recognition," IEEE Transactions on Speech and Audio Processing, vol. 6, No. 5, Sep. 1998, 12 pages.
Bellegarda, J. R., et al., "A Novel Word Clustering Algorithm Based on Latent Semantic Analysis," In Proceedings of the IEEE International Conference on Acoustics, Speech, and Signal Processing (ICASSP'96), vol. 1, 4 pages.
Bellegarda, J. R., et al., "Experiments Using Data Augmentation for Speaker Adaptation," International Conference on Acoustics, Speech, and Signal Processing (ICASSP'95), May 9-12, 1995, 4 pages.
Bellegarda, J. R., "Exploiting Both Local and Global Constraints for Multi-Span Statistical Language Modeling," Proceeding of the 1998 IEEE International Conference on Acoustics, Speech, and Signal Processing (ICASSP'98), vol. 2, May 12-15 1998, 5 pages.
Bellegarda, J. R., "Exploiting Latent Semantic Information in Statistical Language Modeling," In Proceedings of the IEEE, Aug. 2000, vol. 88, No. 8, 18 pages.
Bellegarda, J. R., "Interaction-Driven Speech Input—A Data-Driven Approach to the Capture of Both Local and Global Language Constraints," 1992, 7 pages, available at http://old.sigchi.org/bulletin/1998.2/bellegarda.html.
Bellegarda, J. R., "Large Vocabulary Speech Recognition with Multispan Statistical Language Models," IEEE Transactions on Speech and Audio Processing, vol. 8, No. 1, Jan. 2000, 9 pages.
Bellegarda, J. R., et al., "Performance of the IBM Large Vocabulary Continuous Speech Recognition System on the ARPA Wall Street Journal Task," Signal Processing VII: Theories and Applications, © 1994 European Association for Signal Processing, 4 pages.
Bellegarda, J. R., et al., "The Metamorphic Algorithm: A Speaker Mapping Approach to Data Augmentation," IEEE Transactions on Speech and Audio Processing, vol. 2, No. 3, Jul. 1994, 8 pages.
Black, A. W., et al., "Automatically Clustering Similar Units for Unit Selection in Speech Synthesis," In Proceedings of Eurospeech 1997, vol. 2, 4 pages.
Blair, D. C., et al., "An Evaluation of Retrieval Effectiveness for a Full-Text Document-Retrieval System," Communications of the ACM, vol. 28, No. 3, Mar. 1985, 11 pages.
Briner, L. L., "Identifying Keywords in Text Data Processing," In Zelkowitz, Marvin V., Ed, Directions and Challenges, 15th Annual Technical Symposium, Jun. 17, 1976, Gaithersbury, Maryland, 7 pages.
Bulyko, I. et al., "Error-Correction Detection and Response Generation in a Spoken Dialogue System," © 2004 Elsevier B.V., specom. 2004.09.009, 18 pages.
Bulyko, I., et al., "Joint Prosody Prediction and Unit Selection for Concatenative Speech Synthesis," Electrical Engineering Department, University of Washington, Seattle, 2001, 4 pages.
Bussey, H. E., et al., "Service Architecture, Prototype Description, and Network Implications of a Personalized Information Grazing Service," INFOCOM'90, Ninth Annual Joint Conference of the IEEE Computer and Communication Societies, Jun. 3-7, 1990, http://slrohall.com/publications/, 8 pages.
Buzo, A., et al., "Speech Coding Based Upon Vector Quantization," IEEE Transactions on Acoustics, Speech, and Signal Processing, vol. Assp-28, No. 5, Oct. 1980, 13 pages.
Caminero-Gil, J., et al., "Data-Driven Discourse Modeling for Semantic Interpretation," In Proceedings of the IEEE International Conference on Acoustics, Speech, and Signal Processing, May 7-10, 1996, 6 pages.
Cawley, G. C., "The Application of Neural Networks to Phonetic Modelling," PhD Thesis, University of Essex, Mar. 1996, 13 pages.
Chang, S., et al., "A Segment-based Speech Recognition System for Isolated Mandarin Syllables," Proceedings TENCON '93, IEEE Region 10 conference on Computer, Communication, Control and Power Engineering, Oct. 19-21, 1993, vol. 3, 6 pages.
Conklin, J., "Hypertext: An Introduction and Survey," Computer Magazine, Sep. 1987, 25 pages.
Connolly, F. T., et al., "Fast Algorithms for Complex Matrix Multiplication Using Surrogates," IEEE Transactions on Acoustics, Speech, and Signal Processing, Jun. 1989, vol. 37, No. 6, 13 pages.
Cox, R. V., et al., "Speech and Language Processing for Next-Millennium Communications Services," Proceedings of the IEEE, vol. 88, No. 8, Aug. 2000, 24 pages.
Deerwester, S., et al., "Indexing by Latent Semantic Analysis," Journal of the American Society for Information Science, vol. 41, No. 6, Sep. 1990, 19 pages.
Deller, Jr., J. R., et al., "Discrete-Time Processing of Speech Signals," © 1987 Prentice Hall, ISBN: 0-02-328301-7, 14 pages.
Digital Equipment Corporation, "Open VMS Software Overview," Dec. 1995, software manual, 159 pages.
Donovan, R. E., "A New Distance Measure for Costing Spectral Discontinuities in Concatenative Speech Synthesisers," 2001, http://citeseerx.ist.psu.edu/viewdoc/summary?doi=10.1.1.21.6398, 4 pages.

(56) References Cited

OTHER PUBLICATIONS

Frisse, M. E., "Searching for Information in a Hypertext Medical Handbook," Communications of the ACM, vol. 31, No. 7, Jul. 1988, 8 pages.
Goldberg, D., et al., "Using Collaborative Filtering to Weave an Information Tapestry," Communications of the ACM, vol. 35, No. 12, Dec. 1992, 10 pages.
Gorin, A. L., et al., "On Adaptive Acquisition of Language," International Conference on Acoustics, Speech, and Signal Processing (ICASSP'90), vol. 1, Apr. 3-6, 1990, 5 pages.
Gotoh, Y., et al., "Document Space Models Using Latent Semantic Analysis," In Proceedings of Eurospeech, 1997, 4 pages.
Gray, R. M., "Vector Quantization," IEEE ASSP Magazine, Apr. 1984, 26 pages.
Harris, F. J., "On the Use of Windows for Harmonic Analysis with the Discrete Fourier Transform," In Proceedings of the IEEE, vol. 66, No. 1, Jan. 1978, 34 pages.
Helm, R., et al., "Building Visual Language Parsers," In Proceedings of CHI'91 Proceedings of the SIGCHI Conference on Human Factors in Computing Systems, 8 pages.
Hermansky, H., "Perceptual Linear Predictive (PLP) Analysis of Speech," Journal of the Acoustical Society of America, vol. 87, No. 4, Apr. 1990, 15 pages.
Hermansky, H., "Recognition of Speech in Additive and Convolutional Noise Based on Rasta Spectral Processing," In proceedings of IEEE International Conference on Acoustics, speech, and Signal Processing (ICASSP'93), Apr. 27-30, 1993, 4 pages.
Hoehfeld M., et al., "Learning with Limited Numerical Precision Using the Cascade-Correlation Algorithm," IEEE Transactions on Neural Networks, vol. 3, No. 4, Jul. 1992, 18 pages.
Holmes, J. N., "Speech Synthesis and Recognition—Stochastic Models for Word Recognition," Speech Synthesis and Recognition, Published by Chapman & Hall, London, ISBN 0 412 534304, © 1998 J. N. Holmes, 7 pages.
Hon, H.W., et al., "CMU Robust Vocabulary-Independent Speech Recognition System," IEEE International Conference on Acoustics, Speech, and Signal Processing (ICASSP-91), Apr. 14-17, 1991, 4 pages.
IBM Technical Disclosure Bulletin, "Speech Editor," vol. 29, No. 10, Mar. 10, 1987, 3 pages.
IBM Technical Disclosure Bulletin, "Integrated Audio-Graphics User Interface," vol. 33, No. 11, Apr. 1991, 4 pages.
IBM Technical Disclosure Bulletin, "Speech Recognition with Hidden Markov Models of Speech Waveforms," vol. 34, No. 1, Jun. 1991, 10 pages.
Iowegian International, "FIR Filter Properties," dspGuro, Digital Signal Processing Central, http://www.dspguru.com/dsp/taqs/fir/properties, downloaded on Jul. 28, 2010, 6 pages.
Jacobs, P. S., et al., "Scisor: Extracting Information from On-Line News," Communications of the ACM, vol. 33, No. 11, Nov. 1990, 10 pages.
Jelinek, F., "Self-Organized Language Modeling for Speech Recognition," Readings in Speech Recognition, edited by Alex Waibel and Kai-Fu Lee, May 15, 1990, © 1990 Morgan Kaufmann Publishers, Inc., ISBN: 1-55860-124-4, 63 pages.
Jennings, A., et al., "A Personal News Service Based on a User Model Neural Network," IEICE Transactions on Information and Systems, vol. E75-D, No. 2, Mar. 1992, Tokyo, JP, 12 pages.
Ji, T., et al., "A Method for Chinese Syllables Recognition based upon Sub-syllable Hidden Markov Model," 1994 International Symposium on Speech, Image Processing and Neural Networks, Apr. 13-16, 1994, Hong Kong, 4 pages.
Jones, J., "Speech Recognition for Cyclone," Apple Computer, Inc., E.R.S., Revision 2.9, Sep. 10, 1992, 93 pages.
Katz, S. M., "Estimation of Probabilities from Sparse Data for the Language Model Component of a Speech Recognizer," IEEE Transactions on Acoustics, Speech, and Signal Processing, vol. ASSP-35, No. 3, Mar. 1987, 3 pages.
Kitano, H., "PhiDM-Dialog, An Experimental Speech-to-Speech Dialog Translation System," Jun. 1991 Computer, vol. 24, No. 6, 13 pages.
Klabbers, E., et al., "Reducing Audible Spectral Discontinuities," IEEE Transactions on Speech and Audio Processing, vol. 9, No. 1, Jan. 2001, 13 pages.
Klatt, D. H., "Linguistic Uses of Segmental Duration in English: Acoustic and Perpetual Evidence," Journal of the Acoustical Society of America, vol. 59, No. 5, May 1976, 16 pages.
Kominek, J., et al., "Impact of Durational Outlier Removal from Unit Selection Catalogs," 5th ISCA Speech Synthesis Workshop, Jun. 14-16, 2004, 6 pages.
Kubala, F., et al., "Speaker Adaptation from a Speaker-Independent Training Corpus," International Conference on Acoustics, Speech, and Signal Processing (ICASSP'90), Apr. 3-6, 1990, 4 pages.
Kubala, F., et al., "The Hub and Spoke Paradigm for CSR Evaluation," Proceedings of the Spoken Language Technology Workshop, Mar. 6-8, 1994, 9 pages.
Lee, K.F., "Large-Vocabulary Speaker-Independent Continuous Speech Recognition: The SPHINX System," Apr. 18, 1988, Partial fulfillment of the requirements for the degree of Doctor of Philosophy, Computer Science Department, Carnegie Mellon University, 195 pages.
Lee, L., et al., "A Real-Time Mandarin Dictation Machine for Chinese Language with Unlimited Texts and Very Large Vocabulary," International Conference on Acoustics, Speech and Signal Processing, vol. 1, Apr. 3-6, 1990, 5 pages.
Lee, L, et al., "Golden Mandarin(II)—An Improved Single-Chip Real-Time Mandarin Dictation Machine for Chinese Language with Very Large Vocabulary," 0-7803-0946-4/93 © 1993IEEE, 4 pages.
Lee, L, et al., "Golden Mandarin(II)—An Intelligent Mandarin Dictation Machine for Chinese Character Input with Adaptation/Learning Functions," International Symposium on Speech, Image Processing and Neural Networks, Apr. 13-16, 1994, Hong Kong, 5 pages.
Lee, L., et al., "System Description of Golden Mandarin (I) Voice Input for Unlimited Chinese Characters," International Conference on Computer Processing of Chinese & Oriental Languages, vol. 5, Nos. 3 & 4, Nov. 1991, 16 pages.
Lin, C.H., et al., "A New Framework for Recognition of Mandarin Syllables With Tones Using Sub-syllabic Unites," IEEE International Conference on Acoustics, Speech, and Signal Processing (ICASSP-93), Apr. 27-30, 1993, 4 pages.
Linde, Y., et al., "An Algorithm for Vector Quantizer Design," IEEE Transactions on Communications, vol. 28, No. 1, Jan. 1980, 12 pages.
Liu, F.H., et al., "Efficient Joint Compensation of Speech for the Effects of Additive Noise and Linear Filtering," IEEE International Conference of Acoustics, Speech, and Signal Processing, ICASSP-92, Mar. 23-26, 1992, 4 pages.
Logan, B., "Mel Frequency Cepstral Coefficients for Music Modeling," In International Symposium on Music Information Retrieval, 2000, 2 pages.
Lowerre, B. T., "The-HARPY Speech Recognition System," Doctoral Dissertation, Department of Computer Science, Carnegie Mellon University, Apr. 1976, 20 pages.
Maghbouleh, A., "An Empirical Comparison of Automatic Decision Tree and Linear Regression Models for Vowel Durations," Revised version of a paper presented at the Computational Phonology in Speech Technology workshop, 1996 annual meeting of the Association for Computational Linguistics in Santa Cruz, California, 7 pages.
Markel, J. D., et al., "Linear Prediction of Speech," Springer-Verlag, Berlin Heidelberg New York 1976, 12 pages.
Morgan, B., "Business Objects," (Business Objects for Windows) Business Objects Inc., DBMS Sep. 1992, vol. 5, No. 10, 3 pages.
Mountford, S. J., et al., "Talking and Listening to Computers," The Art of Human-Computer Interface Design, Copyright © 1990 Apple Computer, Inc. Addison-Wesley Publishing Company, Inc., 17 pages.
Murty, K. S. R., et al., "Combining Evidence from Residual Phase and MFCC Features for Speaker Recognition," IEEE Signal Processing Letters, vol. 13, No. 1, Jan. 2006, 4 pages.

(56) References Cited

OTHER PUBLICATIONS

Murveit H. et al., "Integrating Natural Language Constraints into HMM-based Speech Recognition," 1990 International Conference on Acoustics, Speech, and Signal Processing, Apr. 3-6, 1990, 5 pages.
Nakagawa, S., et al., "Speaker Recognition by Combining MFCC and Phase Information," IEEE International Conference on Acoustics Speech and Signal Processing (ICASSP), Mar. 14-19, 2010, 4 pages.
Niesler, T. R., et al., "A Variable-Length Category-Based N-Gram Language Model," IEEE International Conference on Acoustics, Speech, and Signal Processing (ICASSP'96), vol. 1, May 7-10, 1996, 6 pages.
Papadimitriou, C. H., et al., "Latent Semantic Indexing: A Probabilistic Analysis," Nov. 14, 1997, http://citeseerx.ist.psu.edu/messages/downloadsexceeded.html, 21 pages.
Parsons, T. W., "Voice and Speech Processing," Linguistics and Technical Fundamentals, Articulatory Phonetics and Phonemics, © 1987 McGraw-Hill, Inc., ISBN: 0-07-0485541-0, 5 pages.
Parsons, T. W., "Voice and Speech Processing," Pitch and Formant Estimation, © 1987 McGraw-Hill, Inc., ISBN: 0-07-0485541-0, 15 pages.
Picone, J., "Continuous Speech Recognition Using Hidden Markov Models," IEEE ASSP Magazine, vol. 7, No. 3, Jul. 1990, 16 pages.
Rabiner, L. R., et al., "Fundamental of Speech Recognition," © 1993 AT&T, Published by Prentice-Hall, Inc., ISBN: 0-13-285826-6, 17 pages.
Rabiner, L. R., et al., "Note on the Properties of a Vector Quantizer for LPC Coefficients," The Bell System Technical Journal, vol. 62, No. 8, Oct. 1983, 9 pages.
Ratcliffe, M., "ClearAccess 2.0 allows SQL searches off-line," (Structured Query Language), ClearAcess Corp., MacWeek Nov. 16, 1992, vol. 6, No. 41, 2 pages.
Remde, J. R., et al., "SuperBook: An Automatic Tool for Information Exploration-Hypertext?," In Proceedings of Hypertext'87 papers, Nov. 13-15, 1987, 14 pages.
Reynolds, C. F., "On-Line Reviews: A New Application of the HICOM Conferencing System," IEE Colloquium on Human Factors in Electronic Mail and Conferencing Systems, Feb. 3, 1989, 4 pages.
Rigoll, G., "Speaker Adaptation for Large Vocabulary Speech Recognition Systems Using Speaker Markov Models," International Conference on Acoustics, Speech, and Signal Processing (ICASSP'89), May 23-26, 1989, 4 pages.
Riley, M. D., "Tree-Based Modelling of Segmental Durations," Talking Machines Theories, Models, and Designs, 1992 © Elsevier Science Publishers B.V., North-Holland, ISBN: 08-444-89115.3, 15 pages.
Rivoira, S., et al., "Syntax and Semantics in a Word-Sequence Recognition System," IEEE International Conference on Acoustics, Speech, and Signal Processing (ICASSP'79), Apr. 1979, 5 pages.
Rosenfeld, R., "A Maximum Entropy Approach to Adaptive Statistical Language Modelling," Computer Speech and Language, vol. 10, No. 3, Jul. 1996, 25 pages.
Roszkiewicz, A., "Extending your Apple," Back Talk—Lip Service, A+ Magazine, The Independent Guide for Apple Computing, vol. 2, No. 2, Feb. 1984, 5 pages.
Sakoe, H., et al., "Dynamic Programming Algorithm Optimization for Spoken Word Recognition," IEEE Transactins on Acoustics, Speech, and Signal Processing, Feb. 1978, vol. ASSP-26 No. 1, 8 pages.
Salton, G., et al., "On the Application of Syntactic Methodologies in Automatic Text Analysis," Information Processing and Management, vol. 26, No. 1, Great Britain 1990, 22 pages.
Savoy, J., "Searching Information in Hypertext Systems Using Multiple Sources of Evidence," International Journal of Man-Machine Studies, vol. 38, No. 6, Jun. 1993, 15 pages.
Scagliola, C., "Language Models and Search Algorithms for Real-Time Speech Recognition," International Journal of Man-Machine Studies, vol. 22, No. 5, 1985, 25 pages.
Schmandt, C., et al., "Augmenting a Window System with Speech Input," IEEE Computer Society, Computer Aug. 1990, vol. 23, No. 8, 8 pages.
Schütze, H., "Dimensions of Meaning," Proceedings of Supercomputing'92 Conference, Nov. 16-20, 1992, 10 pages.
Sheth B., et al., "Evolving Agents for Personalized Information Filtering," In Proceedings of the Ninth Conference on Artificial Intelligence for Applications, Mar. 1-5, 1993, 9 pages.
Shikano, K., et al., "Speaker Adaptation Through Vector Quantization," IEEE International Conference on Acoustics, Speech, and Signal Processing (ICASSP'86), vol. 11, Apr. 1986, 4 pages.
Sigurdsson, S., et al., "Mel Frequency Cepstral Coefficients: An Evaluation of Robustness of MP3 Encoded Music," In Proceedings of the 7th International Conference on Music Information Retrieval (ISMIR), 2006, 4 pages.
Silverman, K. E. A., et al., "Using a Sigmoid Transformation for Improved Modeling of Phoneme Duration," Proceedings of the IEEE International Conference on Acoustics, Speech, and Signal Processing, Mar. 15-19, 1999, 5 pages.
Tenenbaum, A.M., et al., "Data Structure Using Pascal," 1981 Prentice-Hall, Inc., 34 pages.
Tsai, W.H., et al., "Attributed Grammar—A Tool for Combining Syntactic and Statistical Approaches to Pattern Recognition," IEEE Transactions on Systems, Man, and Cybernetics, vol. SMC-10, No. 12, Dec. 1980, 13 pages.
Udell, J., "Computer Telephony," BYTE, vol. 19, No. 7, Jul. 1, 1994, 9 pages.
Van Santen, J. P. H., "Contextual Effects on Vowel Duration," Journal Speech Communication, vol. 11, No. 6, Dec. 1992, 34 pages.
Vepa, J., et al., "New Objective Distance Measures for Spectral Discontinuities in Concatenative Speech Synthesis," In Proceedings of the IEEE 2002 Workshop on Speech Synthesis, 4 pages.
Verschelde, J., "MATLAB Lecture 8. Special Matrices in MATLAB," Nov. 23, 2005, UIC Dept. of Math., Stat.. & C.S., MCS 320, Introduction to Symbolic Computation, 4 pages.
Vingron, M. "Near-Optimal Sequence Alignment," Deutsches Krebsforschungszentrum (DKFZ), Abteilung Theoretische Bioinformatik, Heidelberg, Germany, Jun. 1996, 20 pages.
Werner, S., et al., "Prosodic Aspects of Speech," Université de Lausanne, Switzerland, 1994, Fundamentals of Speech Synthesis and Speech Recognition: Basic Concepts, State of the Art, and Future Challenges, 18 pages.
Wikipedia, "Mel Scale," Wikipedia, the free encyclopedia, last modified page date: Oct. 13, 2009, http://en.wikipedia.org/wiki/Mel_scale, 2 pages.
Wikipedia, "Minimum Phase," Wikipedia, the free encyclopedia, last modified page date: Jan. 12, 2010, http://en.wikipedia.org/wiki/Minimum_phase, 8 pages.
Wolff, M., "Poststructuralism and the Artful Database: Some Theoretical Considerations," Information Technology and Libraries, vol. 13, No. 1, Mar. 1994, 10 pages.
Wu, M., "Digital Speech Processing and Coding," ENEE408G Capstone-Multimedia Signal Processing, Spring 2003, Lecture-2 course presentation, University of Maryland, College Park, 8 pages.
Wu, M., "Speech Recognition, Synthesis, and H.C.I.," ENEE408G Capstone-Multimedia Signal Processing, Spring 2003, Lecture-3 course presentation, University of Maryland, College Park, 11 pages.
Wyle, M. F., "A Wide Area Network Information Filter," In Proceedings of First International Conference on Artificial Intelligence on Wall Street, Oct. 9-11, 1991, 6 pages.
Yankelovich, N., et al., "Intermedia: The Concept and the Construction of a Seamless Information Environment," Computer Magazine, Jan. 1988, © 1988 IEEE, 16 pages.
Yoon, K., et al., "Letter-to-Sound Rules for Korean," Department of Linguistics, The Ohio State University, 2002, 4 pages.
Zhao, Y., "An Acoustic-Phonetic-Based Speaker Adaptation Technique for Improving Speaker-Independent Continuous Speech Recognition," IEEE Transactions on Speech and Audio Processing, vol. 2, No. 3, Jul. 1994, 15 pages.

(56) References Cited

OTHER PUBLICATIONS

Zovato, E., et al., "Towards Emotional Speech Synthesis: A Rule Based Approach," 5th ISCA Speech Synthesis Workshop—Pittsburgh, Jun. 14-16, 2004, 2 pages.
International Search Report and Written Opinion dated Aug. 25, 2010, received in International Application No. PCT/US2010/037378, which corresponds to U.S. Appl. No. 12/479,477, 16 pages (Apple Inc.).
International Search Report and Written Opinion dated Nov. 16, 2012, received in International Application No. PCT/US2012/040571, which corresponds to U.S. Appl. No. 13/251,088 14 pages (Apple Inc.).
International Search Report and Written Opinion dated Dec. 20, 2012, received in International Application No. PCT/US2012/056382, which corresponds to U.S. Appl. No. 13/250,947, 11 pages (Gruber).
International Search Report dated Nov. 9, 1994, received in International Application No. PCT/US1993/12666, which corresponds to U.S. Appl. No. 07/999,302, 8 pages (Robert Don Strong).
International Preliminary Examination Report dated Mar. 1, 1995, received in International Application No. PCT/US1993/12666, which corresponds to U.S. Appl. No. 07/999,302, 5 pages (Robert Don Strong).
International Preliminary Examination Report dated Apr. 10, 1995, received in International Application No. PCT/US1993/12637, which corresponds to U.S. Appl. No. 07/999,354, 7 pages (Alejandro Acero).
International Search Report dated Feb. 8, 1995, received in International Application No. PCT/US1994/11011, which corresponds to U.S. Appl. No. 08/129,679, 7 pages (Yen-Lu Chow).
International Preliminary Examination Report dated Feb. 28, 1996, received in International Application No. PCT/US1994/11011, which corresponds to U.S. Appl. No. 08/129,679, 4 pages (Yen-Lu Chow).
Written Opinion dated Aug. 21, 1995, received in International Application No. PCT/US1994/11011, which corresponds to U.S. Appl. No. 08/129,679, 4 pages (Yen-Lu Chow).
International Search Report dated Nov. 8, 1995, received in International Application No. PCT/US1995/08369, which corresponds to U.S. Appl. No. 08/271,639, 6 pages (Peter V. De Souza).
International Preliminary Examination Report dated Oct. 9, 1996, received in International Application No. PCT/US1995/08369, which corresponds to U.S. Appl. No. 08/271,639, 4 pages (Peter V. De Souza).
Australian Office Action dated Jul. 2, 2013 for Application No. 2011205426, 9 pages.
Australian Office Action dated Dec. 7, 2012 for Application No. 2010254812, 8 pages.
Australian Office Action dated Nov. 27, 2012 for Application No. 2012101471, 6 pages.
Australian Office Action dated Nov. 22, 2012 for Application No. 2012101466, 6 pages.
Australian Office Action dated Nov. 14, 2012 for Application No. 2012101473, 6 pages.
Australian Office Action dated Nov. 19, 2012 for Application No. 2012101470, 5 pages.
Australian Office Action dated Nov. 28, 2012 for Application No. 2012101468, 5 pages.
Australian Office Action dated Nov. 19, 2012 for Application No. 2012101472, 5 pages.
Australian Office Action dated Nov. 19, 2012 for Application No. 2012101469, 6 pages.
Australian Office Action dated Nov. 15, 2012 for Application No. 2012101465, 6 pages.
Australian Office Action dated Nov. 30, 2012 for Application No. 2012101467, 6 pages.
Canadian Office Action dated Mar. 27, 2013 for Application No. 2,793,118, 3 pages.
Certificate of Examination dated Apr. 29, 2013 for Australian Patent No. 2012101191, 4 pages.
Certificate of Examination dated May 21, 2013 for Australian Patent No. 2012101471, 5 pages.
Certificate of Examination dated May 10, 2013 for Australian Patent No. 2012101466, 4 pages.
Certificate of Examination dated May 9, 2013 for Australian Patent No. 2012101473, 4 pages.
Certificate of Examination dated May 6, 2013 for Australian Patent No. 2012101470, 5 pages.
Certificate of Examination dated May 2, 2013 for Australian Patent No. 2012101468, 5 pages.
Certificate of Examination dated May 6, 2013 for Australian Patent No. 2012101472, 5 pages.
Certificate of Examination dated May 6, 2013 for Australian Patent No. 2012101469, 4 pages.
Certificate of Examination dated May 13, 2013 for Australian Patent No. 2012101465, 5 pages.
Certificate of Examination dated May 13, 2013 for Australian Patent No. 2012101467, 5 pages.
Current claims of PCT Application No. PCT/US11/20861 dated Jan. 11, 2011, 17 pages.
GB Patent Act 1977: Combined Search Report and Examination Report under Sections 17 and 18(3) for Application No. GB1009318.5, report dated Oct. 8, 2010, 5 pages.
GB Patent Act 1977: Combined Search Report and Examination Report under Sections 17 and 18(3) for Application No. GB1217449.6, report dated Jan. 17, 2013, 6 pages.
Notice of Allowance dated Jul. 10, 2013, received in U.S. Appl. No. 13/725,656, 14 pages (Gruber).
Notice of Allowance dated Jun. 12, 2013, received in U.S. Appl. No. 11/518,292, 16 pages (Cheyer).
Final Office Action dated Jun. 19, 2012, received in U.S. Appl. No. 12/479,477, 46 pages (van Os).
Final Office Action dated Mar. 25, 2013, received in U.S. Appl. No. 13/251,127, 53 pages (Gruber).
Office Action dated Jul. 26, 2013, received in U.S. Appl. No. 13/725,512, 36 pages (Gruber).
Office Action dated Jul. 11, 2013, received in U.S. Appl. No. 13/784,707, 29 pages (Cheyer).
Office Action dated Jul. 5, 2013, received in U.S. Appl. No. 13/725,713, 34 pages (Guzzoni).
Office Action dated Jul. 2, 2013, received in U.S. Appl. No. 13/725,761,14 pages (Gruber).
Office Action dated Jun. 28, 2013, received in U.S. Appl. No. 13/725,616, 29 pages (Cheyer).
Office Action dated Jun. 27, 2013, received in U.S. Appl. No. 13/725,742, 29 pages (Cheyer).
Office Action dated Apr. 16, 2013, received in U.S. Appl. No. 13/725,550, 8 pages (Cheyer).
Office Action dated Mar. 27, 2013, received in U.S. Appl. No. 13/725,656, 22 pages (Gruber).
Office Action dated Mar. 14, 2013, received in U.S. Appl. No. 12/987,982, 59 pages (Gruber).
Office Action dated Mar. 7, 2013, received in U.S. Appl. No. 13/492,809, 26 pages (Gruber).
Office Action dated Jul. 5, 2013, received in U.S. Appl. No. 13/725,481, 26 pages (Gruber).
Office Action dated Sep. 29, 2011, received in U.S. Appl. No. 12/479,477, 32 pages (van Os).
Office Action dated Jan. 31, 2013, received in U.S. Appl. No. 13/251,088, 38 pages (Gruber).
Office Action dated Nov. 28, 2012, received in U.S. Appl. No. 13/251,104, 49 pages (Gruber).
Office Action dated Dec. 7, 2012, received in U.S. Appl. No. 13/251,118, 52 pages (Gruber).
Office Action dated Nov. 8, 2012, received in U.S. Appl. No. 13/251,127, 35 pages (Gruber).
Russian Office Action dated Nov. 8, 2012 for Application No. 2012144647, 7 pages.
Russian Office Action dated Dec. 6, 2012 for Application No. 2012144605, 6 pages.
Goddeau et al., "A Form-Based Dialogue Manager for Spoken Language Applications", Available online at <http://phasedance.com/pdflicslp96.pdf>, Oct. 1996, 4 pages.

(56) References Cited

OTHER PUBLICATIONS

Goddeau et al., "Galaxy: A Human-Language Interface to On-Line Travel Information", International Conference on Spoken Language Processing, Yokohama, 1994, pp. 707-710.
Gruber, Tom, "(Avoiding) the Travesty of the Commons", Presentation at NPUC, New Paradigms for User Computing, IBM Almaden Research Center, Jul. 24, 2006, 52 pages.
Gruber, Thomas R., "A Translation Approach to Portable Ontology Specifications", Knowledge Acquisition, vol. 5, No. 2, Jun. 1993, pp. 199-220.
Gruber et al., "An Ontology for Engineering Mathematics", Fourth International Conference on Principles of Knowledge Representation and Reasoning, Available online at <http://www-ksl.stanford.edu/knowledge-sharing/papers/engmath.html>, 1994, pp. 1-22.
Gruber, Thomas R., "Automated Knowledge Acquisition for Strategic Knowledge", Machine Learning, vol. 4, 1989, pp. 293-336.
Gruber, Tom, "Big Think Small Screen: How Semantic Computing in the Cloud will Revolutionize the Consumer Experience on the Phone", Keynote Presentation at Web 3.0 Conference, Jan. 2010, 41 pages.
Gruber, Tom, "Collaborating Around Shared Content on the WWW, W3C Workshop on WWW and Collaboration", available at <http://www.w3.org/Collaboration/Workshop/Proceedings/P9.html>, Sep. 1995, 1 page.
Gruber, Tom, "Collective Knowledge Systems: Where the Social Web Meets the Semantic Web", Web Semantics: Science, Services and Agents on the World Wide Web, 2007, pp. 1-19.
International Search Report & Written Opinion received for PCT Patent Application No. PCT/US2013/028412, dated Sep. 26, 2013, 17 pages.
International Search Report and Written Opinion received for PCT Patent Application No. PCT/US2013/028920, dated Jun. 27, 2013, 14 pages.
International Search Report and Written Opinion received for PCT Patent Application No. PCT/US2013/029156, dated Jul. 15, 2013, 9 pages.
International Search Report and Written Opinion received for PCT Patent Application No. PCT/US2013/058916, dated Sep. 8, 2014, 10 pages.
International Search Report and Written Opinion received for PCT Patent Application No. PCT/US2014/029050, dated Jul. 31, 2014, 9 pages.
International Search Report and Written Opinion received for PCT Patent Application No. PCT/US2014/029562, dated Sep. 18, 2014, 21 pages.
International Search Report and Written Opinion received for PCT Patent Application No. PCT/US2014/040401, dated Sep. 4, 2014, 10 pages.
International Search Report and Written Opinion received for PCT Patent Application No. PCT/US2014/040403, dated Sep. 23, 2014, 9 pages.
International Search Report and Written Opinion received for PCT Patent Application No. PCT/US2014/041159, dated Sep. 26, 2014, 10 pages.
International Search Report and Written Opinion received for PCT Patent Application No. PCT/US2014/041173, dated Sep. 10, 2014, 11 pages.
International Search Report and Written Opinion received for PCT Patent Application No. PCT/US2014/23822, dated Sep. 25, 2014, 14 pages.
International Preliminary Report on Patentability received for PCT Patent Application No. PCT/US2012/056382, dated Apr. 10, 2014, 9 pages.
International Preliminary Report on Patentability received for PCT Patent Application No. PCT/US2013/028412, dated Sep. 12, 2014, 12 pages.
International Preliminary Report on Patentability received for PCT Patent Application No. PCT/US2013/028920, dated Sep. 18, 2014, 11 pages.
International Preliminary Report on Patentability received for PCT Patent Application No. PCT/US2013/029156, dated Sep. 9, 2014, 7 pages.
Biemann et al., "Disentangling from Babylonian Confusion—Unsupervised Language Identification", CICLing'05 Proceedings of the 6th international conference on Computational Linguistics and Intelligent Text Processing, vol. 3406, Feb. 2005, pp. 773-784.
Choularton et al., "User Responses to Speech Recognition Errors: Consistency of Behaviour Across Domains", Proceedings of the 10th Australian International Conference on Speech Science & Technology, Dec. 8-10, 2004, pp. 457-462.
Jiang et al., "A Syllable-based Name Transliteration System", Proc. of the 2009 Named Entities Workshop, Aug. 7, 2009, pp. 96-99.
Kazemzadeh et al., "Acoustic Correlates of User Response to Error in Human-Computer Dialogues", Automatic Speech Recognition and Understanding, 2003, pp. 215-220.
Kikui, Gen-Itiro, "Identifying the Coding System and Language of On-Line Documents on the Internet", International Conference on Computational, Aug. 1996, pp. 652-657.
Meng et al., "Generating Phonetic Cognates to Handle Named Entities in English-Chinese Cross-Language Spoken Document Retrieval", Automatic Speech Recognition and Understanding, Dec. 2001, pp. 311-314.
Russo et al., "Urgency is a Non-Monotonic Function of Pulse Rate", Journal of the Acoustical Society of America, vol. 122, No. 5, 2007, 6 pages.
Sethy et al., "A Syllable Based Approach for Improved Recognition of Spoken Names", ITRW on Pronunciation Modeling and Lexicon Adaptation for Spoken language Technology (PMLA2002), Sep. 14-15, 2002, pp. 30-35.
Strom et al., "Intelligent Barge-In in Conversational Systems", MIT laboratory for Computer Science, 2000, 4 pages.
Henrich et al., "Language Identification for the Automatic Grapheme-To-Phoneme Conversion of Foreign Words in a German Text-To-Speech System", Proceedings of the European Conference on Speech Communication and Technology, vol. 2, Sep. 1989, pp. 220-223.
Adobe.com, "Reading PDF Documents with Adobe Reader 6.0 A Guide for People with Disabilities", Available online at <https://www.adobe.com/enterprise/accessibility/pdfs/acro6_cg_ue.pdf>, Jan. 2004, 76 pages.
Bertolucci, Jeff, "Google Adds Voice Search to Chrome Browser", PC World, Jun. 14, 2011, 5 pages.
Lee et al., "A Multi-Touch Three Dimensional Touch-Sensitive Tablet", CHI '85 Proceedings of the SIGCHI Conference on Human Factors in Computing Systems, Apr. 1985, pp. 21-25.
Martins et al., "Extracting and Exploring the Geo-Temporal Semantics of Textual Resources", IEEE International Conference on Semantic Computing, 2008, pp. 1-9.
International Preliminary Report on Patentability received for PCT Patent Application No. PCT/US2009/055577, completed on Aug. 6, 2010, 12 pages.
International Search Report and Written Opinion received for PCT Patent Application No. PCT/US2009/055577, dated Jan. 26, 2010, 9 pages.
International Preliminary Report on Patentability received for PCT Patent Application No. PCT/US2013/041225, dated Nov. 27, 2014, 9 pages.
International Preliminary Report on Patentability received for PCT Patent Application No. PCT/US2013/047668, dated Jan. 8, 2015, 13 pages.
International Preliminary Report on Patentability received for PCT Patent Application No. PCT/US2013/052558, dated Feb. 12, 2015, 12 pages.
International Preliminary Report on Patentability received for PCT Patent Application No. PCT/US2013/058916, dated Mar. 19, 2015, 8 pages.
International Preliminary Report on Patentability received for PCT Patent Application No. PCT/US2013/060121, dated Apr. 2, 2015, 6 pages.
Rios, Mafe, "New Bar Search for Facebook", YouTube, available at <https://www.youtube.com/watch?v=vwgN1WbvCas>, Jul. 19, 2013, 2 pages.

(56) References Cited

OTHER PUBLICATIONS

Rubine, Dean, "Combining Gestures and Direct Manipulation", CHI '92, May 3-7, 1992, pp. 659-660.
Rubine, Dean Harris., "The Automatic Recognition of Gestures", CMU-CS-91-202, Thesis Submitted in Partial Fulfillment of the Requirements for the Degree of Doctor of Philosophy in Computer Science at Carnegie Mellon University, Dec. 1991, 285 pages.
Sen et al., "Indian Accent Text-to-Speech System for Web Browsing", Sadhana, vol. 27, No. 1, Feb. 2002, pp. 113-126.
Westerman, Wayne, "Hand Tracking, Finger Identification and Chordic Manipulation on a Multi-Touch Surface", Doctoral Dissertation, 1999, 363 Pages.
International Search Report and Written Opinion received for PCT Patent Application No. PCT/US2013/047668, dated Feb. 13, 2014, 17 pages.
International Search Report and Written Opinion received for PCT Patent Application No. PCT/US2013/052558, dated Jan. 30, 2014, 15 pages.
International Search Report and Written Opinion received for PCT Patent Application No. PCT/US2013/060121, dated Dec. 6, 2013, 8 pages.
Rose et al., "Inside Macintosh", vols. I, II, and III, Addison-Wesley Publishing Company, Inc., Jul. 1988, 1284 pages.
Stuker et al., "Cross-System Adaptation and Combination for Continuous Speech Recognition: The Influence of Phoneme Set and Acoustic Front-End", Influence of Phoneme Set and Acoustic Front-End, Interspeech, Sep. 17-21, 2006, pp. 521-524.
Wang et al., "An Industrial-Strength Audio Search Algorithm", In Proceedings of the International Conference on Music Information Retrieval (ISMIR), 2003, 7 pages.
Extended European Search Report (includes Supplementary European Search Repon and Search Opinion) received for European Patent Application No. 12727027.0, dated Sep. 26, 2014, 7 pages.
Extended European Search Report (inclusive of the Partial European Search Report and European Search Opinion) received for European Patent Application No. 127293322, dated Oct. 31, 2014, 6 pages.
Extended European Search Report (includes Panial European Search Report and European Search Opinion) received for European Patent Application No. 13169672.6, dated Aug. 14, 2013, 11 pages.
Barrett et al., "How to Personalize the Web", 1997 In proceddings of the ACM SIGCHI Conference on Human Factors in Computer Systems, Mar. 22-27, 1997, pp. 75-82.
Boyer et al., "A Fast String Searching Algorithm", Communications of the ACM, vol. 20, 1977, pp. 762-772.
Chomsky et al., "The Sound Pattern of English", New York, Harper and Row, 1968, 242 pages.
Evermann et al., "Posterior Probability Decoding, Confidence Estimation and System Combination", Proceedings Speech Transcription Workshop, 2000, 4 pages.
Gruber et al., U.S. Appl. No. 61/186,414, filed Jun. 12, 2009 titled "System and Method for Semantic Auto-Completion", 13 pages.
Gruber et al., U.S. Appl. No. 61/493,201, filed Jun. 3, 2011 titled "Generating and Processing Data Items That Represent Tasks to Perform", 68 pages.
Gruber et al., U.S. Appl. No. 61/657,744, filed Jun. 9, 2012 titled "Automatically Adapting User Interfaces for Hands-Free Interaction", 40 pages.
Gruber et al., "U.S. Appl. No. 07/976,970, filed Nov. 16, 1992 titled Status Bar for Application Windows".
Guay, Matthew, "Location-Driven Productivity with Task Ave", available at "http://iphone.appstorm.net/reviews/productivity/location-driven-productivity-with-task-ave/", Feb. 19, 2011, 7 pages.
Haitsma et al., "A Highly Robust Audio Fingerprinting System", In Proceedings of the International Symposium on Music Information Retrieval (ISMIR), 2002, 9 pages.
ID3.org, "id3v2.4.0-Frames", available at "http://id3.org/id3v2.4.0-frames?action=print", retrieved on Jan. 22, 2015, 41 pages.
Kane et al., "Slide Rule: Making Mobile Touch Screens Accessible to Blind People Using Multi-Touch Interaction Techniques", Assets, Oct. 13-15, 2008, pp. 73-80.
Kohler, Joachim, "Multilingual Phone Models for Vocabulary-Independent Speech Recognition Tasks", Speech Communication, vol. 35, No. 1-2, Aug. 2001, pp. 21-30.
Leveseque et al., "A Fundamental Tradeoff in Knowledge Representation and Reasoning", Readings in Knowledge Representation, 1985, 30 pages.
International Preliminary Report on Patentability received for PCT Patent Application No. PCT/US2005/030234, dated Mar. 20, 2007, 9 pages.
International Search Report and Written Opinion received for PCT Patent Application No. PCT/US2005/030234, dated Mar. 17, 2006, 11 pages.
International Preliminary Report on Patentability received for PCT Patent Application No. PCT/US2009/051954, dated Mar. 24, 2011, 8 pages.
International Search Report and Written Opinion received for PCT Patent Application No. PCT/US2009/051954, dated Oct. 30, 2009, 10 pages.
International Preliminary Report on Patentability received for PCT Patent Application No. PCT/US2012/040571, dated Dec. 19, 2013, 10 pages.
International Preliminary Report on Patentability received for PCT Patent Application No. PCT/US2012/040801, dated Dec. 19, 2013, 16 pages.
International Search Report and Written Opinion received for PCT Patent Application No. PCT/US2012/040801, dated Oct. 22, 2012, 20 pages.
International Search Report and Written Opinion received for PCT Patent Application No. PCT/US2012/043100, dated Nov. 15, 2012, 8 pages.
International Preliminary Report on Patentability received for PCT Patent Application No. PCT/US2013/041233, dated Nov. 18, 2014, 8 pages.
International Search Report received for PCT Patent Application No. PCT/US2013/041233, dated Nov. 22, 2013, 3 pages.
International Search Report and Written Opinion received for PCT Patent Application No. PCT/US2014/028785, dated Oct. 17, 2014, 23 pages.
International Search Report and Written Opinion received for PCT Patent Application No. PCT/US2014/049568, dated Nov. 14, 2014, 12 pages.
International Preliminary Report on Patentability received for PCT Patent Application No. PCT/US2014/041159, dated Dec. 17, 2015, 8 pages.
International Preliminary Report on Patentability received for PCT Patent Application No. PCT/US2014/041173, dated Dec. 17, 2015, 9 pages.
Funakoshi, et al., "Lalognosis based on Domain Ontology", Manuscripts of 21st National Convention of JSAI2007, The Japanese Society for Artificial Intelligence, Jun. 22, 2007, 8 pages (3 pages of English Translation and 5 pages of Official Copy).
Non Final Office Action received for U.S. Appl. No. 18/918,428, dated Jun. 14, 2018, 27 pages.
Intention to Grant received for European Patent Application No. 14737379.9, dated Jul. 20, 2018, 7 pages.
Office Action received for Japanese Patent Application No. 2016-172025, dated Jun. 8, 2018, 8 pages (4 pages of English Translation and 4 pages of Official Copy).
Tanaka, Tatsuo, "Next Generation IT Channel Strategy Through Experience Technology", Intellectual Resource Creation, Japan, Nomura Research Institute Ltd. vol. 19, No. 1, Dec. 20, 2010, 17 pages (Official Copy only) (See Communication under 37 CFR § 1.98(a) (3)).
Non-Final Office Action received for U.S. Appl. No. 13/250,947, dated Jun. 5, 2018, 49 pages.
Notice of Allowance received for Japanese Patent Application No. 2014-533617, dated May 21, 2018, 3 pages (1 page of English Translation and 2 pages of official copy).

(56) References Cited

OTHER PUBLICATIONS

Office Action received for Chinese Patent Application No. 201480030632.0, dated Mar. 8, 2018, 19 pages (5 pages of English Translation and 14 pages of Official Copy).
Popescu et al., "Modern Natural Language Interfaces to Databases: Composing Statistical Parsing With Semantic Tractability", Proceedings of the 20th international conference on Computational Linguistics, Article No. 141, Aug. 23-27, 2004, 7 pages.
"Semantic Interpretation for Speech Recognition (SISR) Version 1.0", "W3C Recommendation", Apr. 5, 2007, 45 pages.
Sutton et al., "Joint Parsing and Semantic Role Labeling", Proceedings of the 9th Conference on Computational Natural Language Learning, Jun. 29-30, 2005, pp. 225-228.
Advisory Action received for U.S. Appl. No. 13/250,947, dated Jan. 8, 2018, 6 pages.
Advisory Action received for U.S. Appl. No. 13/913,423, dated Aug. 29, 2016, 3 pages.
Advisory Action received for U.S. Appl. No. 13/913,428, dated Mar. 11, 2015, 6 pages.
Advisory Action received for U.S. Appl. No. 13/913,428, dated Mar. 26, 2018, 3 pages.
Board Opinion received for Chinese Patent Application No. 201280058606.X, dated Apr. 19, 2017, 11 pages (1 page of English Summary and 10 pages of Official Copy).
Decision to Refusal received for Japanese Patent Application No. 2014-533617, dated May 6, 2016, 5 pages (2 pages of English Translation and 3 pages of Official Copy).
Final Office Action received for U.S. Appl. No. 13/250,947, dated Aug. 31, 2017, 52 pages.
Final Office Action received for U.S. Appl. No. 13/250,947, dated Dec. 4, 2015, 26 pages.
Final Office Action received for U.S. Appl. No. 13/913,423, dated Apr. 20, 2016, 18 pages.
Final Office Action received for U.S. Appl. No. 13/913,428, dated Mar. 2, 2017, 20 pages.
Final Office Action received for U.S. Appl. No. 13/913,428, dated Nov. 1, 2017, 23 pages.
Final Office Action received for U.S. Appl. No. 13/913,428, dated Nov. 3, 2015, 32 pages.
Final Office Action received for U.S. Appl. No. 14/210,183, dated Jun. 27, 2016, 23 pages.
Non-Final Office Action received for U.S. Appl. No. 13/250,947, dated Apr. 10, 2015, 26 pages.
Non-Final Office Action received for U.S. Appl. No. 13/250,947, dated Jan. 18, 2017, 33 pages.
Non-Final Office Action received for U.S. Appl. No. 13/913,423, dated Apr. 10, 2015, 15 pages.
Non-Final Office Action received for U.S. Appl. No. 13/913,423, dated Sep. 10, 2015, 17 pages.
Non-Final Office Action received for U.S. Appl. No. 13/913,428, dated Mar. 26, 2015, 31 pages.
Non-Final Office Action received for U.S. Appl. No. 14/210,183, dated Oct. 21, 2015, 19 pages.
Notice of Acceptance received for Australian Patent application No. 10-2014-7011766, dated Jan. 26, 2016, 3 pages (1 page of English Translation and 2 pages of Official Copy).
Notice of Allowance received for Korean Patent Application No. 10-2015-7033597, dated Oct. 13, 2017, 2 pages (Official Copy Only) (See Communication under 37 CFR § 1.98(a) (3)).
Notice of Allowance received for Korean Patent Application No. 10-2015-7033745, dated Nov. 29, 2017, 3 pages (1 page of English Translation and 2 pages of Official Copy).
Office Action received for Australian Patent Application No. 2012316484, dated Jan. 21, 2016, 4 pages.
Office Action received for Australian Patent Application No. 2012316484, dated Jan. 30, 2015, 4 pages.
Office Action received for Australian Patent Application No. 2016200568, dated Feb. 19, 2018, 5 pages.
Office Action received for Australian Patent Application No. 2016200568, dated Mar. 7, 2018, 6 pages.
Office Action received for Australian Patent Application No. 2016200568, dated Mar. 9, 2017, 3 pages.
Office Action received for Australian Patent Application No. 2016200568, dated Nov. 9, 2017, 3 pages.
Office Action received for Chinese Patent Application No. 201280058606.X, dated Apr. 18, 2016, 11 pages (3 pages of English Translation and 8 pages of Official Copy).
Office Action received for Chinese Patent Application No. 201280058606.X, dated Feb. 2, 2015, 25 pages (13 pages of English Translation and 12 pages of Official Copy).
Office Action received for Chinese Patent Application No. 201280058606.X, dated Oct. 26, 2015, 21 pages (13 pages of English Translation and 8 pages of Official Copy).
Office Action received for Chinese Patent Application No. 2014800299632, dated Dec. 18, 2017, 11 pages (3 pages of English Translation and 8 pages of Official Copy).
Office Action received for Chinese Patent Application No. 2014800299632, dated May 2, 2017, 14 pages (5 pages of English Translation and 9 pages of Official Copy).
Office Action received for Chinese Patent Application No. 201480030632.0, dated May 26, 2017, 19 pages (7 pages of English Translation and 12 pages of Official Copy).
Office Action received for European Patent Application No. 12770373.4, dated Aug. 25, 2016, 5 pages.
Office Action received for European Patent Application No. 14736158.8, dated Feb. 9, 2018, 6 pages.
Office Action received for European Patent Application No. 14737379.9, dated Mar. 5, 2018, 5 pages.
Office Action received for Japanese Patent Application No. 2014-533617, dated Jul. 17, 2015, 9 pages (5 pages of English Translation and 4 pages of official Copy).
Office Action received for Japanese Patent Application No. 2014-533617, dated Mar. 3, 2017, 6 pages (3 pages of English Translation and 3 pages of official Copy).
Office Action received for Japanese Patent Application No. 2014-533617, dated Nov. 13, 2017, 6 pages (3 pages of English Translation and 3 pages of official Copy).
Office Action received for Japanese Patent Application No. 2016-172025, dated Jul. 7, 2017, 8 pages (4 pages of English Translation and 4 pages of official Copy).
Office Action received for Korean Patent Application No. 10-2014-7011766, dated Jun. 22, 2015, 4 pages (1 page of English Translation and 3 pages of Official Copy).
Office Action received for Korean Patent Application No. 10-2015-7033597, dated Feb. 8, 2017, 9 pages (4 pages of English Translation and 5 pages of official Copy).
Office Action received for Korean Patent Application No. 10-2015-7033745, dated Jul. 31, 2017, 9 pages (4 pages of English Translation and 5 pages of official Copy).
Office Action received for Korean Patent Application No. 10-2015-7033745, dated Sep. 14, 2016, 16 pages (7 pages of English Translation and 9 pages of Official Copy).
Office Action received for Chinese Patent Application No. 201480029963.2, dated Aug. 6, 2018, 10 pages (3 pages of English Translation and 7 pages of Official Copy).
Summons to Attend Oral Proceeding received for European Patent Application No. 12770373.4, dated Oct. 17, 2018, 9 pages.
Summons to Attend Oral Proceedings received for European Patent Application No. 14736158.8, dated Nov. 6, 2018, 11 pages.
Office Action received for Chinese Patent Application No. 201480030632.0, dated Aug. 29, 2018, 8 pages (3 pages of English Translation and 5 pages of Official Copy).
Decision to Grant received for European Patent Application No. 14737379.9, dated Nov. 22, 2018, 2 pages.
Notice of Allowance received for Chinese Patent Application No. 201480029963.2, dated Feb. 25, 2019, 2 pages (1 page of English Translation and 1 page of Official Copy).
Office Action received for Japanese Patent Application No. 2016-172025, dated Feb. 12, 2019, 5 pages (2 pages of English Translation and 3 pages of Official Copy).
Notice of Allowance received for Chinese Patent Application No. 201480030632.0, dated Mar. 12, 2019, 4 pages (1 page of English Translation and 3 pages of Official Copy).

(56) References Cited

OTHER PUBLICATIONS

Decision to Refuse received for European Patent Application No. 14736158.8, dated May 15, 2019, 10 pages.
Intention to Grant received for European Patent Application No. 12770373.4, dated Jun. 5, 2019, 9 pages.
Minutes of the Oral Proceedings received for European Patent Application No. 14736158.8, dated Apr. 30, 2019, 4 pages.
Decision on Appeal received for U.S. Appl. No. 14/210,183, dated Aug. 2, 2019, 16 pages.
Final Office Action received for U.S. Appl. No. 13/913,428, dated Mar. 7, 2019, 27 pages.
Non-Final Office Action received for U.S. Appl. No. 13/913,428, dated Aug. 21, 2019, 25 pages.
Non-Final Office Action received for U.S. Appl. No. 16/200,281, dated May 15, 2019, 12 pages.
Notice of Allowance received for U.S. Appl. No. 13/250,947, dated Jul. 30, 2019, 26 pages.
Decision to Grant received for European Patent Application No. 12770373.4, dated Sep. 26, 2019, 2 pages.
Notice of Allowance received for U.S. Appl. No. 14/210,183, dated Oct. 17, 2019, 7 pages.
Corrected Notice of Allowance received for U.S. Appl. No. 14/210,183, dated Nov. 20, 2019, 4 pages.
Decision on Appeal received for U.S. Appl. No. 13/913,423, dated Nov. 25, 2019, 6 pages.
Office Action received for Chinese Patent Application No. 201810162529.1, dated Feb. 3, 2020, 19 pages (8 pages of English Translation and 11 pages of Official Copy).

* cited by examiner

FIG. 4
AT&T
1:41
Friday, September 16
Tom Devon
Hey, are you going to the game?
slide to reply
471
470
472

FIG. 6C
5:18 PM
I updated your message.
Ready to send it?
770
To: Tom Devon
I might be late I'll call you
577
Cancel
579
578
570

AUTOMATICALLY ADAPTING USER INTERFACES FOR HANDS-FREE INTERACTION

CROSS-REFERENCE TO RELATED APPLICATIONS

This application claims the benefit of U.S. Provisional Application Ser. No. 61/657,744, entitled "Automatically Adapting User Interfaces For Hands-Free Interaction," filed Jun. 9, 2012, and is a continuation-in-part application of U.S. application Ser. No. 13/250,947, entitled "Automatically Adapting User Interfaces for Hands-Free Interaction," filed Sep. 30, 2011, which claims benefit of U.S. Provisional Application Ser. No. 61/493,201, filed Jun. 3, 2011, and which is a continuation-in-part application of U.S. application Ser. No. 12/987,982, entitled "Intelligent Automated Assistant," filed on Jan. 10, 2011, which claims the benefit of U.S. Provisional Application Ser. No. 61/295,774, filed Jan. 18, 2010. The disclosures of all of the above applications are incorporated herein by reference in their entireties.

FIELD OF THE INVENTION

The present invention relates to multimodal user interfaces, and more specifically to user interfaces that include both voice-based and visual modalities.

BACKGROUND OF THE INVENTION

Many existing operating systems and devices use voice input as a modality by which the user can control operation. One example is voice command systems, which map specific verbal commands to operations, for example to initiate dialing of a telephone number by speaking the person's name. Another example is Interactive Voice Response (IVR) systems, which allow people to access static information over the telephone, such as automated telephone service desks.

Many voice command and IVR systems are relatively narrow in scope and can only handle a predefined set of voice commands. In addition, their output is often drawn from a fixed set of responses.

An intelligent automated assistant, also referred to herein as a virtual assistant, is able to provide an improved interface between human and computer, including the processing of natural language input. Such an assistant, which may be implemented as described in related U.S. Utility application Ser. No. 12/987,982 for "Intelligent Automated Assistant", filed Jan. 10, 2011, the entire disclosure of which is incorporated herein by reference, allows users to interact with a device or system using natural language, in spoken and/or text forms. Such an assistant interprets user inputs, operationalizes the user's intent into tasks and parameters to those tasks, executes services to support those tasks, and produces output that is intelligible to the user.

Virtual assistants are capable of using general speech and natural language understanding technology to recognize a greater range of input, enabling generation of a dialog with the user. Some virtual assistants can generate output in a combination of modes, including verbal responses and written text, and can also provide a graphical user interface (GUI) that permits direct manipulation of on-screen elements. However, the user may not always be in a situation where he or she can take advantage of such visual output or direct manipulation interfaces. For example, the user may be driving or operating machinery, or may have a sight disability, or may simply be uncomfortable or unfamiliar with the visual interface.

Any situation in which a user has limited or no ability to read a screen or interact with a device via contact (including using a keyboard, mouse, touch screen, pointing device, and the like) is referred to herein as a "hands-free context". For example, in situations where the user is attempting to operate a device while driving, as mentioned above, the user can hear audible output and respond using their voice, but for safety reasons should not read fine print, tap on menus, or enter text.

Hands-free contexts present special challenges to the builders of complex systems such as virtual assistants. Users demand full access to features of devices whether or not they are in a hands-free context. However, failure to account for particular limitations inherent in hands-free operation can result in situations that limit both the utility and the usability of a device or system, and can even compromise safety by causing a user to be distracted from a primary task such as operating a vehicle.

SUMMARY

According to various embodiments of the present invention, a user interface for a system such as a virtual assistant is automatically adapted for hands-free use. A hands-free context is detected via automatic or manual means, and the system adapts various stages of a complex interactive system to modify the user experience to reflect the particular limitations of such a context. The system of the present invention thus allows for a single implementation of a virtual assistant or other complex system to dynamically offer user interface elements and to alter user interface behavior to allow hands-free use without compromising the user experience of the same system for hands-on use.

For example, in various embodiments, the system of the present invention provides mechanisms for adjusting the operation of a virtual assistant so that it provides output in a manner that allows users to complete their tasks without having to read details on a screen. Furthermore, in various embodiments, the virtual assistant can provide mechanisms for receiving spoken input as an alternative to reading, tapping, clicking, typing, or performing other functions often achieved using a graphical user interface.

In various embodiments, the system of the present invention provides underlying functionality that is identical to (or that approximates) that of a conventional graphical user interface, while allowing for the particular requirements and limitations associated with a hands-free context. More generally, the system of the present invention allows core functionality to remain substantially the same, while facilitating operation in a hands-free context. In some embodiments, systems built according to the techniques of the present invention allow users to freely choose between hands-free mode and conventional ("hands-on") mode, in some cases within a single session. For example, the same interface can be made adaptable to both an office environment and a moving vehicle, with the system dynamically making the necessary changes to user interface behavior as the environment changes.

According to various embodiments of the present invention, any of a number of mechanisms can be implemented for adapting operation of a virtual assistant to a hands-free context. In various embodiments, the virtual assistant is an intelligent automated assistant as described in U.S. Utility application Ser. No. 12/987,982 for "Intelligent Automated Assistant", filed Jan. 10, 2011, the entire disclosure of which is incorporated herein by reference. Such an assistant engages with the user in an integrated, conversational manner using natural language dialog, and invokes external services when appropriate to obtain information or perform various actions.

According to various embodiments of the present invention, a virtual assistant may be configured, designed, and/or operable to detect a hands-free context and to adjust its operation accordingly in performing various different types of operations, functionalities, and/or features, and/or to combine a plurality of features, operations, and applications of an electronic device on which it is installed. In some embodiments, a virtual assistant of the present invention can detect a hands-free context and adjust its operation accordingly when receiving input, providing output, engaging in dialog with the user, and/or performing (or initiating) actions based on discerned intent.

Actions can be performed, for example, by activating and/or interfacing with any applications or services that may be available on an electronic device, as well as services that are available over an electronic network such as the Internet. In various embodiments, such activation of external services can be performed via application programming interfaces (APIs) or by any other suitable mechanism(s). In this manner, a virtual assistant implemented according to various embodiments of the present invention can provide a hands-free usage environment for many different applications and functions of an electronic device, and with respect to services that may be available over the Internet. As described in the above-referenced related application, the use of such a virtual assistant can relieve the user of the burden of learning what functionality may be available on the device and on web-connected services, how to interface with such services to get what he or she wants, and how to interpret the output received from such services; rather, the assistant of the present invention can act as a go-between between the user and such diverse services.

In addition, in various embodiments, the virtual assistant of the present invention provides a conversational interface that the user may find more intuitive and less burdensome than conventional graphical user interfaces. The user can engage in a form of conversational dialog with the assistant using any of a number of available input and output mechanisms, depending in part on whether a hands-free or hands-on context is active. Examples of such input and output mechanisms include, without limitation, speech, graphical user interfaces (buttons and links), text entry, and the like. The system can be implemented using any of a number of different platforms, such as device APIs, the web, email, and the like, or any combination thereof. Requests for additional input can be presented to the user in the context of a conversation presented in an auditory and/or visual manner. Short and long term memory can be engaged so that user input can be interpreted in proper context given previous events and communications within a given session, as well as historical and profile information about the user.

In various embodiments, the virtual assistant of the present invention can control various features and operations of an electronic device. For example, the virtual assistant can call services that interface with functionality and applications on a device via APIs or by other means, to perform functions and operations that might otherwise be initiated using a conventional user interface on the device. Such functions and operations may include, for example, setting an alarm, making a telephone call, sending a text message or email message, adding a calendar event, and the like. Such functions and operations may be performed as add-on functions in the context of a conversational dialog between a user and the assistant. Such functions and operations can be specified by the user in the context of such a dialog, or they may be automatically performed based on the context of the dialog. One skilled in the art will recognize that the assistant can thereby be used as a mechanism for initiating and controlling various operations on the electronic device. By collecting contextual evidence that contributes to inferences about the user's current situation, and by adjusting operation of the user interface accordingly, the system of the present invention is able to present mechanisms for enabling hands-free operation of a virtual assistant to implement such a mechanism for controlling the device.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION OF THE EMBODIMENTS

Figure 1:
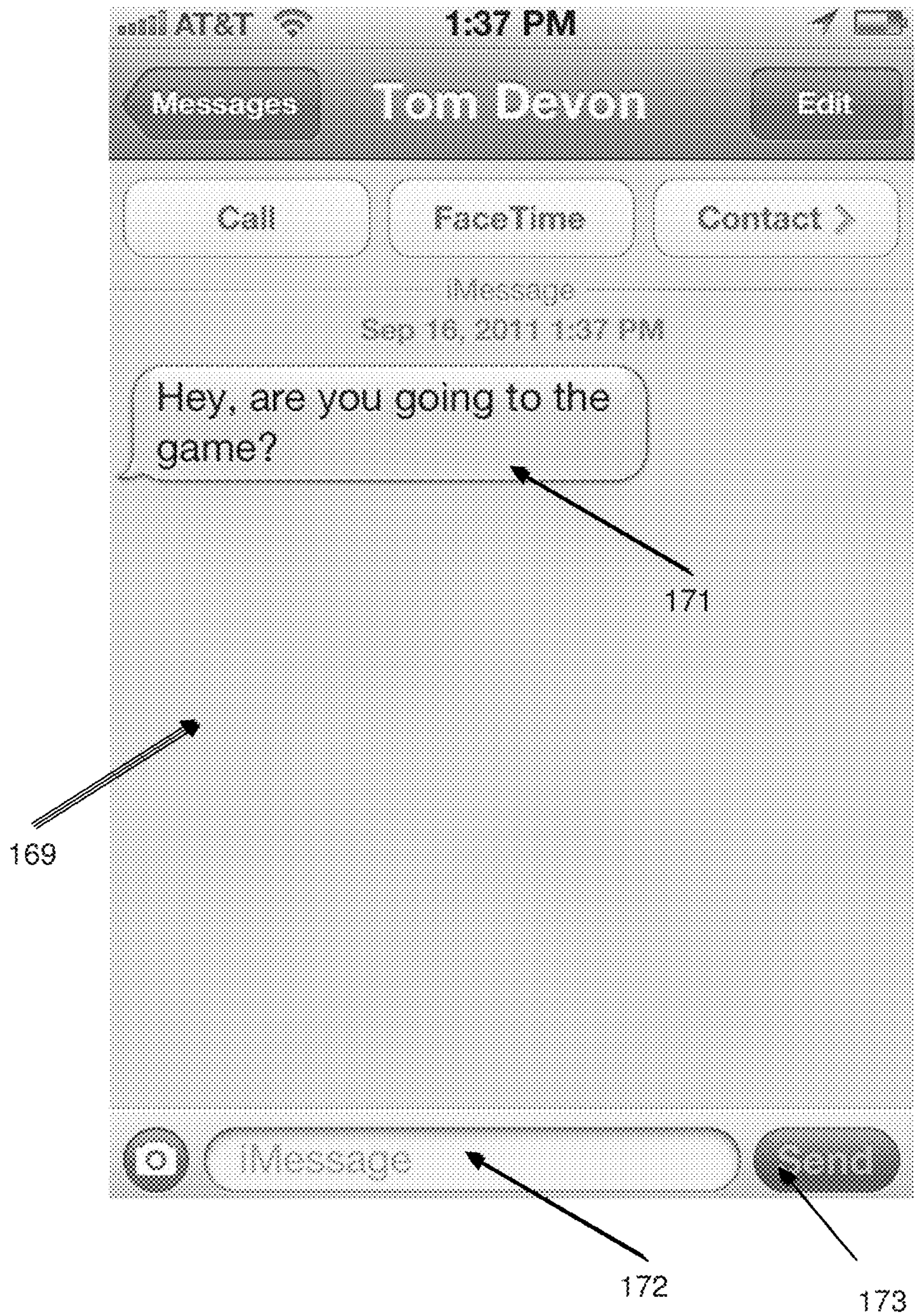
FIG. 1 is a screen shot illustrating an example of a hands-on interface for reading a text message, according to the prior art.

According to various embodiments of the present invention, a hands-free context is detected in connection with operations of a virtual assistant, and the user interface of the virtual assistant is adjusted accordingly, so as to enable the user to interact with the assistant meaningfully in the hands-free context.

For purposes of the description, the term "virtual assistant" is equivalent to the term "intelligent automated assistant", both referring to any information processing system that performs one or more of the functions of:

- interpreting human language input, in spoken and/or text form;
- operationalizing a representation of user intent into a form that can be executed, such as a representation of a task with steps and/or parameters;
- executing task representations, by invoking programs, methods, services, APIs, or the like; and
- generating output responses to the user in language and/or graphical form.

An example of such a virtual assistant is described in related U.S. Utility application Ser. No. 12/987,982 for "Intelligent Automated Assistant", filed Jan. 10, 2011, the entire disclosure of which is incorporated herein by reference.

Various techniques will now be described in detail with reference to example embodiments as illustrated in the accompanying drawings. In the following description, numerous specific details are set forth in order to provide a thorough understanding of one or more aspects and/or features described or reference herein. It will be apparent, however, to one skilled in the art, that one or more aspects and/or features described or reference herein may be practiced without some or all of these specific details. In other instances, well known process steps and/or structures have not been described in detail in order to not obscure some of the aspects and/or features described or reference herein.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in any suitable order. In other words, any sequence or order of steps that may be described in this patent application does not, in and of itself, indicate a requirement that the steps be performed in that order. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

Techniques and mechanisms described or reference herein will sometimes be described in singular form for clarity. However, it should be noted that particular embodiments include multiple iterations of a technique or multiple instantiations of a mechanism unless noted otherwise.

Although described within the context of technology for implementing an intelligent automated assistant, also known as a virtual assistant, it may be understood that the various aspects and techniques described herein may also be deployed and/or applied in other fields of technology involving human and/or computerized interaction with software.

Other aspects relating to virtual assistant technology (e.g., which may be utilized by, provided by, and/or implemented at one or more virtual assistant system embodiments described herein) are disclosed in one or more of the following, the entire disclosures which are incorporated herein by reference:

U.S. Utility application Ser. No. 12/987,982 for "Intelligent Automated Assistant", filed Jan. 10, 2011;
U.S. Provisional Patent Application Ser. No. 61/295,774 for "Intelligent Automated Assistant", filed Jan. 18, 2010;
U.S. Utility application Ser. No. 13/250,854, entitled "Using Context Information to Facilitate Processing of Commands in a Virtual Assistant", filed Sep. 30, 2011;
U.S. patent application Ser. No. 11/518,292 for "Method And Apparatus for Building an Intelligent Automated Assistant", filed Sep. 8, 2006;
U.S. Provisional Patent Application Ser. No. 61/186,414 for "System and Method for Semantic Auto-Completion", filed Jun. 12, 2009.

Hardware Architecture

Generally, the virtual assistant techniques disclosed herein may be implemented on hardware or a combination of software and hardware. For example, they may be implemented in an operating system kernel, in a separate user process, in a library package bound into network applications, on a specially constructed machine, and/or on a network interface card. In a specific embodiment, the techniques disclosed herein may be implemented in software such as an operating system or in an application running on an operating system.

Software/hardware hybrid implementation(s) of at least some of the virtual assistant embodiment(s) disclosed herein may be implemented on a programmable machine selectively activated or reconfigured by a computer program stored in memory. Such network devices may have multiple network interfaces which may be configured or designed to utilize different types of network communication protocols. A general architecture for some of these machines may appear from the descriptions disclosed herein. According to specific embodiments, at least some of the features and/or functionalities of the various virtual assistant embodiments disclosed herein may be implemented on one or more general-purpose network host machines such as an end-user computer system, computer, network server or server system, mobile computing device (e.g., personal digital assistant, mobile phone, smartphone, laptop, tablet computer, or the like), consumer electronic device, music player, or any other suitable electronic device, router, switch, or the like, or any combination thereof. In at least some embodiments, at least some of the features and/or functionalities of the various virtual assistant embodiments disclosed herein may be implemented in one or more virtualized computing environments (e.g., network computing clouds, or the like).

Figure 9:
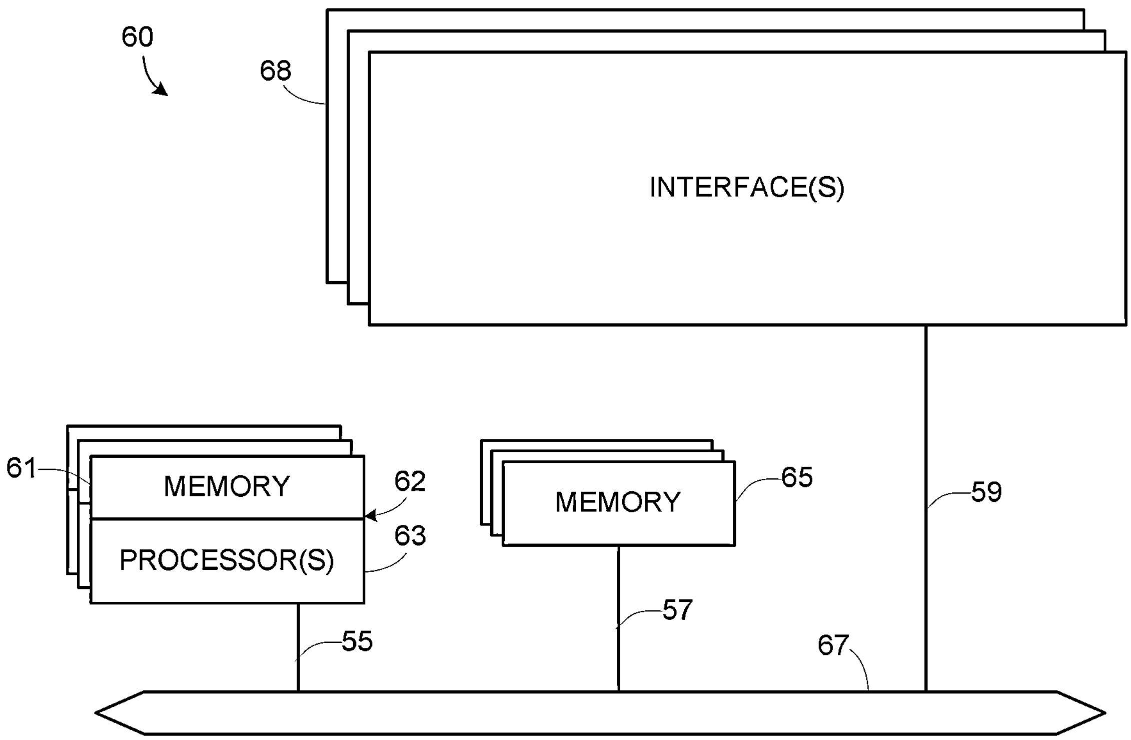
FIG. 9 is a block diagram depicting a computing device suitable for implementing at least a portion of a virtual assistant according to at least one embodiment.

Referring now to FIG. 9, there is shown a block diagram depicting a computing device 60 suitable for implementing at least a portion of the virtual assistant features and/or functionalities disclosed herein. Computing device 60 may be, for example, an end-user computer system, network server or server system, mobile computing device (e.g., personal digital assistant, mobile phone, smartphone, laptop, tablet computer, or the like), consumer electronic device, music player, or any other suitable electronic device, or any combination or portion thereof. Computing device 60 may be adapted to communicate with other computing devices, such as clients and/or servers, over a communications network such as the Internet, using known protocols for such communication, whether wireless or wired.

In one embodiment, computing device 60 includes central processing unit (CPU) 62, interfaces 68, and a bus 67 (such as a peripheral component interconnect (PCI) bus). When acting under the control of appropriate software or firmware, CPU 62 may be responsible for implementing specific functions associated with the functions of a specifically configured computing device or machine. For example, in at least one embodiment, a user's personal digital assistant (PDA) or smartphone may be configured or designed to function as a virtual assistant system utilizing CPU 62, memory 61, 65, and interface(s) 68. In at least one embodiment, the CPU 62 may be caused to perform one or more of the different types of virtual assistant functions and/or operations under the control of software modules/components, which for example, may include an operating system and any appropriate applications software, drivers, and the like.

CPU 62 may include one or more processor(s) 63 such as, for example, a processor from the Motorola or Intel family of microprocessors or the MIPS family of microprocessors. In some embodiments, processor(s) 63 may include specially designed hardware (e.g., application-specific integrated circuits (ASICs), electrically erasable programmable read-only memories (EEPROMs), field-programmable gate arrays (FPGAs), and the like) for controlling the operations of computing device 60. In a specific embodiment, a memory 61 (such as non-volatile random access memory (RAM) and/or read-only memory (ROM)) also forms part of CPU 62. However, there are many different ways in which memory may be coupled to the system. Memory block 61 may be used for a variety of purposes such as, for example, caching and/or storing data, programming instructions, and the like.

As used herein, the term "processor" is not limited merely to those integrated circuits referred to in the art as a processor, but broadly refers to a microcontroller, a microcomputer, a programmable logic controller, an application-specific integrated circuit, and any other programmable circuit.

In one embodiment, interfaces 68 are provided as interface cards (sometimes referred to as "line cards"). Generally, they control the sending and receiving of data packets over a computing network and sometimes support other peripherals used with computing device 60. Among the interfaces that may be provided are Ethernet interfaces, frame relay interfaces, cable interfaces, DSL interfaces, token ring interfaces, and the like. In addition, various types of interfaces may be provided such as, for example, universal serial bus (USB), Serial, Ethernet, Firewire, PCI, parallel, radio frequency (RF), BLUETOOTH® wireless technology, near-field communications (e.g., using near-field magnetics), 802.11 (WiFi), frame relay, TCP/IP, ISON, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDis), and the like. Generally, such interfaces 68 may include ports appropriate for communication with the appropriate media. In some cases, they may also include an independent processor and, in some instances, volatile and/or non-volatile memory (e.g., RAM).

Although the system shown in FIG. 9 illustrates one specific architecture for a computing device 60 for implementing the techniques of the invention described herein, it is by no means the only device architecture on which at least a portion of the features and techniques described herein may be implemented. For example, architectures having one or any number of processors 63 can be used, and such processors 63 can be present in a single device or distributed among any number of devices. In one embodiment, a single processor 63 handles communications as well as routing computations. In various embodiments, different types of virtual assistant features and/or functionalities may be implemented in a virtual assistant system which includes a client device (such as a personal digital assistant or smartphone running client software) and server system(s) (such as a server system described in more detail below).

Regardless of network device configuration, the system of the present invention may employ one or more memories or memory modules (such as, for example, memory block 65) configured to store data, program instructions for the general-purpose network operations and/or other information relating to the functionality of the virtual assistant techniques described herein. The program instructions may control the operation of an operating system and/or one or more applications, for example. The memory or memories may also be configured to store data structures, keyword taxonomy information, advertisement information, user click and impression information, and/or other specific non-program information described herein.

Because such information and program instructions may be employed to implement the systems/methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as floptical disks, and hardware devices that are specially configured to store and perform program instructions, such as read-only memory devices (ROM), flash memory, memristor memory, random access memory (RAM), and the like. Examples of program instructions include both machine code, such as produced by a compiler, and files containing higher level code that may be executed by the computer using an interpreter.

Figure 10:
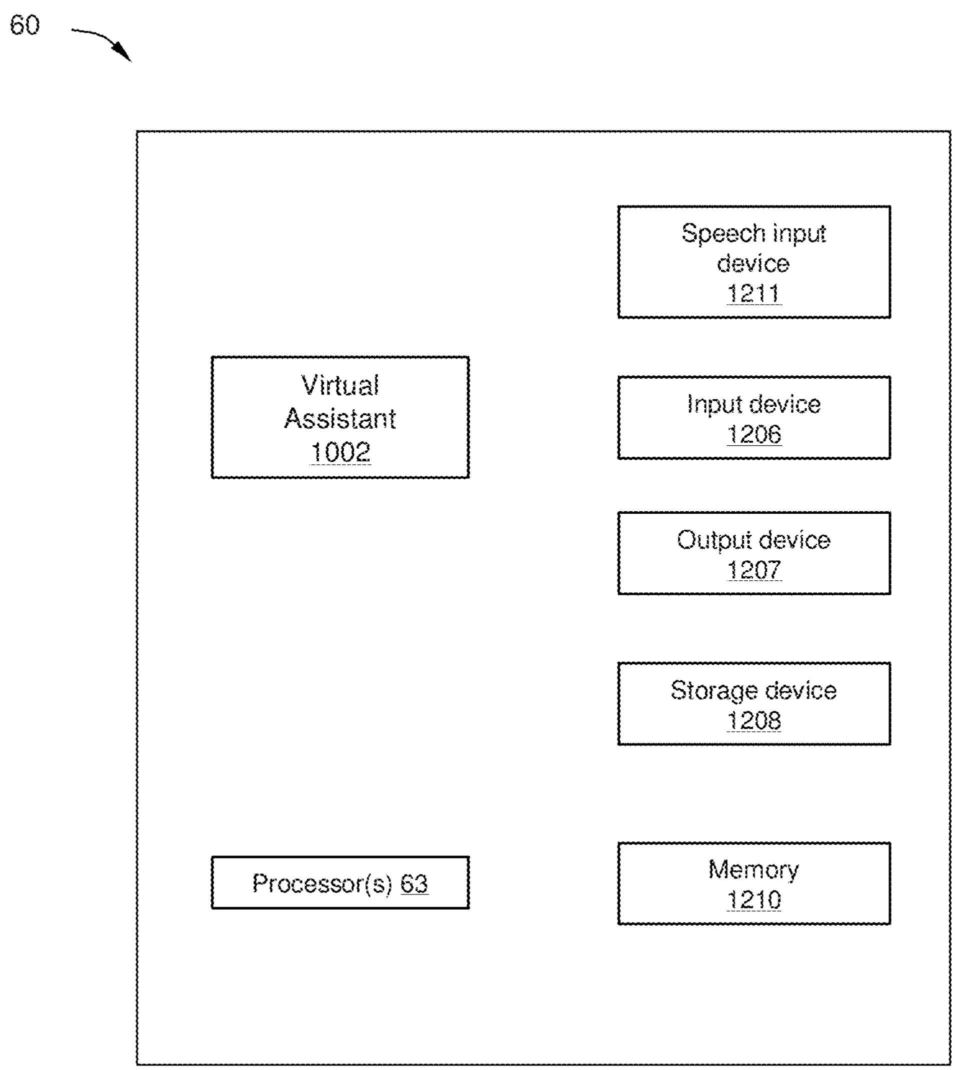
FIG. 10 is a block diagram depicting an architecture for implementing at least a portion of a virtual assistant on a standalone computing system, according to at least one embodiment.

In one embodiment, the system of the present invention is implemented on a standalone computing system. Referring now to FIG. 10, there is shown a block diagram depicting an architecture for implementing at least a portion of a virtual assistant on a standalone computing system, according to at least one embodiment. Computing device 60 includes processor(s) 63 which run software for implementing multimodal virtual assistant 1002. Input device 1206 can be of any type suitable for receiving user input, including for example a keyboard, touchscreen, mouse, touchpad, trackball, five-way switch, joystick, and/or any combination thereof. Device 60 can also include speech input device 1211, such as for example a microphone. Output device 1207 can be a screen, speaker, printer, and/or any combination thereof. Memory 1210 can be random-access memory having a structure and architecture as are known in the art, for use by processor(s) 63 in the course of running software. Storage device 1208 can be any magnetic, optical, and/or electrical storage device for storage of data in digital form; examples include flash memory, magnetic hard drive, CD-ROM, and/or the like.

Figure 11:
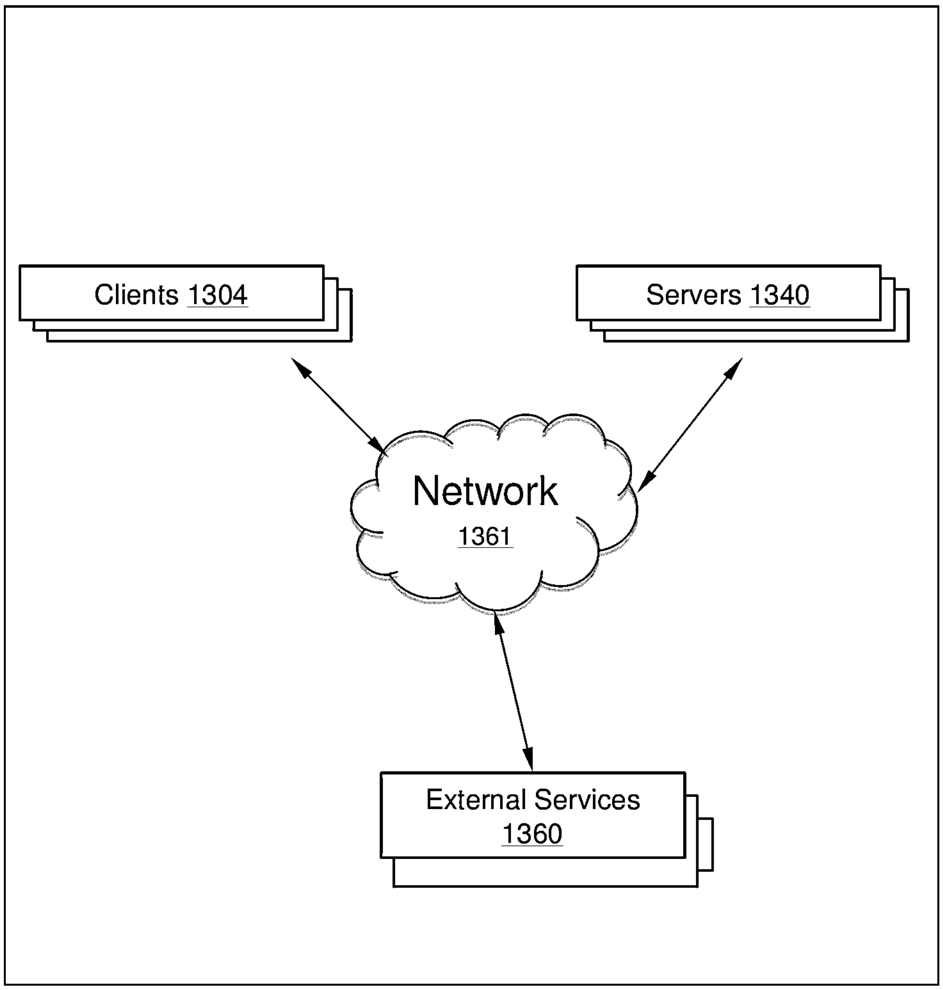
FIG. 11 is a block diagram depicting an architecture for implementing at least a portion of a virtual assistant on a distributed computing network, according to at least one embodiment.

In another embodiment, the system of the present invention is implemented on a distributed computing network, such as one having any number of clients and/or servers. Referring now to FIG. 11, there is shown a block diagram depicting an architecture for implementing at least a portion of a virtual assistant on a distributed computing network, according to at least one embodiment.

In the arrangement shown in FIG. 11, any number of clients 1304 are provided; each client 1304 may run software for implementing client-side portions of the present invention. In addition, any number of servers 1340 can be provided for handling requests received from clients 1304. Clients 1304 and servers 1340 can communicate with one another via electronic network 1361, such as the Internet. Network 1361 may be implemented using any known network protocols, including for example wired and/or wireless protocols.

In addition, in one embodiment, servers 1340 can call external services 1360 when needed to obtain additional information or refer to store data concerning previous interactions with particular users. Communications with external services 1360 can take place, for example, via network 1361. In various embodiments, external services 1360 include web-enabled services and/or functionality related to or installed on the hardware device itself. For example, in an embodiment where assistant 1002 is implemented on a smartphone or other electronic device, assistant 1002 can obtain information stored in a calendar application ("app"), contacts, and/or other sources.

In various embodiments, assistant 1002 can control many features and operations of an electronic device on which it is installed. For example, assistant 1002 can call external services 1360 that interface with functionality and applications on a device via APIs or by other means, to perform functions and operations that might otherwise be initiated using a conventional user interface on the device. Such functions and operations may include, for example, setting an alarm, making a telephone call, sending a text message or email message, adding a calendar event, and the like. Such functions and operations may be performed as add-on functions in the context of a conversational dialog between a user and assistant 1002. Such functions and operations can be specified by the user in the context of such a dialog, or they may be automatically performed based on the context of the dialog. One skilled in the art will recognize that assistant 1002 can thereby be used as a control mechanism for initiating and controlling various operations on the electronic device, which may be used as an alternative to conventional mechanisms such as buttons or graphical user interfaces.

For example, the user may provide input to assistant 1002 such as "I need to wake tomorrow at 8 am". Once assistant 1002 has determined the user's intent, using the techniques described herein, assistant 1002 can call external services 1340 to interface with an alarm clock function or application on the device. Assistant 1002 sets the alarm on behalf of the user. In this manner, the user can use assistant 1002 as a replacement for conventional mechanisms for setting the alarm or performing other functions on the device. If the user's requests are ambiguous or need further clarification, assistant 1002 can use the various techniques described herein, including active elicitation, paraphrasing, suggestions, and the like, and which may be adapted to a hands-free context, so that the correct services 1340 are called and the intended action taken. In one embodiment, assistant 1002 may prompt the user for confirmation and/or request additional context information from any suitable source before calling a service 1340 to perform a function. In one embodiment, a user can selectively disable assistant's 1002 ability to call particular services 1340, or can disable all such service-calling if desired.

Figure 12:
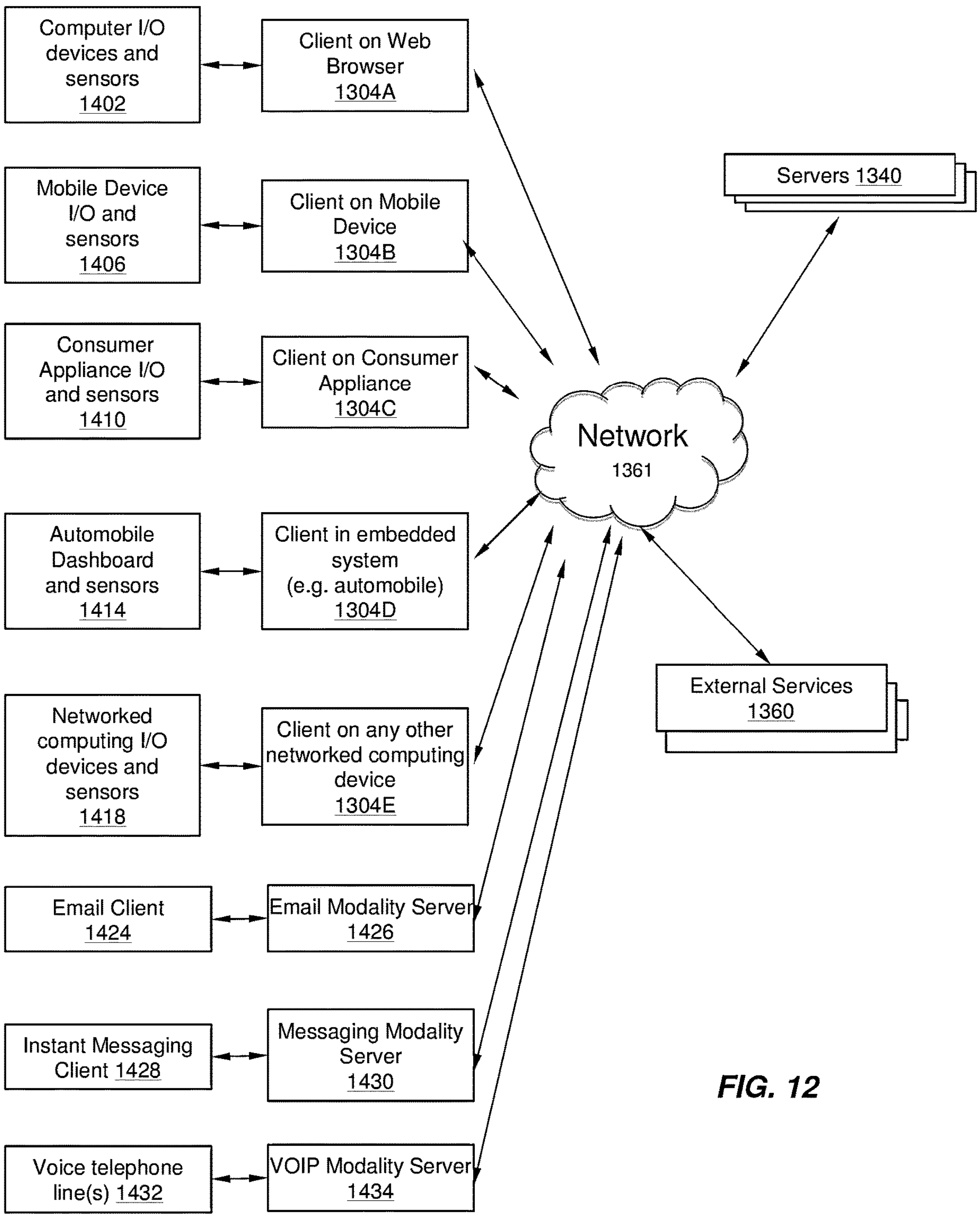
FIG. 12 is a block diagram depicting a system architecture illustrating several different types of clients and modes of operation.

The system of the present invention can be implemented with any of a number of different types of clients 1304 and modes of operation. Referring now to FIG. 12, there is shown a block diagram depicting a system architecture illustrating several different types of clients 1304 and modes of operation. One skilled in the art will recognize that the various types of clients 1304 and modes of operation shown in FIG. 12 are merely exemplary, and that the system of the present invention can be implemented using clients 1304 and/or modes of operation other than those depicted. Additionally, the system can include any or all of such clients 1304 and/or modes of operation, alone or in any combination. Depicted examples include:

- Computer devices with input/output devices and/or sensors 1402. A client component may be deployed on any such computer device 1402. At least one embodiment may be implemented using a web browser 1304A or other software application for enabling communication with servers 1340 via network 1361. Input and output channels may of any type, including for example visual and/or auditory channels. For example, in one embodiment, the system of the invention can be implemented using voice-based communication methods, allowing for an embodiment of the assistant for the blind whose equivalent of a web browser is driven by speech and uses speech for output.
- Mobile Devices with I/O and sensors 1406, for which the client may be implemented as an application on the mobile device 1304B. This includes, but is not limited to, mobile phones, smartphones, personal digital assistants, tablet devices, networked game consoles, and the like.
- Consumer Appliances with I/O and sensors 1410, for which the client may be implemented as an embedded application on the appliance 1304C.
- Automobiles and other vehicles with dashboard interfaces and sensors 1414, for which the client may be implemented as an embedded system application 1304D. This includes, but is not limited to, car navigation systems, voice control systems, in-car entertainment systems, and the like.
- Networked computing devices such as routers 1418 or any other device that resides on or interfaces with a network, for which the client may be implemented as a device-resident application 1304E.
- Email clients 1424, for which an embodiment of the assistant is connected via an Email Modality Server 1426. Email Modality server 1426 acts as a communication bridge, for example taking input from the user as email messages sent to the assistant and sending output from the assistant to the user as replies.
- Instant messaging clients 1428, for which an embodiment of the assistant is connected via a Messaging Modality Server 1430. Messaging Modality server 1430 acts as a communication bridge, taking input from the user as messages sent to the assistant and sending output from the assistant to the user as messages in reply.
- Voice telephones 1432, for which an embodiment of the assistant is connected via a Voice over Internet Protocol (VoIP) Modality Server 1434. VoIP Modality server 1434 acts as a communication bridge, taking input from the user as voice spoken to the assistant and sending output from the assistant to the user, for example as synthesized speech, in reply.

For messaging platforms including but not limited to email, instant messaging, discussion forums, group chat sessions, live help or customer support sessions and the like, assistant 1002 may act as a participant in the conversations. Assistant 1002 may monitor the conversation and reply to individuals or the group using one or more the techniques and methods described herein for one-to-one interactions.

In various embodiments, functionality for implementing the techniques of the present invention can be distributed among any number of client and/or server components. For example, various software modules can be implemented for performing various functions in connection with the present invention, and such modules can be variously implemented to run on server and/or client components. Further details for such an arrangement are provided in related U.S. Utility application Ser. No. 12/987,982 for "Intelligent Automated Assistant", filed Jan. 10, 2011, the entire disclosure of which is incorporated herein by reference.

Figure 13:
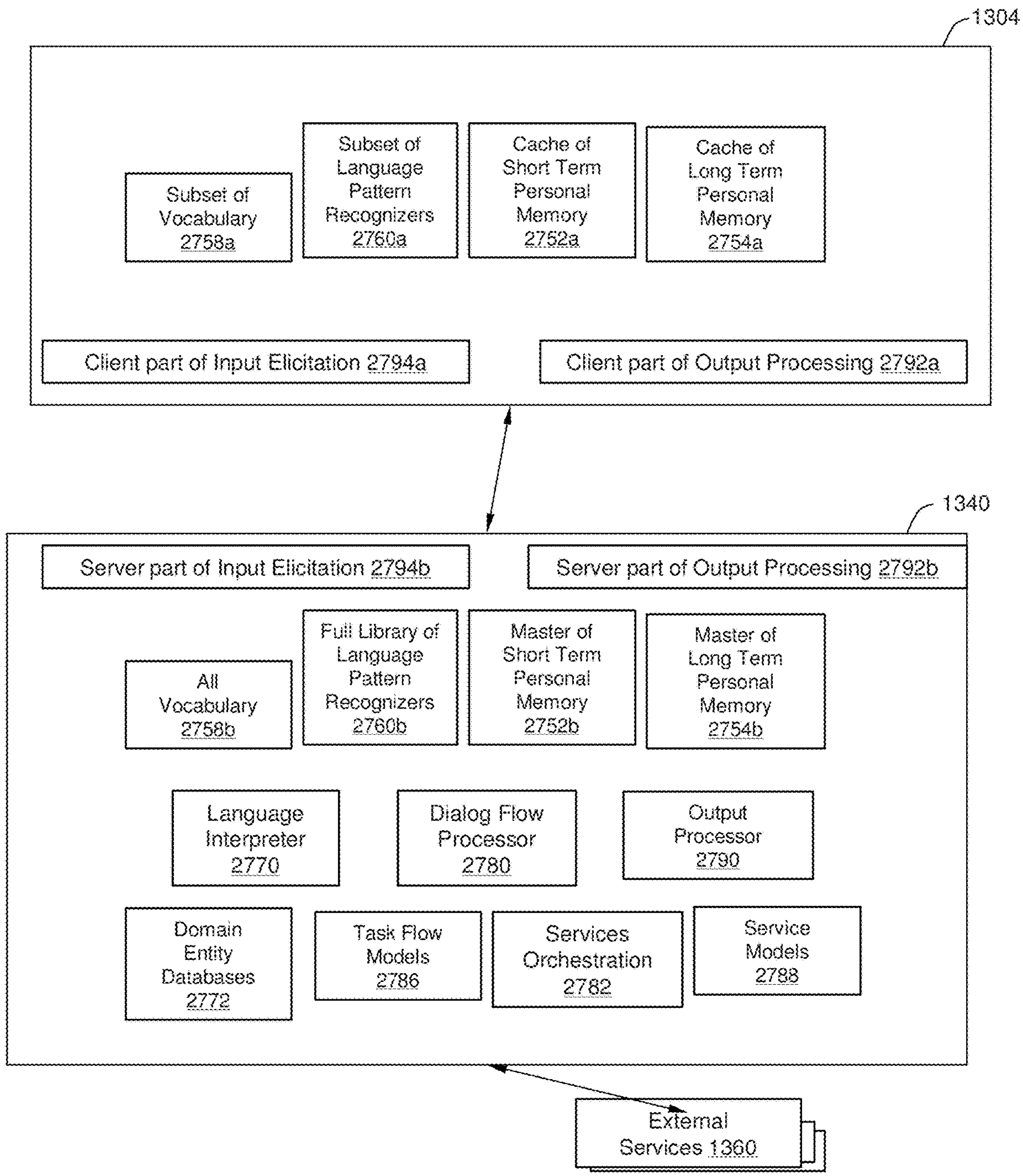
FIG. 13 is a block diagram depicting a client and a server, which communicate with each other to implement the present invention according to one embodiment.
Figure 14A:
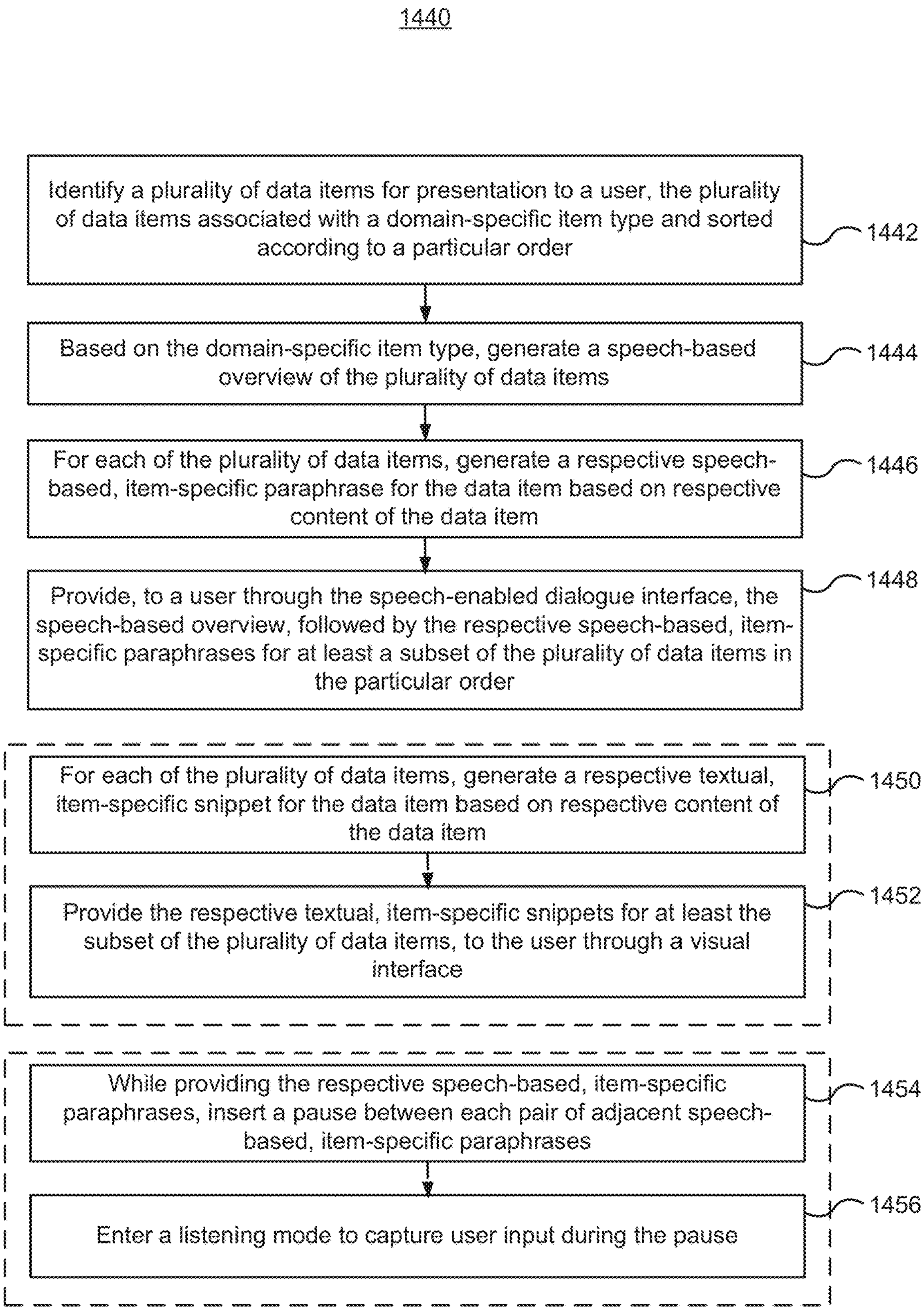
FIGS. 14A-14L is a flow diagram depicting a method of operation of a virtual assistant that provides hands-free list reading according some embodiments.
Figure 14B:
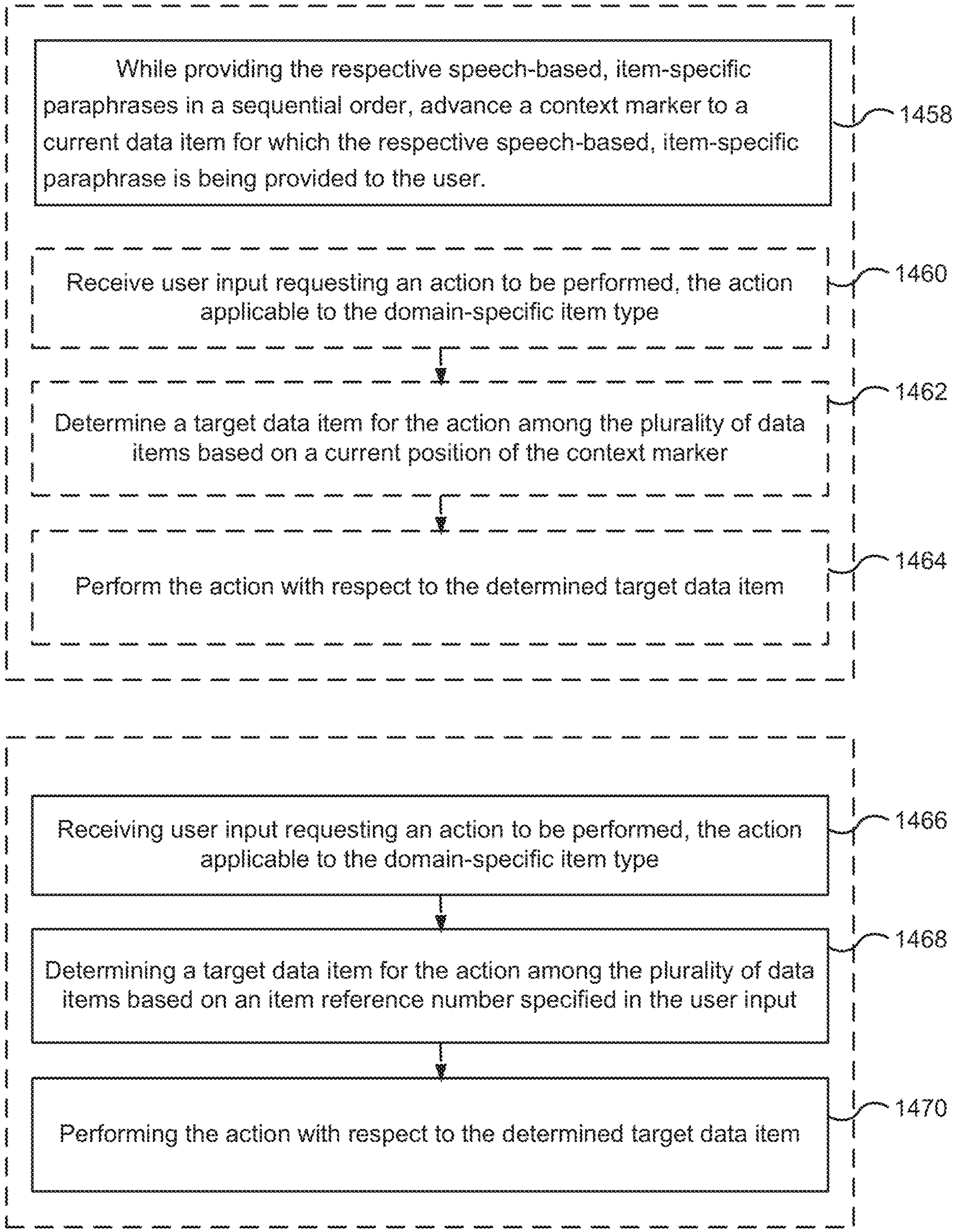
Figure 14C:
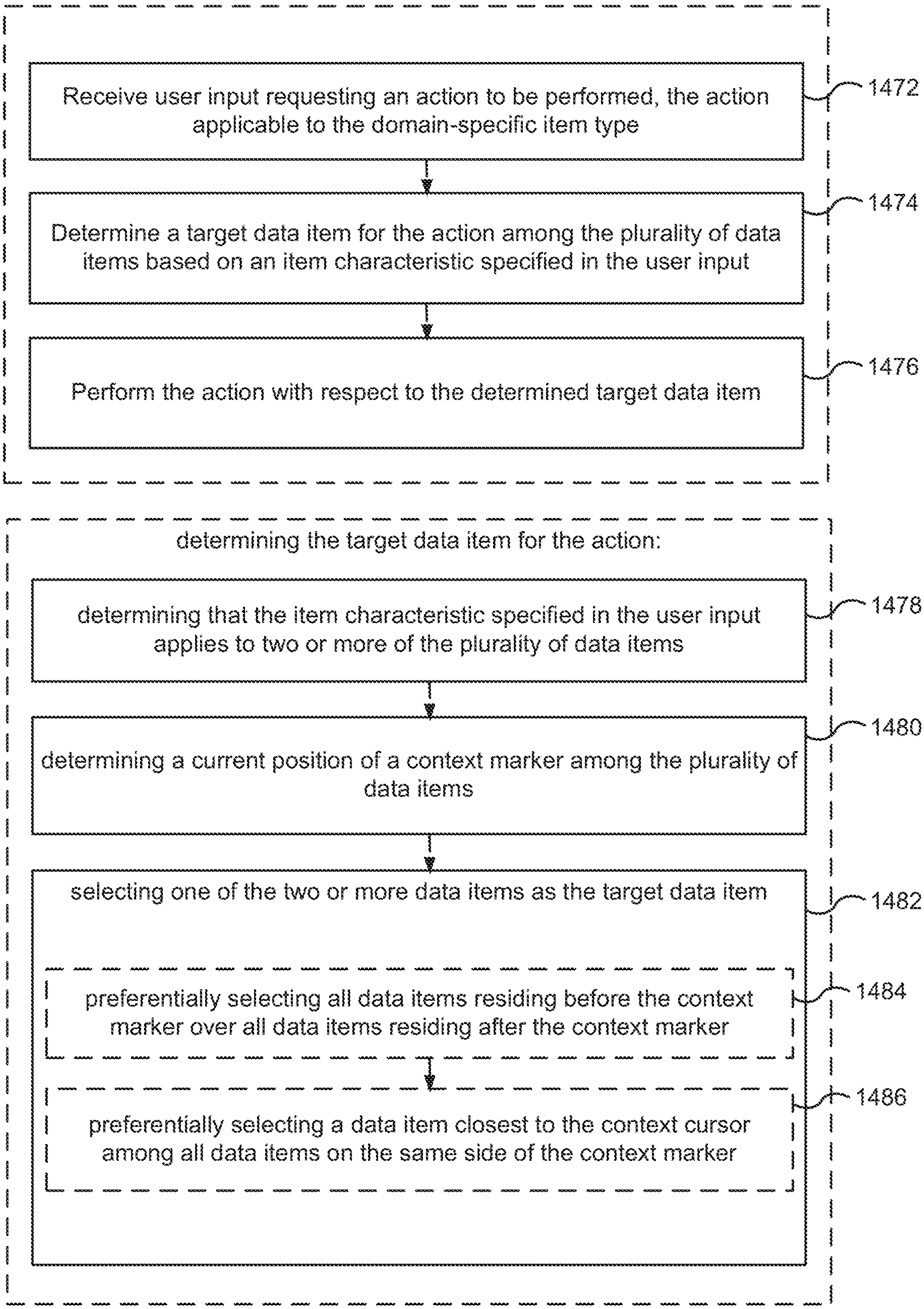
Figure 14D:
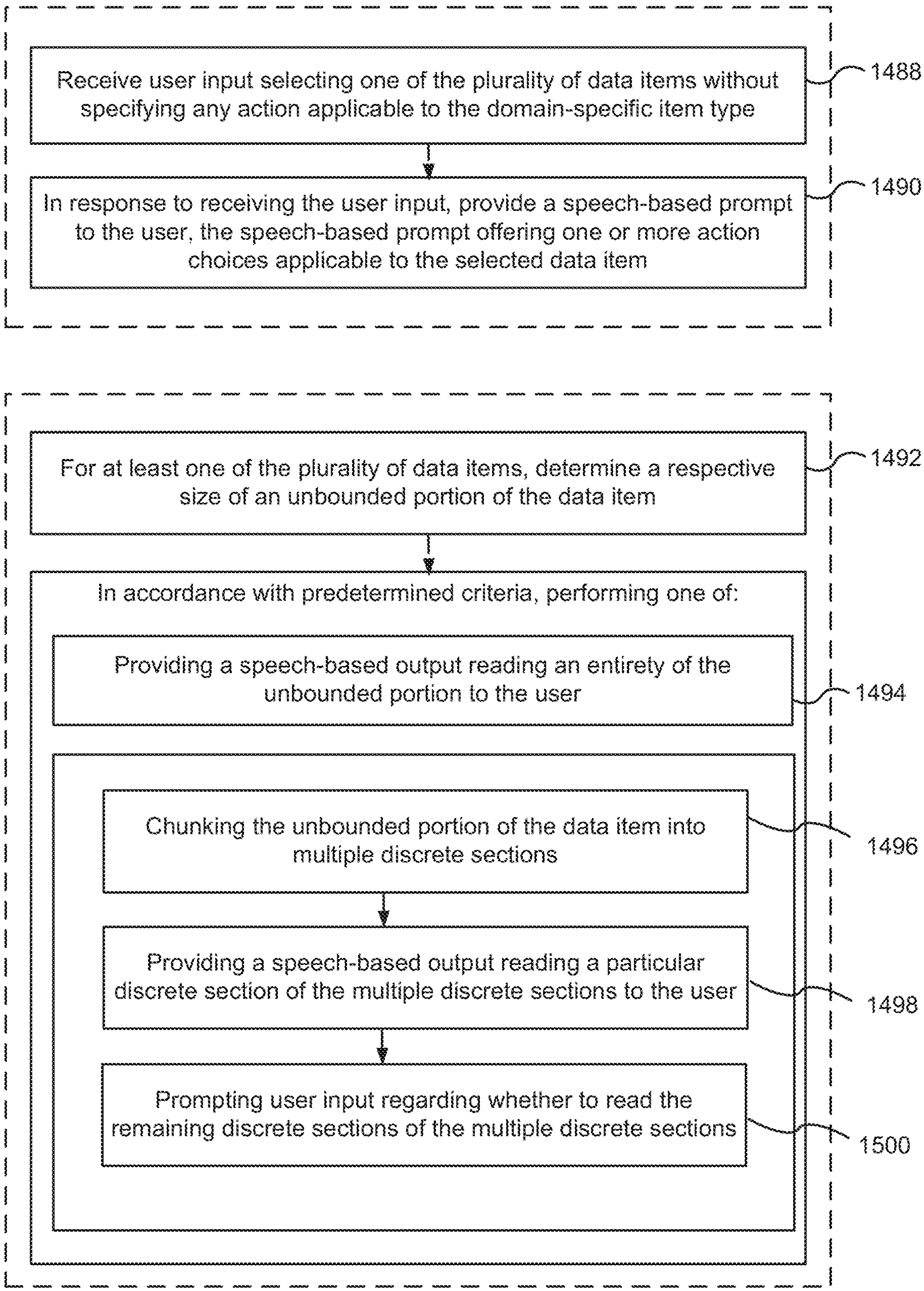
Figure 14E:
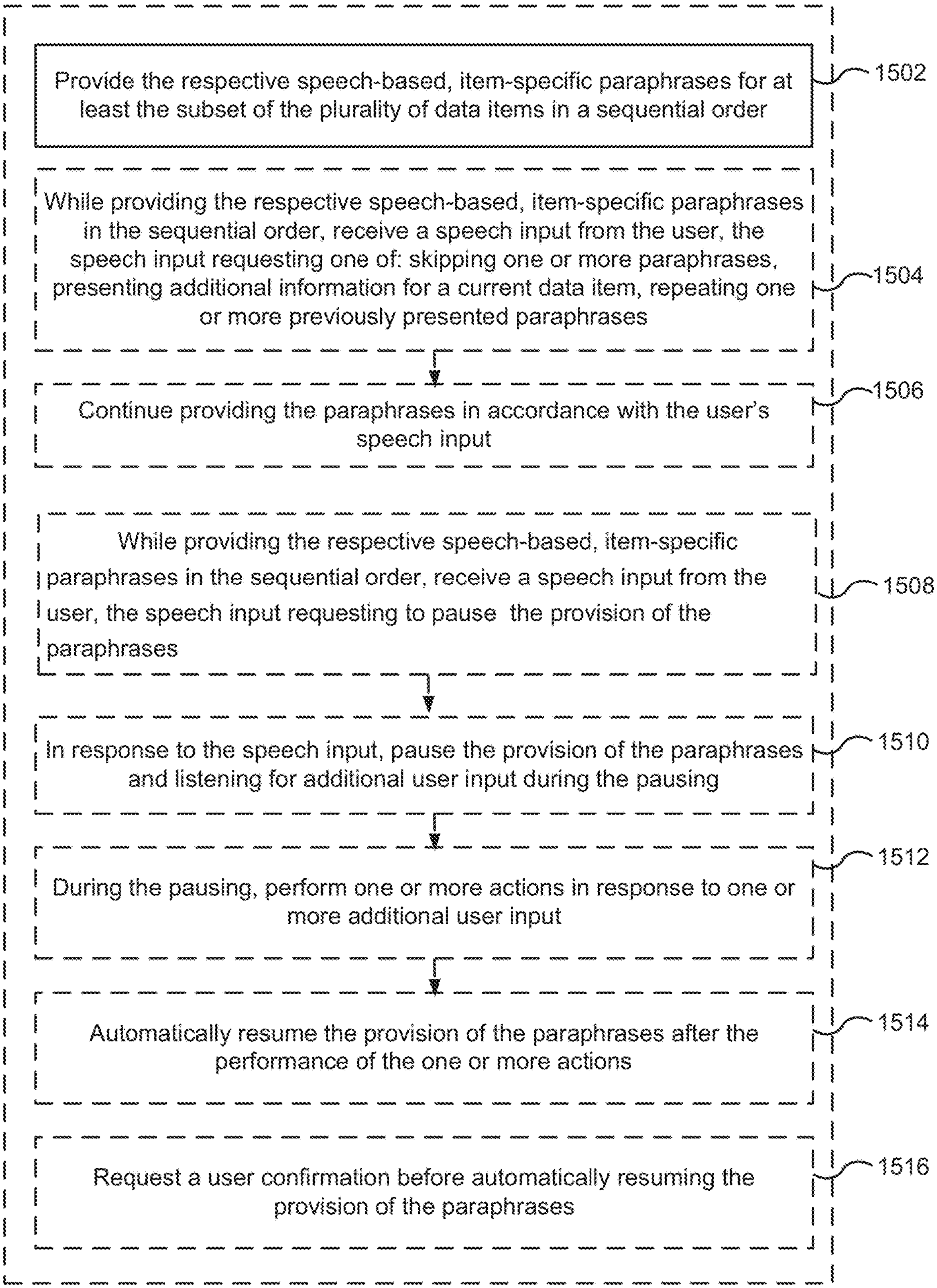
Figure 14F:
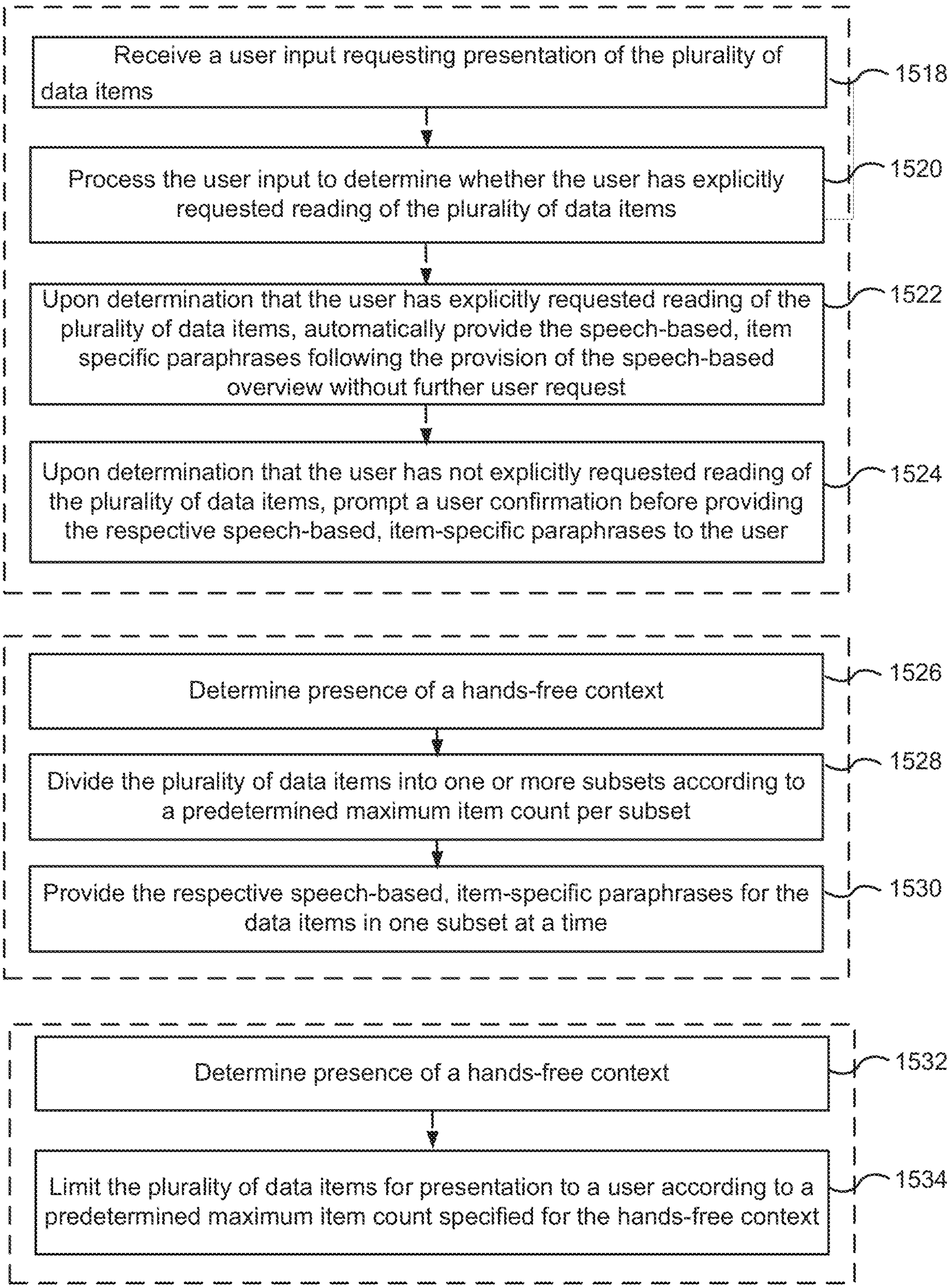
Figure 14G:
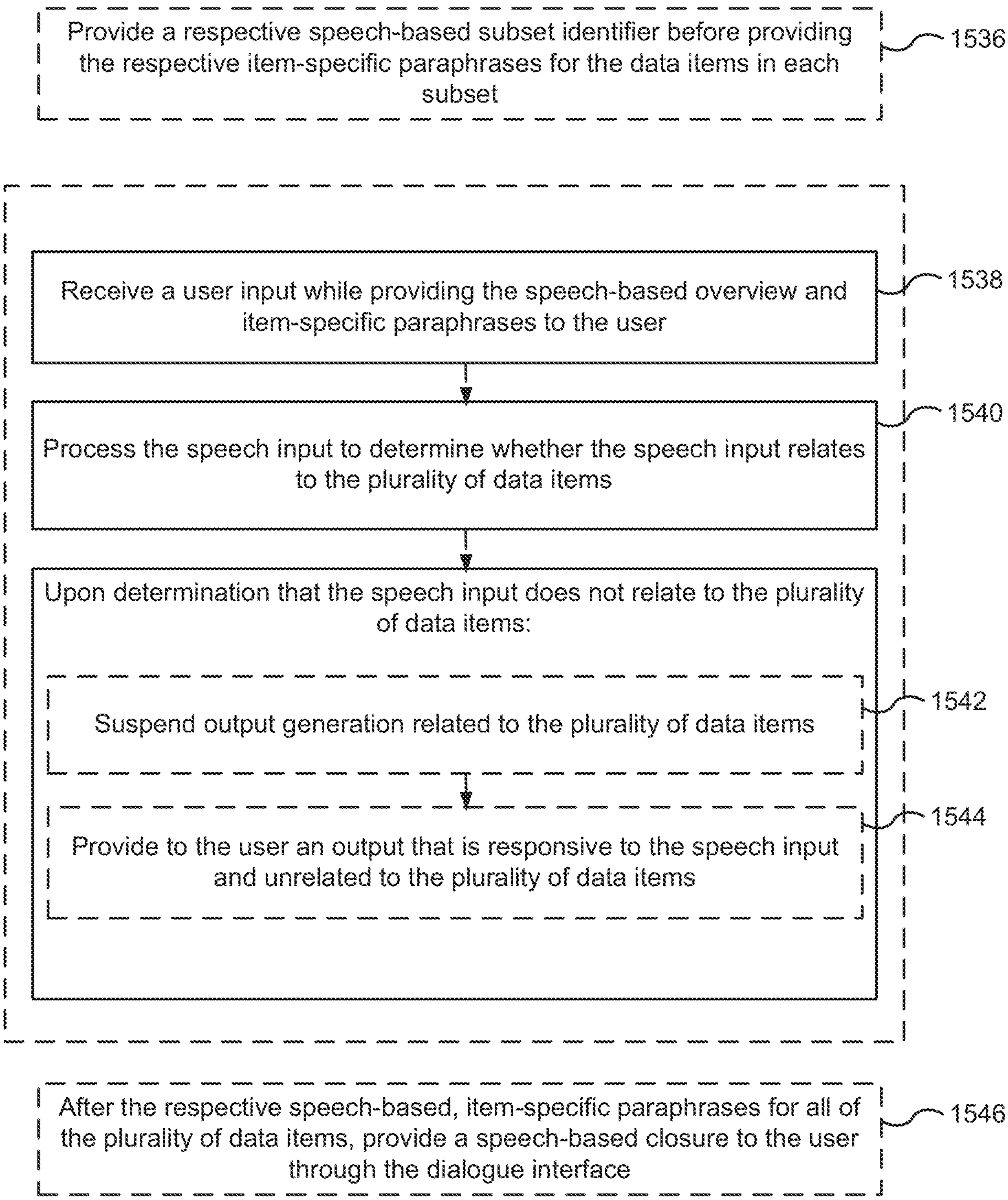
Figure 14H:
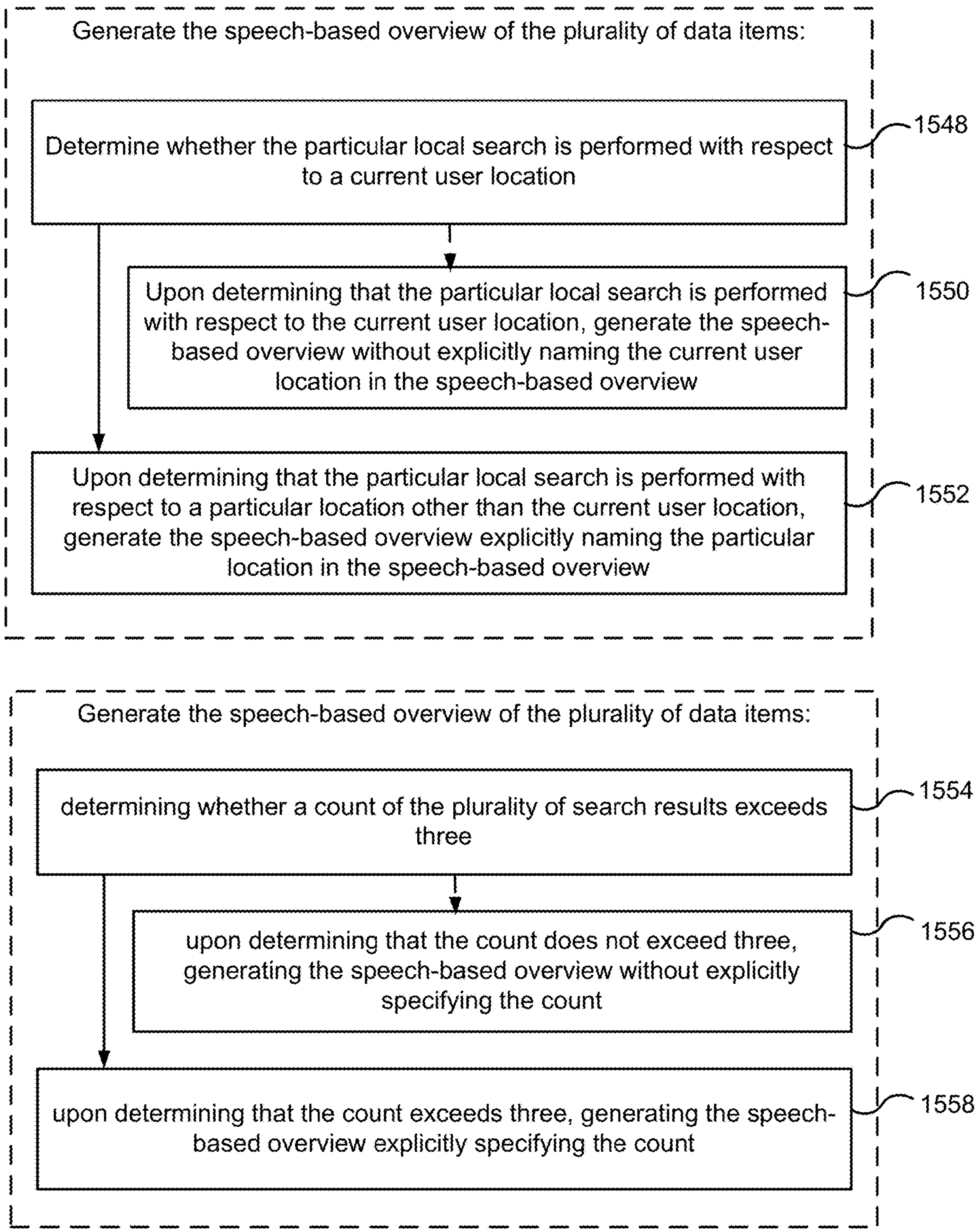
Figure 14I:
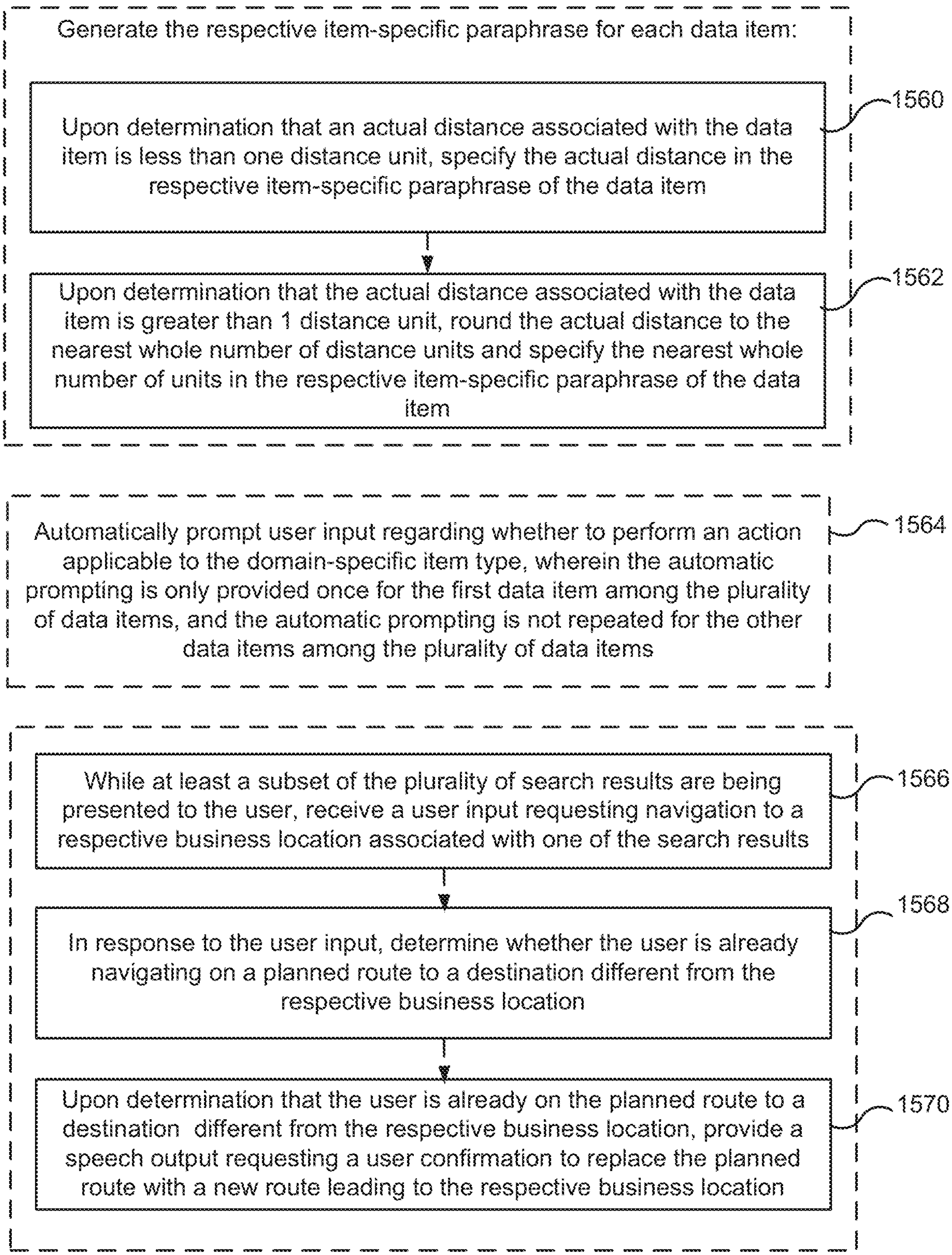
Figure 14J:
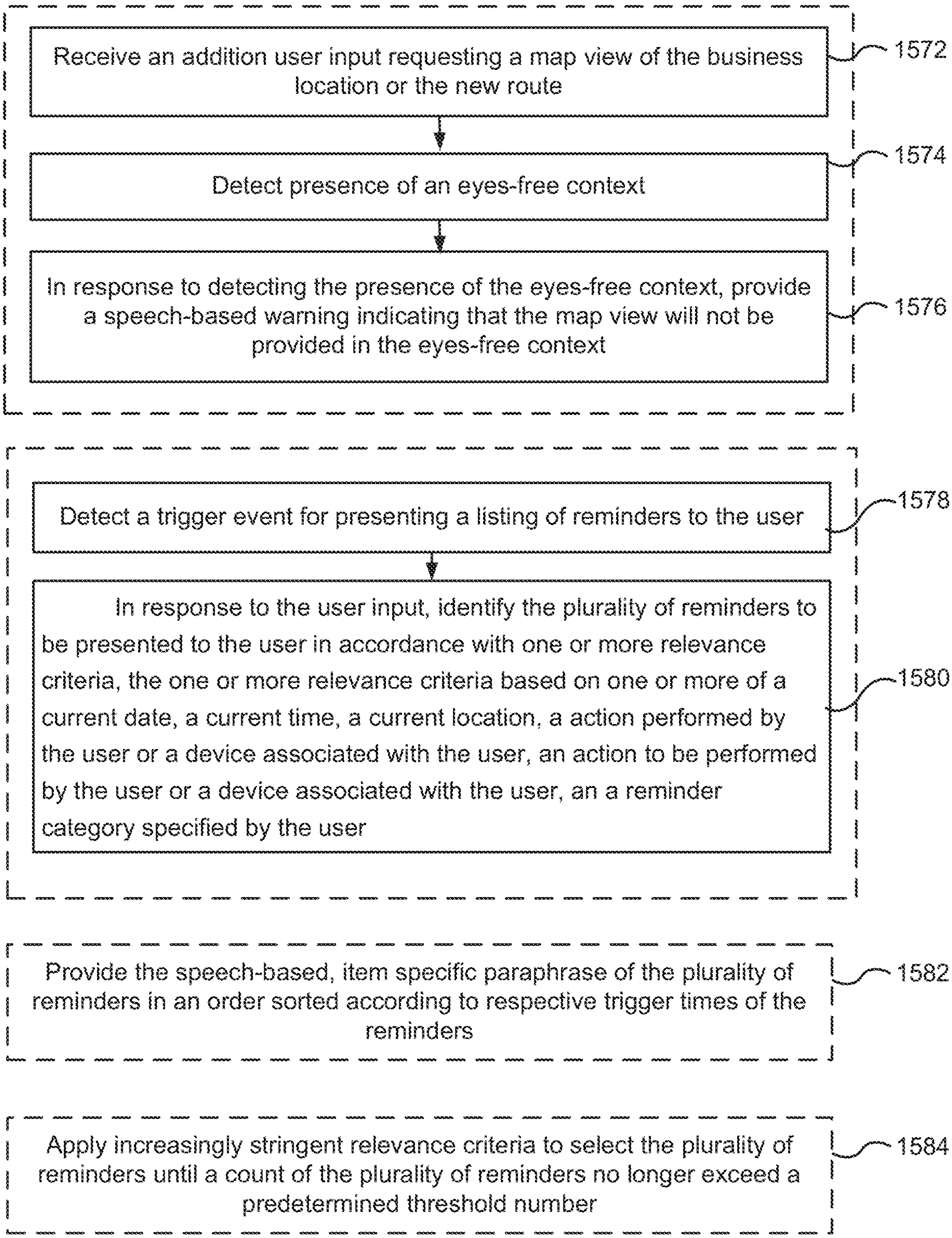
Figure 14K:
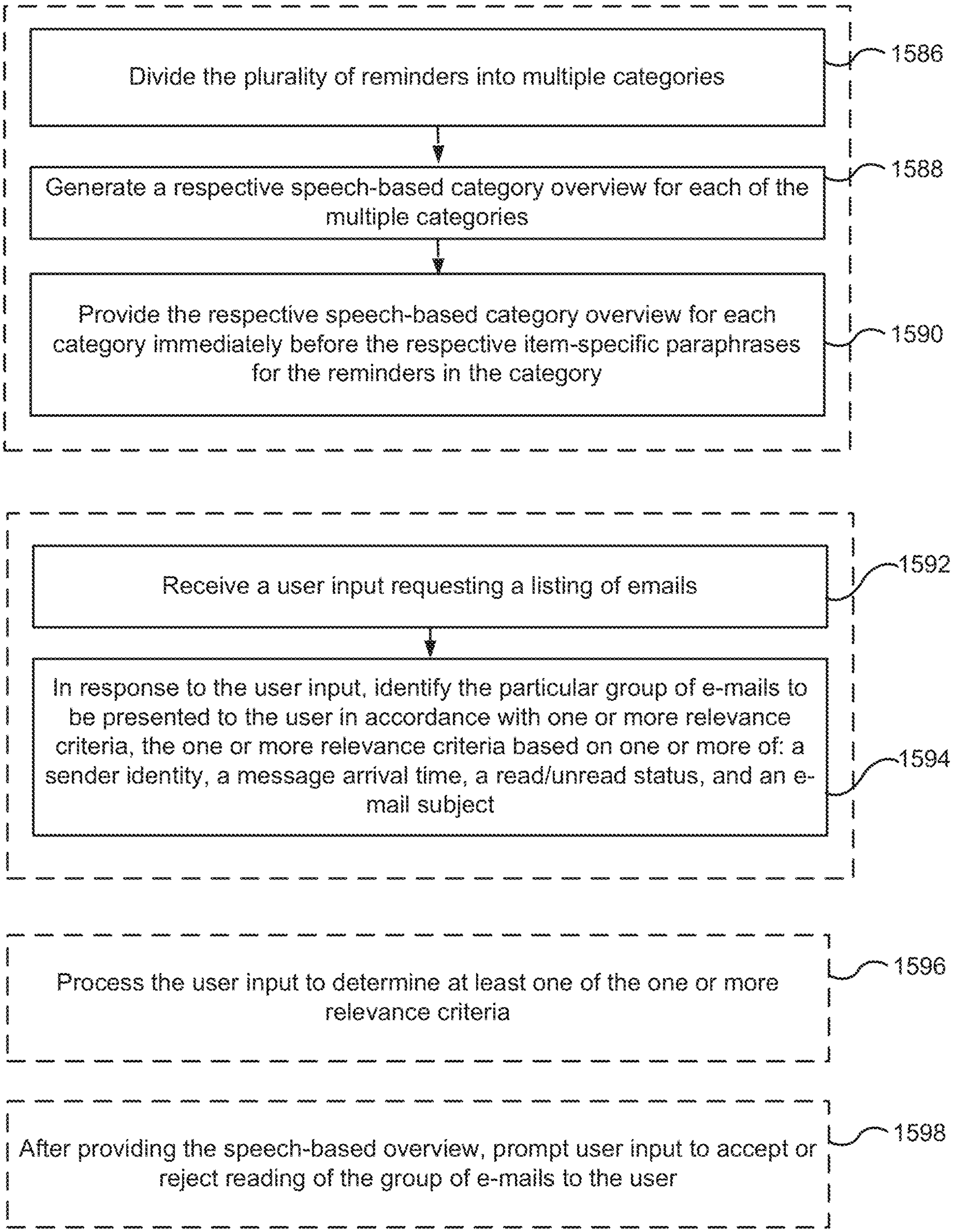
Figure 14L:
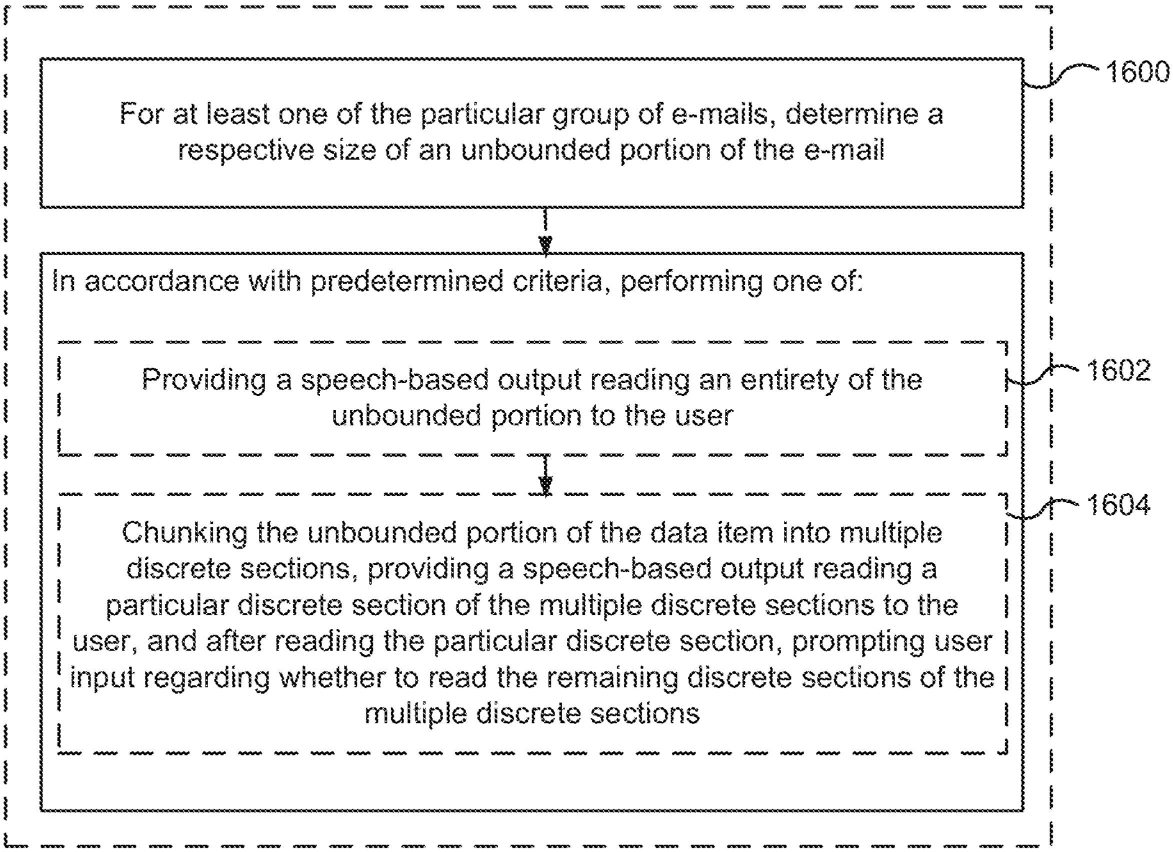

In the example of FIG. 13, input elicitation functionality and output processing functionality are distributed among client 1304 and server 1340, with client part of input elicitation 2794*a* and client part of output processing 2792*a* located at client 1304, and server part of input elicitation 2794*b* and server part of output processing 2792*b* located at server 1340. The following components are located at server 1340:

- complete vocabulary 2758*b;*
- complete library of language pattern recognizers 2760*b;*
- master version of short term personal memory 2752*b;*
- master version of long term personal memory 2754*b.*

In one embodiment, client 1304 maintains subsets and/or portions of these components locally, to improve responsiveness and reduce dependence on network communications. Such subsets and/or portions can be maintained and updated according to well known cache management techniques. Such subsets and/or portions include, for example:

- subset of vocabulary 2758*a;*
- subset of library of language pattern recognizers 2760*a;*
- cache of short term personal memory 2752*a;*
- cache of long term personal memory 2754*a.*

Additional components may be implemented as part of server 1340, including for example:

- language interpreter 2770;
- dialog flow processor 2780;
- output processor 2790;
- domain entity databases 2772;
- task flow models 2786;
- services orchestration 2782;
- service capability models 2788.

Server 1340 obtains additional information by interfacing with external services 1360 when needed.

Conceptual Architecture

Figure 8:
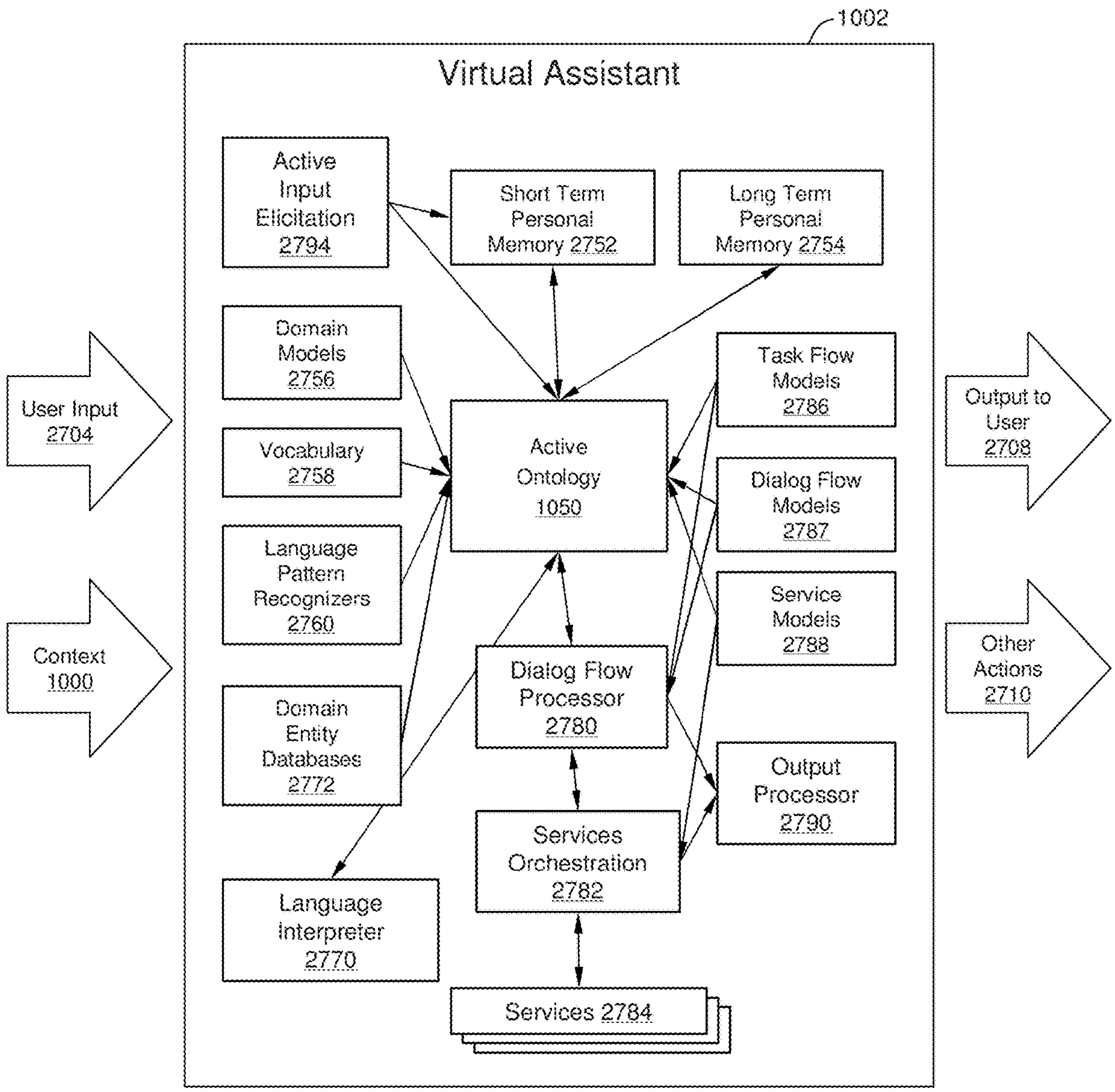
FIG. 8 is a block diagram depicting an example of a virtual assistant system according to one embodiment.

Referring now to FIG. 8, there is shown a simplified block diagram of a specific example embodiment of multimodal virtual assistant 1002. As described in greater detail in related U.S. utility applications referenced above, different embodiments of multimodal virtual assistant 1002 may be configured, designed, and/or operable to provide various different types of operations, functionalities, and/or features generally relating to virtual assistant technology. Further, as described in greater detail herein, many of the various operations, functionalities, and/or features of multimodal virtual assistant 1002 disclosed herein may enable or provide different types of advantages and/or benefits to different entities interacting with multimodal virtual assistant 1002. The embodiment shown in FIG. 8 may be implemented using any of the hardware architectures described above, or using a different type of hardware architecture.

For example, according to different embodiments, multimodal virtual assistant 1002 may be configured, designed, and/or operable to provide various different types of operations, functionalities, and/or features, such as, for example, one or more of the following (or combinations thereof):

- automate the application of data and services available over the Internet to discover, find, choose among, purchase, reserve, or order products and services. In addition to automating the process of using these data and services, multimodal virtual assistant 1002 may also enable the combined use of several sources of data and services at once. For example, it may combine information about products from several review sites, check prices and availability from multiple distributors, and check their locations and time constraints, and help a user find a personalized solution to their problem.

automate the use of data and services available over the Internet to discover, investigate, select among, reserve, and otherwise learn about things to do (including but not limited to movies, events, performances, exhibits, shows and attractions); places to go (including but not limited to travel destinations, hotels and other places to stay, landmarks and other sites of interest, and the like); places to eat or drink (such as restaurants and bars), times and places to meet others, and any other source of entertainment or social interaction that may be found on the Internet.

enable the operation of applications and services via natural language dialog that are otherwise provided by dedicated applications with graphical user interfaces including search (including location-based search); navigation (maps and directions); database lookup (such as finding businesses or people by name or other properties); getting weather conditions and forecasts, checking the price of market items or status of financial transactions; monitoring traffic or the status of flights; accessing and updating calendars and schedules; managing reminders, alerts, tasks and projects; communicating over email or other messaging platforms; and operating devices locally or remotely (e.g., dialing telephones, controlling light and temperature, controlling home security devices, playing music or video, and the like). In one embodiment, multimodal virtual assistant 1002 can be used to initiate, operate, and control many functions and apps available on the device.

offer personal recommendations for activities, products, services, source of entertainment, time management, or any other kind of recommendation service that benefits from an interactive dialog in natural language and automated access to data and services.

According to different embodiments, at least a portion of the various types of functions, operations, actions, and/or other features provided by multimodal virtual assistant 1002 may be implemented at one or more client systems(s), at one or more server system(s), and/or combinations thereof.

According to different embodiments, at least a portion of the various types of functions, operations, actions, and/or other features provided by multimodal virtual assistant 1002 may use contextual information in interpreting and operationalizing user input, as described in more detail herein.

For example, in at least one embodiment, multimodal virtual assistant 1002 may be operable to utilize and/or generate various different types of data and/or other types of information when performing specific tasks and/or operations. This may include, for example, input data/information and/or output data/information. For example, in at least one embodiment, multimodal virtual assistant 1002 may be operable to access, process, and/or otherwise utilize information from one or more different types of sources, such as, for example, one or more local and/or remote memories, devices and/or systems. Additionally, in at least one embodiment, multimodal virtual assistant 1002 may be operable to generate one or more different types of output data/information, which, for example, may be stored in memory of one or more local and/or remote devices and/or systems.

Examples of different types of input data/information which may be accessed and/or utilized by multimodal virtual assistant 1002 may include, but are not limited to, one or more of the following (or combinations thereof):

Voice input: from mobile devices such as mobile telephones and tablets, computers with microphones, BLUETOOTH® wireless technology headsets, automobile voice control systems, over the telephone system, recordings on answering services, audio voicemail on integrated messaging services, consumer applications with voice input such as clock radios, telephone station, home entertainment control systems, and game consoles.

Text input from keyboards on computers or mobile devices, keypads on remote controls or other consumer electronics devices, email messages sent to the assistant, instant messages or similar short messages sent to the assistant, text received from players in multiuser game environments, and text streamed in message feeds.

Location information coming from sensors or location-based systems. Examples include Global Positioning System (GPS) and Assisted GPS (A-GPS) on mobile phones. In one embodiment, location information is combined with explicit user input. In one embodiment, the system of the present invention is able to detect when a user is at home, based on known address information and current location determination. In this manner, certain inferences may be made about the type of information the user might be interested in when at home as opposed to outside the home, as well as the type of services and actions that should be invoked on behalf of the user depending on whether or not he or she is at home.

Time information from clocks on client devices. This may include, for example, time from telephones or other client devices indicating the local time and time zone. In addition, time may be used in the context of user requests, such as for instance, to interpret phrases such as "in an hour" and "tonight".

Compass, accelerometer, gyroscope, and/or travel velocity data, as well as other sensor data from mobile or handheld devices or embedded systems such as automobile control systems. This may also include device positioning data from remote controls to appliances and game consoles.

Clicking and menu selection and other events from a graphical user interface (GUI) on any device having a GUI. Further examples include touches to a touch screen.

Events from sensors and other data-driven triggers, such as alarm clocks, calendar alerts, price change triggers, location triggers, push notification onto a device from servers, and the like.

The input to the embodiments described herein also includes the context of the user interaction history, including dialog and request history.

As described in the related U.S. utility applications referenced above, many different types of output data/information may be generated by multimodal virtual assistant 1002. These may include, but are not limited to, one or more of the following (or combinations thereof):

Text output sent directly to an output device and/or to the user interface of a device;

Text and graphics sent to a user over email;

Text and graphics send to a user over a messaging service;

- Speech output, which may include one or more of the following (or combinations thereof):
  - Synthesized speech;
  - Sampled speech;
  - Recorded messages;
- Graphical layout of information with photos, rich text, videos, sounds, and hyperlinks (for instance, the content rendered in a web browser);
- Actuator output to control physical actions on a device, such as causing it to turn on or off, make a sound, change color, vibrate, control a light, or the like;
- Invoking other applications on a device, such as calling a mapping application, voice dialing a telephone, sending an email or instant message, playing media, making entries in calendars, task managers, and note applications, and other applications;
- Actuator output to control physical actions to devices attached or controlled by a device, such as operating a remote camera, controlling a wheelchair, playing music on remote speakers, playing videos on remote displays, and the like.

It may be appreciated that the multimodal virtual assistant 1002 of FIG. 8 is but one example from a wide range of virtual assistant system embodiments which may be implemented. Other embodiments of the virtual assistant system (not shown) may include additional, fewer and/or different components/features than those illustrated, for example, in the example virtual assistant system embodiment of FIG. 8.

Multimodal virtual assistant 1002 may include a plurality of different types of components, devices, modules, processes, systems, and the like, which, for example, may be implemented and/or instantiated via the use of hardware and/or combinations of hardware and software. For example, as illustrated in the example embodiment of FIG. 8, assistant 1002 may include one or more of the following types of systems, components, devices, processes, and the like (or combinations thereof):

- One or more active ontologies 1050;
- Active input elicitation component(s) 2794 (may include client part 2794*a* and server part 2794*b*);
- Short term personal memory component(s) 2752 (may include master version 2752*b* and cache 2752*a*);
- Long-term personal memory component(s) 2754 (may include master version 2754*b* and cache 2754*a*);
- Domain models component(s) 2756;
- Vocabulary component(s) 2758 (may include complete vocabulary 2758*b* and subset 2758*a*);
- Language pattern recognizer(s) component(s) 2760 (may include full library 2760*b* and subset 2760*a*);
- Language interpreter component(s) 2770;
- Domain entity database(s) 2772;
- Dialog flow processor component(s) 2780;
- Services orchestration component(s) 2782;
- Services component(s) 2784;
- Task flow models component(s) 2786;
- Dialog flow models component(s) 2787;
- Service models component(s) 2788;
- Output processor component(s) 2790.

In certain client/server-based embodiments, some or all of these components may be distributed between client 1304 and server 1340. Such components are further described in the related U.S. utility applications referenced above.

In one embodiment, virtual assistant 1002 receives user input 2704 via any suitable input modality, including for example touchscreen input, keyboard input, spoken input, and/or any combination thereof. In one embodiment, assistant 1002 also receives context information 1000, which may include event context, application context, personal acoustic context, and/or other forms of context, as described in related U.S. Utility application Ser. No. 13/250,854, entitled "Using Context Information to Facilitate Processing of Commands in a Virtual Assistant", filed Sep. 30, 2011, the entire disclosure of which is incorporated herein by reference. Context information 1000 also includes a hands-free context, if applicable, which can be used to adapt the user interface according to techniques described herein.

Upon processing user input 2704 and context information 1000 according to the techniques described herein, virtual assistant 1002 generates output 2708 for presentation to the user. Output 2708 can be generated according to any suitable output modality, which may be informed by the hands-free context as well as other factors, if appropriate. Examples of output modalities include visual output as presented on a screen, auditory output (which may include spoken output and/or beeps and other sounds), haptic output (such as vibration), and/or any combination thereof.

Additional details concerning the operation of the various components depicted in FIG. 8 are provided in related U.S. Utility application Ser. No. 12/987,982 for "Intelligent Automated Assistant", filed Jan. 10, 2011, the entire disclosure of which is incorporated herein by reference.

Adapting User Interfaces to a Hands-Free Context

For illustrative purposes, the invention is described herein by way of example. However, one skilled in the art will recognize that the particular input and output mechanisms depicted in the examples are merely intended to illustrate one possible interaction between the user and assistant 1002, and are not intended to limit the scope of the invention as claimed. Furthermore, in alternative embodiments, the invention can be implemented in a device without necessarily involving a multimodal virtual assistant 1002; rather, the functionality of the invention can be implemented directly in an operating system or application running on any suitable device, without departing from the essential characteristics of the invention as solely defined in the claims.

Referring now to FIG. 1, there is shown a screen shot illustrating an example of a conventional hands-on interface 169 for reading a text message, according to the prior art. A graphical user interface (GUI) as shown in FIG. 1 generally requires the user to be able to read fine details, such as the message text shown in bubble 171, and respond by typing in text field 172 and tapping send button 173. In many devices, such actions require looking at and touching the screen, and are therefore impractical to perform in certain contexts, referred to herein as hands-free contexts.

Figure 2:
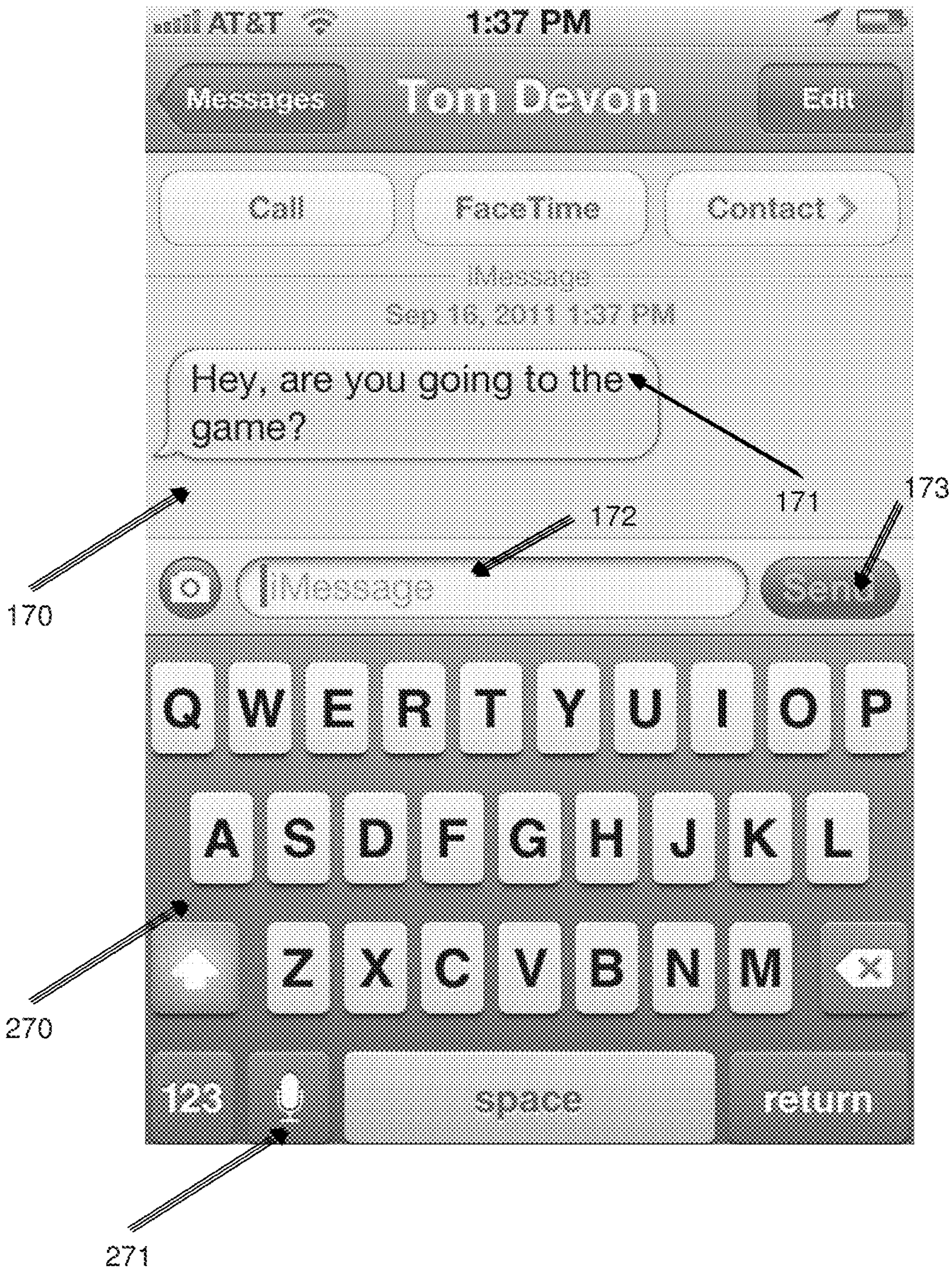
FIG. 2 is a screen shot illustrating an example of an interface for responding to a text message.

Referring now to FIG. 2, there is shown a screen shot illustrating an example of an interface 170 for responding to text message 171. Virtual keyboard 270 is presented in response to the user tapping in text field 172, permitting text to be entered in text field 172 by tapping on areas of the screen corresponding to keys. The user taps on send button 173 when the text message has been entered. If the user wishes to enter text by speaking, he or she taps on speech button 271, which invokes a voice dictation interface for receiving spoken input and converting it into text. Thus, button 271 provides a mechanism by which the user can indicate that he or she is in a hands-free context.

Figure 3A:
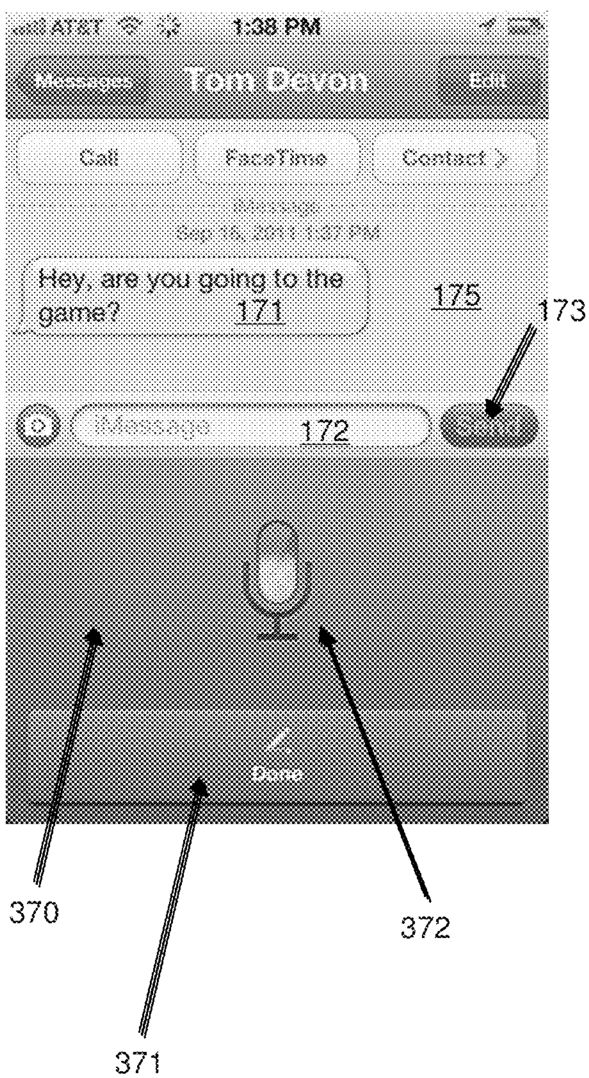
FIGS. 3A and 3B are a sequence of screen shots illustrating an example wherein a voice dictation interface is used to reply to a text message.
Figure 3B:
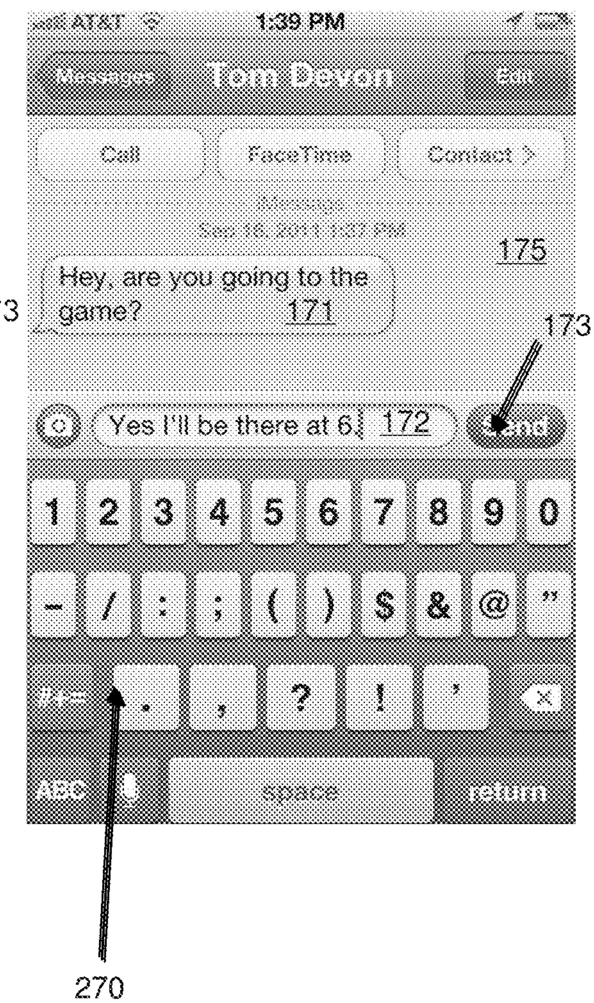

Referring now to FIGS. 3A and 3B, there is shown a sequence of screen shots illustrating an example of an interface 175 wherein a voice dictation interface is used to reply to text message 171. Screen 370 is presented, for example, after user taps on speech button 271. Microphone icon 372 indicates that the device is ready to accept spoken input. The user inputs speech, which is received via speech input device 1211, which may be a microphone or similar device. The user taps on Done button 371 to indicate that he or she has finished entering spoken input.

The spoken input is converted to text, using any well known speech-to-text algorithm or system. Speech-to-text functionality can reside on device 60 or on a server. In one embodiment, speech-to-text functionality is implemented using, for example, Nuance Recognizer, available from Nuance Communications, Inc. of Burlington, Mass.

As shown in FIG. 3B, the results of the conversion can be shown in field 172. Keyboard 270 can be presented, to allow the user to edit the generated text in field 172. When the user is satisfied with the entered text, he or she taps on Send button 173 to cause the text message to be sent.

In the example described in connection with FIGS. 2, 3A, and 3B, several operations require the user to look at the display screen and/or provide touch input. Such operations include:

- reading text message 171 on the display screen;
- touching button 271 to enter speech input mode;
- touching Done button 371 to indicate that speech input is finished;
- viewing the converted text generated from the user's spoken input;
- touching Send button 173 to send the message.

In one embodiment of the present invention, mechanisms for accepting and processing speech input are integrated into device 60 in a manner that reduces the need for a user to interact with a display screen and/or to use a touch interface when in a hands-free context. Accordingly, the system of the present invention is thus able to provide an improved user interface for interaction in a hands-free context.

Referring now to FIGS. 4 and 5A through 5D, there is shown a series of screen shots illustrating an example of an interface for receiving and replying to a text message, according to one embodiment wherein a hands-free context is recognized; thus, in this example, the need for the user to interact with the screen is reduced, in accordance with the techniques of the present invention.

Figure 4:
FIG. 4 is a screen shot illustrating an example of an interface for receiving a text message, according to one embodiment.

In FIG. 4, screen 470 depicts text message 471 which is received while device 60 is in a locked mode. The user can activate slider 472 to reply to or otherwise interact with message 471 according to known techniques. However, in this example, device 60 may be out of sight and/or out of reach, or the user may be unable to interact with device 60, for example, if he or she is driving or engaged in some other activity. As described herein, multimodal virtual assistant 1002 provides functionality for receiving and replying to text message 471 in such a hands-free context.

In one embodiment, virtual assistant 1002 installed on device 60 automatically detects the hands-free context. Such detection may take place by any means of determining a scenario or situation where it may be difficult or impossible for the user to interact with the screen of device 60 or to properly operate the GUI.

For example and without limitation, determination of hands-free context can be made based on any of the following, singly or in any combination:

- data from sensors (including, for example, compass, accelerometer, gyroscope, speedometer (e.g., whether device 60 is travelling at or above a predetermined speed), ambient light sensor, BLUETOOTH® wireless technology connection detector, clock, WiFi signal detector, microphone, and the like);
- determining that device 60 is in a certain geographic location, for example via GPS (for example, determining that device 60 is travelling on or near a road);
- speed data (for example, via GPS, speedometer, accelerometer, wireless data signal information (e.g., cell tower triangulation));
- data from a clock (for example, hands-free context can be specified as being active at certain times of day and/or certain days of the week);
- predefined parameters (for example, the user or an administrator can specify that hands-free context is active when any condition or combination of conditions is detected);
- connection of BLUETOOTH® or other wireless I/O devices (for example, if a connection with a BLUETOOTH® wireless technology enabled interface of a moving vehicle is detected);
- any other information that may indicate that the user is in a moving vehicle or driving a car;
- presence or absence of attached peripherals, including headphones, headsets, charging cables or docking stations (including vehicle docking stations), things connected by adapter cables, and the like;
- determining that the user is not in contact with or in close proximity to device 60;
- the particular signal used to trigger interaction with assistant 1002 (for example, a motion gesture in which the user holds the device to the ear, or the pressing of a button on Bluetooth device using BLUETOOTH® wireless technology, or pressing of a button on an attached audio device);
- detection of specific words in a continuous stream of words (for example, assistant 1002 can be configured to be listening for commands, and to be invoked when the user calls its name or says some command such as "Computer!"; the particular command can indicate whether or not hands-free context is active As noted above, hands-free context can be automatically determined based (at least in part) on determining that the user is in a moving vehicle or driving a car. In some embodiments, such determination is made without user input and without regard to whether a digital assistant has been separately invoked by a user. For example, a device through which a user interacts with assistant 1002 may contain multiple applications that are configured to execute within an operating system on the device. The determination that the device is in a vehicle, therefore, can be made without regard to whether a user has selected or activated a digital assistant application for immediate execution on the device. In some embodiments, the determination is made while a digital assistant application is not being executed in the foreground of an operating system, or is not displaying a graphical user interface on the device. Thus, in some embodiments, it is not necessary for a user to separately invoke a digital assistant application in order for the device to determine that it is in a vehicle. In some embodiments, automatically determining that the electronic device is in the vehicle is performed without regard to whether the digital assistant application was recently invoked by a user.

In some embodiments, automatically determining a hands free context can be based (at least in part) on detecting that the electronic device is moving at or above a first predetermined speed. For example, if the device is moving above about 20 miles per hour, indicating that the user is not merely walking, hands-free context can be invoked, including invoking a listening mode as described below. In some embodiments, automatically determining a hands free context can be further based on detecting that the electronic device is moving at or below a second predetermined speed. This is useful, for example, to prevent the device from mistakenly detecting hands-free context when a user is in a plane. In some embodiments, hands-free context can be detected if the electronic device is moving less than about 150 miles per hour, indicating that the user is likely not flying in an airplane.

In other embodiments, the user can manually indicate that hands-free context is active or inactive, and/or can schedule hands-free context to activate and/or deactivate at certain times of day and/or certain days of the week.

In one embodiment, upon receiving text message 470 while in hands-free context, multimodal virtual assistant 1002 causes device 60 to output an audio indication, such as a beep or tone, indicating receipt of a text message. As described above, the user can activate slider 472 to reply to or otherwise interact with message 471 according to known techniques (for example if hands-free mode was incorrectly detected, or if the user elects to stop driving or otherwise make him or herself available for hands-on interaction with device 60). Alternatively, the user can engage in a spoken dialog with assistant 1002 to enable interaction with assistant 1002 in a hands-free manner.

In one embodiment, the user initiates the spoken dialog by any suitable mechanism appropriate to a hands-free context. For example, in an environment where the user is driving a vehicle equipped with BLUETOOTH® wireless technology, and device 60 is in communication with the vehicle, an easily-accessed button (for example, one mounted on the steering wheel of a car) may be available. Pressing the button initiates a spoken dialog with assistant 1002, and allows the user to communicate with assistant 1002 via the BLUETOOTH® wireless connection and through a microphone and/or speaker installed in the vehicle. Alternatively, the user can initiate the spoken dialog by pressing a button on device 60 itself, or on a headset, or on any other peripheral device, or by performing some other distinctive action that signals to assistant 1002 that the user wishes to initiate a spoken dialog. As another example, the user can speak a command that is understood by assistant 1002 and that initiates the spoken dialog, as described in greater detail below. One skilled in the art will recognize that many other techniques can be provided for allowing a user to easily initiate a spoken dialog with assistant 1002. Preferably, the mechanism that is used for initiating the spoken dialog does not require hand-eye coordination on the part of the user, thus allowing the user to focus on a primary task, such as driving, and/or can be performed by an individual having a disability that prevents, hinders, restricts, or limits his or her ability to interact with a GUI such as depicted in FIGS. 2, 3A, and 3B.

Once the spoken dialog has been initiated, assistant 1002 listens for spoken input. In one embodiment, assistant 1002 acknowledges the spoken input by some output mechanism that is easily detected by the user while in the hands-free context. An example is an audio beep or tone, and/or visual output on a vehicle dashboard that is easily seen by the user even while driving, and/or by some other mechanism. Spoken input is processed using known speech recognition techniques. Assistant 1002 then performs action(s) indicated by the spoken input. In one embodiment, assistant 1002 provides spoken output, which may be output via speakers (in device 60 or installed in the vehicle), headphones or the like, so as to continue the audio dialog with the user. For example, assistant 1002 can read content of text messages, email messages, and the like, and can provide options to the user in spoken form.

For example, if the user says "Read my new message", assistant 1002 may cause device 60 to emit an acknowledgement tone. Assistant may then 1002 emit spoken output such as "You have a new message from Tom Devon. It says: 'Hey, are you going to the game?'". Spoken output may be generated by assistant 1002 using any known technique for converting text to speech. In one embodiment, text-to-speech functionality is implemented using, for example, Nuance Vocalizer, available from Nuance Communications, Inc. of Burlington, Mass.

Figure 5A:
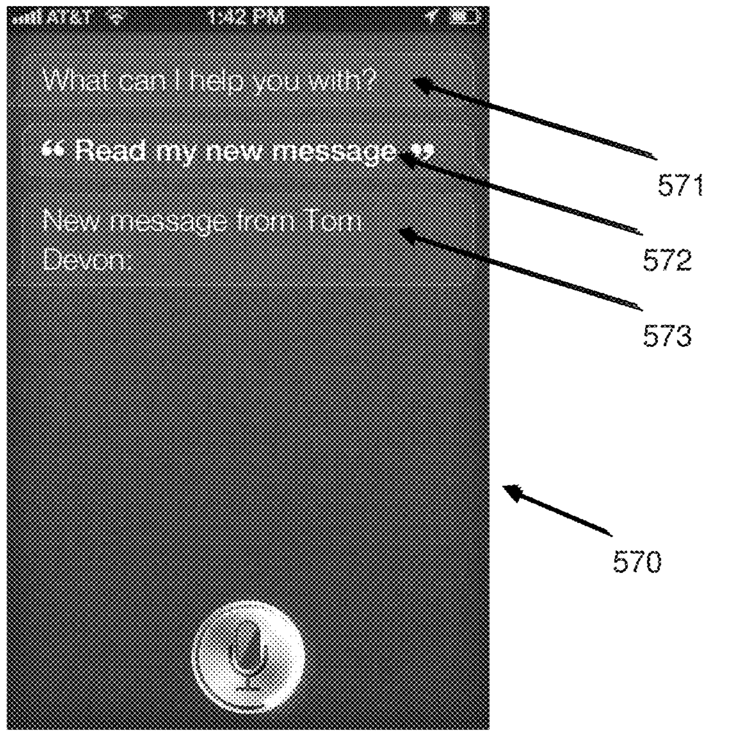
FIGS. 5A through 5D are a series of screen shots illustrating an example of operation of a multimodal virtual assistant according to an embodiment of the present invention, wherein the user receives and replies to a text message in a hands-free context.

Referring now to FIG. 5A, there is shown an example of a screen shot 570 showing output that may be presented on the screen of device 60 while the verbal interchange between the user and assistant 1002 is taking placing. In some hands-free situations, the user can see the screen but cannot easily touch it, for example if the output on the screen of device 60 is being replicated on a display screen of a vehicle's navigation system. Visual echoing of the spoken conversation, as depicted in FIGS. 5A through 5D, can help the user to verify that his or her spoken input has been properly and accurately understood by assistant 1002, and can further help the user understand assistant's 1002 spoken replies. However, such visual echoing is optional, and the present invention can be implemented without any visual display on the screen of device 60 or elsewhere. Thus, the user can interact with assistant 1002 purely by spoken input and output, or by a combination of visual and spoken inputs and/or outputs.

In the example, assistant 1002 displays and speaks a prompt 571. In response to user input, assistant 1002 repeats the user input 572, on the display and/or in spoken form. Assistant then introduces 573 the incoming text message and reads it. In one embodiment, the text message may also be displayed on the screen.

Figure 5B:
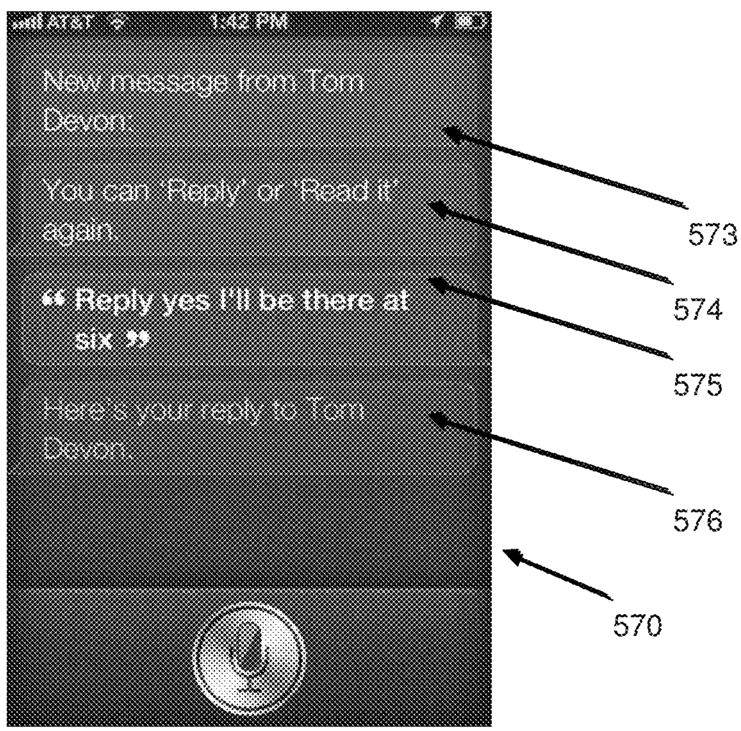

As shown in FIG. 5B, after reading the incoming message to the user, assistant 1002 then tells the user that the user can "reply or read it again" 574. Again, such output is provided, in one embodiment, in spoken form (i.e., verbally). In this manner, the system of the present invention informs the user of available actions in a manner that is well-suited to the hands-free context, in that it does not require the user to look at text fields, buttons, and/or links, and does not require direct manipulation by touch or interaction with on-screen objects. As depicted in FIG. 5B, in one embodiment the spoken output is echoed 574 on-screen; however, such display of the spoken output is not required. In one embodiment, echo messages displayed on the screen scroll upwards automatically according to well known mechanisms.

In the example, the user says "Reply yes I'll be there at six". As depicted in FIG. 5B, in one embodiment the user's spoken input is echoed 575 so that the user can check that it has been properly understood. In addition, in one embodiment, assistant 1002 repeats the user's spoken input in auditory form, so that the user can verify understanding of his or her command even if he or she cannot see the screen. Thus, the system of the present invention provides a mechanism by which the user can initiate a reply command, compose a response, and verify that the command and the composed response were properly understood, all in a hands-free context and without requiring the user to view a screen or interact with device 60 in a manner that is not feasible or well-suited to the current operating environment.

In one embodiment, assistant 1002 provides further verification of the user's composed text message by reading back the message. In this example, assistant 1002 says, verbally, "Here's your reply to Tom Devon: 'Yes I'll be there at six.'". In one embodiment, the meaning of the quotation marks is conveyed with changes in voice and/or prosody. For example, the string "Here's your reply to Tom Devon"

can be spoken in one voice, such as a male voice, while the string "Yes I'll be there at six" can be spoken in another voice, such as a female voice. Alternatively, the same voice can be used, but with different prosody to convey the quotation marks.

Figure 5C:
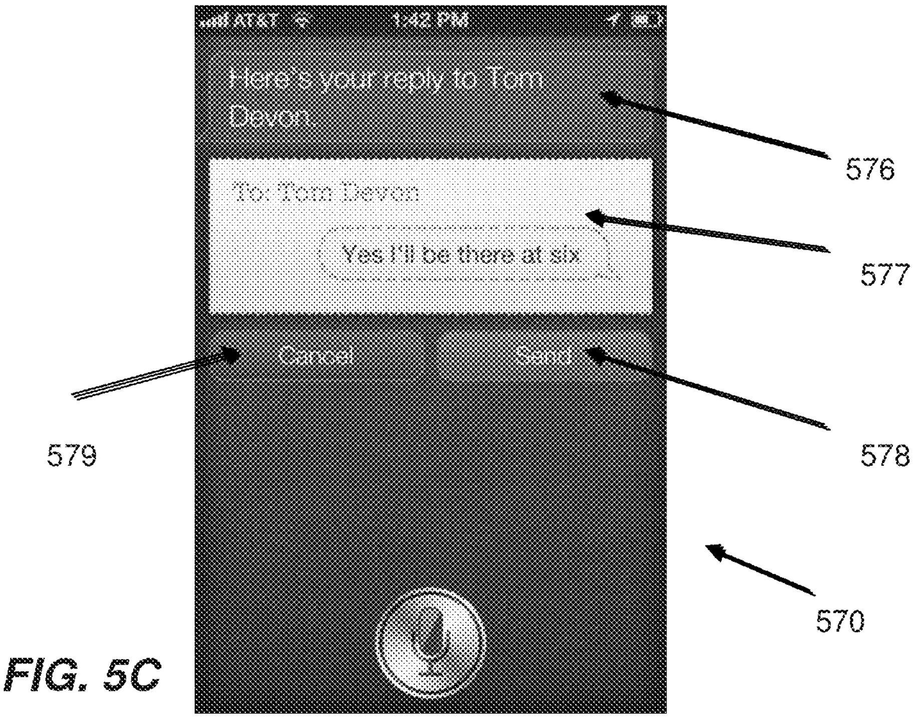

In one embodiment, assistant 1002 provides visual echoing of the spoken interchange, as depicted in FIGS. 5B and 5C. FIGS. 5B and 5C show message 576 echoing assistant's 1002 spoken output of "Here's your reply to Tom Devon". FIG. 5C shows a summary 577 of the text message being composed, including recipient and content of the message. In FIG. 5C, previous messages have scrolled upward off the screen, but can be viewed by scrolling downwards according to known mechanisms. Send button 578 sends the message; cancel button 579 cancels it. In one embodiment, the user can also send or cancel the message by speaking a keyword, such as "send" or "cancel". Alternatively, assistant 1002 can generate a spoken prompt, such as "Ready to send it?"; again, a display 570 with buttons 578, 579 can be shown while the spoken prompt is output. The user can then indicate what he or she wishes to do by touching buttons 578, 579 or by answering the spoken prompt. The prompt can be issued in a format that permits a "yes" or "no" response, so that the user does not need to use any special vocabulary to make his or her intention known.

Figure 5D:

In one embodiment, assistant 1002 can confirm the user's spoken command to send the message, for example by generating spoken output such as "OK, I'll send your message." As shown in FIG. 5D, this spoken output can be echoed 580 on screen 570, along with summary 581 of the text message being sent.

The spoken exchange described above, combined with optional visual echoing, illustrates an example by which assistant 1002 provides redundant outputs in a multimodal interface. In this manner, assistant 1002 is able to support a range of contexts including eyes-free, hands-free, and fully hands-on.

The example also illustrates mechanisms by which the displayed and spoken output can differ from one another to reflect their different contexts. The example also illustrates ways in which alternative mechanisms for responding are made available. For example, after assistant says "Ready to send it?" and displays screen 570 shown in FIG. 5C, the user can say the word "send", or "yes", or tap on Send button 578 on the screen. Any of these actions would be interpreted the same way by assistant 1002, and would cause the text message to be sent. Thus, the system of the present invention provides a high degree of flexibility with respect to the user's interaction with assistant 1002.

Figure 6A:
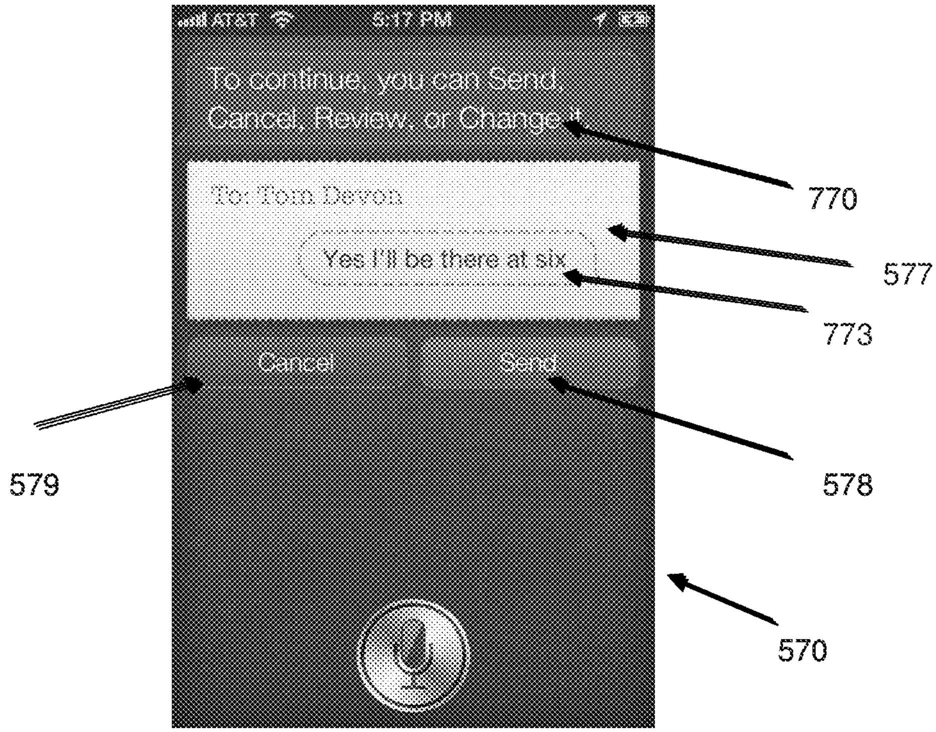
FIGS. 6A through 6C are a series of screen shots illustrating an example of operation of a multimodal virtual assistant according to an embodiment of the present invention, wherein the user revises a text message in a hands-free context.
Figure 6B:
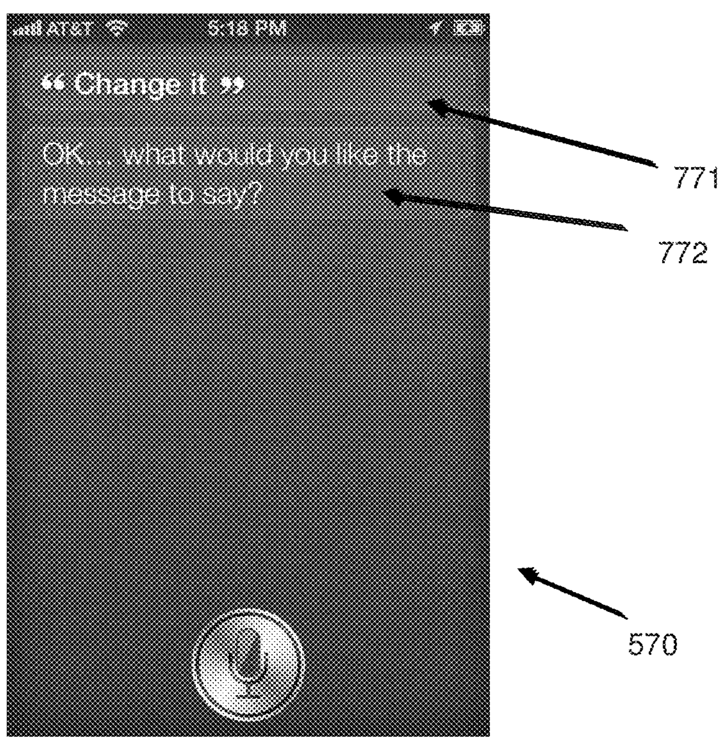
Figure 6C:

Referring now to FIGS. 6A through 6C, there is shown a series of screen shots illustrating an example of operation of multimodal virtual assistant 1002 according to an embodiment of the present invention, wherein the user revises text message 577 in a hands-free context, for example to correct mistakes or add more content. In a visual interface involving direct manipulation, such as described above in connection with FIGS. 3A and 3B, the user might type on virtual keyboard 270 to edit the contents of text field 172 and thereby revise text message 577. Since such operations may not be feasible in a hands-free context, multimodal virtual assistant 1002 provides a mechanism by which such editing of text message 577 can take place via spoken input and output in a conversational interface In one embodiment, once text message 577 has been composed (based, for example, on the user's spoken input), multimodal virtual assistant 1002 generates verbal output informing the user that the message is ready to be sent, and asking the user whether the message should be sent. If the user indicates, via verbal or direct manipulation input, that he or she is not ready to send the message, then multimodal virtual assistant 1002 generates spoken output to inform the user of available options, such as sending, canceling, reviewing, or changing the message. For example, assistant 1002 may say with "OK, I won't send it yet. To continue, you can Send, Cancel, Review, or Change it."

As shown in FIG. 6A, in one embodiment multimodal virtual assistant 1002 echoes the spoken output by displaying message 770, visually informing the user of the options available with respect to text message 577. In one embodiment, text message 577 is displayed in editable field 773, to indicate that the user can edit message 577 by tapping within field 773, along with buttons 578, 579 for sending or canceling text message 577, respectively. In one embodiment, tapping within editable field 773 invokes a virtual keyboard (similar to that depicted in FIG. 3B), to allow editing by direct manipulation.

The user can also interact with assistant 1002 by providing spoken input. Thus, in response to assistant's 1002 spoken message providing options for interacting with text message 577, the user may say "Change it". Assistant 1002 recognizes the spoken text and responds with a verbal message prompting the user to speak the revised message. For example, assistant 1002 may say, "OK . . . . What would you like the message to say?" and then starts listening for the user's response. FIG. 6B depicts an example of a screen 570 that might be shown in connection with such a spoken prompt. Again, the user's spoken text is visually echoed 771, along with assistant's 1002 prompt 772.

In one embodiment, once the user has been prompted in this manner, the exact contents of the user's subsequent spoken input is interpreted as content for the text message, bypassing the normal natural language interpretation of user commands. User's spoken input is assumed to be complete either when a pause of sufficient length in the input is detected, or upon detection of a specific word indicating the input is complete, or upon detection that the user has pressed a button or activated some other command to indicate that he or she has finished speaking the text message. In one embodiment, assistant 1002 then repeats back the input text message in spoken form, and may optionally echo it as shown in FIG. 6C. Assistant 1002 offers a spoken prompt, such as "Are you ready to send it?", which may also be echoed 770 on the screen as shown in FIG. 6C. The user can then reply by saying "cancel", "send", "yes", or "no", any of which are correctly interpreted by assistant 1002. Alternatively, the user can press a button 578 or 579 on the screen to invoke the desired operation.

By providing a mechanism for modifying text message 577 in this manner, the system of the present invention, in one embodiment, provides a flow path appropriate to a hands-free context, which is integrated with a hands-on approach so that the user can freely choose the mode of interaction at each stage. Furthermore, in one embodiment assistant 1002 adapts its natural language processing mechanism to particular steps in the overall flow; for example, as described above, in some situations assistant 1002 may enter a mode where it bypasses normal natural language interpretation of user commands when the user has been prompted to speak a text message.

Method

In one embodiment, multimodal virtual assistant 1002 detects a hands-free context and adapts one or more stages of its operation to modify the user experience for hands-free operation. As described above, detection of the hands-free context can be applied in a variety of ways to affect the operation of multimodal virtual assistant 1002.

Figure 7A:
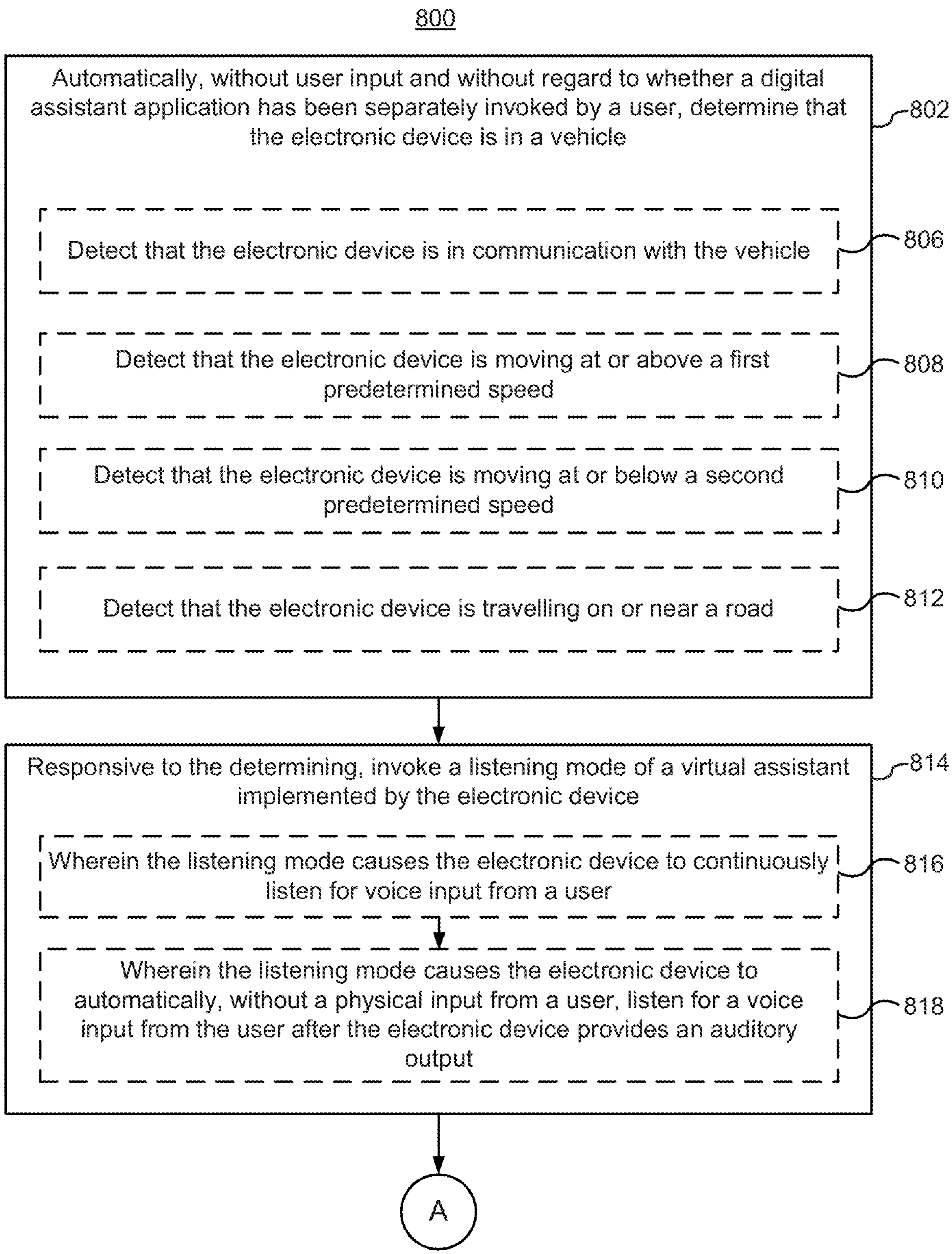
FIGS. 7A-7D are flow diagrams of methods of adapting a user interface, according to some embodiments.

FIG. 7A is a flow diagram depicting a method 800 of adapting a user interface, according to some embodiments. In some embodiments, the method 800 is performed at an electronic device having one or more processors and memory storing one or more programs for execution by the one or more processors (e.g., device 60). The method 800 includes automatically, without user input and without regard to whether a digital assistant application has been separately invoked by a user, determining (802) that the electronic device is in a vehicle. In some embodiments, automatically determining that the electronic device is in the vehicle is performed without regard to whether the digital assistant application was recently invoked by a user (e.g., within about the previous 1 minute, 2 minutes, 5 minutes).

In some embodiments, determining that the electronic device is in a vehicle comprises detecting (806) that the electronic device is in communication with the vehicle. In some embodiments, the communication is wireless communication. In some embodiments, the communication is BLUETOOTH® wireless communication. In some embodiments, the communication is wired communication. In some embodiments, detecting that the electronic device is in communication with the vehicle comprises detecting that the electronic device is in communication with a voice control system of the vehicle (e.g., via wireless communication, BLUETOOTH® wireless technology, wired communication, etc.).

In some embodiments, determining that the electronic device is in a vehicle comprises detecting (808) that the electronic device is moving at or above a first predetermined speed. In some embodiments, the first predetermined speed is about 20 miles per hour. In some embodiments, the first predetermined speed is about 10 miles per hour. In some embodiments, determining that the electronic device is in a vehicle further comprises detecting (810) that the electronic device is moving at or below a second predetermined speed. In some embodiments, the second predetermined speed is about 150 miles per hour. In some embodiments, the speed of the electronic device is determined using one or more of the group consisting of: GPS location information; accelerometer data; wireless data signal information; and speedometer information.

In some embodiments, determining that the electronic device is in a vehicle further comprises detecting (812) that the electronic device is travelling on or near a road. The location of the vehicle may be determined by GPS location information, cellular tower triangulation, and/or other location detecting techniques and technologies.

Returning to FIG. 7A, the method 800 further includes, responsive to the determining, invoking (814) a listening mode of a virtual assistant implemented by the electronic device. Example embodiments of listening modes are described herein. In some embodiments, the listening mode causes the electronic device to continuously listen (816) for voice input from a user. In some embodiments, the listening mode causes the electronic device to continuously listen for voice input from the user responsive to detecting that the electronic device is connected to a charging source. In some embodiments, the listening mode causes the electronic device to listen for voice input from a user for a predetermined time after initiation of the listening mode (e.g., for about 5 minutes after initiation of the listening mode). In some embodiments, the listening mode causes the electronic device to automatically, without a physical input from a user, listen (818) for a voice input from the user after the electronic device provides an auditory output (such as a "beep").

In some embodiments, the method 800 also comprises limiting functionality of the device (e.g., device 60) and/or the digital assistant (e.g., assistant 1002) when it is determined that the electronic device is in a vehicle. In some embodiments, the method includes, responsive to determining that the electronic device is in the vehicle, taking any of the following actions (alone or in combination): limiting the ability to view visual output presented by the electronic device; limiting the ability to interact with a graphical user interface presented by the electronic device; limiting the ability to use a physical component of the electronic device; limiting the ability to perform touch input on the electronic device; limiting the ability to use a keyboard on the electronic device; limiting the ability to execute one or more applications on the electronic device; limiting the ability to perform one or more functions enabled by the electronic device; limiting the device so as to not request touch input from the user; limiting the device so as to not respond to touch input from the user; and limiting the amount of items in the list to a predetermined amount.

Figure 7B:
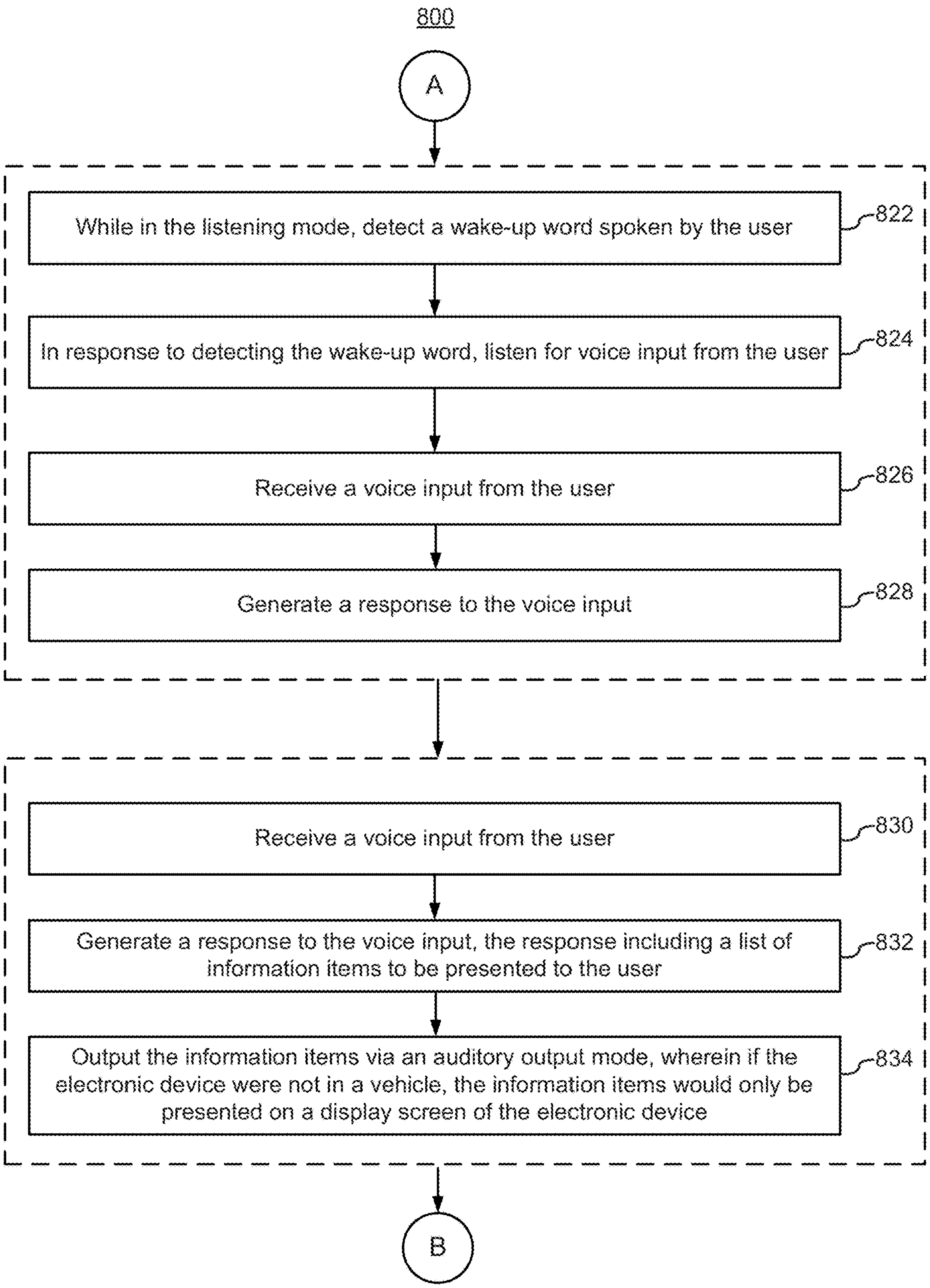

Referring now to FIG. 7B, in some embodiments, the method 800 further comprises, while the device is in the listening mode, detecting (822) a wake-up word spoken by the user. The wake-up word may be any word that a digital assistant (e.g., assistant 1002) is configured to recognize as a trigger signaling the assistant to begin listening for voice input from a user. The method further comprises, in response to detecting the wake-up word, listening (824) for voice input from the user, receiving (826) a voice input from the user, and generating (828) a response to the voice input.

In some embodiments, the method 800 further comprises, receiving (830) a voice input from the user; generating (832) a response to the voice input, the response including a list of information items to be presented to the user; and outputting (834) the information items via an auditory output mode, wherein if the electronic device were not in a vehicle, the information items would only be presented on a display screen of the electronic device. For example, in some cases, information items that are returned in response to a web search are displayed visually on a device. In some cases, they are only displayed visually (e.g., without any audio). In contrast, this aspect of method 800 instead provides only auditory output for the information items, without any visual output.

Figure 7C:
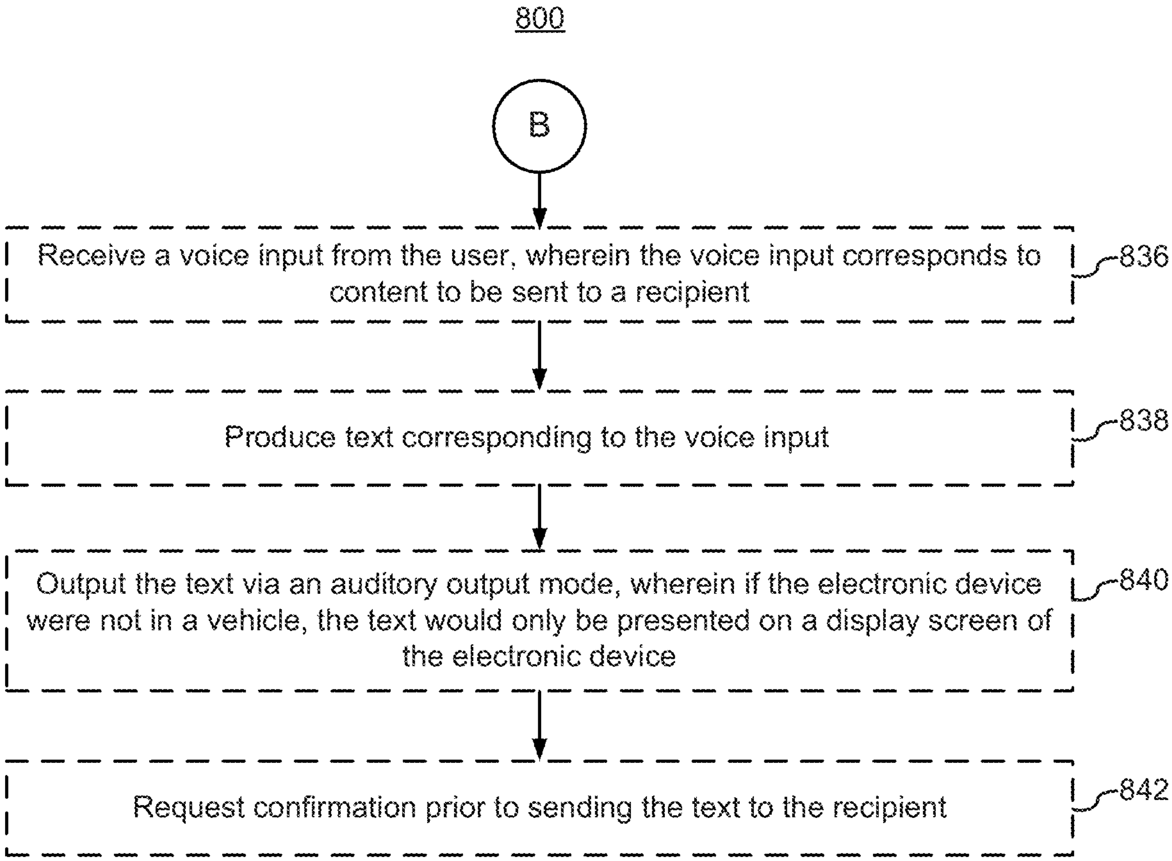

Referring now to FIG. 7C, in some embodiments, the method 800 further comprises receiving (836) a voice input from the user, wherein the voice input corresponds to content to be sent to a recipient. In some embodiments, the content is to be sent to a recipient via text message, email message, etc. The method further comprises producing (838) text corresponding to the voice input, and outputting (840) the text via an auditory output mode, wherein if the electronic device were not in a vehicle, the text would only be presented on a display screen of the electronic device. For example, in some cases, message content that is transcribed from a voice input is displayed visually on a device. In some cases, it is only displayed visually (e.g., without any audio). In contrast, this aspect of method 800 instead provides only auditory output for the transcribed text, without any visual output.

In some embodiments, the method further comprises requesting (842) confirmation prior to sending the text to the recipient. In some embodiments, requesting confirmation comprises asking the user, via the auditory output mode, whether the text should be sent to the recipient.

Figure 7D:
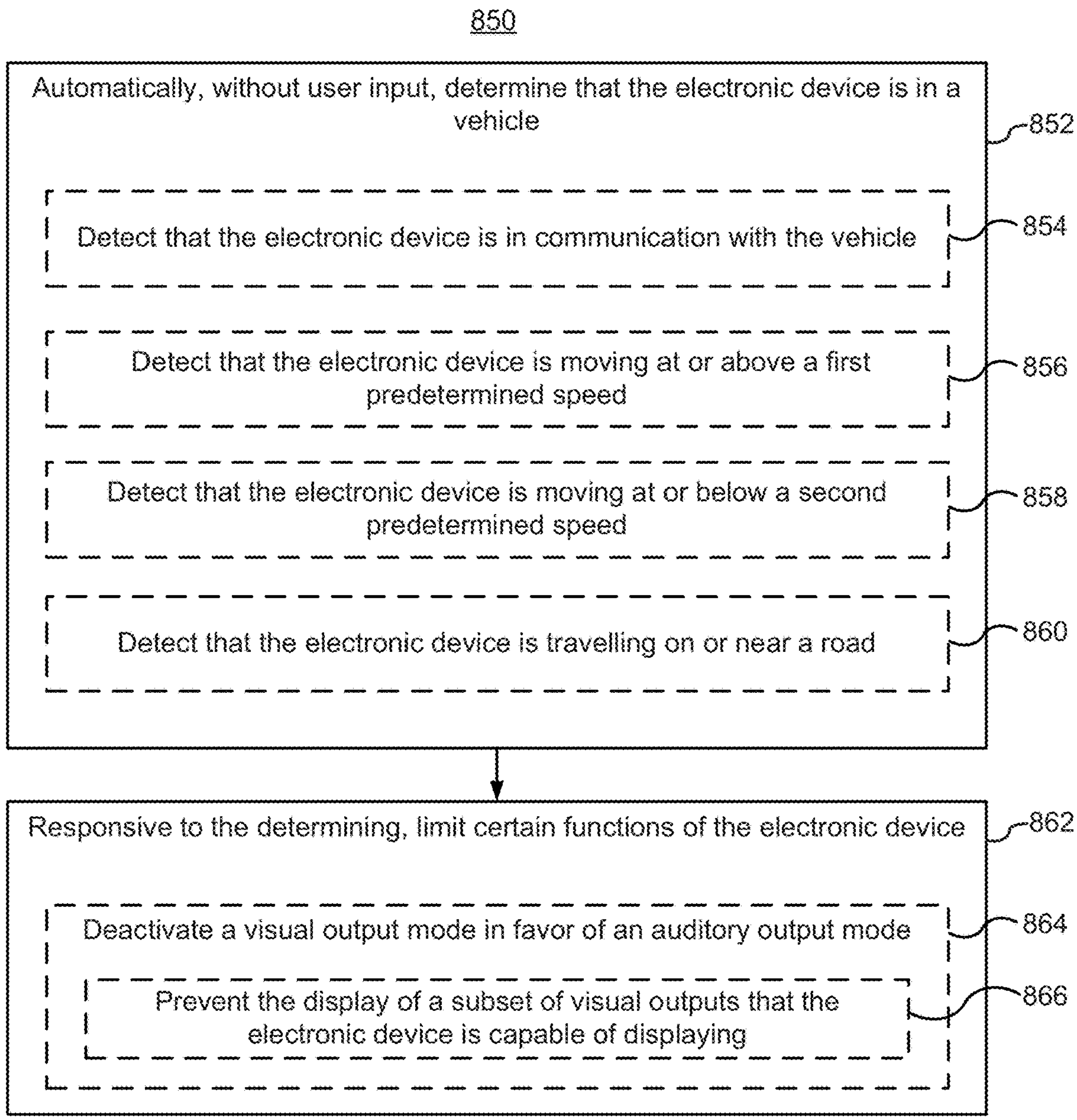

FIG. 7D is a flow diagram depicting a method 850 of adapting a user interface, according to some embodiments. In some embodiments, the method 850 is performed at an electronic device having one or more processors and memory storing one or more programs for execution by the one or more processors.

The method 850 comprises automatically, without user input, determining (852) that the electronic device is in a vehicle.

In some embodiments, determining that the electronic device is in a vehicle comprises detecting (854) that the electronic device is in communication with the vehicle. In some embodiments, the communication is wireless communication. In some embodiments, the communication is BLUETOOTH® wireless communication. In some embodiments, the communication is wired communication. In some embodiments, detecting that the electronic device is in communication with the vehicle comprises detecting that the electronic device is in communication with a voice control system of the vehicle (e.g., via wireless communication, BLUETOOTH® wireless technology, wired communication, etc.).

In some embodiments, determining that the electronic device is in a vehicle comprises detecting (856) that the electronic device is moving at or above a first predetermined speed. In some embodiments, the first predetermined speed is about 20 miles per hour. In some embodiments, the first predetermined speed is about 10 miles per hour. In some embodiments, determining that the electronic device is in a vehicle further comprises detecting (858) that the electronic device is moving at or below a second predetermined speed. In some embodiments, the second predetermined speed is about 150 miles per hour. In some embodiments, the speed of the electronic device is determined using one or more of the group consisting of: GPS location information; accelerometer data; wireless data signal information; and speedometer information.

In some embodiments, determining that the electronic device is in a vehicle further comprises detecting (860) that the electronic device is travelling on or near a road. The location of the vehicle may be determined by GPS location information, cellular tower triangulation, and/or other location detecting techniques and technologies.

The method 850 further comprises, responsive to the determining, limiting certain functions of the electronic device, as described above. For example, in some embodiments, limiting certain functions of the device comprises deactivating (864) a visual output mode in favor of an auditory output mode. In some embodiments, deactivating the visual output mode includes preventing (866) the display of a subset of visual outputs that the electronic device is capable of displaying.

Figure 7E:
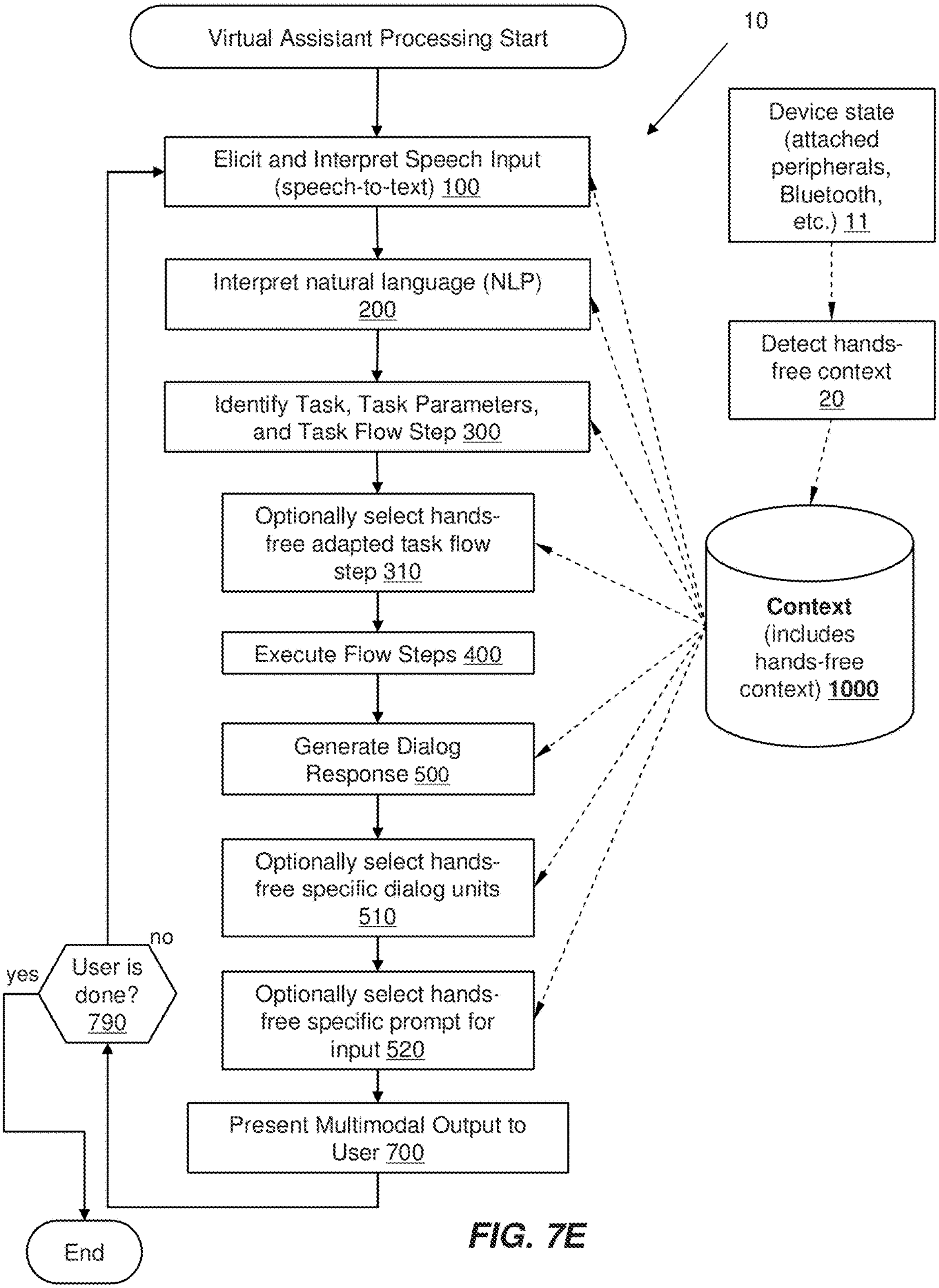
FIG. 7E is a flow diagram depicting methods of operation of a virtual assistant that supports dynamic detection of and adaptation to a hands-free context, according to one embodiment.

Referring now to FIG. 7E, there is shown a flow diagram depicting a method 10 of operation of virtual assistant 1002 that supports dynamic detection of and adaptation to a hands-free context, according to one embodiment. Method 10 may be implemented in connection with one or more embodiments of multimodal virtual assistant 1002. As depicted in FIG. 7, the hands-free context can be used at various stages of processing in multimodal virtual assistant 1002, according to one embodiment.

In at least one embodiment, method 10 may be operable to perform and/or implement various types of functions, operations, actions, and/or other features such as, for example, one or more of the following (or combinations thereof):

- Execute an interface control flow loop of a conversational interface between the user and multimodal virtual assistant 1002. At least one iteration of method 10 may serve as a ply in the conversation. A conversational interface is an interface in which the user and assistant 1002 communicate by making utterances back and forth in a conversational manner.
- Provide executive control flow for multimodal virtual assistant 1002. That is, the procedure controls the gathering of input, processing of input, generation of output, and presentation of output to the user.
- Coordinate communications among components of multimodal virtual assistant 1002. That is, it may direct where the output of one component feeds into another, and where the overall input from the environment and action on the environment may occur.

In at least some embodiments, portions of method 10 may also be implemented at other devices and/or systems of a computer network.

According to specific embodiments, multiple instances or threads of method 10 may be concurrently implemented and/or initiated via the use of one or more processors 63 and/or other combinations of hardware and/or hardware and software. In at least one embodiment, one or more or selected portions of method 10 may be implemented at one or more client(s) 1304, at one or more server(s) 1340, and/or combinations thereof.

For example, in at least some embodiments, various aspects, features, and/or functionalities of method 10 may be performed, implemented and/or initiated by software components, network services, databases, and/or the like, or any combination thereof.

According to different embodiments, one or more different threads or instances of method 10 may be initiated in response to detection of one or more conditions or events satisfying one or more different types of criteria (such as, for example, minimum threshold criteria) for triggering initiation of at least one instance of method 10. Examples of various types of conditions or events which may trigger initiation and/or implementation of one or more different threads or instances of the method may include, but are not limited to, one or more of the following (or combinations thereof):

- a user session with an instance of multimodal virtual assistant 1002, such as, for example, but not limited to, one or more of:
  - a mobile device application starting up, for instance, a mobile device application that is implementing an embodiment of multimodal virtual assistant 1002;
  - a computer application starting up, for instance, an application that is implementing an embodiment of multimodal virtual assistant 1002;
  - a dedicated button on a mobile device pressed, such as a "speech input button";
  - a button on a peripheral device attached to a computer or mobile device, such as a headset, telephone handset or base station, a GPS navigation system, consumer appliance, remote control, or any other device with a button that might be associated with invoking assistance;
  - a web session started from a web browser to a website implementing multimodal virtual assistant 1002;
  - an interaction started from within an existing web browser session to a website implementing multimodal virtual assistant 1002, in which, for example, multimodal virtual assistant 1002 service is requested;

an email message sent to an email modality server 1426 that is mediating communication with an embodiment of multimodal virtual assistant 1002;

a text message is sent to a messaging modality server 1430 that is mediating communication with an embodiment of multimodal virtual assistant 1002;

a phone call is made to a VoIP modality server 1434 that is mediating communication with an embodiment of multimodal virtual assistant 1002;

an event such as an alert or notification is sent to an application that is providing an embodiment of multimodal virtual assistant 1002.

when a device that provides multimodal virtual assistant 1002 is turned on and/or started.

According to different embodiments, one or more different threads or instances of method 10 may be initiated and/or implemented manually, automatically, statically, dynamically, concurrently, and/or combinations thereof. Additionally, different instances and/or embodiments of method 10 may be initiated at one or more different time intervals (e.g., during a specific time interval, at regular periodic intervals, at irregular periodic intervals, upon demand, and the like).

In at least one embodiment, a given instance of method 10 may utilize and/or generate various different types of data and/or other types of information when performing specific tasks and/or operations, including detection of a hands-free context as described herein. Data may also include any other type of input data/information and/or output data/information. For example, in at least one embodiment, at least one instance of method 10 may access, process, and/or otherwise utilize information from one or more different types of sources, such as, for example, one or more databases. In at least one embodiment, at least a portion of the database information may be accessed via communication with one or more local and/or remote memory devices. Additionally, at least one instance of method 10 may generate one or more different types of output data/information, which, for example, may be stored in local memory and/or remote memory devices.

In at least one embodiment, initial configuration of a given instance of method 10 may be performed using one or more different types of initialization parameters. In at least one embodiment, at least a portion of the initialization parameters may be accessed via communication with one or more local and/or remote memory devices. In at least one embodiment, at least a portion of the initialization parameters provided to an instance of method 10 may correspond to and/or may be derived from the input data/information.

In the particular example of FIG. 7E, it is assumed that a single user is accessing an instance of multimodal virtual assistant 1002 over a network from a client application with speech input capabilities. In one embodiment, assistant 1002 is installed on device 60 such as a mobile computing device, personal digital assistant, mobile phone, smartphone, laptop, tablet computer, consumer electronic device, music player, or the like. Assistant 1002 operates in connection with a user interface that allows users to interact with assistant 1002 via spoken input and output as well as direct manipulation and/or display of a graphical user interface (for example via a touchscreen).

Device 60 has a current state 11 that can be analyzed to detect 20 whether it is in a hands-free context. A hands-free context can be detected 20, based on state 11, using any applicable detection mechanism or combination of mechanisms, whether automatic or manual. Examples are set forth above.

When hands-free context is detected 20, that information is added to other contextual information 1000 that may be used for informing various processes of the assistant, as described in related U.S. Utility application Ser. No. 13/250,854, entitled "Using Context Information to Facilitate Processing of Commands in a Virtual Assistant", filed Sep. 30, 2011, the entire disclosure of which is incorporated herein by reference.

Speech input is elicited and interpreted 100. Elicitation may include presenting prompts in any suitable mode. Thus, depending on whether or not hands-free context is detected, in various embodiments, assistant 1002 may offer one or more of several modes of input. These may include, for example:

an interface for typed input, which may invoke an active typed-input elicitation procedure;

an interface for speech input, which may invoke an active speech input elicitation procedure.

an interface for selecting inputs from a menu, which may invoke active GUI-based input elicitation.

For example, if a hands-free context is detected, speech input may be elicited by a tone or other audible prompt, and the user's speech may be interpreted as text. One skilled in the art will recognize, however, that other input modes may be provided.

The output of step 100 may be a set of candidate interpretations of the text of the input speech. This set of candidate interpretations is processed 200 by language interpreter 2770 (also referred to as a natural language processor, or NLP), which parses the text input and generates a set of possible semantic interpretations of the user's intent.

In step 300, these representation(s) of the user's intent is/are passed to dialog flow processor 2780, which implements an embodiment of a dialog and flow analysis procedure to operationalize the user's intent as task steps. Dialog flow processor 2780 determines which interpretation of intent is most likely, maps this interpretation to instances of domain models and parameters of a task model, and determines the next flow step in a task flow. If appropriate, one or more task flow step(s) adapted to hands-free operation is/are selected 310. For example, as described above, the task flow step(s) for modifying a text message may be different when hands-free context is detected.

In step 400, the identified flow step(s) is/are executed. In one embodiment, invocation of the flow step(s) is performed by services orchestration component 2782, which invokes a set of services on behalf of the user's request. In one embodiment, these services contribute some data to a common result.

In step 500, a dialog response is generated. In one embodiment, dialog response generation 500 is influenced by the state of hands-free context. Thus, when hands-free context is detected, different and/or additional dialog units may be selected 510 for presentation using the audio channel. For example, additional prompts such as "Ready to send it?" may be spoken verbally and not necessarily displayed on the screen. In one embodiment, the detection of hands-free context can influence the prompting for additional input 520, for example to verify input.

In step 700, multimodal output (which, in one embodiment includes verbal and visual content) is presented to the user, who then can optionally respond again using speech input.

If, after viewing and/or hearing the response, the user is done 790, the method ends. If the user is not done, another iteration of the loop is initiated by returning to step 100.

As described herein, context information 1000, including a detected hands-free context, can be used by various components of the system to influence various steps of method 10. For example, as depicted in FIG. 7E, context 1000, including hands-free context, can be used at steps 100, 200, 300, 310, 500, 510, and/or 520. One skilled in the art will recognize, however, that the use of context information 1000, including hands-free context, is not limited to these specific steps, and that the system can use context information at other points as well, without departing from the essential characteristics of the present invention. Further description of the use of context 1000 in the various steps of operation of assistant 1002 is provided in related U.S. Utility application Ser. No. 13/250,854, entitled "Using Context Information to Facilitate Processing of Commands in a Virtual Assistant", filed Sep. 30, 2011, and in related U.S. Utility application Ser. No. 12/479,477 for "Contextual Voice Commands", filed Jun. 5, 2009, the entire disclosures of which are incorporated herein by reference.

In addition, one skilled in the art will recognize that different embodiments of method 10 may include additional features and/or operations than those illustrated in the specific embodiment depicted in FIG. 7, and/or may omit at least a portion of the features and/or operations of method 10 as illustrated in the specific embodiment of FIG. 7.

Adaptation of steps 100, 200, 300, 310, 500, 510, and/or 520 to a hands-free context is described in more detail below.

Adapting Input Elicitation and Interpretation 100 to Hands-Free Context

Elicitation and interpretation of speech input 100 can be adapted to a handsfree context in any of several ways, either singly or in any combination. As described above, in one embodiment, if a hands-free context is detected, speech input may be elicited by a tone and/or other audible prompt, and the user's speech is interpreted as text. In general, multimodal virtual assistant 1002 may provide multiple possible mechanisms for audio input (such as, for example, BLUETOOTH® wireless technology connected microphones or other attached peripherals), and multiple possible mechanisms for invoking assistant 1002 (such as, for example, pressing a button on a peripheral or using a motion gesture in proximity to device 60). The information about how assistant 1002 was invoked and/or which mechanism is being used for audio input can be used to indicate whether or not hands-free context is active and can be used to alter the hands-free experience. More particularly, such information can be used to direct step 100 to use a particular audio path for input and output.

In addition, when hands-free context is detected, the manner in which audio input devices are used can be changed. For example, in a hands-on mode, the interface can require that the user press a button or make a physical gesture to cause assistant 1002 to start listening for speech input. In hands-free mode, by contrast, the interface can continuously prompt for input after every instance of output by assistant 1002, or can allow continuous speech in both directions (allowing the user to interrupt assistant 1002 while assistant 1002 is still speaking).

Adapting Natural Language Processing 200 to Hands-Free Context

Natural Language Processing (NLP) 200 can be adapted to a hands-free context, for example, by adding support for certain spoken responses that are particularly well-suited to hands-free operation. Such responses can include, for example, "yes", "read the message" and "change it". In one embodiment, support for such responses can be provided in addition to support for spoken commands that are usable in a hands-on situation. Thus, for example, in one embodiment, a user may be able to operate a graphical user interface by speaking a command that appears on a screen (for example, when a button labeled "Send" appears on the screen, support may be provided for understanding the spoken word "send" and its semantic equivalents). In a hands-free context, additional commands can be recognized to account for the fact that the user may not be able to view the screen.

Detection of a hands-free context can also alter the interpretation of words by assistant 1002. For example, in a hands-free context, assistant 1002 can be tuned to recognize the command "quiet!" and its semantic variants, and to turn off all audio output in response to such a comment. In a non-hands-free context, such a command might be ignored as not relevant.

Adapting Task Flow 300 to Hands-Free Context

Step 300, which includes identifying task(s) associated with the user's intent, parameter(s) for the task(s) and/or task flow steps 300 to execute, can be adapted for hands-free context in any of several ways, singly or in combination.

In one embodiment, one or more additional task flow step(s) adapted to hands-free operation is/are selected 310 for operation. Examples include steps to review and confirm content verbally. In addition, in a hands-free context, assistant 1002 can read lists of results that would otherwise be presented on a display screen.

In some embodiments, when a hands-free context is detected, items that would normally be displayed only via visual interface (e.g., in a hands-on mode) are instead output to a user only via an auditory output mode. For example, a user may provide a voice input requesting a web search, thus causing the assistant 1002 to generate a response including a list of information items to be presented to the user. In a non-hands-free context, such a list may be presented to the user via visual output only, without any auditory output. However, in a hands-free context, it may be difficult or unsafe for a user to read such lists. Accordingly, the assistant 1002 can speak the list aloud, either in its entirety or in a truncated or summarized version, instead of displaying it on a visual interface.

In some cases, information that is typically displayed only via a visual interface is not adapted to auditory output modes. For example, a typical web search for restaurants will return results that include multiple pieces of information, such as a name, address, hours, phone number, user ratings, and the like. These items are well suited to being displayed in a list on a screen (such as a touchscreen on a mobile device). But this information may not all be necessary in a hands-free context, and it may be confusing or difficult to follow if it were to be converted directly to a spoken output. For example, speaking all of the displayed components of a list of restaurant results may be very confusing, especially for longer lists. Moreover, in a hands-free context, such as while driving, the user may only need the top-level information (e.g., the names and addresses of restaurants). Thus, in some embodiments, the assistant 1002 summarizes or truncates information items (such as items in a list) so that they can be more easily understood by a user. Continuing the above example, the assistant 1002 may receive a list of restaurant results and read aloud only a subset of the information in each result, such as the restaurant name and street name, or restaurant name and rating information (e.g., 4 stars), etc., for each result. Other ways of summarizing or truncating lists and/or information items within lists are also contemplated by the present disclosure.

In some embodiments, verbal commands can be provided for interacting with individual items in the list. For example, if several incoming text messages are to be presented to the user, and a hands-free context is detected, then identified task flow steps can include reading aloud each text message individually, and pausing after each message to allow the user to provide a spoken command. In some embodiments, if a list of search results (e.g., from a web search) is to be presented to a user, and a hands-free context is detected, then identified task flow steps can include reading aloud each search result individually (either the entire result or a truncated or summarized version), and pausing after each result to allow the user to provide a spoken command.

In one embodiment, task flows can be modified for hands-free context. For example, the task flow for taking notes in a notes application might normally involve prompting for content and immediately adding it to a note. Such an operation might be appropriate in a hands-on environment in which content is immediately shown in the visual interface and immediately available for modification by direct manipulation. However, when a hands-free context is detected, the task flow can be modified, for example to verbally review the content and allow for modification of content before it is added to the note. This allows the user to catch speech dictation errors before they are stored in the permanent document.

In one embodiment, hands-free context can also be used to limit the tasks or functionalities that are allowed at a given time. For example, a policy can be implemented to disallow the playing videos when the user's device is in hands-free context, or a specific hands-free context such as driving a vehicle. In some embodiments, when a hands-free context is determined (e.g. driving a vehicle), device 60 limits the ability to view visual output presented by the electronic device. This may include limiting the device in any of the following ways (individually or in any combination):

- limiting the ability to view visual output presented by the electronic device (for example, deactivating a screen/visual output mode, preventing display of videos and/or images, displaying large text, limiting lengths of lists (e.g., search results), limiting number of visual items displayed on a screen, etc.);
- limiting the ability to interact with a graphical user interface presented by the electronic device (for example, limiting a device so as to not request touch input from the user, limiting the device so as to not respond to touch input from the user, etc.);
- limiting the ability to use a physical component of the electronic device (for example, deactivating a physical button on a device, such as a volume button, "home" button, power button, etc.);
- limiting the ability to perform touch input on the electronic device (for example, deactivating all or part of a touch screen);
- limiting the ability to use a keyboard on the electronic device (either a physical keyboard or a touchscreen based keyboard);
- limiting the ability to execute one or more applications on the electronic device (for example, preventing activation of a game, image viewing application, video viewing application, web browser, etc.); and
- limiting the ability to perform one or more functions enabled by the electronic device (for example, playing a video, displaying an image, etc.).

In one embodiment, assistant 1002 can make available entire domains of discourse and/or tasks that are only applicable in a hands-free context. Examples include accessibility modes such as those designed for people with limited eyesight or limited use of their hands. These accessibility modes include commands that are implemented as handsfree alternatives for operating an arbitrary GUI on a given application platform, for example to recognize commands such as "press the button" or "scroll up" are. Other tasks that are may be applicable only in hands-free modes include tasks related to the hands-free experience itself, such as "use my car's BLUETOOTH® wireless technology kit" or "slow down [the Text to Speech Output]".

Adapting Dialog Generation 500 to Hands-Free Context

In various embodiments, any of a number of techniques can be used for modifying dialog generation 500 to adapt to a hands-free context.

In a hands-on interface, assistant's 1002 interpretation of the user's input can be echoed in writing; however such feedback may not be visible to the user when in a hands-free context. Thus, in one embodiment, when a hands-free context is detected, assistant 1002 uses Text-to-Speech (TTS) technology to paraphrase the user's input. Such paraphrasing can be selective; for example, prior to sending a text message, assistant 1002 can speak the text message so that a user can verify its contents even if he or she cannot see the display screen. In some cases, the assistant 1002 does not visually display transcribed text at all, but rather speaks the text back to the user. This may be beneficial where it may be unsafe for a user to read text from a screen, such as when the user is driving, and/or when a screen or visual output mode has been deactivated.

The determination as to when to paraphrase the user's speech, and which parts of the speech to paraphrase, can be driven by task- and/or flow-specific dialogs. For example, in response to a user's spoken command such as "read my new message", in one embodiment assistant 1002 does not paraphrase the command, since it is evident from assistant's 1002 response (reading the message) that the command was understood. However, in other situations, such as when the user's input is not recognized in step 100 or understood in step 200, assistant 1002 can attempt to paraphrase the user's spoken input so as to inform the user why the input was not understood. For example, assistant 1002 might say "I didn't understand 'reel my newt massage'. Please try again."

In one embodiment, the verbal paraphrase of information can combine dialog templates with personal data on a device. For example, when reading a text message, in one embodiment assistant 1002 uses a spoken output template with variables of the form, "You have a new message from $person. It says $message." The variables in the template can be substituted with user data and then turned into speech by a process running on device 60. In one embodiment wherein the invention is implemented in a client/server environment, such a technique can help protect the privacy of users while still allowing personalization of output, since the personal data can remain on device 60 and can be filled in upon receipt of an output template from the server.

In one embodiment, when hands-free context is detected, different and/or additional dialog units specifically tailored to hands-free contexts may be selected 510 for presentation using the audio channel. The code or rules for determining which dialog units to select can be sensitive to the particulars of the hands-free context. In this manner, a general dialog generation component can be adapted and extended to support various hands-free variations without necessarily building a separate user experience for different hands-free situations.

In one embodiment, the same mechanism that generates text and GUI output units can be annotated with texts that are tailored for an audio (spoken word) output modality. For example:

- In one embodiment, a dialog generation component can be adapted for a hands-free context by reading all of its written dialog responses using TTS.
- In one embodiment, a dialog generation component can be adapted for a hands-free context by reading some of its written dialog responses verbatim over TTS, and using TTS variants for other dialog responses.
- In one embodiment, such annotations support a variable substitution template mechanism which segregates user data from dialog generation.
- In one embodiment, graphical user interface elements can be annotated with text that indicates how they should be verbally paraphrased over TTS.
- In one embodiment, TTS texts can be tuned so that the voice, speaking rate, pitch, pauses, and/or other parameters are used to convey verbally what would otherwise be conveyed in punctuation or visual rendering. For example, the voice that is used when repeating back the user's words can be a different voice, or can use different prosody, than that used for other dialog units. As another example, the voice and/or prosody can differ depending on whether content or instructions are being spoken. As another example, pauses can be inserted between sections of text with different meanings, to aid in understanding. For example, when paraphrasing a message and asking for confirmation, a pause might be inserted between the paraphrase of the content "Your message reads . . . " and the prompt for confirmation "Ready to send it?"

In one embodiment, non-hands free contexts can be enhanced using similar mechanisms of using TTS as described above for hands-free contexts. For example, a dialog can generate verbal-only prompts in addition to written text and GUI elements. For example, in some situations, assistant 1002 can say, verbally, "Shall I send it?" to augment the on-screen display of a Send button. In one embodiment, the TTS output used for both hands-free and non-hands-free contexts can be tailored for each case. For example, assistant 1002 may use longer pauses when in the hands-free context.

In one embodiment, the detection of hands-free context can also be used to determine whether and when to automatically prompt the user for a response. For example, when interaction between assistant 1002 and user is synchronous in nature, so that one party speaks while the other listens, a design choice can be made as to whether and when assistant 1002 should automatically start listening for a speech input from the user after assistant 1002 has spoken. The specifics of the hands-free context can be used to implement various policies for this auto-start-listening property of a dialog. Examples include, without limitation:

- Always auto-start-listening;
- Only auto-start-listening when in a hands-free context;
- Only auto-start-listening for certain task flow steps and dialog states;
- Only auto-start-listening for certain task flow steps and dialog states in a hands-free context.

In some embodiments, a listening mode is initiated in response to detecting a hands-free context. In the listening mode, the assistant 1002 may continuously analyze ambient audio in order to identify voice input, such as a voice command, from a user. The listening mode may be used in hands-free contexts, such as when a user is driving in a vehicle. In some embodiments, the listening mode is activated whenever a hands-free context is detected. In some embodiments, it is activated in response to detecting that the assistant 1002 is being used in a vehicle.

In some embodiments, the listening mode is active as long as the assistant 1002 detects that it is in a vehicle. In some embodiments, the listening mode is active for a predetermined time after initiation of the listening mode. For example, if a user pairs the assistant 1002 to a vehicle, the listening mode may be active for a predetermined time after the pairing event. In some embodiments, the predetermined time is 1 minute. In some embodiments, the predetermined time is 2 minutes. In some embodiments, the predetermined time is 10 or more minutes.

In some embodiments, when in the listening mode, the assistant 1002 analyzes received audio inputs (e.g., using speech-to-text processing) to determine whether the audio input includes a speech input intended for the assistant 1002. In some embodiments, to ensure user the privacy of nearby users, received speech is converted to text locally (i.e., on the device) without sending the audio input to a remote computer. In some embodiments, the received speech is first analyzed (e.g., converted to text) locally in order to identify words that are intended for the assistant 1002. Once it is determined that one or more words are intended for the assistant, a portion of the received speech is sent to a remote server (e.g., servers 1340) for further processing, such as speech-to-text processing, natural language processing, intent deduction, and the like.

In some embodiments, the portion sent to the remote service is a group of words following a predefined wake-up word. In some embodiments, the assistant 1002 continuously analyzes received ambient audio (converting the audio to text locally), and when a predefined wake-up word is detected, the assistant 1002 will recognize that one or more of the following words are directed to the assistant 1002. The assistant 1002 will then send recorded audio of the one or more words following the keyword to a remote computer for further analysis (e.g., speech-to-text processing). In some embodiments, the assistant 1002 detects a pause (i.e., a silent period) of a predefined length following the one or more words, and sends only those words that are between the keyword and the pause to the remote service. The assistant 1002 then proceeds to fulfill the user's intent, including executing appropriate task flows and/or dialog flows.

For example, in a listening mode, a user may say "Hey Assistant—find me a nearby gas station . . . ." In this case, the assistant 1002 is configured to detect the phrase "hey assistant" as a wake-up to signal the beginning of an utterance that is directed to the assistant 1002. The assistant 1002 then processes the received audio to determine what should be sent to a remote service for further processing. In this case, the pause following the word "station" is detected by the assistant 1002 as an end of the utterance. The phrase "find me a nearby gas station" is thus sent to the remote service for further analysis (e.g., intent deduction, natural language processing, etc.). The assistant then proceeds to execute one or more steps, such as those described with reference to FIG. 7, in order to satisfy the user's request.

In other embodiments, detection of a hands-free context can also affect choices with regard to other parameters of a dialog, such as, for example:

- the length of lists of options to offer the user;
- whether to read lists;

whether to ask questions with single or multiple valued answers;

whether to prompt for data that can only be given using a direct manipulation interface.

Thus, in various embodiments, a hands-free context, once detected, is a system-side parameter that can be used to adapt various processing steps of a complex system such as multimodal virtual assistant 1002. The various methods described herein provide ways to adapt general procedures of assistant 1002 for hands-free contexts to support a range of user experiences from the same underlying system.

Various mechanisms for gathering, communicating, representing, and accessing context are described in related U.S. Utility application Ser. No. 13/250,854, entitled "Using Context Information to Facilitate Processing of Commands in a Virtual Assistant", filed Sep. 30, 2011, the entire disclosure of which is incorporated herein by reference. One skilled in the art will recognize that such techniques are applicable to hands-free context as well.

Use Cases

The following use cases are presented as examples of operation of assistant 1002 in a hands-free context. One skilled in the art will recognize that the use cases are exemplary, and are presented for illustrative purposes only.

Phone Use Cases

In one embodiment, when in a hands-free context, assistant 1002 allows the user to can call anyone if the user can specify the person to be called without tapping or otherwise touching the device. Examples include calling by contact name, calling by phone number (digits recited by user), and the like. Ambiguity can be resolved by additional spoken prompts. Examples are shown below.

Example 1

Call a Contact, Unambiguous

User's spoken input: "Call Adam Smith"

Assistant's 1002 spoken output: "Calling Adam Smith, mobile."

Call is placed

Similar interaction would take place for any of the following use cases:

Call contact by Name ("call adam smith")

Call contact by Name, non-default phone number ("call adam smith mobile")

Call by Number ("call 800 555 1212")

Call contact by Relationship Alias ("call my mom")

Call contact by Location Alias ("phone home")

Call via FaceTime ("facetime adam smith")

Call back from context ("call him back")

Example 2

Cancel a Phone Call

User's spoken input: "Call Adam Smith"

Assistant's 1002 spoken output: "Calling Adam Smith, mobile."

User notes this is the wrong person to call; user single-presses home button to cancel the call, or says "Stop"

Call is canceled

Example 3

Call by Name, Ambiguous

User's spoken input: "Call Adam"

Assistant's 1002 spoken output: "I found multiple matches for <voice change> Adam"

Assistant's 1002 visual output: "I found multiple matches for <voice change> Adam"

Assistant's 1002 spoken output: Read names

Assistant's 1002 visual output:

Disambiguation Menu

Adam Cheyer home

Adam Sandler home

Adam Smith mobile

User's spoken input: "Adam Cheyer"

Assistant's 1002 spoken output: "Calling Adam Cheyer"

Call is placed

Example 4

Call by Name, Doubly Ambiguous

User's spoken input: "Call Paul"

Assistant's 1002 spoken output: "I found multiple matches for <voice change> Paul"

Assistant's 1002 visual output: "I found multiple matches for <voice change> Paul"

Assistant's 1002 spoken output: Read names

Assistant's 1002 visual output:

Disambiguation Menu

Paul Holden home

Paul Marcos iPhone

Paul Marcos mobile

Paul Marcos home

Pablo Picasso home

User's spoken input: "Paul Marcos"

Assistant's 1002 spoken output: "Which number for Paul Marcos: iPhone, mobile, or home?"

Assistant's 1002 visual output: "Which number for Paul Marcos?"

Assistant's 1002 visual output:

Disambiguation Menu

Paul Marcos iPhone

Paul Marcos mobile

Paul Marcos home

User's spoken input: "mobile"

Assistant's 1002 spoken output: "Calling Paul Marcos <pause> mobile"

Call is placed

Example 5

Call a Business by Name, No Ambiguity

User's spoken input: "Call the song metreon in san francisco"

Assistant's 1002 spoken output: "I found AMC Loews Metreon 16 on Fourth Street"

Assistant's 1002 visual output: "I found AMC Loews Metreon 16 on Fourth Street"

Assistant's 1002 visual output:

Local Search Snippet

AMC Loews Metreon 16

101 Fourth St, San Francisco (888) 262-4386

<Cancel button> <Call button>

Assistant's 1002 spoken output: "Shall I place the call?"
User's spoken input: "Call it"
Assistant's 1002 spoken output: "Calling AMC Loews Metreon 16"
Call is placed Example 6

Call a Business by Name, Multiple Matches

User's spoken input: "Call walgreens"
Assistant's 1002 spoken output: "I found several matches for <change voice> Walgreens"
Assistant's 1002 visual output: "I found several matches for <change voice> Walgreens"
Assistant's 1002 visual output:
List of Local Search Snippets
Walgreens Store Los Gatos
423 N Santa Cruz Ave, Los Gatos
Walgreens
1570 Campbell Ave, Campbell, Calif.
Walgreens
20011 Bollinger Rd, Cupertino, Calif.
Walgreens
1334 Saratoga Ave, San Jose, Calif.
Walgreens
2680 Union Ave, San Jose, Calif.
Assistant's 1002 spoken output: "Shall I read them to you?"
User's spoken input: "yes"
Assistant's 1002 spoken output: "Walgreens store los gatos on 423 North Santa Cruz Avenue in Los Gatos <pause> 2. Walgreens on 1570 Campbell Avenue in Campbell <pause> 3 . . . ."
User's spoken input: "the one in Cupertino"
Assistant's 1002 spoken output: "Calling Walgreens in Cupertino"
Call is placed Example 7

Make Scheduled Calls in Car

User starts driving home
Assistant 1002 issues tone of an In Car Reminder
Assistant's 1002 visual output:
Reminder Alert
Call Adam Smith
<Close button> <Call button>
User's spoken input: "Read it"
Assistant's 1002 spoken output: "You have a reminder to call Adam Smith"
User's spoken input: "Call him now"
Assistant's 1002 spoken output: "Calling Adam Smith, mobile"
Call is placed Example 8

Play New Voicemails

User's spoken input: "play voicemail"
Assistant's 1002 spoken output: "You have three new voice mail messages"
Assistant 1002 plays voicemails, one at a time, with prompts"

SMS Text Messaging Use Cases

Example 9

Read a Single Text Message Alert

Assistant's 1002 audio output: Reads the alert or alerts; or generates sound indicating incoming text message
Assistant's 1002 visual output:
Text Message
Mary Richards
Are you free for dinner tonight?
<Close button> <Reply button>
User's spoken input: "read it"
Assistant's 1002 spoken output: "Message from Mary Richards <change of voice> are you free for dinner tonight?"

Example 10

Reply to Text Message (Continues from Example 8)

User's spoken input: "reply <pause> sure, how about 8?"
Assistant's 1002 spoken output: "Ready to reply to Mary Richards with the message <change of voice> sure how about 8"
Assistant's 1002 visual output:
To: Mary Richards
sure how about 8
<Cancel button> <Send button>
User's spoken input: "send it"
Assistant's 1002 audio output: "Sending"; or generates outgoing text message sound Example 11

Send a Text Message to One Recipient

User's spoken input: "Tell Lisa that I'll be 15 minutes late"
Assistant's 1002 spoken output: "Ready to send a text to Lisa Gonzalez with the message <change of voice> I'll be 15 minutes late"
Assistant's 1002 visual output:
Text Message
To: Lisa Gonzalez
I'll be 15 minutes late
<Cancel button> <Send button>
User's spoken input: "send it"
Assistant's 1002 audio output: "Sending"; or generates outgoing text message sound Example 12

Send a Text Message to One Recipient—Ambiguous

User's spoken input: "text to Adam with message Where is the meeting?"
Assistant's 1002 spoken output: "I found multiple matches for <voice change> Adam"
Assistant's 1002 spoken output: Read names Assistant's 1002 visual output:

Disambiguation Menu

Adam Cheyer home

Adam Sandler home

Adam Smith mobile

User's spoken input: "Adam Cheyer"

Assistant's 1002 spoken output: "Adam Cheyer"

Assistant's 1002 visual output:

Text Message

To: Adam Cheyer

Where is the meeting?

<Cancel button> <Send button>

Assistant's 1002 spoken output: "Ready to send a text to Adam Cheyer with the message <change of voice> Where is the meeting?"

User's spoken input: "send it"

Assistant's 1002 audio output: "Sending"; or generates outgoing text message sound Example 13

Read an SMS Message from Messages App

Assistant's 1002 visual output:

Text Message

Betty Joe Bialowski

You can call me Nancy

<Close button> <Reply button>

User's spoken input: "read it"

Assistant's 1002 spoken output: "Message from Betty Joe Bialowski <change voice> you can call me nancy"

Example 14

Reply in Context of Messages App (Continues from Example 12)

User's spoken input: "reply <pause> Hi Nancy"

Assistant's 1002 spoken output: "Ready to reply to Betty Joe Bialowski with the message <change of voice> Hi Nancy"

Assistant's 1002 visual output:

To: Betty Joe Bialowski

Hi Nancy

<Cancel button> <Send button>

User's spoken input: "send it"

Assistant's 1002 audio output: "Sending"; or generates outgoing text message sound Example 15

Read all Unread SMS Messages

Assistant's 1002 visual output:

Melanie Haber (1)

Betty Joe Bialowski (3)

Audrey Farber (1)

User's spoken input: "Read my new messages"

Assistant's 1002 spoken output: "You have 4 new messages. From Melanie Haber <change voice> How about dinner?<pause> From Betty Joe Bialowski, you have 2 messages. <pause> 1. <change voice> My name is MacGill. <pause> 2. <change voice> I call myself Lill. "<pause> 3. <change voice> you can call me nancy"

Example 16

Reply by Name in Context of Messages App

User's spoken input: "Tell Audrey that I'll be 15 minutes late"

Assistant's 1002 spoken output: "Ready to send a text to Audrey Farber with the message <change of voice> I'll be 15 minutes late"

Assistant's 1002 visual output:

Text Message

To: Audrey Farber

I'll be 15 minutes late

<Cancel button> <Send button>

Assistant's 1002 spoken output: "Shall I send it?"

User's spoken input: "yes"

Assistant's 1002 audio output: "Sending"; or generates outgoing text message sound Example 17

Send a Text Message to Multiple Recipient

In one embodiment, this task is determined to be out of scope for hands-free context. Accordingly, assistant 1002 reverts to tapping for disambiguation.

User's spoken input: "Tell Lisa, Paul, and Nancy that I'll be 15 minutes late to our important meeting"

Assistant's 1002 spoken output: "Please select among these people"

Assistant's 1002 visual output: GUI to select multiple recipients

User selects recipients via GUI

Assistant's 1002 spoken output: "Ready to send a text to Lisa Gonzalez, Paul Marcos, and Audrey Farber with the message <change of voice> I'll be 15 minutes late to our important meeting"

Assistant's 1002 visual output:

Text Message

To: Lisa Gonzalez, Paul Marcos, Audrey Farber

I'll be 15 minutes late to our important meeting

<Cancel button> <Send button>

User's spoken input: "Send it"

Assistant's 1002 audio output: "Sending"; or generates outgoing text message sound Alerts & Reminders Use Cases Example 18

Read a Single Reminder Alert

Assistant 1002 issues reminder tone

Assistant's 1002 visual output:

Reminders

Call Mary Richards

<Close button> <Call button>

User's spoken input: "Read it"

Assistant's 1002 spoken output: "Reminder to call Mary Richards"

Example 19

Execute Reminder Alert (Continues from Example 17)

User's spoken input: "call her"

Assistant's 1002 spoken output: "Calling Mary Richards, mobile"

Call is placed

Example 20

Create a New Reminder with Alert

User's spoken input: "Remind me to call Bob Jones at 5 pm"

Assistant's 1002 spoken output: "Please confirm: reminder at 5 pm today to <change of voice>call Bob Jones"

Assistant's 1002 visual output:

Please confirm Reminder

Call Bob Jones

Reminder time: 5:00 pm today

<Cancel> <Save>

Pause

Assistant's 1002 spoken output: "Is this correct?"

User's spoken input: "yes, save it"

Assistant's 1002 spoken output: "Your reminder has been saved"

Example 21

Create a New Reminder with No Alert P1

User's spoken input: "Remind me to get bread" or "Remember to get bread"

Assistant's 1002 spoken output: "Please confirm: remember to get bread"

Assistant's 1002 visual output:

Please confirm Reminder get bread

<Cancel> <Save>

Pause

Assistant's 1002 spoken output: "Is this correct?"

User's spoken input: "yup"

Assistant's 1002 spoken output: "I added it to your to-do list"

Calendar Use Cases

Example 22

Create a Simple Appointment (Description and Date/Time Given)

User's spoken input: "Schedule a meeting at 2 tomorrow to plan the company picnic"

Assistant's 1002 spoken output: "I put it on your calendar for 2 PM tomorrow"

Assistant's 1002 visual output:

description: Plan the company picnic when: tomorrow at 2 PM

Example 23

Create a Simple Appointment (No Description Given)

User's spoken input: "Meet with Carol at 2 tomorrow"

Assistant's 1002 spoken output: "I put it on your calendar for 2 PM tomorrow"

Assistant's 1002 visual output:

description: Meeting when: tomorrow at 2 PM

Example 24

Create a Simple Appointment (No Time Given)

User's spoken input: "Dentist appointment next Thursday"

Assistant's 1002 spoken output: "What time next Thursday?"

User's spoken input: "3 o'clock"

Assistant's 1002 spoken output: "I put it on your calendar for 3 PM next Thursday"

Assistant's 1002 visual output:

description: Dentist appointment when: next Thursday—3 pm

Example 25

Create a Simple Appointment (No Date or Time Given)

User's spoken input: "Schedule a meeting to plan the company picnic"

Assistant's 1002 spoken output: "When would you like to have the meeting?"

Assistant's 1002 visual output: editable appointment form

User's spoken input: "Tuesday at 3 o'clock"

Assistant's 1002 spoken output: "I put it on your calendar for 3 PM on Tuesday"

Assistant's 1002 visual output:

description: meeting to plan the company picnic when: Tuesday—3 pm

One skilled in the art will recognize that the above examples are merely illustrative of the use of hands-free context in particular situations. Additional uses include, for example, maps, playing media such as music, and the like.

The following use cases are more specifically directed to how a list of items is presented to the user in a hands-free context, in general and in specific domains (e.g., in the local search domain, calendar domain, reminder domain, text messaging domain, and e-mail domain, etc.). The specific algorithms for presenting a list of items in the hands-free and/or eyes-free context(s) are designed to provide information about the items to the user in an intuitive and personal way, and at the same time, to avoid overburdening the user with unnecessary details. Each piece of information to be presented to the user through a speech-based output and/or the accompanying textual interface is carefully selected out of many pieces of potentially relevant information, and optionally paraphrased to provide a smooth and personable dialogue flow. In addition, when providing information to the user in the hands-free and/or eyes-free context(s), the information (particularly unbounded) is divided into suitable-sized chucks (e.g., pages, sub-lists, categories, etc.), such that user is not bombarded with too many pieces of information concurrently or within a short time. Known cognitive limitations (e.g., adults are typically only capable of handling 3-7 pieces of information at a time, and children or people with disabilities are capable of handling even fewer pieces of information concurrently) are used to guide the selection of a suitable size for the chunking and categorization of information for presentation.

General Hands-Free List-Reading

Hands-free list reading is a core, cross-domain ability for users to be able to navigate results involving more than one item. The item can be of a common data item type associated with a particular domain, such as results of a local search, a group of e-mails, a group of calendar entries, a group of reminders, a group of messages, a group of voice mail messages, a group of text messages, etc. Typically, the group of data items can be sorted in a particular order (e.g., by time, location, sender, and other criteria), and hence result in a list.

The general functional requirements for hands-free list reading include one or more of: (1) Providing a verbal overview of a list of items (e.g., "There are 6 items.") through a speech-based output; (2) Optionally, providing a list of visual snippets representing the list of items on a screen (e.g., within a single dialogue window); (3) Iterating through the items and have each one read aloud; (4) Reading a domain-specific paraphrase of an item (e.g., "message from X on date Y about Z"); (4) Reading the unbounded content of an item (e.g., content body of an email); (5) Verbally "paginating" the unbounded content of an individual item (e.g., sections of the content body of an email); (6) Allowing the user to act on the current item by starting a speech request (e.g., for an e-mail item, the user can say "reply" to start a reply action); (7) Allowing the user to interrupt reading of the items and/or paraphrases to enter another request; (8) Allowing the user to pause and resume the content/list reading, and/or to skip to another item in the list (e.g., the next or previous item, the third item, the last item, the item with certain properties, etc.); (9) Allowing the user to refer to the Nth item in the list in natural language (e.g., "reply to the first one"); and (10) Using the list as a context for natural language disambiguation (e.g., during reading of a list of messages, the user input "reply to the one from Mark" in light of the respective senders of the messages in the list).

There are several basic interaction patterns for presenting information about the list of items to the user, and for eliciting user input and responding to user commands during presentation of the information. In some embodiments, when presenting information about a list of data items, a speech-based overview is first provided. If the list of data items has been identified based on a particular set of selection criteria (e.g., new, unread, from Mark, for today, nearby, in Palo Alto, restaurants, etc.) and/or belong to a particular domain-specific data type (e.g., local search results, calendar entries, reminders, e-mails, etc.), the overview paraphrases the list of items. The particular paraphrasing used is domain-specific, and typically specifies one or more of the criteria used to select the list of data items. In addition, for presenting a list of data items, the overview also specifies the length of the list, to provide the user with some idea of how long and involved the reading is going to be. For example, the overview can be "You have 3 new messages from Anna Karenina and Alexei Vronsky." In this overview, the list length (e.g., 3), the criteria for selecting the items for the list (e.g., unread/new, and sender="Anna Karenina" and "Alexei Vronsky") are also provided. Presumably, the criteria used to select the items were specified by the user, and by including the criteria in the overview, the presentation of information would appear more responsive to the user's request.

In some embodiments, the interaction also includes providing a speech-based prompt with an offer to read the list and/or the unbounded content of each item to the user. For example, a digital assistant can provide a speech-based prompt such as "Shall I read them to you?" after providing the overview. In some embodiments, the prompt is only provided in the hands-free mode, because in a hands-on mode, the user can probably easily read and scroll through the list on a screen rather than hearing the content read out loud. In some embodiments, if the original command was to read the list of items, then the digital assistant will proceed to read the data items out loud without providing the prompt first. For example, if the user input was "Read my new messages." Then, the digital assistant proceeds to read the messages without asking the user whether he or she wants the messages read out loud. Alternatively, if the user input was "Do I have any email from Henri?" Since the original user input does not explicitly request the digital assistant to "read" the messages, the digital assistant will first provide an overview of the list of messages, and will provide a prompt with an offer to read the messages. The messages will not be read out loud unless the user provides a confirmation for doing so.

In some embodiments, the digital assistant identifies fields of text data from each data item in the list, and generates a domain-specific and item-specific paraphrase of the item's content based on a domain-specific template and the actual text identified from the data item. Once the respective paraphrases for the data items are generated, the digital assistant iterates through each item in the list one by one and reads its respective paraphrase out loud. Examples of text data fields in a data item include dates, times, person names, location names, business names, and other domain-specific data fields. The domain-specific speakable text templates arrange the different data fields of a domain-specific item type in a suitable order, and connecting the data fields with suitable connection words, and apply suitable variations (e.g., variations based on grammatical, cognitive, and other requirements) to the text of different text fields, to generate a succinct, and natural, and easy-to-understand paraphrase of the data item.

In some embodiments, when iterating through the list of items and providing information (e.g., the domain-specific, item-specific paraphrase of the items), the digital assistant sets a context marker to the current item. The context marker advances from item to item as the reading proceeds through the list. The context marker can also hop from one item to another item, if the user issues commands to jump from one item to another item. The digital assistant uses the context marker to identify the current context of the interaction between the digital assistant and the user, so that the user's input can be interpreted correctly in context. For example, the user can interrupt the list reading at any time and issue a command applicable to all or multiple of the list items (e.g., "reply"), and the context marker is used to identify a target data item (e.g., the current item) for which the command should be applied. In some embodiments, the domain-specific, item-specific paraphrases are provided to the user through text-to-speech processing. In some embodiments, a textual version of the paraphrase is also provided on a screen. In some embodiments, the textual version of the paraphrase is not provided on the screen, instead, full-versions of or detailed versions the data items are presented on the screen.

In some embodiments, when reading the unbounded content of a data item, the unbounded content is first divided into sections. The division can be based on paragraphs, lines, number of words, and/or other logical divisions of the unbounded content. The goal is to reduce the cognitive burden on the user, and not overloading the user with too much information or taking up too much time. When reading the unbounded content, a speech output is generated for each section, provided to the user one section at a time. Once the speech output for one section is provided, a verbal prompt is provided asking whether the user wishes to proceed with the speech output for the next section. This process repeats until all sections of unbounded content have been read, or until the user asks the reading of the unbounded content to be stopped. When the reading of the unbounded content for one item is stopped (e.g., either when all sections have been read or when the reading was stopped by the user), the reading of the item-specific paraphrase of the next item in the list can begin. In some embodiments, the digital assistant automatically resumes reading of the item-specific paraphrase of the next item in the list. In some embodiments, the digital assistant asks the user for a confirmation before resuming the reading.

In some embodiments, the digital assistant is fully responsive to user input from multiple input channels. For example, while the digital assistant is reading through the list of items or in the middle of reading information on one item, the digital assistant allows the user to navigate to other items via natural language commands, gestures on a touch-sensitive surface or display, and other input interfaces (e.g., mouse, keyboard, cursor, etc.). Example navigation commands include: (1) Next: stop reading the current item and start reading the next. (2) More: read more of the current item (if it was truncated or segmented), (3) Repeat: read the last speech output again (e.g., repeat the paraphrase of an item or section of unbounded content that was just read), (4) Previous: stop reading the current item and start reading the one before the current one, (5) Pause: stop reading the current item and wait for a command, (6) Resume: continue reading if paused.

In some embodiments, the interaction pattern also includes a wrap-up output. For example, when the last item has been read, read an optional, domain-specific text pattern for ending a list. For example, a suitable wrap-up output for reading a list of e-mails can be "That was all 5 e-mails", "That was all of the messages", "That was the end of the last message", etc.

The above generic listing reading examples are applicable to multiple domains, and domain-specific item types. The following use cases provide more detailed examples of hands-free list reading in different domains and for different domain-specific item types. Each domain-specific item types also have customizations specifically applicable to items of that item type and/or domain.

Hands-Free List Reading of Local Search Results

Local search results are search results obtained through a local search, e.g., search for businesses, landmarks, and/or addresses. Examples of local search include a search for restaurants near a geographic location or within a geographic area, a search for gas stations along a route, a search for locations of a particular chain-store, and the like. Local search is an example of a domain, and local search result is an example of a domain-specific item type. The following provides an algorithm for presenting a list of local search results to a user in a hand-free context.

In the algorithm, some key parameters include N: the number of results returned by a search engine for a local search request, M: the maximum number of search results to show to the user, and P: the number of items per "page" (i.e., concurrently presented to the user on the screen and/or provided under the same sub-section overview).

In some embodiments, the digital assistant detects a hands-free context, and trims the list of results for hands-free context. In other words, the digital assistant trims the list of all relevant results to no more than M: the maximum number of search results to show to the user. A suitable number for M is about 3-7. The rationale behind this maximum number is: first, a user is unlikely to perform in depth research in a hands-free mode, and therefore, a small number of most pertinent items would typically satisfy the user's information needs; and second, a user is unlikely to be able to keep track of too much information simultaneously in his mind while in a hands-free mode, because the user is probably distracted by other tasks (e.g., driving or engaged in other hands-on work).

In some embodiments, the digital assistant summarizes the list of results in text, and generates a domain-specific overview (in text form) of the entire list from the text. In addition, the overview is tailored to presenting local search results and therefore location information is particularly relevant in the overview. For example, suppose that the user requested search results for a query in the form of "category, current location" (e.g., queries resulted from natural language search requests "Find Chinese restaurants near me" or "Where can I eat here?"). Then, the digital assistant reviews the search results, and identifies search results that are near the user's current location. Then the digital assistant generates an overview of the search results in the form of "I found several <categoryPlural> nearby." In some embodiments, no count is provided in the overview unless N<3. In some embodiments, a count of the search results is provided in the overview if the count is less than 6.

For another example, suppose the user requested search results for a query in the form of "category, other location" (e.g., queries resulted from natural language search requests "Find me some romantic restaurants in Palo Alto" while the user is not currently in Palo Alto, or "Where can I eat after the movie?" where the movie will be shown at a location than the user's current location). The digital assistant will generate an overview (in textual form) in the form of "I found several <categoryPlural> in <location>." (or "near" instead of "in", whichever is more suitable given the <location>.)

In some embodiments, the textual form of the overview is provided on a display screen (e.g., within a dialogue window). After providing the overview of the entire list, the list of results are presented on the display as usual (e.g., capped at M items, M=25, for example).

In some embodiments, after the list of results are presented on the screen, a speech-based overview is provided to the user. The speech-based overview can be generated through text-to-speech conversion of the textual version of the overview. In some embodiments, no content is provided on a display screen, and only the speech-based overview is provided at this point.

Once the speech-based overview is provided to the user, a speech-based sub-section overview of a first "page" of results can be provided. For example, the sub-section overview can list the names (e.g., business names) of the first P items on the "page." Specifically, a. If this is the first page, the sub-section overview says "including <name1>, <name2>, . . . and <nameP>", where <name1> . . . <nameP> are the business names of the first P results, and the sub-section overview is presented immediately after the list overview "I found several <category-Plural> nearby . . . ."

b. If this is not the first page, the sub-section overview says "The next P are <name1>, <name2>, . . . <nameP>" etc.

The digital assistant iterate through all the "pages" of the search result list in the above manner.

For each page of results, the following steps are performed:

a. In some embodiments, on the display, a current page of search results are presented in visual form (e.g., in textual form). A visual context marker indicates the current item being read. The textual paraphrase for each search result includes the ordinal position (e.g., first, second, etc), distance, and bearing associated with the search result. In some embodiments, the textual paraphrase for each result only occupies a single line in the list on the display, such that the list appears succinct and easy to read. To keep the text in a single line, no business name is presented, the text paraphrase is in the format of "Second: 0.6 miles south".

b. In some embodiments, an individual visual snippet is provided for each result. For example, the snippet of each result can be revealed when the textual paraphrase shown on the display is scrolled, so that the I line text bubble is at the top and the snippet fits underneath.

c. In some embodiments, the context marker or context cursor advances through the list of items as the items or paraphrases thereof are presented to the user one by one in a sequential order.

d. In speech, announce the ordinal position, business name, short address, distance, and bearing of the current item. The short address is the street name portion of the full address, for example.

1. If item is the first one (independent of pages), indicate the sort order with "the closest is", "the highest rated is", "the best match is", or just "the first is"
2. Else say "the second is" (third, fourth, etc.). Keep incrementing through pages, that is, if page size P=4, the first item on page 2 would be the "fifth".
3. For short address, use "on <street name>" (no street number).
4. If result.address.city is not same as locus.city, then add "in <city>".
5. For distance, if less than a mile, say "point x miles". If less than 1.5 miles, say "1 mile". Else round to nearest whole mile and say "X miles". Use Kilometers instead of miles where the locale dictates.
6. For bearing, use north, south, east, or west (no intermediates)

e. Only for the first item of this page, speak a prompt for options: "Would you like to call it, get directions, or go to the next one?"

f. Listen g. Handle natural language commands in context of the current result (e.g., as determined based on the current position of the context marker). If user says "next" or an equivalent word, move on to the next item in the list.

h. go back to step a or go to the next page if this is the last item of the current page has been reached.

The above steps are repeated for each of the remaining "pages" of results, until there are no more pages of results left in the list.

In some embodiments, if user asks for directions to a location associated with a result item and the user is already in a navigation mode on a planned route, the digital assistant can provide a speech output saying "You are already navigating on a route. Would you like to replace this route with directions to <item name>?" If the user replies in the affirmative, the digital assistant presents the directions to the location associated with that result. In some embodiments, the digital assistant provides a speech out saying "Directions to <item name>" and presents the navigation interface (e.g., a maps and directions interface). If the user replies in the negative, the digital assistant provides a speech output saying "OK, I won't replace your route." If in eyes-free mode, just stop here. If user says "show it on a map," but the digital assistant detects an eyes-free context, the digital assistant generates a speech output saying "Sorry, your vehicle won't let me show items on the map during driving" or some other standard eyes-free warning. If eyes-free context is not detected, the digital assistant provides a speech output saying "Here is the location of <item name>" and shows the single item snippet for that item again.

In some embodiments, when an item is displayed, and the user asks to call an item, e.g., by saying "Call." The digital assistant identifies the correct target result, and initiates a telephone connection to a telephone number associated with the target result. Before making the telephone connection, the digital assistant provides a speech out saying "Calling <item name>."

The following provides a few natural language use cases for identifying the target item/result of an action command. For example, the user can name the item in a command, and the target item is then identified based on the particular item name specified in the command. The user can also use "it" or other reference to refer to a current item. The digital assistant can identify the correct target item based on the current position of the context marker. The user can also use "the nth one" or "number n" to refer to the nth item in the list. In some cases, the nth item can be ahead of the current item. For example, as soon as the user has heard the overview list of names and are hearing information regarding item #1, the user can say "directions to number 3". In response, the digital assistant will perform the "direction" action with respect to the 3rd item in the list.

For another example, the user can speak a business name to identify a target item. If multiple items in the list match the business name, then, the digital assistant chooses the last read item that matches the business name as the target item. In general, the digital assistant disambiguate from the current item (i.e., the item pointed to by the context marker) back in time, then forward from the current item. For example, if context marker is on item 5 of 10 items, and the user says a selection criterion (e.g., a particular business name, or other properties of the results) that matches items 2, 4, 6, and 8. Then the digital assistant chooses item 4 as the target item for the command. In another scenario, if context marker is on item 2, and items 3, 5, and 7 match the selection criterion, then the digital assistant selects item 3 as the target item of the command. In this case, nothing before the current context marker matches the selection criterion, and item 3 is the closest item to the context marker.

While presenting the list of local search results, the digital assistant allows the user to moving around the list by issuing the following commands: Next, Previous, go back, Read it again or repeat.

In some embodiments, when the user provides a speech command that only specifies an item, but not any action applicable to the item, then, the digital assistant prompts the user to specify an applicable action. In some embodiments, the prompt provided by the digital assistant provides one or more actions applicable to the specific item type of the item (e.g., actions to local search results, such as "Call", "Directions," "Show on map", etc.). For example, if the user simply says "number 3" or "chevron" with no applicable command verb (e.g., "call" or "directions"), then the digital assistant prompts the user with a speech output saying "Would you like call it or get directions?" If the user's speech input already specifies a command verb or action applicable to the item, then, the digital assistant acts on the item according to the command. For example, if the user's input is "call the nearest gas station" or the like. The digital assistant identifies the target item (e.g., the result corresponding to the nearest gas station), and initiates a telephone connection to a telephone number associated with the target item.

In some embodiments, the digital assistant is capable of processing and responding to user input related to different domains and context. If the user makes a context-independent, fully specified request in another domain, then, the digital assistant suspends or terminates the list reading, and responds to the request in the other domain. For example, while the digital assistant is in the process as asking the user "Would you like to call it, get directions, or go the next one" during list reading, the user can say "What is the time in Beijing?" In response to this new user input, the digital assistant determines the domain of interest has switch from local search and list-reading to another domain of clock/time. Based on such a determination, the digital assistant performs the action requested in the clock/time domain (e.g., launch the clock application, or provides the current time in Beijing).

The following provides another more detailed example on presenting a list of gas stations in response to a search request for "Find gas stations near me."

In this example, the parameters are: Page size P=4, Max results M=12, and query: {category (e.g., gas station), nearest, sorted by distance from current location}

The following task flow is implemented to present the list of search results (i.e., gas stations identified based on a local search request).

1. Sort gas stations by distance from the user's current location, and trim the list of search results to a total count of M.

2. Generate text only summary for the list: "I found several gas stations near you." (fit on at most 2 lines).

3. Show a list of N local search snippets for the complete list of results on a display.

4. Generate and provide speech-based overview: "I found several gas stations near you,"

5. Generate and provide speech-based sub-section overview: "including Chevron Station, Valero, Chevon, and Shell Station."

6. for <item 1> in the list, perform the following steps a through g:

a. provide item-specific paraphrase in text: "First: 0.7 miles south."

b. show visual snippet for Chevron Station.

c. set context marker to this item (i.e., <item 1>).

d. provide speech-based, item-specific paraphrase: "The closest is Chevon Station on North De Anza Boulevard, point 7 miles north."

e. provide a speech-based prompt offering options regarding actions applicable to the first item of the page (i.e., the <item 1>): "Would you like to call it, get directions, or go to the next one?"

f. Beep beep g. User says "next".

6. move onto the next item, <item 2> a. providing a item-specific paraphrase of the item in text: "Second: 0.7 miles south"

b. show a visual snippet for Valero.

c. set the context marker to this item (i.e., <item 2>)

d. provide a speech-based item-specific paraphrase of the item: "The second is Valero on North de Anza Boulevard, point 7 miles south."

e. do not provide prompt regarding actions applicable to the second item.

f. Beep beep g. User says "next".

6. <item 3> a. provide an item-specific paraphrase of the item in text form: "Third: 0.7 miles south."

b. show a visual snippet for Chevon.

c. set the context marker to this item.

d. provide a speech-based item specific paraphrase for this item: "The third is Chevron on South de Anza Boulevard, point 7 miles south."

e. do not provide prompt regarding actions applicable to the third item.

f. Beep beep g. User says "next".

6. <item 4> a. provide items specific paraphrase of the item in text: "Fourth: 0.7 miles south."

b. show a visual snippet for the Shell Station.

c. set the context marker to this item.

d. provide a speech-based item-specific paraphrase of the item: "The fourth is Shell Station on South de Anza Boulevard, 1 mile south."

e. do not provide prompt regarding actions applicable to the second item.

f. Beep beep g. User says "next".

5.  start a new page of items provide a speech-based section-overview for the second page: "The next 4 are Cupertino's Smog Pro & Auto Service, Shell Station, Valero, and Rotten Robbie."

6. <item 5> a. provide an item-specific paraphrase in text for this item: "Fifth: 1 mile south."

b. show a visual snippet for Cupertino's Smog Pro & Auto Service.

c. set the context marker to this item.

d. provide a speech-based item-specific paraphrase for this item: "The fifth is Cupertino's Smog Pro & Auto Service on North de Anza Boulevard, 1 mile east."

e. provide a speech-based prompt offering options regarding actions applicable to the first item of the page (i.e., the <item 5>): "Would you like to call it, get directions, or go to the next one?"

f. Beep beep g. User says "next".

<item 6> a. provide an item-specific paraphrase of the item in text: "Sixth: 2 miles west."

b. show a visual snippet for Shell Station.

c. set the context marker to this item.

d. provide a speech-based, item-specific paraphrase for the item: "The sixth is Shell Station on Stevens Creek Boulevard, 1 mile west."

e. do not provide prompt regarding actions applicable to the second item.

f. Beep beep g. User says "directions".

h. determine the target item based on the position of the context marker, and identifies the current item as the target item. Invoke the directions retrieval for the current item.

The above examples for list-reading in the local search domain are merely exemplary. The techniques disclosed for the local search domain are also applicable to other domains and domain-specific item types. For example, the list reading algorithms and presentation techniques can also be applicable to reading a list of business listings outside of a local search domain.

Reading Reminders

Reading reminders in hands-free mode has two important parts: selecting what reminders to read and deciding how to read each reminder. For hands-free mode, the list of reminder to be presented is filtered down to a group of reminders that is a meaningful subset of all available reminders associated with the user. In addition, the group of reminders to be presented to the user in the hands-free context can further be divided into meaningful sub-groups based on various reminder properties, such as reminder trigger time, trigger location, and other actions or events that the user or the user's device may perform. For example, if someone says "what are my reminders" it may not be very helpful for the assistant to reply "at least 25 . . . " since the user is unlikely to have time or be interested in hearing about all 25 reminders in one sitting. Instead, the reminders to be presented to the user should be a rather small and actionable set of reminders that are relevant now. Such as "You have 3 recent reminders." "You have 4 reminders for today." "You have 5 reminders for today, 1 for when you are traveling and 4 for after you get home."

There are a few kinds of structured data that can be used to help determine whether a reminder is relevant now, including current and trigger date/time, trigger location, and trigger actions. Selection criteria for choose which reminders are relevant now can be based on one or more of these structured data. For trigger date/time, there is an alert time and due date for each reminder.

A selection criterion can be based on a match between the alert time and due date of the reminder and the current date and time, or other user-specified date and time. For example, the user can ask "what are my reminders" and a small set (e.g., 5) of recent reminders and/or upcoming reminders with trigger time (e.g., alert time and/or due time/date) close to the current time is selected for hands-free listing reading to the user. For location triggers, a reminder can be triggered when the user is leaving a current location and/or arriving at another location.

A selection criterion can be based on the current location and/or a user specified location. For example, the user can say "what are my reminders" when he or she is leaving a current location, and the assistant can select a small set of reminders that have triggers associated with the user leaving the current location. For another example, the user can say "what are my reminders" when the user steps into a store, and reminders associated with that store can be selected for presentation. For action triggers, a reminder can be triggered when the assistant detects that the user is performing an action (e.g., driving, or walking) Alternatively or in addition, the type of actions to be performed by the user as specified in the reminders can also be used to select relevant reminders for presentation.

A selection criterion can be based on the user's current action or the action triggers associated with the reminders. A selection criterion can also be based on the user's current action and the actions that are to be performed by the user according to the reminders. For example, when the user asks "what are my reminders" when he is driving, and reminders associated with the driving action triggers (e.g., reminders for making calls in the car, reminders for going to the gas station, reminders to do oil change, etc.) can be selected for presentation. For another example, when the user asks "what are my reminders" when he is walking, reminders associate with actions that are suitable to be performed while the user is walking, such as reminders for making calls and a reminder for checking the current pollen count, a reminder to put on sunscreens, etc., can be selected for presentation.

While the user is traveling in a moving vehicle (e.g., driving or sitting in a car), the user can make calls, and preview what reminders will be triggered next or soon. Reminders for calls can form a meaningful group since the calls can be make in series in one sitting (e.g., while the user is traveling in a car).

The following description provides some more detailed scenarios for hands-free reminder reading. If someone says "what are my reminders" in a hands-free situation, the assistant provides a report or overview on a short list of reminders associated with one or more of the following categories of reminders: (1) reminders that were recently triggered, (2) reminders to be triggered when the user is leaving some place (make the assumption that the some place is where they just were), (3) reminders to be triggered or due today, in soonest first, (4) reminders to be triggered when you arrive somewhere.

For reminders, the order by which the individual reminders are presented sometimes is not as important as the overview. The overview puts the list of reminders in a context in which the arbitrary title strings of the reminders can make some sense to the user. For example, when the user asks for reminders. The assistant can provide a overview saying "You have N reminders that have recently come up, M for when you are traveling, and J reminders scheduled for today." After providing the overview of the list of reminders, the assistant can proceed to go through each sub-group of reminder in the list. For example, the following is the steps that the assistant can perform to present the list to the user:

The assistant provides a speech-based sub-section overview: "The reminders that were recently triggered are:", followed by a pause. Then, the assistant provides a speech-based item-specific paraphrase of the content of the reminder (e.g., a title of the reminder, or a short description of the reminder) saying, "contact that guy about something." In between reminders within the sub-group (e.g., the sub-group of recently triggered reminders), a pause can be inserted, so that the user can tell the reminders apart, and can interrupt the assistant with a command during the pause. In some embodiments, the assistant enters a listening mode during the pause, if two-way communication is not constantly maintained. After the paraphrase of the first reminder is provided, the assistant proceeds with the second reminder in the sub-group, and so on: "<pause> get a cable for intergalactic communication from the company store." In some embodiments, the ordinal position of the reminders are provided before the paraphrase is read. However, since the order of the reminders are not as important as it is for other types of data items, the ordinal positions of the reminders are sometimes deliberately omitted to make the communication more succinct.

The assistant continues with the second sub-group of reminders by providing a sub-group overview first: "Reminders for when you are traveling are:" Then, the assistant goes through the reminders in the second sub-group one by one: "<pause>call Justin Beaver" "<pause>check out the sunset." After the second sub-group of reminders are presented, the assistant proceeds to read a sub-group overview of the third sub-group of reminders: "A reminder coming up today is:" Then, the assistant proceeds to provide the item-specific paraphrase of each reminder in the third sub-group: "<pause>finish that report." After the third sub-group of reminders are presented, the assistant provides the sub-group overview of the fourth sub-group by saying "Reminders for when you get home are:" Then, the assistant proceeds to read the item-specific paraphrases for the reminders in the fourth sub-group: "<pause>pull a bottle from the cellar", "<pause>light a fire." The above examples are merely illustrative, and demonstrate the ideas of how a list of relevant reminders can be divided into meaningful subgroups or categories based on various properties (e.g., trigger time relative to current time, recently triggered, upcoming, triggered based on action, triggered based on location, etc.) The above examples also illustrate the key phrases through which the reminders are presented. For example, a list-level overview including a description of the sub-groups and a count of reminders within each sub-group can be provided. In addition, when there are more than one sub-groups, a sub-group overview is provided before the reminders in the sub-groups are presented. The sub-group overview states the name or title of the sub-group based on a characteristic or property by which this sub-group is created, and by which reminders within the sub-group are selected.

In some embodiments, the user will specify which particular group of reminders the user is interested in. In other words, the selection criteria are provided by the user input. For example, the user may explicitly request "show me the calls I need to make" or "what do I have to do when I get home" "what do I have to buy at this store" and so on. For each of these requests, the digital assistant extract the selection criteria from the user input based on natural language processing, and identify the relevant reminders for presentation based on the user-specified selection criteria and the pertinent properties (e.g., trigger time/date, trigger actions, actions to be performed, trigger locations, etc.) associated the reminders.

The following are example of reading for specific groups of reminders:

For reminders for calls: the user can ask "what calls do I need to make," and the assistant can say "You have reminders to make 3 calls: Amy Joe, Bernard Julia, and Chetan Cheyer." In this response, the assistant provides an overview followed by the item-specific paraphrases of the reminders. The overview specified the selection criterion (e.g., action to be performed by the user is "making calls") used to select the relevant reminders, and a count of the relevant reminders (e.g., 3). The domain-specific, item specific paraphrase for reminders for calls includes just the name of the person to be called (e.g., Amy Joe, Bernard Julia, and Chetan Cheyer), and no extraneous information is provided in the paraphrases since the names are sufficient at this point for the user to make a decision about whether to proceed with an action on the reminder (i.e., actually making one of the calls).

For reminders for things to do at a specific location: the user asks "what do have to do when I get home," and the assistant can say "You have 2 reminders for when you get home: <pause>pull a bottle from the cellar, and <pause>light a fire." In this response, the assistant provides an overview followed by the item-specific paraphrases of the reminders. The overview specified the selection criterion (e.g., trigger location is "home") used to select the relevant reminders, and a count of the relevant reminders (e.g., 2). The domain-specific, item specific paraphrase for the reminders includes just the action to be performed (e.g., action specified in the reminders), and no extraneous information is provided in the paraphrases since the user just wants a preview of what's coming up.

The above examples are merely illustrative for hands-free list reading for the reminders domain. Additional variations are possible depending on the specific types and categories of reminders that are relevant and should be presented to the user in the hands-free context. Visual snippets of the reminders are optionally provided on a screen accompanying the speech-based outputs provided by the assistant. Commands such as repeat, next, etc. can still be used to navigate among the different sub-groups of reminders or repeat information regarding one or more reminders.

Reading Calendar Events

The following description relates to reading calendar events in a hands-free mode. The two main considerations for hands-free calendar event reading are still selecting which calendar entries to read, and deciding how to read each calendar entry. Similar to reading reminders and other domain-specific data item types, a small subset of all calendar entries associated with the user are selected, and grouped into meaningful sub-groups of 3-5 entries each. The division of sub-groups can be based on various selection criteria such as event date/time, reminder date/time, type of events, location of events, participants, etc. For example, if user asks says "what is on my calendar," it would not be very helpful for the assistant to say "you have at least 50 entries in your calendar." Instead, the assistant can present information about the event entries for the current day or half day, and then proceeds afterwards in accordance with the user's subsequent commands. For example, the user can ask about additional events for the next day by simply saying "next page."

In some embodiments, the calendar entries are divided into sub-groups by date. Each sub-group only includes events on a single day. If the user asks for calendar entries of a date range spanning multiple days, the calendar entries associated with each single day within that range is presented at a time. For example, if the user asks "what's on my calendar next week," the assistant can reply with a list-level overview "You have 3 events on Monday, 2 events on Tuesday, and no events on other days." The assistant can then proceed to present the events on each of Monday and Tuesday. For the events on each day, the assistant can provide a sub-group overview of the day first. The overview can specify the times of the events on that day. In some embodiments, if an event is a whole-day event, the assistant provides that information in the sub-group overview as well. For example, the following is an example scenario illustrating the hands-free reading of calendar entries:

The user asks "what's on my calendar today." The assistant replies in speech: "You have events on your calendar at 11 am, 12:30, 3:30, and 7:00 pm. You also have a day-long event." In this example, the user only requested events of a single day, and the list-level overview is the overview of the day's events.

In presenting a list of calendar events, event time is a most pertinent piece of information to the user in most cases. Streamlining the presentation of a list of times can improve use experience and make the communication of information more efficient. In some embodiments, if the event times of the calendar entries span both the morning and the afternoon, only the event times for the first and last calendar entries are provided with an AM/PM indicator in the speech-based overview. In addition, if all events are in the morning, the AM indicator is provided for the event times of the first and the last calendar entries. If all events are in the afternoon, the PM indicator is provided for the last event of the day, but no AM/PM indicator is provided for other event times. Noon and midnight are exempt from AM/PM rule above. For some more explicit example, the following are what can be provided in the calendar entry list overview: "11 am, 12:30, 3:30, and 7 pm", "8:30 am, 9, and 10 am", "5, 6, and 7:30 pm", "Noon, 2, 4, 5, 5:30, and 7 pm", "5, 6, and midnight."

For all-day events, the assistant provides a count of all-day events. For example, when asked about the events next week, the digital assistant can say "You have (N) all-day event(s)."

When reading the list of relevant calendar entries, the digital assistant first reads all of the timed events and then the all-day events. If there are no timed events, then the assistant goes directly to reading the list of all-day events after the overview. Then, for each event on the list, the assistants provides a speech-based item-specific paraphrase according to the following template: <time> <subject> <location>, where the location can be omitted if no location is specified in the calendar entry. For example, the item-specific paraphrases of the calendar entries include a <time> component in the form of: "at 11 AM", "at noon", "at 1:30 PM", "at 7:15 PM", "at noon", etc. For all day event, no such paraphrase is needed. For the <subject> component, the assistant optionally specifies the count and/or identities of the participants in addition to the title of the event. For example, if there are more than 3 participants for an event, the <subject> component can include "<event title> with N people about". If there are 1-3 participants, the <subject> component can include "<event title> with person1, person2, and person3" If there are no participants for an event other than the user, the <subject> component can include just the <event title>. If a location is specified for a calendar event, <location> component can be inserted into the paraphrase of the calendar event. This needs some filtering.

The following illustrate a hands-free list-reading scenario for calendar events. After the user asks "what's on my calendar." The assistant replies with an overview: "You have events on your calendar at 11 AM, noon, 3:30, and 7 PM. You also have 2 day-long events." After the overview, the assistant continues with the list of calendar entries: "At 11 AM: meeting", "At 11:30 AM: meeting with Harry Saddler", "At noon: design review with 9 people in Room (8), IL 2", "At 3:30 PM: meeting with Susan", "At 7 PM: dinner with Amy Cheyer and Lynn Julia." In some embodiments, the assistant can indicate the end of the list by providing a wrap-up output, such as "That was all."

The above examples are merely illustrative for hands-free list reading for the calendars domain. Additional variations are possible depending on the specific types and categories of calendar entries (e.g., meetings, appointments, parties, meals, events that need preparation/travel/etc.) that are relevant and should be presented to the user in the hands-free context. Visual snippets of the calendar entries are optionally provided on a screen accompanying the speech-based outputs provided by the assistant.

List Reading for E-mails

Similar to other list of data items in other domains, hands-free reading of a list of e-mails also concerns with which e-mails to include in the list, and how to read each e-mail to the user. E-mail is different from other item types in that emails typically include an unbounded portion (i.e., the message body) that is of unbounded size (e.g., too large to read in its entirety), and may include content that cannot be readily converted to speech (e.g., objects, tables, pictures, etc.). Therefore, when reading e-mails, the unbounded portions of e-mails are divided into smaller chunks, and only one chunk is provided at a time, and the rest is omitted from the speech output unless the user specifically request to hear them (e.g., by using a command such as "More"). In addition, pertinent properties for selecting e-mails for presentation, and dividing emails into sub-groups include sender identity, date, subject, read/unread status, urgency flag, etc. Objects (e.g., tables, pictures) and attachments in the email can be identified by the assistant, but may be omitted from hands-free reading. In some embodiments, the objects and attachment may be presented on a display. In some embodiments, if the user is also in an eyes-free mode, the display of these objects and attachment may be prevented by the assistant.

The following is an example scenario illustrating the hands-free list reading for email. The example illustrates the use of a prompt after the overview and before reading the list of emails. When reading the list of emails, a summary or paraphrase of the content of each email is provided one by one. The user can navigate through the list by using the command "Next", "First", "Previous", "Last" etc. To hear more of the message body of the email, the user can say "More." The user can also say command related to actions applicable to an email. The context marker advances through the list of emails as the assistant reads the emails one by one. The context marker also hops from one email to another if the user's command is directed to an email out of sequential order.

For example, the user can ask: "Do I have any new mail from Harry Saddler?"

Based on the selection criteria specified in the user input (e.g., sender=Harry Saddler, and read/unread status=NEW", the assistant identifies the relevant e-mails, and provides a list overview and a prompt for reading the list of emails: "You have 5 unread messages from Harry Saddler. Would you like to hear them read?" If the user answers in the affirmative, "Yes." The assistant proceeds to read a domain-specific, item-specific paraphrase of the list of emails one by one. For example, the assistant can say, "First message, From Harry Saddler, 3 days ago. With the subject: Short meeting today 3 pm." The paraphrase is generated based on the content of the e-mail, and include key information such as an ordinal position of the message in the list, a sender identify associated with the message, a time associated with the message, and the subject line of the message. Here, the exact arrival time is not used. Instead a paraphrase of the arrival time is used, since the exact arrival time is probably not pertinent in the hands-free context. The body of the message is not read or provided in the paraphrase. Then, after a brief pause, the assistant can begin reading a first chuck of the unbounded content of the message: "Harry wrote: Next meeting—to scope a project X—is Monday October 17, 2 pm. I can't find a room, so let's meet in the IL2/4th elevator lobby, and go from there. Harry" In this case, the overall length of the unbounded content of the message is short enough to fit within a predetermined length limit for a chuck (e.g., 3 lines of text), therefore, the entire content body of the message is read in one chunk.

After reading the first message, a brief pause is provided, so that the user can enter a command for an action (e.g., reply, delete, repeat, etc.) applicable to the message just read, or to move on to the next message. Suppose that the use says "next." Then, the assistant proceeds to the next message in the list, and the context marker advances to the next message. The assistant provides a speech output saying "Next message, From Harry Saddler, today at 8:23 am, with the subject: List reading use cases." After a pause for user interruption, the assistant continues to read the unbounded content of the message "Harry wrote: By popular demand, we're using spreadsheets to develop, refine and track use cases. Each will be attached to the corresponding TLF radar; when updated, a new version will be added. I'll be the point person for developing the use cases with the relevant domain teams." After reading the first chunk of the message body, the assistant pauses, and prompts the user "Continue reading this message?" If the user says "Yes," the assistant proceeds to read the next chunk of the message body: "Harry wrote: Calendar use cases are partly worked out, still needs some flesh on the bones, and of course prioritization. LINK. TLF: Calendar entries . . . ." Before the assistant finishes reading this chunk of the message body, the user interrupts the reading with a command "Reply." In response, the assistant stops the reading, and identifies the current message as the target message for the action requested by the user's input. The assistant generates a speech-based response "OK, I can help you reply to Harry Saddler. What would you like to say?" The user speaks the text of the reply email "Great idea period these will help a lot." The assistant mirrors the message back to the user to confirm accuracy, "Your message reads: Great idea. These will help a lot." The assistant then asks "Ready to send it?" Once the user confirms (e.g., by saying "yes"), the assistant acknowledges the user's confirmation, and says "OK, I'll send it. Shall I continue reading your email?" After the user replies "Yes." The assistant goes to the next message in the list and reads it "Next message, From Harry Saddler, yesterday at 2:34 pm with the subject: spreadsheet <pause> The email message contains only an attachment."

Note that in the reading of the unbounded content for both this email message and the previous email message, the assistant detected some object that is not easily read out lout. For example, in the previous email, the message body contains a hyperlink. The assistant does not convert the text of the hyperlink to the speech. Instead, the assistant simply identifies the existence of the link in the message body by using a keyword "LINK.TLF:." so that the user is informed of the link, but the speech output of the message body is not distorted into an unrecognizable form. In the current message, an attachment is identified. The assistant does not attempt to read the attachment. Instead, the assistant simply provide a speech output indicating the presence of the attachment in the email.

Continue with above email reading scenario. After reading the unbounded content of the third message, the digital assistant continues to read the next message, "Next message, From Harry Saddler, 30 minutes ago. In reply to a message from you on the subject: no way to shut up TTS." After a pause, the assistant continues with the first chunk of the unbounded content "Harry wrote: How about this simple solution: silence the assistant. While assistant is speaking, shake it; it stops talking silence the assistant and make a new request: while assistant is speaking, shake again . . . <pause>" After reading the first chuck, the assistant again asks "Continue reading this message?" The user says "Repeat." In response, the assistant checks the position of the context marker, which is now residing on the first chunk of the unbounded content of the fourth message in the list. The assistant then reads the first chunk of the message body for the fourth message again, "How about this simple solution: silence the assistant. while assistant is speaking, shake it; it stops talking. silence the assistant and make a new request: while assistant is speaking, shake again . . . ."

After a brief pause, the assistant asks "Continue?" If the user says "Yes", the assistant continues to read the second chunk of the current message, and the context marker moves to the second chunk as well. For example, the assistant reads the second chunk "this is simply 'silence the assistant'+'start listening' to get the assistant without making a new request. Home button, then mic button when it appears. This is really forced endpoint with no input. Harry."

After a brief pause, the assistant asks "Continue?" and the user says "No."

In response to the user's command to stop reading the message body of the current message, the assistant proceeds to the read the next message: "Next message, From Harry Saddler, 10 minutes ago, In reply to a message from Siamak Hodjat on the subject: the simple rule for staying in transactions (modal prompting)." After a brief pause, the assistant asks "Continue reading this message?" The user says "Next." In response to the use's input, the assistant replies "That was the last of 5 email messages."

Note in the above example, only the ordinal position of the first message was provided in the item-specific paraphrases of the messages, the rest of the messages are simply referred to as the "Next message" in their respective paraphrases. Omission of the ordinal position in the paraphrases is possible because there are only a few messages (e.g., 5 or fewer) being read. And the user does not need to hear the ordinal positions out loud in order to mentally register the ordinal positions of the messages. User commands that make references to the messages by their respective ordinal positions in the list would still work in this context. For example, a speech input "Repeat the second message" after the reading of the fourth message would still take the user back to the second message.

The above e-mail list reading examples are merely illustrative. Other commands for the assistant can be implemented to initiate other actions applicable to email messages. The techniques and options described with respect to the e-mail reading scenarios are applicable to other types of data items as well.

FIGS. 14A-14L is a flow diagram of a method for providing hands-free listing reading by a digital assistant (also called a virtual assistant). In a process 1440, the digital assistant identifies a plurality of data items for presentation to a user, where the plurality of data items are each associated with a domain-specific item type (1442). Examples of the data items include: calendar entries associated with a user, emails from a particular sender, reminders for a particular day, and search results obtained from a particular local search request. The domain-specific item types for the above example data items are calendar entries, emails, reminders, and local search results. Each domain-specific data type has a relatively stable data structure, such that content of particular data fields can be predictably extracted and restructured into a paraphrase of the content. In some embodiments, the plurality of data items are also sorted according to a particular order. For example, local search results are often sorted by relevance and distance. Calendar entries are often sorted by event time. Items of some item types do not need to be sorted. For example, reminders may be unsorted."

Based on the domain-specific item type, the assistant generates an speech-based overview of the plurality of data items (1444). The overview provides the user with a general idea of what kinds of items are in the list, and how many items are in the list. For each of the plurality of data items, the assistant further generates a respective speech-based, item-specific paraphrase for the data item based on respective content of the data item (1446). The format of the item-specific paraphrase often depends on the domain-specific item type (e.g., whether the items is a calendar entry or a reminder) and the actual content of the data item (e.g., event time and subject of a particular calendar entry). Then, the assistant provides the speech-based overview to a user through the speech-enabled dialogue interface (1448). The speech-based overview is then followed by the respective speech-based, item-specific paraphrases for at least a subset of the plurality of data items. In some embodiments, if the items in the list are sorted in a particular order, the paraphrases of the items are provided in the particular order. In some embodiments, if there are more than a threshold number (e.g., maximum number per "page"=5 items) of items in the list, only a subset of the items are presented at a time. The user can request to see/hear more of the items by specifically requesting such.

In some embodiments, for each of the plurality of data items, the digital assistant generates a respective textual, item-specific snippet for the data item based on respective content of the data item (1450). For example, the snippet can include more details of a corresponding local search result, or the content body of an email, etc. The snippet is for presentation on a display, and accompanies the speech-based reading of the list. In some embodiments, the digital assistant provides the respective textual, item-specific snippets for at least the subset of the plurality of data items, to the user through a visual interface (1452). In some embodiments, the context marker is provided on the visual interface as well. In some embodiments, all of the plurality of data items are presented on the visual interface at the same time, while the reading of the items proceed "page" by "page", i.e., a subset at a time.

In some embodiments, the provision of the speech-based, item-specific paraphrases is accompanied by provision of the respective textual, item specific snippets.

In some embodiments, while providing the respective speech-based, item-specific paraphrases, the digital assistant inserts a pause between each pair of adjacent speech-based, item-specific paraphrases (1454). The digital assistant enters a listening mode to capture user input during the pause (1456).

In some embodiments, while providing the respective speech-based, item-specific paraphrases in a sequential order, the digital assistant advances a context marker to a current data item for which the respective speech-based, item-specific paraphrase is being provided to the user (1458).

In some embodiments, the digital assistant receives user input requesting an action to be performed, the action applicable to the domain-specific item type (1460). The digital assistant determines a target data item for the action among the plurality of data items based on a current position of the context marker (1462). For example, the user may request an action without explicitly specifying a target item for apply the action. The assistant presumes the user is referring to the current data item as the target item. Then, the digital assistant performs the action with respect to the determined target data item (1464).

In some embodiments, the digital assistant receives user input requesting an action to be performed, the action applicable to the domain-specific item type (1466). The digital assistant determines a target data item for the action among the plurality of data items based on an item reference number specified in the user input (1468). For example, the user may say "the third" item in the user input, and the assistant can determine which item the "third" item is in the list. Once the target item is determined, the digital assistant performs the action with respect to the determined target data item (1470).

In some embodiments, the digital assistant receives user input requesting an action to be performed, the action applicable to the domain-specific item type (1472). The digital assistant determines a target data item for the action among the plurality of data items based on an item characteristic specified in the user input (1474). For example, the user can say "Reply to the message from Mark," and the digital assistant can determine which message the user is referring to based on the sender identity "Mark" among the list of messages. Once the target item is determined, the digital assistant performs the action with respect to the determined target data item (1476).

In some embodiments, when determining the target data item for the action, the digital assistant: determines that the item characteristic specified in the user input applies to two or more of the plurality of data items (1478), determines a current position of a context marker among the plurality of data items (1480), and selecting one of the two or more data items as the target data item (1482). In some embodiments, the selecting of the data item includes: preferentially selecting all data items residing before the context marker over all data items residing after the context marker (1484); and preferentially selecting a data item closest to the context cursor among all data items on the same side of the context marker (1486). For example, when the user says reply to the message from Mark, and if all messages from Mark are located after the current context marker, then select the closet one to the context marker as the target message. If one message from Mark is before the context marker, and the rest are after the context Marker, then the one before the context marker is selected as the target message. If all messages from Mark are located before the context marker, then the one closest to the context marker is selected as the target message.

In some embodiments, the digital assistant receives user input selecting one of the plurality of data items without specifying any action applicable to the domain-specific item type (1488). In response to receiving the user input, the digital assistant provides a speech-based prompt to the user, the speech-based prompt offering one or more action choices applicable to the selected data item (1490). For example, if the user says "the first gas station." The assistant can offer a prompt saying "would you like to call or get directions?"

In some embodiments, for at least one of the plurality of data items, the digital assistant determines a respective size of an unbounded portion of the data item (1492). Then, in accordance with predetermined criteria, the digital assistant performs one of: (1) providing a speech-based output reading an entirety of the unbounded portion to the user (1494); and (2) chunking the unbounded portion of the data item into multiple discrete sections (1496), providing a speech-based output reading a particular discrete section of the multiple discrete sections to the user (1498), and prompting user input regarding whether to read the remaining discrete sections of the multiple discrete sections (1500). In some embodiments, the speech-based output comprises a verbal pagination indicator uniquely identifying the particular discrete section among the multiple discrete sections.

In some embodiments, the digital assistant provides the respective speech-based, item-specific paraphrases for at least the subset of the plurality of data items in a sequential order (1502). In some embodiments, while providing the respective speech-based, item-specific paraphrases in the sequential order, the digital assistant receiving a speech input from the user, the speech input requesting one of: skipping one or more paraphrases, presenting additional information for a current data item, repeating one or more previously presented paraphrases (1504). In response to the speech input, the digital assistant continues providing the paraphrases in accordance with the user's speech input (1506). In some embodiments, while providing the respective speech-based, item-specific paraphrases in the sequential order, the digital assistant receives a speech input from the user, the speech input requesting to pause the provision of the paraphrases (1508). In response to the speech input, the digital assistant pauses the provision of the paraphrases and listening for additional user input during the pausing (1510). During the pausing, the digital assistant performs one or more actions in response to one or more additional user input (1512). After performing the one or more actions, the digital assistant automatically resuming the provision of the paraphrases after the performance of the one or more actions (1514). For example, while reading one of a list of emails, the user can interrupt the reading, and ask the assistant to reply to a message. After the message is completed and sent, the assistant resumes reading of the remaining messages in the list. In some embodiments, the digital assistant requests a user confirmation before automatically resuming the provision of the paraphrases (1516).

In some embodiments, the speech-based overview specifies a count of the plurality of data items.

In some embodiments, the digital assistant receives a user input requesting presentation of the plurality of data items (1518). The digital assistant processes the user input to determine whether the user has explicitly requested reading of the plurality of data items (1520). Upon determination that the user has explicitly requested reading of the plurality of data items, the digital assistant automatically provides the speech-based, item specific paraphrases following the provision of the speech-based overview without further user request (1522). Upon determination that the user has not explicitly requested reading of the plurality of data items, the digital assistant prompts a user confirmation before providing the respective speech-based, item-specific paraphrases to the user (1524).

In some embodiments, the digital assistant determines presence of a hands-free context (1526). The digital assistant divides the plurality of data items into one or more subsets according to a predetermined maximum item count per subset (1528). Then, the digital assistant provides the respective speech-based, item-specific paraphrases for the data items in one subset at a time (1530).

In some embodiments, the digital assistant determines presence of a hands-free context (1532). The digital assistant limits the plurality of data items for presentation to a user according to a predetermined maximum item count specified for the hands-free context (1534). In some embodiments, the digital assistant provides a respective speech-based subset identifier before providing the respective item-specific paraphrases for the data items in each subset (1536). For example, the sub-set identifiers can be "the first five messages", "the next five messages", etc.

In some embodiments, the digital assistant receives a user input while providing the speech-based overview and item-specific paraphrases to the user (1538). The digital assistant processes the speech input to determine whether the speech input relates to the plurality of data items (1540). Upon determination that the speech input does not relate to the plurality of data items: the digital assistant suspends output generation related to the plurality of data items (1542), and provides to the user an output that is responsive to the speech input and unrelated to the plurality of data items (1544).

In some embodiments, after the respective speech-based, item-specific paraphrases for all of the plurality of data items, the digital assistant provides a speech-based closure to the user through the dialogue interface (1546).

In some embodiments, the domain-specific item type is local search results and the plurality of data items are a plurality of search results of a particular local search. In some embodiments, to generate the speech-based overview of the plurality of data items, the digital assistant determines whether the particular local search is performed with respect to a current user location (1548), upon determining that the particular local search is performed with respect to the current user location, the digital assistant generates the speech-based overview without explicitly naming the current user location in the speech-based overview (1550), and upon determining that the particular local search is performed with respect to a particular location other than the current user location, the digital assistant generates the speech-based overview explicitly naming the particular location in the speech-based overview (1552). In some embodiments, to generate the speech-based overview of the plurality of data items, the digital assistant determines whether a count of the plurality of search results exceeds three (1554), upon determining that the count does not exceed three, the assistant generates the speech-based overview without explicitly specifying the count (1556), and upon determining that the count exceeds three, the digital assistant generates the speech-based overview explicitly specifying the count (1558).

In some embodiments, the speech-based overview of the plurality of data items specifies a respective business name associated with each of the plurality of search results.

In some embodiments, the respective speech-based, item-specific paraphrase of each data item specifies a respective ordinal position of a search results among the plurality of search results, followed in sequence by a respective business name, a respective short address, a respective distance, and a respective bearing associated with the search result, and wherein the respective short address includes only a respective street name associated with the search result. In some embodiments, to generate the respective item-specific paraphrase for each data item, the digital assistant: (1) upon determination that an actual distance associated with the data item is less than one distance unit, specifies the actual distance in the respective item-specific paraphrase of the data item (1560); and (2) upon determination that the actual distance associated with the data item is greater than 1 distance unit, rounds the actual distance to the nearest whole number of distance units and specifies the nearest whole number of units in the respective item-specific paraphrase of the data item (1562).

In some embodiments, the respective item-specific paraphrase of a highest-ranked data item among the plurality of data items according to one of a rating, a distance, and a matching score associated with the data item includes a phrase indicating the ranking of the data item, while the respective item-specific paraphrases of other data items among the plurality of data items omits the ranking of said data items.

In some embodiments, the digital assistant automatically prompts user input regarding whether to perform an action applicable to the domain-specific item type, wherein the automatic prompting is only provided once for the first data item among the plurality of data items, and the automatic prompting is not repeated for the other data items among the plurality of data items (1564).

In some embodiments, while at least a subset of the plurality of search results are being presented to the user, the digital assistant receives a user input requesting navigation to a respective business location associated with one of the search results (1566). In response to the user input, the assistant determines whether the user is already navigating on a planned route to a destination different from the respective business location (1568). Upon determination that the user is already on the planned route to a destination different from the respective business location, the assistant provides a speech output requesting a user confirmation to replace the planned route with a new route leading to the respective business location (1570).

In some embodiments, the digital assistant receives an addition user input requesting a map view of the business location or the new route (1572). The assistant detects presence of an eyes-free context (1574). In response to detecting the presence of the eyes-free context, the digital assistant provides a speech-based warning indicating that the map view will not be provided in the eyes-free context (1576). In some embodiments, detecting the presence of the eyes-free context comprises detecting the user's presence in a moving vehicle.

In some embodiments, the domain-specific item type is reminders and the plurality of data items are a plurality of reminders for a particular time range. In some embodiments, the digital assistant detects a trigger event for presenting a listing of reminders to the user (1578). In response to the user input, the digital assistant identifies the plurality of reminders to be presented to the user in accordance with one or more relevance criteria, the one or more relevance criteria based on one or more of a current date, a current time, a current location, a action performed by the user or a device associated with the user, an action to be performed by the user or a device associated with the user, an a reminder category specified by the user (1580).

In some embodiments, the trigger event for presenting a listing of reminders comprises receipt of a user request to see reminders for the current day, and the plurality of reminders is identified based on the current date, and each of the plurality of reminders has a respective trigger time within the current date.

In some embodiments, the trigger event for presenting a listing of reminders comprises receipt of a user request to see recent reminders, and the plurality of reminders is identified based on the current time, and each of the plurality of reminders has been triggered within a predetermined time period before the current time.

In some embodiments, the trigger event for presenting a listing of reminders comprises receipt of a user request to see upcoming reminders, and the plurality of reminders is identified based on the current time, and each of the plurality of reminders has a respective trigger time within a predetermined time period after the current time.

In some embodiments, the trigger event for presenting a listing of reminders comprises receipt of a user request to see a particular category of reminders, and each of the plurality of reminders belongs to the particular category. In some embodiments, the trigger event for presenting a listing of reminder comprises detecting the user leaving a predetermined location. In some embodiments, the trigger event for presenting a listing of reminders comprises detecting the user arriving at a predetermined location.

In some embodiments, the trigger event based on location, action, time for presenting a list of reminders can also be used as selection criteria for determining which reminders should be included in the list of reminders to present to the user when the user requests to see reminders without specifying a selection criterion in his or she request. For example, as set forth in the use cases for hands-free list reading, the fact that the user is at a particular location (e.g.,), leaving or arriving at a particular location, and performing a particular action (e.g., driving, walking) can be used as the context for deriving appropriate selection criteria for selecting data items (e.g., reminders) to show to the user at the present time, when the user has simply asked "show me my reminders."

In some embodiments, the digital assistant provides the speech-based, item specific paraphrase of the plurality of reminders in an order sorted according to respective trigger times of the reminders (1582). In some embodiments, the reminders are not sorted.

In some embodiments, to identify the plurality of reminders, the digital assistant applies increasingly stringent relevance criteria to select the plurality of reminders until a count of the plurality of reminders no longer exceed a predetermined threshold number (1584).

In some embodiments, the digital assistant dividing the plurality of reminders into multiple categories (1586). The digital assistant generates a respective speech-based category overview for each of the multiple categories (1588). The digital assistant provides the respective speech-based category overview for each category immediately before the respective item-specific paraphrases for the reminders in the category (1590). In some embodiments, the multiple categories includes one or more of a category based on location, a category based on task, a category based on trigger time relative to current time, a category based on trigger time relative to a user-specified time.

In some embodiments, the domain-specific item type is calendar entries and the plurality of data items are a plurality of calendar entries for a particular time range. In some embodiments, the speech-based overview of the plurality of data items provides either or both timing and duration information associated with each of the plurality of calendar entries without providing additional details regarding the calendar entries. In some embodiments, the speech-based overview of the plurality of data items provides a count of all-day events among the plurality of calendar entries.

In some embodiments, the speech-based overview of the plurality of data items includes a listing of respective event times associated with the plurality of calendar entries, and wherein the speech-based overview only explicitly pronounces a respective AM/PM indicator associated with a particular event time under one of the following conditions: (1) the particular event time is the last one in the listing, (2) the particular event time is the first one in the listing and occurs in the morning.

In some embodiments, the speech-based, item-specific paraphrases of the plurality of data items is a paraphrase of a respective calendar event generated according to a "<time><subject><location, if available>" format.

In some embodiments, the paraphrase of the respective calendar event names one or more participants of the respective calendar event if a total count of the participants is below a predetermined number; and the paraphrase of the respective calendar event does not name participants of the respective calendar event if the total count of the participants is above the predetermined number.

In some embodiments, the paraphrase of the respective calendar event provides the total count of the participants if the total count is above the predetermined number.

In some embodiments, the domain-specific item type is e-mails and the plurality of data items are a particular group of e-mails. In some embodiments, the digital assistant receiving a user input requesting a listing of emails (1592). In response to the user input, the digital assistant identifies the particular group of e-mails to be presented to the user in accordance with one or more relevance criteria, the one or more relevance criteria based on one or more of: a sender identity, a message arrival time, a read/unread status, and an e-mail subject (1594). In some embodiments, the digital assistant processes the user input to determine at least one of the one or more relevance criteria (1596). In some embodiments, the speech-based overview of the plurality of data items paraphrases the one or more relevance criteria used to identify the particular group of e-mails, and provides a count of the particular group of e-mails. In some embodiments, after providing the speech-based overview, the digital assistant prompts user input to accept or reject reading of the group of e-mails to the user (1598). In some embodiments, the respective speech-based, item specific paraphrase for each data item is a respective speech-based, item specific paraphrase for a respective e-mail in the particular group of emails, and the respective paraphrase for the respective e-mail specifies an ordinal position of the respective e-mail in the group of e-mails, a sender of the respective e-mail, and a subject of the email.

In some embodiments, for at least one of the particular group of e-mails, the digital assistant determines a respective size of an unbounded portion of the e-mail (1600). In accordance with predetermined criteria, the digital assistant performs one of: (1) providing a speech-based output reading an entirety of the unbounded portion to the user (1602); and (2) chunking the unbounded portion of the data item into multiple discrete sections (1604), providing a speech-based output reading a particular discrete section of the multiple discrete sections to the user, and after reading the particular discrete section, prompting user input regarding whether to read the remaining discrete sections of the multiple discrete sections.

The above flow diagram illustrates the various options that can be implemented in hands-free list reading for data items in general, and for various domain-specific item types. Although the steps are show in a flow diagram, the steps do not have to be performed in any particular order, unless explicitly indicated in the particular steps. Not all steps need to be performed in various embodiments. Various features from different domains may be applicable to reading of items in other domains. The steps can be selectively combined in various embodiments, unless explicitly prohibited. Other steps, methods, and features are described in other parts of the specification, and can be combined with the steps described with respect to FIGS. 14A-14L.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a nontransitory computer-readable storage medium and computer program code, encoded on the medium, for causing a processor in a computing device or other electronic device to perform the above-described techniques.

Reference in the specification to “one embodiment” or to “an embodiment” means that a particular feature, structure, or characteristic described in connection with the embodiments is included in at least one embodiment of the invention. The appearances of the phrase “in one embodiment” in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as “processing” or “computing” or “calculating” or “displaying” or “determining” or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, desktop computer, laptop computer, tablet computer, consumer electronic device, consumer entertainment device; music player; camera; television; set-top box; electronic gaming unit; or the like. An electronic device for implementing the present invention may use any operating system such as, for example, iOS or MacOS, available from Apple Inc. of Cupertino, Calif., or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A method of adapting a user interface, performed at an electronic device having one or more processors and memory storing one or more programs for execution by the one or more processors, the method comprising:

automatically, without user input and without regard to whether a digital assistant application has been separately invoked by a user, determining that the electronic device is in a vehicle; and responsive to the determining:

automatically invoking a listening mode of a virtual assistant implemented by the electronic device, wherein the listening mode causes the electronic device to automatically, without a physical input from the user, listen for voice input from the user for a predetermined time after the electronic device provides an auditory output;

receiving a voice input from the user; and concurrently providing both an auditory output and a visual output on a display screen of the electronic device based on the voice input, wherein at least one of the auditory output and the visual output paraphrases the voice input.

2. The method of claim 1, further comprising:

while in the listening mode, detecting a wake-up word spoken by the user;

in response to detecting the wake-up word, listening for a second voice input from the user;

receiving the second voice input from the user; and generating a response to the second voice input.

3. The method of claim 1, wherein determining that the electronic device is in a vehicle comprises detecting that the electronic device is in communication with the vehicle.

4. The method of claim 3, wherein the communication is BLUETOOTH® wireless communication.

5. The method of claim 1, wherein determining that the electronic device is in a vehicle comprises detecting that the electronic device is moving at or above a first predetermined speed.

6. The method of claim 1, further comprising, responsive to the determining, limiting the ability to view visual output presented by the electronic device.

7. The method of claim 1, further comprising, responsive to the determining, limiting the ability to interact with a graphical user interface presented by the electronic device.

8. The method of claim 1, further comprising, responsive to the determining, limiting the ability to use a keyboard on the electronic device.

9. The method of claim 1, further comprising, responsive to the determining, limiting the device so as to not request touch input from the user.

10. The method of claim 1, further comprising, responsive to the determining, limiting the device so as to not respond to touch input from the user.

11. The method of claim 1, further comprising:

generating a response to the voice input, the response including a list of information items to be presented to the user; and outputting the information items via an auditory output mode, wherein in accordance with a determination that the electronic device is not in a vehicle, the information items are only presented on a display screen of the electronic device.

12. The method of claim 11, further comprising, responsive to the determining that the electronic device is in a vehicle, limiting the amount of items in the list to a predetermined amount.

13. The method of claim 1, wherein the voice input corresponds to content to be sent to a recipient, further comprising:

producing a message corresponding to the voice input, wherein the auditory output and the visual output include the message; and requesting confirmation prior to sending the message to the recipient.

14. The method of claim 13, wherein requesting confirmation comprises asking the user, via the auditory output mode, whether the text should be sent to the recipient.

15. The method of claim 1, further comprising:
receiving a voice input comprising natural language information;
generating, based on the voice input, a plurality of candidate interpretations of user intent;
inferring a user intent based on the plurality of candidate interpretations of the user intent;
identifying a task based at least in part on the inferred user intent;
executing the identified task; and
in accordance with the execution of the identified task, generating a response to the user.

16. The method of claim 1, wherein both the auditory output and the visual output paraphrase the voice input.

17. A non-transitory computer-readable medium having instructions stored thereon, the instructions, when executed by one or more processors, cause the processors to perform operations comprising:
automatically, without user input and without regard to whether a digital assistant application has been separately invoked by a user, determining that the electronic device is in a vehicle; and
responsive to the determining:
automatically invoking a listening mode of a virtual assistant implemented by the electronic device, wherein the listening mode causes the electronic device to automatically, without a physical input from the user, listen for voice input from the user for a predetermined time after the electronic device provides an auditory output;
receiving a voice input from the user; and
concurrently providing both an auditory output and a visual output on a display screen of the electronic device based on the voice input, wherein at least one of the auditory output and the visual output paraphrases the voice input.

18. The non-transitory computer-readable medium of claim 17, wherein determining that the electronic device is in a vehicle comprises detecting that the electronic device is in communication with the vehicle.

19. The non-transitory computer-readable medium of claim 17, the instructions further causing the processors to perform operations comprising:
generating a response to the voice input, the response including a list of information items to be presented to the user; and
outputting the information items via an auditory output mode, wherein in accordance with a determination that the electronic device is not in a vehicle, the information items are only presented on a display screen of the electronic device.

20. The non-transitory computer-readable medium of claim 19, the instructions further causing the processors to perform operations comprising, responsive to the determining that the electronic device is in a vehicle, limiting the amount of items in the list to a predetermined amount.

21. The non-transitory computer-readable medium of claim 17, wherein the voice input corresponds to content to be sent to a recipient, the instructions further causing the processors to perform operations comprising:
producing a message corresponding to the voice input, wherein the auditory output and the visual output include the message; and
requesting confirmation prior to sending the message to the recipient.

22. The non-transitory computer-readable medium of claim 21, wherein requesting confirmation comprises asking the user, via the auditory output mode, whether the text should be sent to the recipient.

23. The non-transitory computer-readable medium of claim 17, the instructions further causing the processors to perform operations comprising:
receiving a voice input comprising natural language information;
generating, based on the voice input, a plurality of candidate interpretations of user intent;
inferring a user intent based on the plurality of candidate interpretations of the user intent;
identifying a task based at least in part on the inferred user intent;
executing the identified task; and
in accordance with the execution of the identified task, generating a response to the user.

24. The non-transitory computer-readable storage medium of claim 17, wherein both the auditory output and the visual output paraphrase the voice input.

25. A system, comprising:
one or more processors; and memory having instructions stored thereon, the instructions, when executed by the one or more processors, cause the processors to perform operations comprising:
automatically, without user input and without regard to whether a digital assistant application has been separately invoked by a user, determining that the electronic device is in a vehicle; and
responsive to the determining:
automatically invoking a listening mode of a virtual assistant implemented by the electronic device, wherein the listening mode causes the electronic device to automatically, without a physical input from the user, listen for voice input from the user for a predetermined time after the electronic device provides an auditory output;
receiving a voice input from the user; and
concurrently providing both an auditory output and a visual output on a display screen of the electronic device based on the voice input, wherein at least one of the auditory output and the visual output paraphrases the voice input.

26. The system of claim 25, wherein determining that the electronic device is in a vehicle comprises detecting that the electronic device is in communication with the vehicle.

27. The system of claim 25, the instructions further causing the processors to perform operations comprising:
generating a response to the voice input, the response including a list of information items to be presented to the user; and
outputting the information items via an auditory output mode, wherein in accordance with a determination that the electronic device is not in a vehicle, the information items are only presented on a display screen of the electronic device.

28. The system of claim 27, the instructions further causing the processors to perform operations comprising, responsive to the determining that the electronic device is in a vehicle, limiting the amount of items in the list to a predetermined amount.

29. The system of claim 25, wherein the voice input corresponds to content to be sent to a recipient, the instructions further causing the processors to perform operations comprising:
producing a message corresponding to the voice input, wherein the auditory output and the visual output include the message; and requesting confirmation prior to sending the message to the recipient.

30. The system of claim 29, wherein requesting confirmation comprises asking the user, via the auditory output mode, whether the text should be sent to the recipient.

31. The system of claim 25, the instructions further causing the processors to perform operations comprising:

receiving a voice input comprising natural language information;

generating, based on the voice input, a plurality of candidate interpretations of user intent;

inferring a user intent based on the plurality of candidate interpretations of the user intent;

identifying a task based at least in part on the inferred user intent;

executing the identified task; and in accordance with the execution of the identified task, generating a response to the user.

32. The system of claim 25, wherein both the auditory output and the visual output paraphrase the voice input.

* * * * *